US005461560A

United States Patent [19]

Uribe

[11] Patent Number: 5,461,560

[45] Date of Patent: Oct. 24, 1995

[54] TOUCH SCREEN CONTROL SYSTEM AND METHOD FOR CONTROLLING AUXILIARY DEVICES OF A PRINTING PRESS

[75] Inventor: Diego Uribe, Barrington, Ill.

[73] Assignee: Oxy-Dry Corporation, Itasca, Ill.

[21] Appl. No.: 217,940

[22] Filed: Mar. 25, 1994

[51] Int. Cl.[6] .......... G06F 19/00

[52] U.S. Cl. .......... 364/188; 345/119; 345/173; 364/471; 395/161

[58] Field of Search .......... 364/188, 189, 364/191–193, 468, 551.01, 514, 471; 395/155–161; 345/4–6, 115, 118, 119, 120, 130, 173, 902

[56] References Cited

U.S. PATENT DOCUMENTS

| | | | |
|---|---|---|---|
| 3,971,000 | 2/1976 | Cromwell | 364/189 |
| 4,396,977 | 8/1983 | Slater et al. | 364/172 X |
| 4,639,881 | 1/1987 | Zingher | 364/188 |
| 4,942,514 | 7/1990 | Miyagaki et al. | 364/189 X |
| 4,962,473 | 10/1990 | Crain | 364/514 X |
| 4,991,077 | 2/1991 | Kawasaki et al. | 364/188 |
| 5,010,819 | 4/1991 | Uribe et al. | 101/425 |
| 5,083,710 | 1/1992 | McLoughlin et al. | 239/690 |
| 5,109,770 | 5/1992 | Uribe et al. | 101/425 |
| 5,213,271 | 5/1993 | Uribe et al. | 239/654 |
| 5,277,111 | 1/1994 | Uribe et al. | 101/425 |
| 5,295,062 | 3/1994 | Fukushima | 364/188 |
| 5,297,252 | 3/1994 | Becker | 395/160 |

*Primary Examiner*—Joseph Ruggiero
*Attorney, Agent, or Firm*—Leydig, Voit & Mayer, Ltd.

[57] ABSTRACT

A control system for controlling auxiliary devices of a printing press. Auxiliary devices are connected to a centralized system controller for operation thereof. The system controller provides an image of control panels for controlling each of the auxiliary devices on a single display screen. A touch screen controller is combined with the display screen and the system controller, allowing a press operator to set and control the operating parameters of the devices from control panel images on the display. The parameters for the auxiliary devices may be saved as a set and recalled for later use on similar job runs.

25 Claims, 31 Drawing Sheets

TOUCH SCREEN CONTROL SYSTEM AND METHOD FOR CONTROLLING AUXILIARY DEVICES OF A PRINTING PRESS

FIELD OF THE INVENTION

The invention relates generally to printing presses, and more particularly to a control system for controlling auxiliary devices of a sheetfed printing press.

BACKGROUND OF THE INVENTION

Auxiliary devices are often attached to printing presses, such as sheetfed printing presses, to enhance the quality of the printing by eliminating problems that are inherent in printing operations. For example, to decrease printing offset, i.e., the blurring of ink caused by subsequently stacked sheets, it has been found useful to coat a printed sheet with powder after inking the sheet. Accordingly, one such auxiliary device comprises a roller-type powder sprayer. In these devices, a roller is rotated to discharge a metered amount of the powder onto the sheet. Electrostatic means may be employed to facilitate complete removal of powder from the roller at the zone of the discharge. The powder deposited on each sheet further acts to maintain sheet separation, which aids in the ink drying process.

Such powder sprayers may be further combined with another auxiliary device that automatically supplies powder to the sprayer. Two such auxiliary powder sprayers with supply systems are described in U.S. Pat. Nos. 5,083,710 and 5,213,271, assigned to the same assignee as the present application.

Another common auxiliary device that is installed on presses consists of a blanket washer for cleaning accumulated foreign matter off of blanket cylinders and plate cylinders. Such accumulated foreign matter typically includes dried ink, ink build-up, paper, lint and the like, and must be removed in order to maintain high-quality printing. To remove the foreign matter, printing presses are often outfitted with auxiliary cleaning systems such as those disclosed in U.S. Pat. Nos. 5,010,819, 5,109,770, 5,277,111 and 4,015,307, assigned to the same assignee as the present application.

In addition to blanket washers, other auxiliary devices can include one or more dryers, an air knife, and/or an air evacuator. These devices generally are installed on printing presses to speed the chemical bonding process (i.e., the drying and curing) of inks deposited on a sheet, which allows faster printing speeds to be run and produces with consistent inking. While the many auxiliaries thus enhance the printing operation, each of the devices have individual parameters which must be set according to the specific job being run. In addition, once set, the parameters must occasionally be adjusted to "fine-tune" their performance, such as to compensate for variations in temperature and humidity, to optimize the printing operation.

By way of example, certain types of inks and types of paper require more powder to prevent offset than do other types of inks and types of paper. However, it is desirable to use only the minimum amount of powder on each sheet that acceptably prevents offset, since excess powder tends to spread to undesirable areas. Moreover, powder that does remain on the sheet must ultimately be removed from the sheet at a later time, so again it is desirable to discharge only the necessary amount to make removal less burdensome.

Thus, each time a different job is run, the press operator must set the operating parameters of the auxiliary devices at appropriate values for the particular paper and ink combination being run. For the sprayer, the press operator typically enters an appropriate value for the powder discharge, which typically is entered as a percentage of maximum sprayer output capacity. Of course, depending on current conditions such as temperature and humidity, the discharge of powder may be further modified from a known starting value for that ink and paper combination. Accordingly, the press operator must make adjustments to occasionally compensate for these and other varying conditions based on periodic examinations of the printed product.

Similar parameters must be entered and subsequently adjusted for each auxiliary device every time a different job is being run. However, printing presses are physically large mechanisms. As a result, in order to adjust the parameters of the several auxiliary devices, an operator must walk to the control panel of each device and make the adjustment. Similarly, the operator must periodically inspect the control panels to obtain certain information as to the status of the devices.

Moreover, each new printing run typically requires the operator to adjust several of the auxiliary device parameters. The operator individually sets the values at the approximate settings required for a particular job based on prior experience, or by consulting a reference manual or the like where the values for similar jobs on the same press have previously been recorded.

In short, the present way of setting operating parameters is time-consuming, depends on the reliability of the press operator, and results in inconsistent quality over several jobs.

OBJECTS AND SUMMARY OF THE INVENTION

Accordingly, it is a primary object of the present invention to substantially reduce the setup time for auxiliary devices of a printing press.

It is a related object to provide a system and method for setting up the parameters of auxiliary devices that improves the quality of the printing from run to run by enabling more consistent settings of the auxiliary device parameters.

In accomplishing these objects, it is another object to provide a visualization of all settings to ease the operator's ability to assess relative device settings.

It is a related object to provide a visualization of all settings that an operator may monitor in real-time during press operation.

Yet another object is to provide a system and method of the above kind that is inherently simple for operators to learn.

Still another object is to reduce the amount of space occupied by auxiliary devices and their control panels.

Briefly, the invention provides a system and method for controlling the individual operating parameters of auxiliary devices associated with a printing press from a common location. The system includes a controller having a processor and a memory therein for storing values of the operating parameters, and an input device operatively connected to the processor and disposed at the common location for obtaining commands and providing signals to the processor corresponding thereto. The system further includes an interface for connecting auxiliary devices to the processor such that signals from the processor control the operating parameters of the auxiliary devices, and a display operatively connected to the processor and disposed at the common location. The display includes images representing a control panel for each auxiliary device, and the processor operates the display and provides signals to the interface to control the auxiliary devices in accordance with commands from the input device.

The system may further include a storage device, and the input device may include means for entering an identifying label to the controller. The controller may then command the storage of the operating parameters of the auxiliaries from the memory of the controller to the storage device in conjunction with the identifying label. Stored parameters may be retrieved from the storage device to the memory of the controller in conjunction with the identifying label.

The method includes the steps of displaying an image representing the control panels corresponding to each auxiliary device on a display screen at a common location and selecting one of the control panels from the image. The selected control panel on the display screen is actuated for inputting values of the operating parameters, and values are selected for the operating parameters of the auxiliary device corresponding to the selected control panel. A signal corresponding to the selected operating parameter is output to control the operating parameter of the auxiliary device.

Other objects and advantages will become apparent from the following detailed description when taken in conjunction with drawings, in which:

BRIEF DESCRIPTION OF THE DRAWINGS

FIG. 2D-1 to 2D-4 comprise a schematic of the electronic drive circuitry for operating the sprayer motor and tube;

FIGS. 2E-1 to 2E-7 and FIGS. 2F-1 to 2F-3 comprise a schematic of the ARCnet board installed in the interfaces for communication with the system controller;

FIG. 3 is a block diagram representing how the devices are controlled by the touch screen controller;

FIG. 4 is a memory map generally illustrating the various divisions of memory allocated for implementing the invention;

FIG. 6 is a representation of a screen that appears during the startup of the program;

FIG. 7 is a representation of an access code entry screen that appears after the entry of a Setup command;

Figure 1:
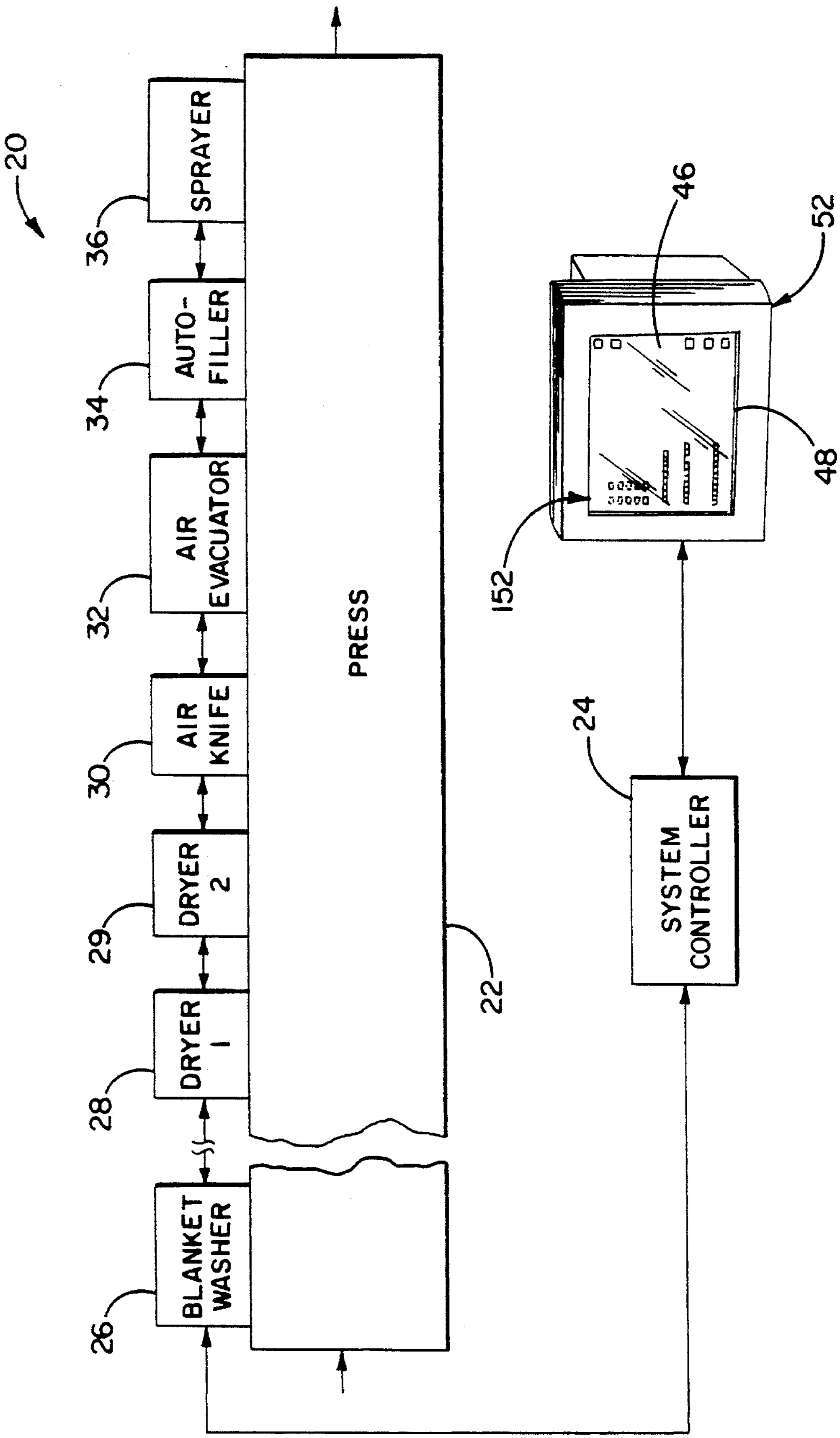
FIG. 1 is a block diagram illustrating auxiliary devices installed on a printing press and connected to a centralized system controller and touch screen controller in accordance with the invention.

All of the references cited herein, including U.S. Pat. Nos. 4,015,307, 5,010,819, 5,083,710, 5,109,770, 5,213,271 and 5,277,111 are hereby incorporated in their entireties by reference.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Turning now to the drawings and referring first to FIG. 1, there is shown a block diagram of a plurality of auxiliary devices generally designated 20 installed on a press 22, and constructed with a centralized system controller 24 in accordance with the invention. As shown in FIG. 1, the auxiliary devices 20 may comprise a blanket washer 26, dryers 28, 29, an air knife 30, an air evacuator 32, an auto-filler 34 and a sprayer 36.

The auto-filler 34 and sprayer 36 might be incorporated into a single device, as described previously, such as those disclosed in U.S. Pat. Nos. 5,083,710 and 5,213,271, but for purposes of this illustrated embodiment are treated separately. Similarly, the air knife 30 and air evacuator 32, while physically separate devices, may be arranged to work as a single unit, i.e., when one is actively operating, so is the other.

It can be appreciated that other such auxiliary devices may be combined, added or deleted from a particular press and auxiliary device configuration without departing from the spirit and scope of the invention. For example, as described in more detail below, it is common to include multiple washers and dryers 28 on a single press.

In accordance with one aspect of the invention, the several control panels ordinarily present on the individual auxiliary devices 20 are consolidated into images thereof and displayed in a minimized profile on the left side of a display screen 46. These control panel images 152 are shown in more detail in FIG. 6. The system controller 24 in communication with the auxiliary devices 20 updates the control panel images 152 in real-time to reflect the status of the individual auxiliary devices 20. This enables the press operator to view the images 152 of all of the control panels simultaneously at a common location.

In accordance with another aspect of the invention, an input device 48, preferably a touch screen controller 52 attached to the display 46, is also connected to the system controller 24 so that icons present in selected ones of the displayed images may be touched to enter device control commands as if the icons themselves were pushbutton switches on conventional control panels. While the minimized control panel images are large enough to display auxiliary device status information, in general they are too small to allow entry of commands. Accordingly, instead of entering the commands in the minimized profile, the system is arranged such that pointing to a control panel selects that panel and presents it to the operator in an enlarged format for command entry.

Figure 9A:
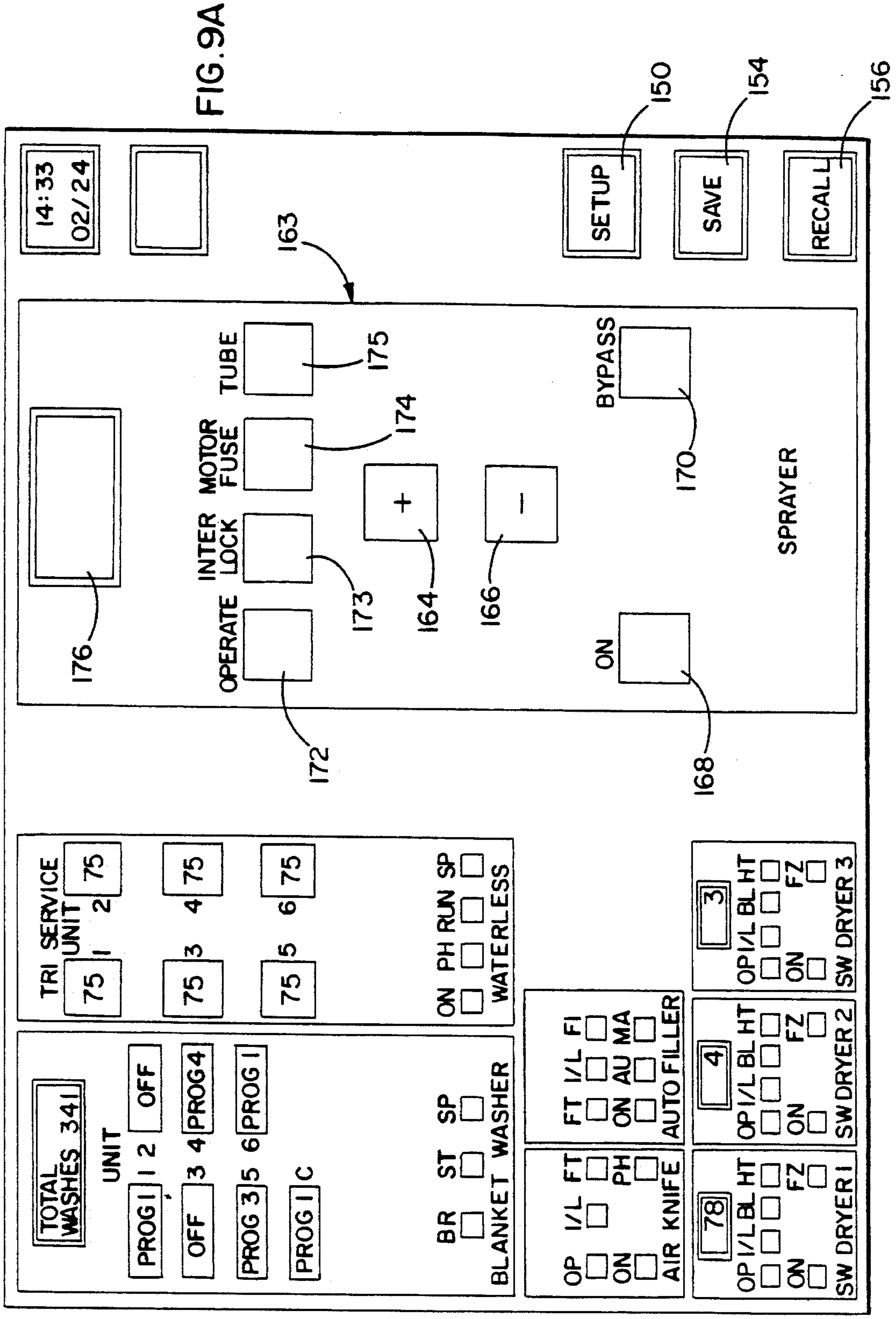
FIGS. 9A–9C are representations of various screens that appear when the sprayer is selected and modified.

More specifically, the right side of the screen is reserved to expand an image of a selected panel to a size that accommodates manual manipulation with a feel similar to that of a standard mechanical panel to which the operator is accustomed. In other words, the selected control panel is maximized on the right side of the display 46, for example as shown in FIG. 9A, and enabled for command entry. In this manner, the display 46 and associated touch screen controller 52 together with the system controller 24 enable the emulation of conventional control panels, but effectively integrate all the control panels into a common location.

Figure 2A:
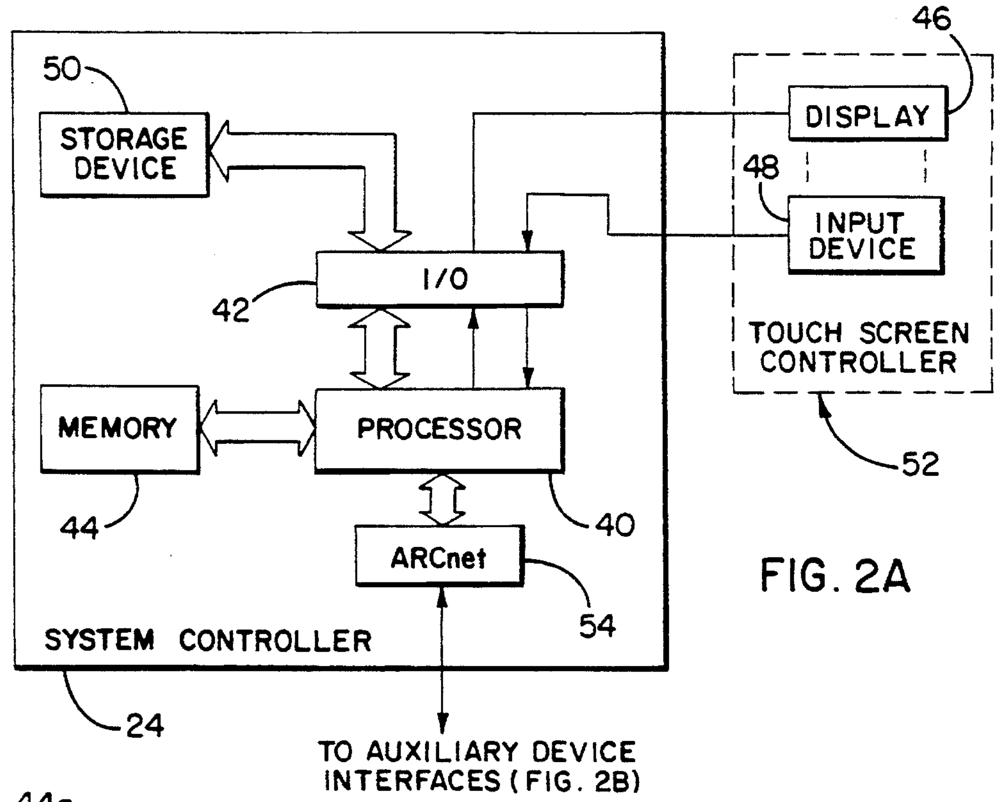
FIG. 2A is a block diagram of the system controller for interfacing with the auxiliary devices.

In general, the system functions to emulate the switches on selected ones of the control panels as the touch screen controller 52 provides data to the system controller 24 indicative of the display coordinates that are being pointed at. Thus, as shown in FIG. 3, the touch screen controller 52 can conceptually be considered as including X–Y matrix 37 that resolves X–Y coordinates when touched and provides them to a processor 40 in the system controller 24. The processor 40 acts as a translator 38 to translate the X–Y matrix coordinate into an input command by referencing an appropriate matrix map from among a set of matrix maps 39 defined in a system controller memory 44 (FIG. 2A). The appropriate matrix map corresponds to the displayed image at the time the coordinates were resolved, i.e, the appropriate map has commands or the like stored therein which correspond to the screen coordinates of the icons that are presently displayed.

By way of example, assuming the operator desires to enter a command, the operator points at (i.e., physically touches or comes into sufficiently close proximity to trigger) the touch screen controller 52 where the icon corresponding to the desired command is displayed. As this icon is pointed at, the processor 40 receives at least one pair of X–Y coordinates indicative of to the pointed-to screen location. Since the processor 40 is aware of what image is currently being displayed, the processor 40 translates these coordinates into an appropriate command, for example by accessing a look-up table, i.e., the matrix map that corresponds to the currently displayed image. Based on that command, the processor 40 will take appropriate action, for example modifying the operation of an auxiliary device, as described in more detail below.

Of course, not all possible screen coordinates necessarily correspond to entered commands since only certain areas of the screen may be displaying images or icons representing commands at any given time. Moreover, it should be understood that many pairs of coordinates may correspond to the same command, since the icons representing the commands may cover large areas. Accordingly, the size of the memory location allocated for the matrix maps 39 will ordinarily depend on the resolution of the touch screen controller 52.

Figure 4:
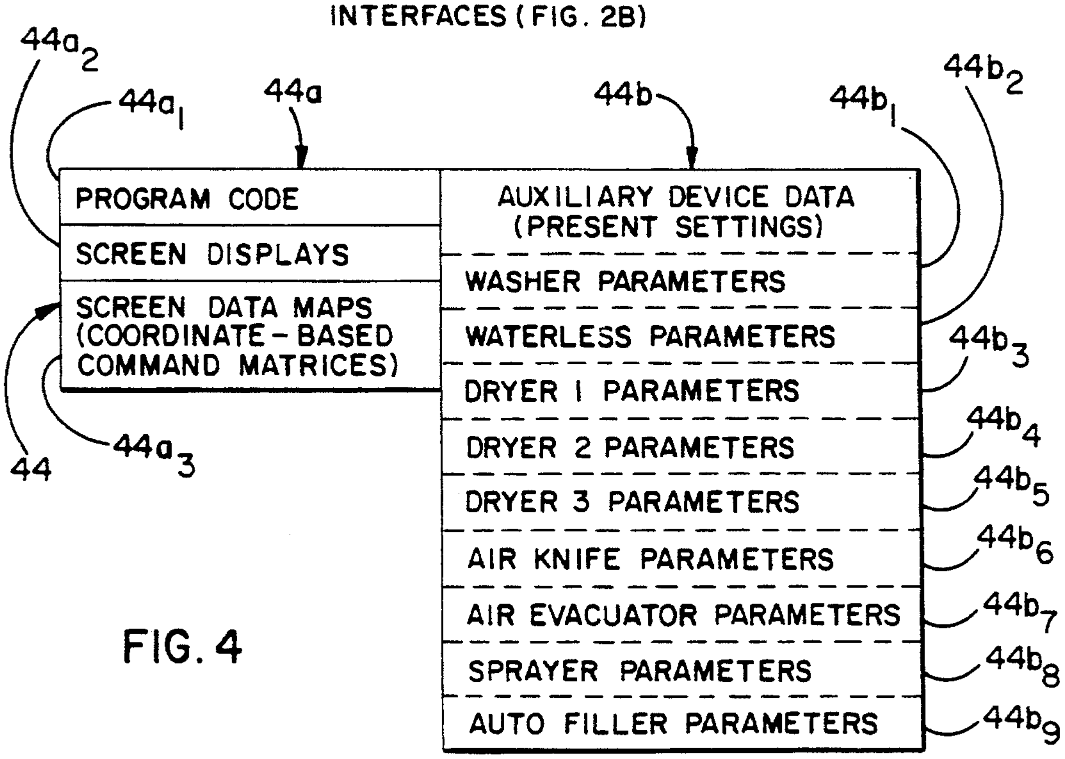

As shown in FIG. 2A, the system controller 24 executes a real-time software program (the listing of which is included herewith as an Appendix) to enable control of the auxiliary devices 20 from a common location in accordance with the invention. The system controller 24 includes the processor 40 operatively connected through a conventional input-output means 42 to the memory 44, a display 46 and the input device 48. In addition, a storage device (memory) 50 is provided to enable substantially permanent data storage. The memory 44 may be generally allocated as shown in FIG. 4, with program code 44$a_1$, screen displays 44$a_2$ and corresponding memory maps 44$a_3$ grouped in one memory section 44$a$, and parameter data 44$b_1$–44$b_9$ grouped in another memory section 44$b$.

The preferred system controller 24 comprises a 40 megahertz 386SX-based personal computer with one megabyte of DRAM memory. The display 46 is preferably a fourteen inch VGA display including 256 kilobytes of video RAM, and may be a Zenith Model No. ZCM1492 or ZCM1495, selected for being relatively flat. The storage device 50 is a solid-state data drive comprising up to 768 kilobytes EPROM and up to 256 kilobytes of battery backed-up static RAM. Of course, it can be readily appreciated that other types of processors, displays, random access memory, data storage devices and the like may be alternatively employed.

Preferably the input device 48 comprises touch-screen sensors incorporated in a touch screen controller 52 disposed so as to be coordinated with the display 46 such that physical proximity to the display 46 provides a signal from the input device 48 to the processor 40 indicative of the screen coordinates being pointed at as described above. As used herein, the terms "physical proximity," "pointed at" and "touch" with respect to the touch screen controller 52 are intended to mean close enough to be detected by the sensors therein, whether or not actual contact with the display screen 46 is made. Although other input devices 48 such as a keyboard or a mouse may be used to control the auxiliary device parameters, the touch screen arrangement has been found particularly useful in the printing environment. Moreover, one advantage of the touch screen controller 52 is that the image on the display 46 is interchangeable to reflect the configuration of the auxiliary devices 20. Thus, unlike a fixed keyboard on a conventional control panel, the image can be adapted to a particular setup that occasionally changes without requiring any different hardware.

The touch screen controller 52 is preferably based on infrared sensing, although ultrasonic or capacitive touch-panel sensing may alternatively be used. The preferred touch screen controller 52 has a minimum resolution of one-eighth of an inch (83 points per x-axis by 63 points per y-axis) and communicates with the processor 40 through an RS-232C interface at a 1200, 9600 or 19,200 baud rate. Accordingly, the touch screen controller 52 (as the preferred input device 48) includes circuitry for 1) sensing physical proximity to the display screen 46, 2) converting the sensed physical proximity to data (i.e., coordinates) indicative of the screen area sensed, and 3) transmitting the data to the processor 40 in the proper RS-232 serial data format. In addition, the chosen touch screen controller 52 should mate reasonably well with the selected display 46. One such touch screen device having these features is commercially available from Transvision Ltd., Bensenville, Illinois, Part No. TSM-010.

To interface the system controller 24 with the auxiliary devices 20 for communication therewith, an ARCnet communications board 54 is further provided as shown in FIG. 2A. As is well known, such ARCnet boards allow various electronic devices to be connected in a networked fashion by providing the necessary circuitry for transmitting and receiving data via a coaxial cable according to the ARCnet standard. One such ARCnet board suitable for installing in a 386-based personal computer is commercially available from Standard Microsystems Corporation, Hauppauge, N.Y., Model No. ARCNETPC130. Of course, while such ARCnet-based communication is preferred, it can be readily appreciated that the system controller 24 may communicate with the auxiliary devices 20 in a number of ways. These include other networking arrangements, hard-wiring, infrared or RF transmission and reception, and the like.

Figure 2B:
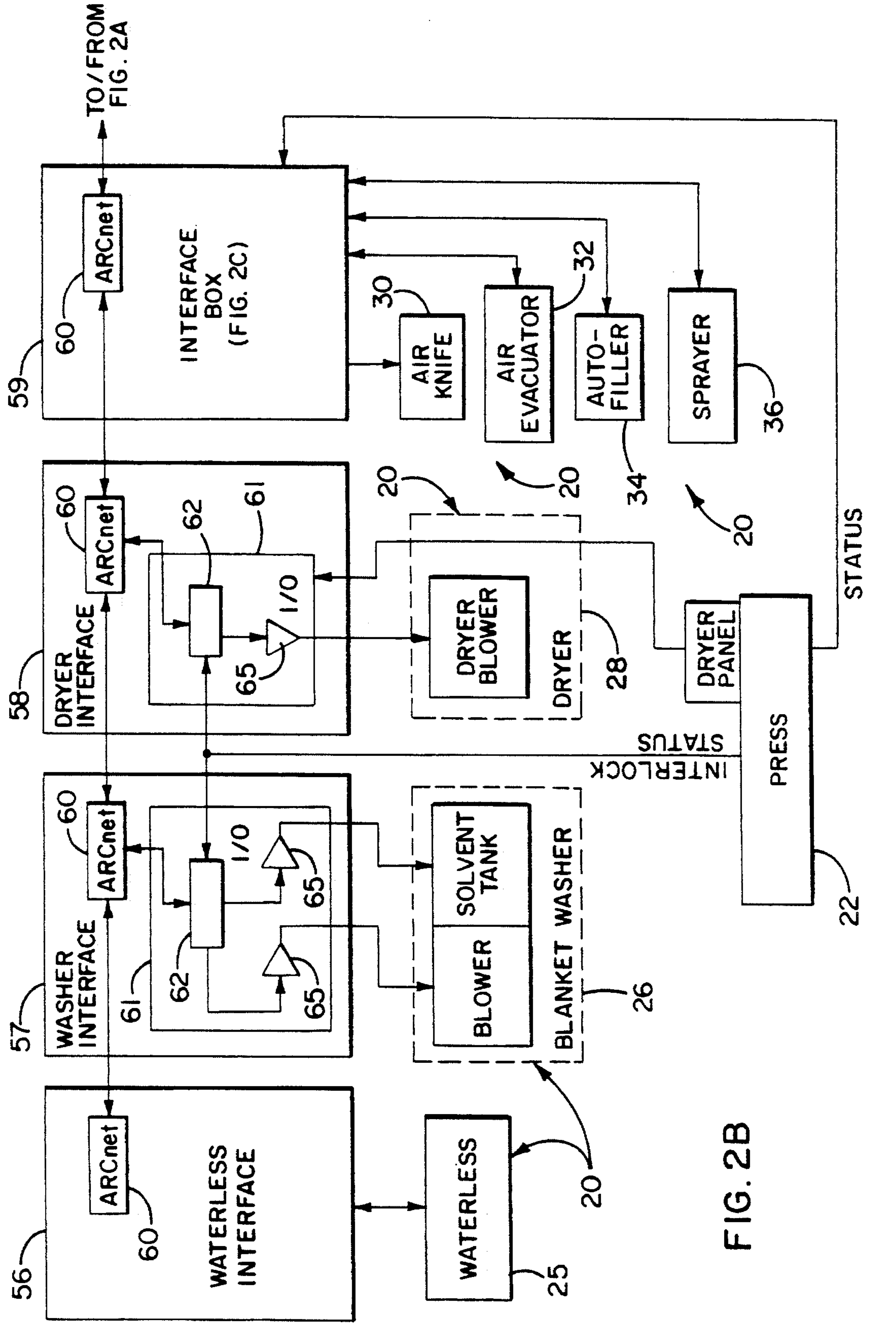
FIG. 2B is a block diagram of the interfaces for connecting the system controller to the auxiliary devices for control thereof.

As shown in FIG. 2B, a plurality of interfaces 56–59 having similar ARCnet boards 60 therein are provided for controlling each of the auxiliary devices 20 based on signals from the system controller 24. In addition, the interfaces 56–59 return signals (such as signals representing device status) from the auxiliary devices 20 to the system controller 24 via the ARCnet boards when appropriate. ARCnet boards used in the interfaces 56–59 were obtained from Transvision Ltd., Bensenville, Ill., Part No. INTF-008. A schematic of one such board is provided in FIGS. 2E-1 to 2E-7 through FIGS. 2F-1 to 2F-3.

The ARCnet boards 60 convert the coaxial-based data transmissions from the system controller ARCnet board 54 back to control signals for operating the auxiliary devices 20. Of course, since the auxiliary devices 20 typically require high voltage and/or current levels to operate, the converted control signals from the ARCnet board, which are typically at logic levels such as 5 volts DC, are not directly applied to the auxiliary devices 20. For example, the air knife 30 motor requires 115 volts AC to operate.

Conversely, the ARCnet boards 60 also convert logic signals (for example, signals indicative of auxiliary device status) to properly formatted serial data for coaxial transmission back to the system controller 24. Ordinarily dependent on the AC voltages required for operating the auxiliary devices 20, the status signals are not initially at logic levels. For example, the press interlock status coming back from the press 22 is ordinarily at 115 volts AC, and thus must be converted to a logic level before it can be safely sent to the ARCnet board 60.

Accordingly, there is provided input-output circuitry 61 which includes devices for converting logic level signals from the ARCnet boards 60 to required output levels required by the auxiliary devices 20 (which may include logic gates and/or buffers 62 and the like), and for converting high voltage input levels from the auxiliary devices 20 to logic levels required by the ARCnet boards 60. One preferred family of devices that accomplishes the appropriate conversions while providing acceptable electrical isolation comprises standard output and input modules, such as AC output module model number G40AC5 (5 VDC logic voltage, 12∝140 VAC line voltage) and AC input module model no. G41AC5 (115 volts input, 5 VDC output) commercially available from OPTO-22, Temecula, Calif. Of course, relays, solenoids and the like may be alternately or concurrently employed as desired. For simplicity herein, the term "driver" is intended to include all such devices that convert between logic level voltages and device operating voltages.

Figure 2C:
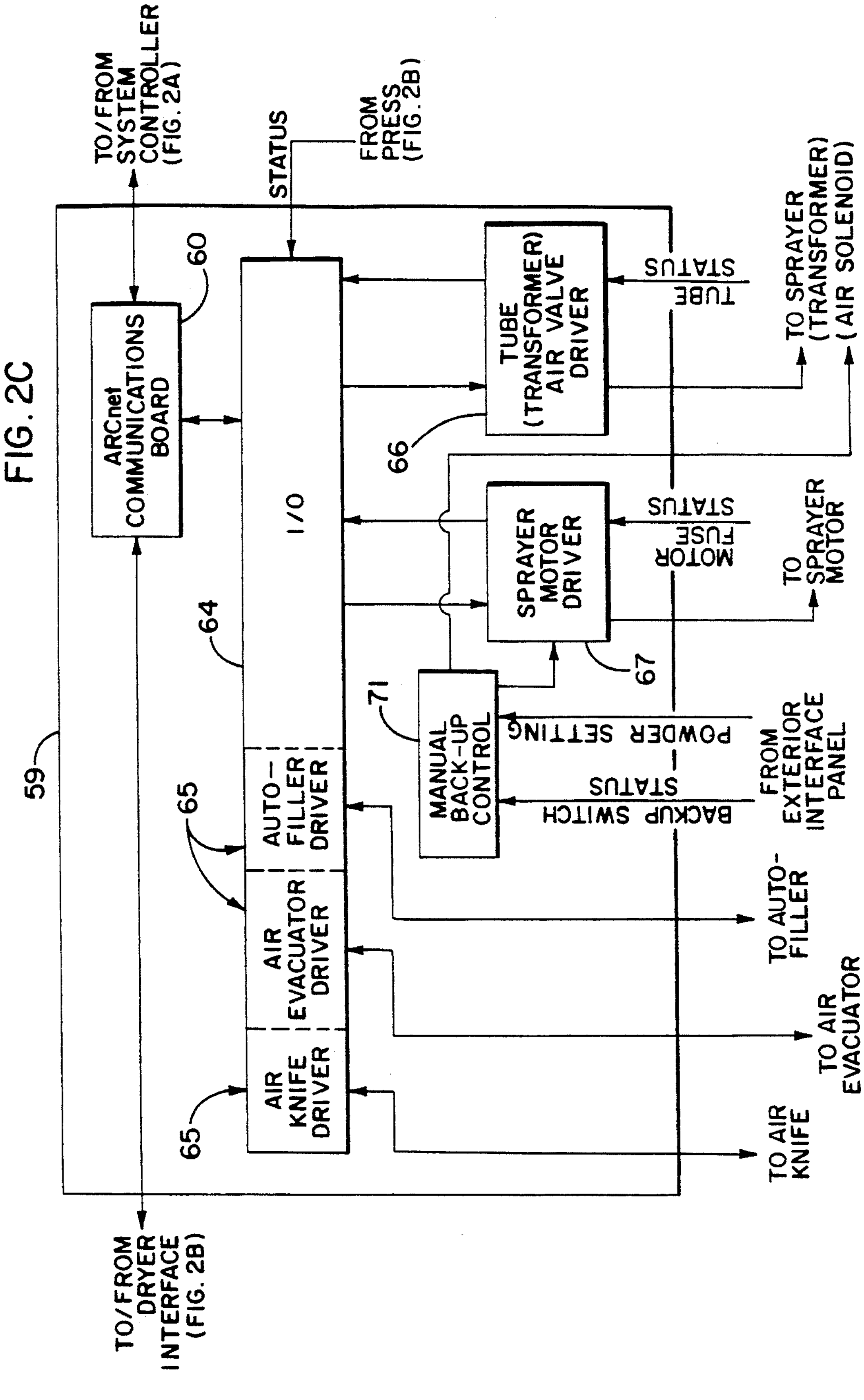
FIG. 2C is a block diagram of the interface box of FIG. 2B, in particular illustrating the connections for control of the sprayer.
Figures 1, 2D:
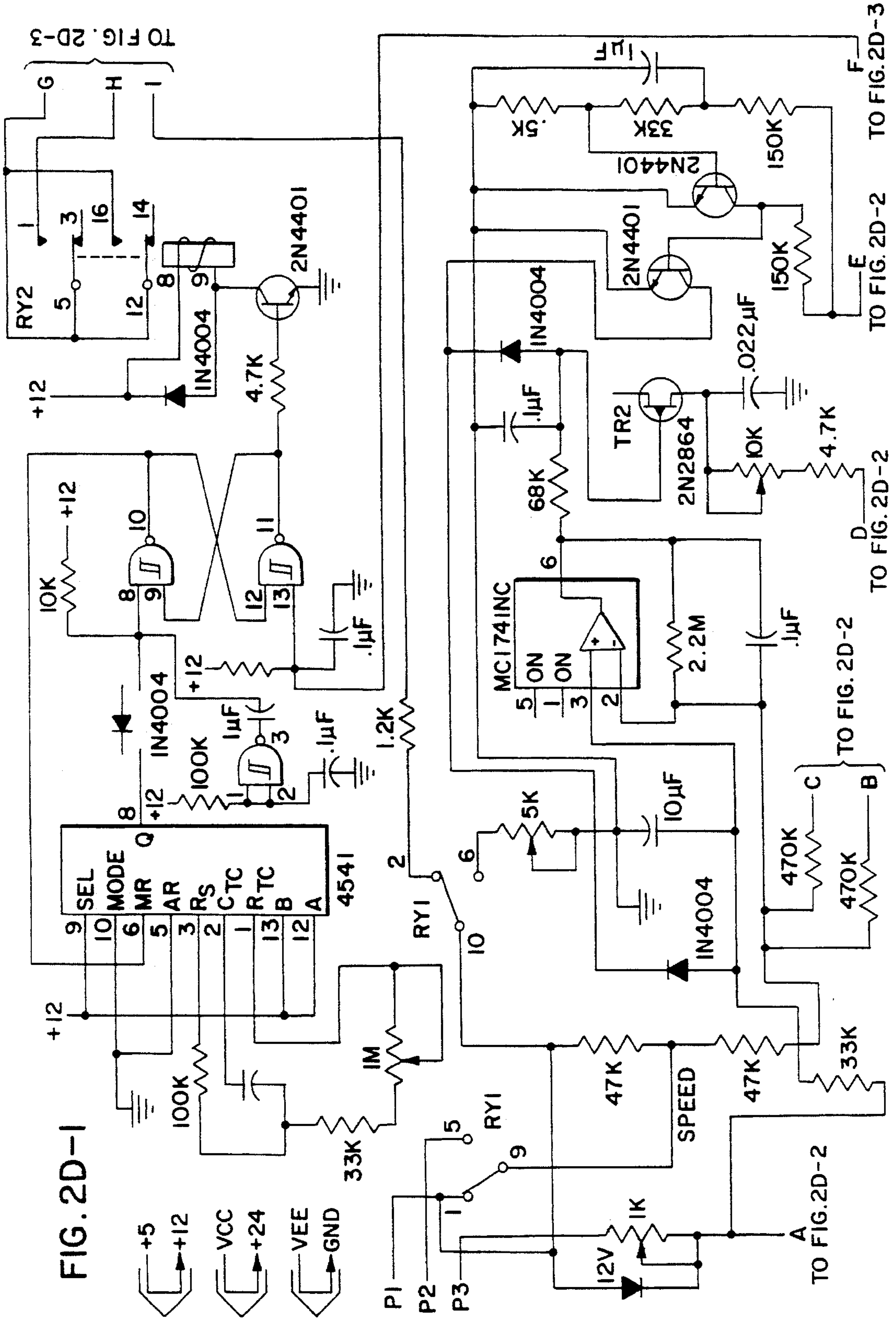
Figures 2, 2D:
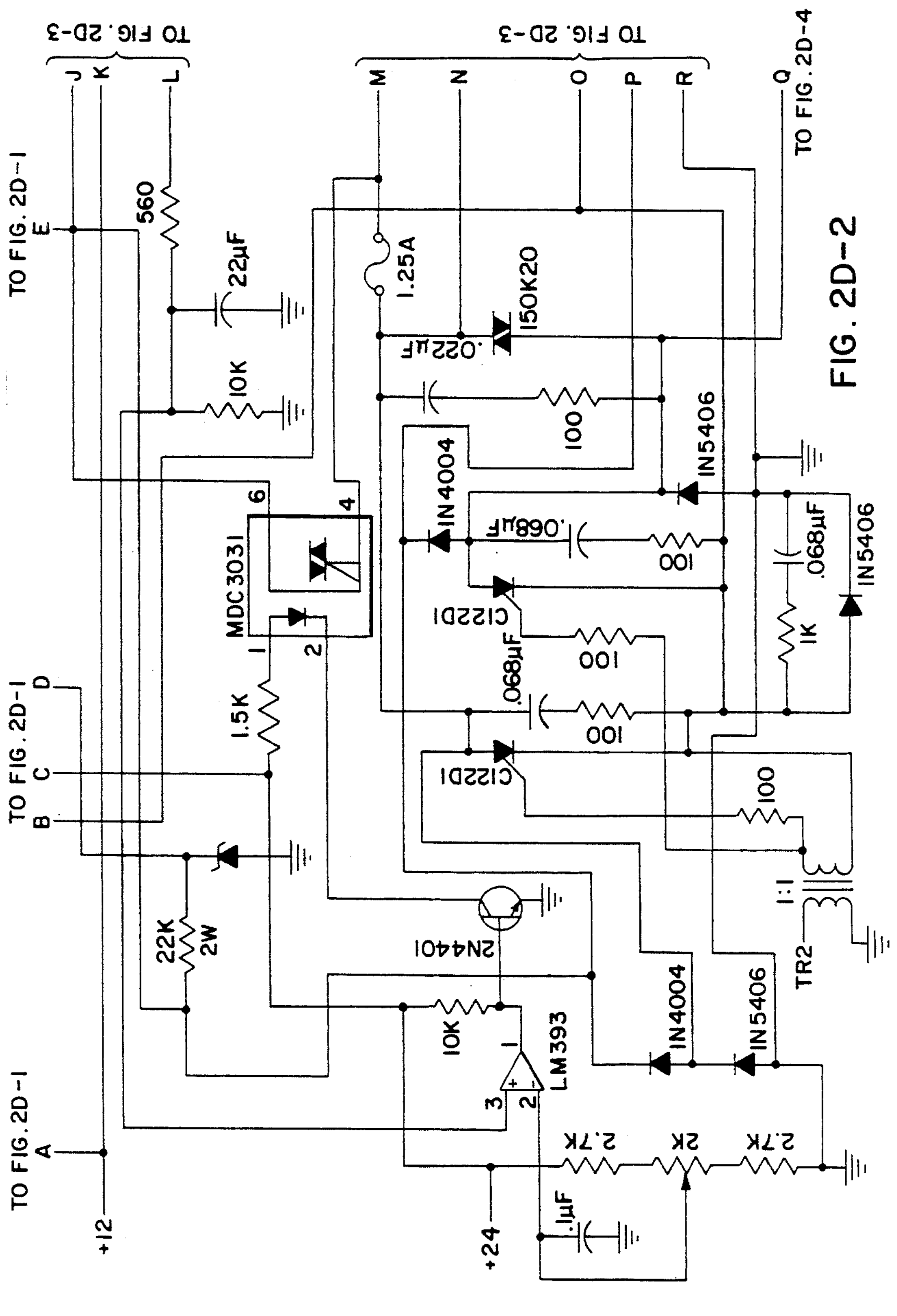
Figures 2, 2D, 3:
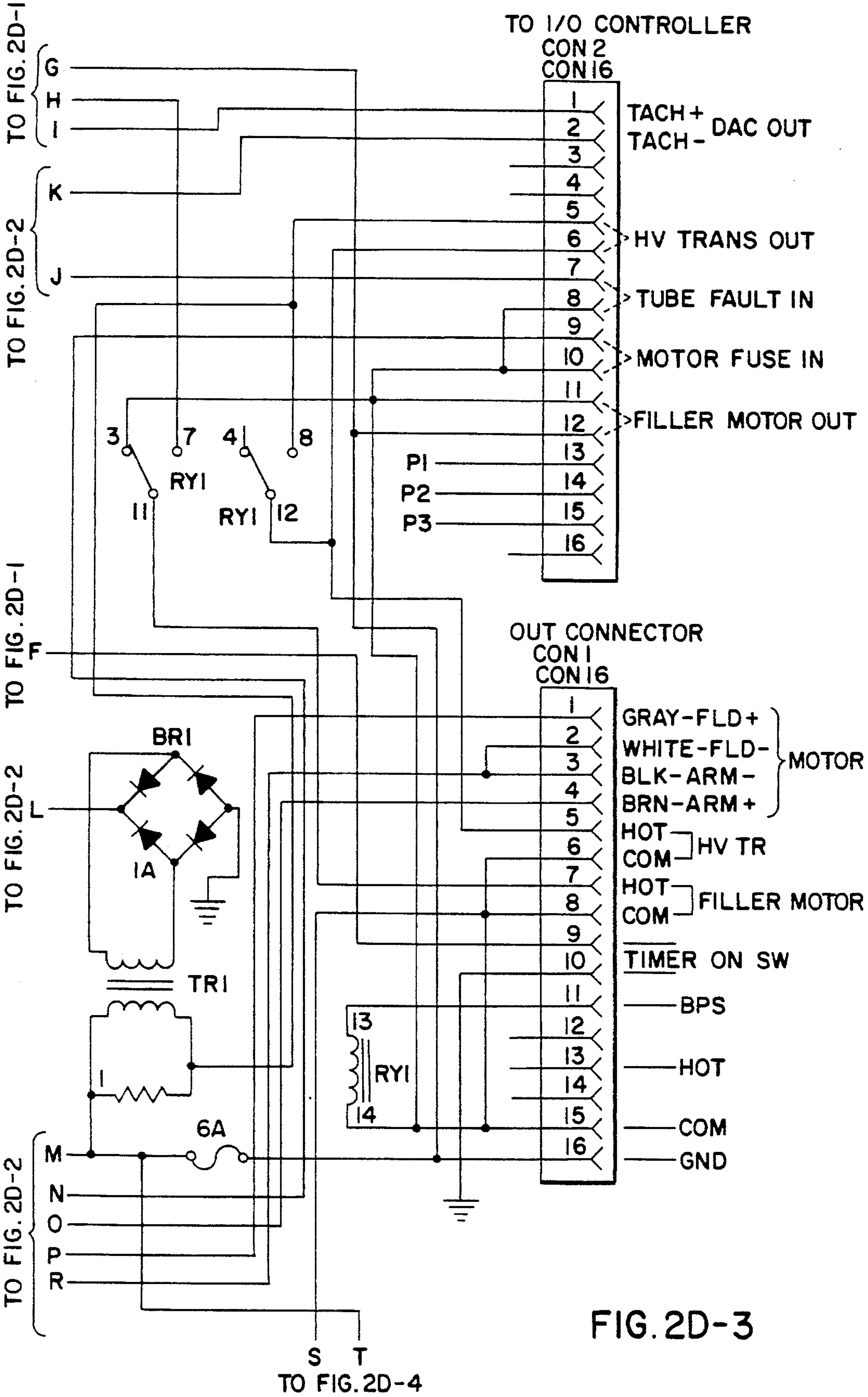
Figures 2, 2D, 3, 4:
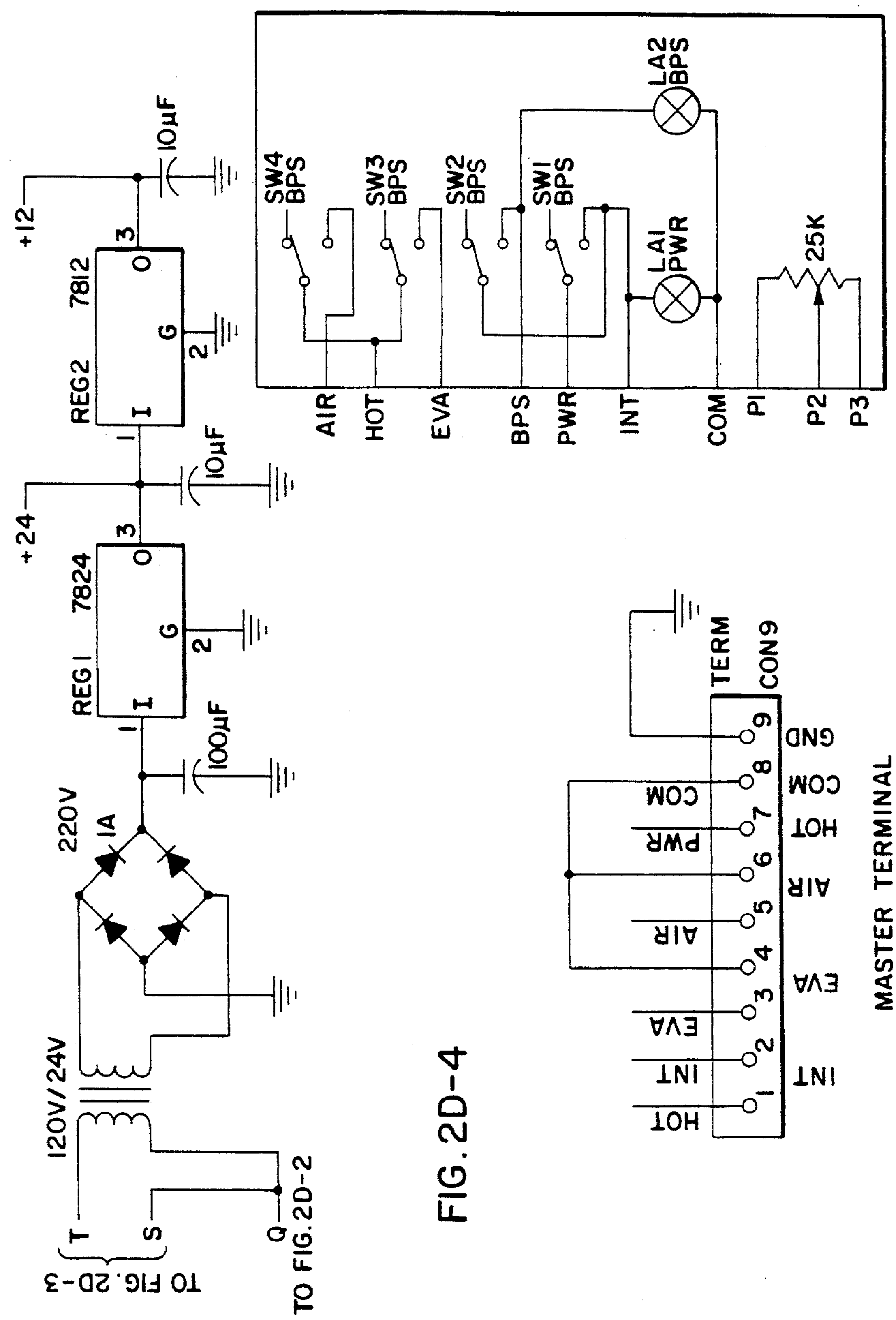
Figures 1, 2E:
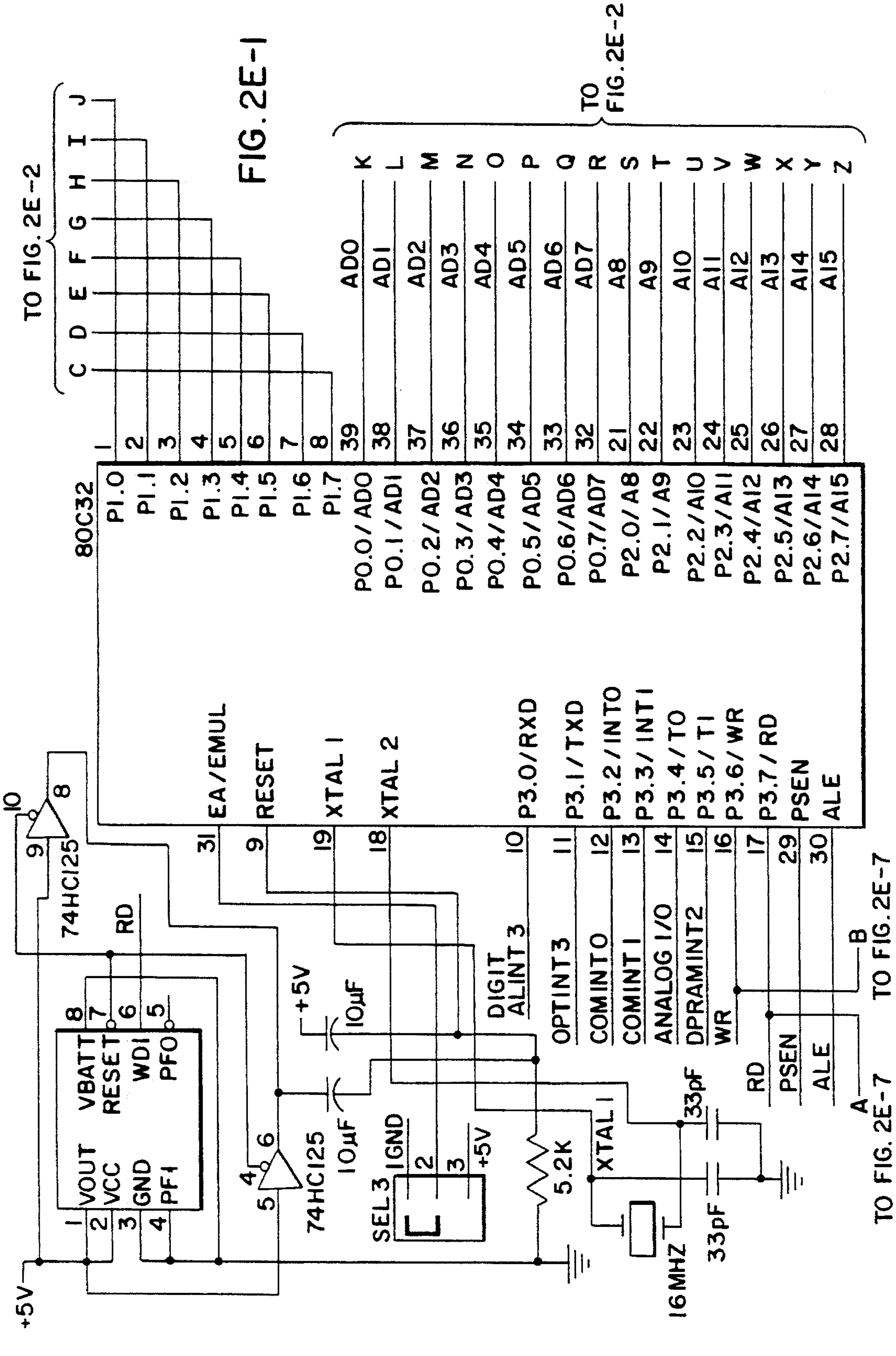
Figures 2, 2E:
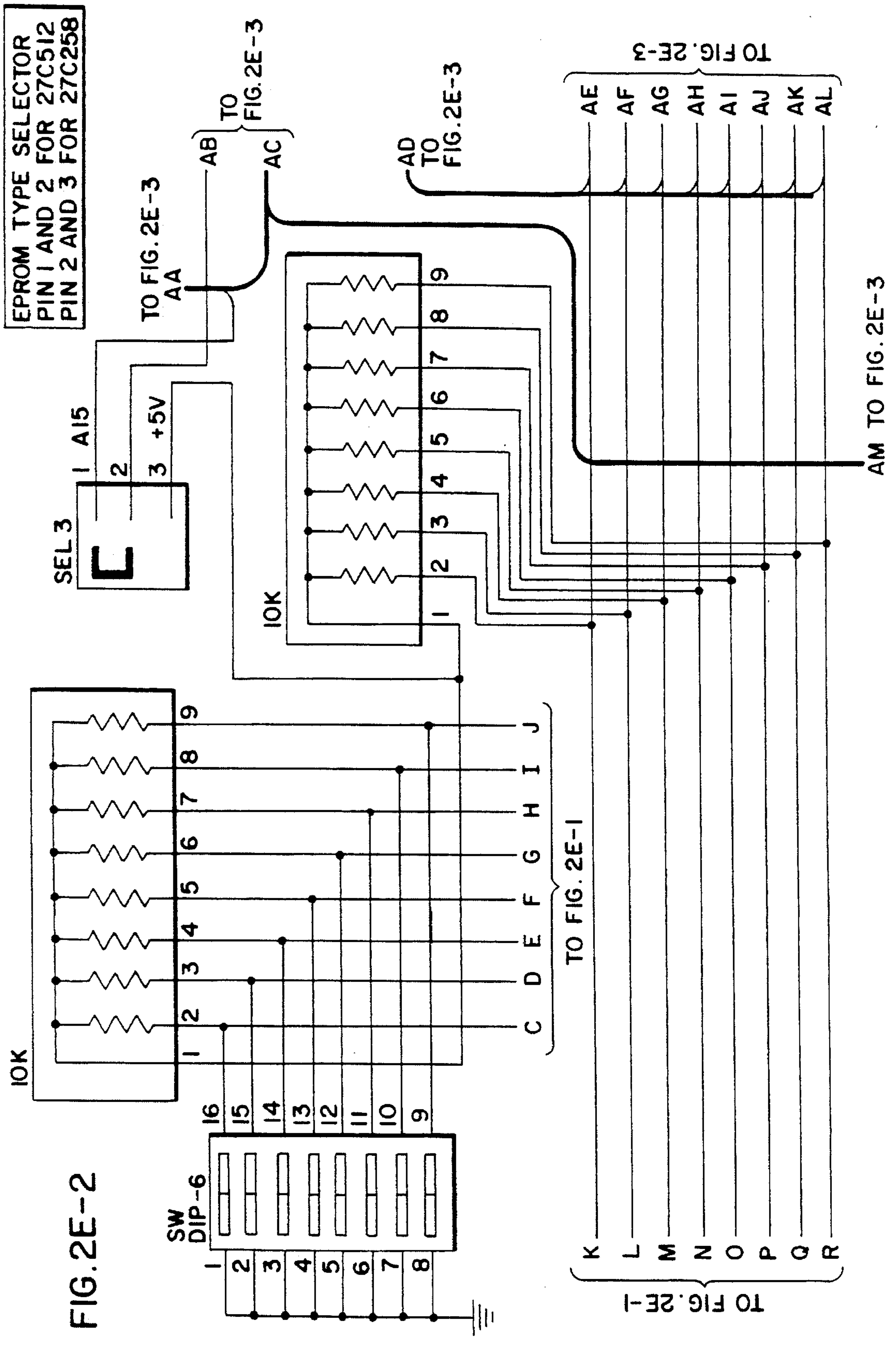
Figures 2, 2E, 3:
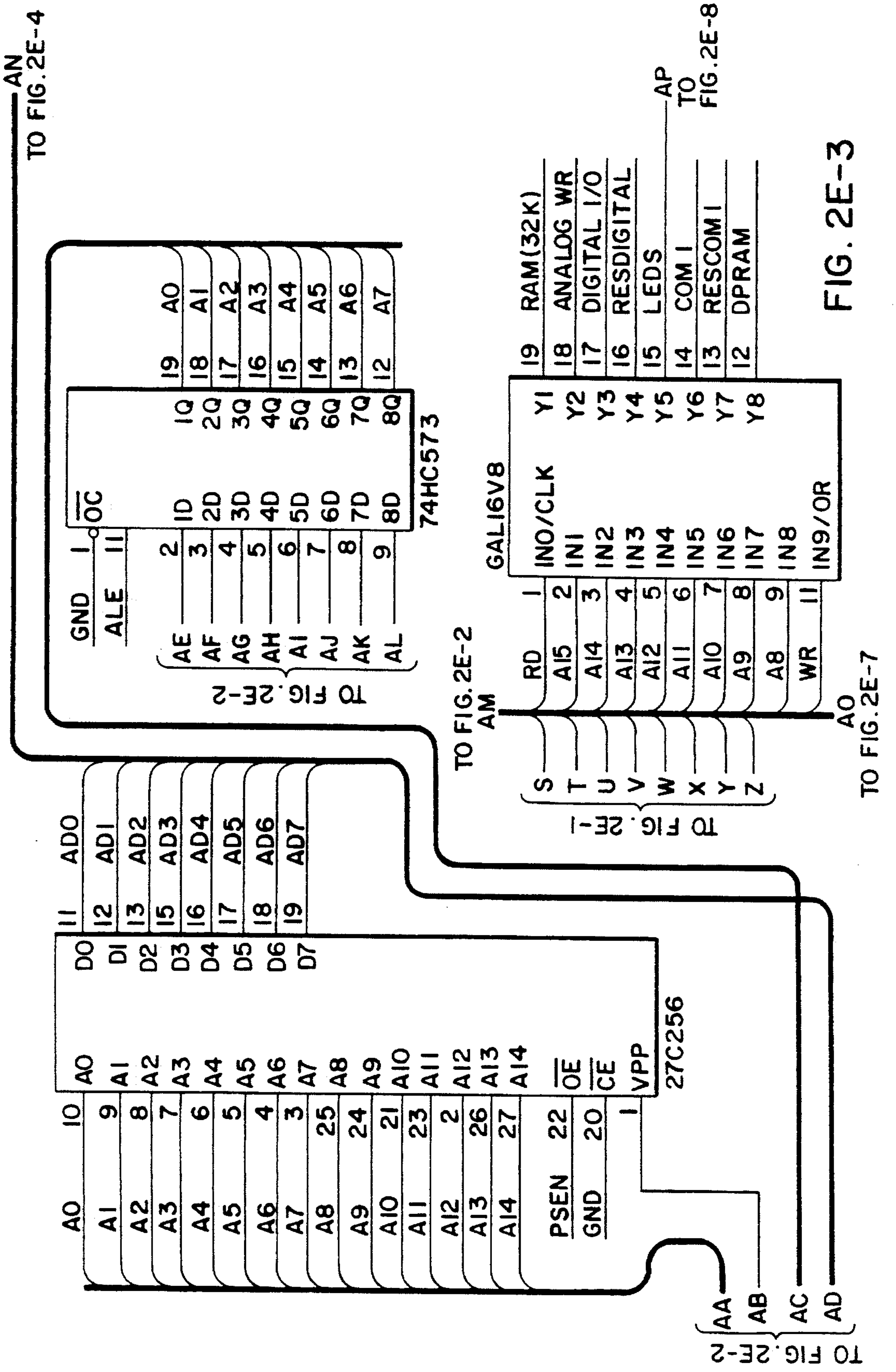
Figures 2, 2E, 3, 4:
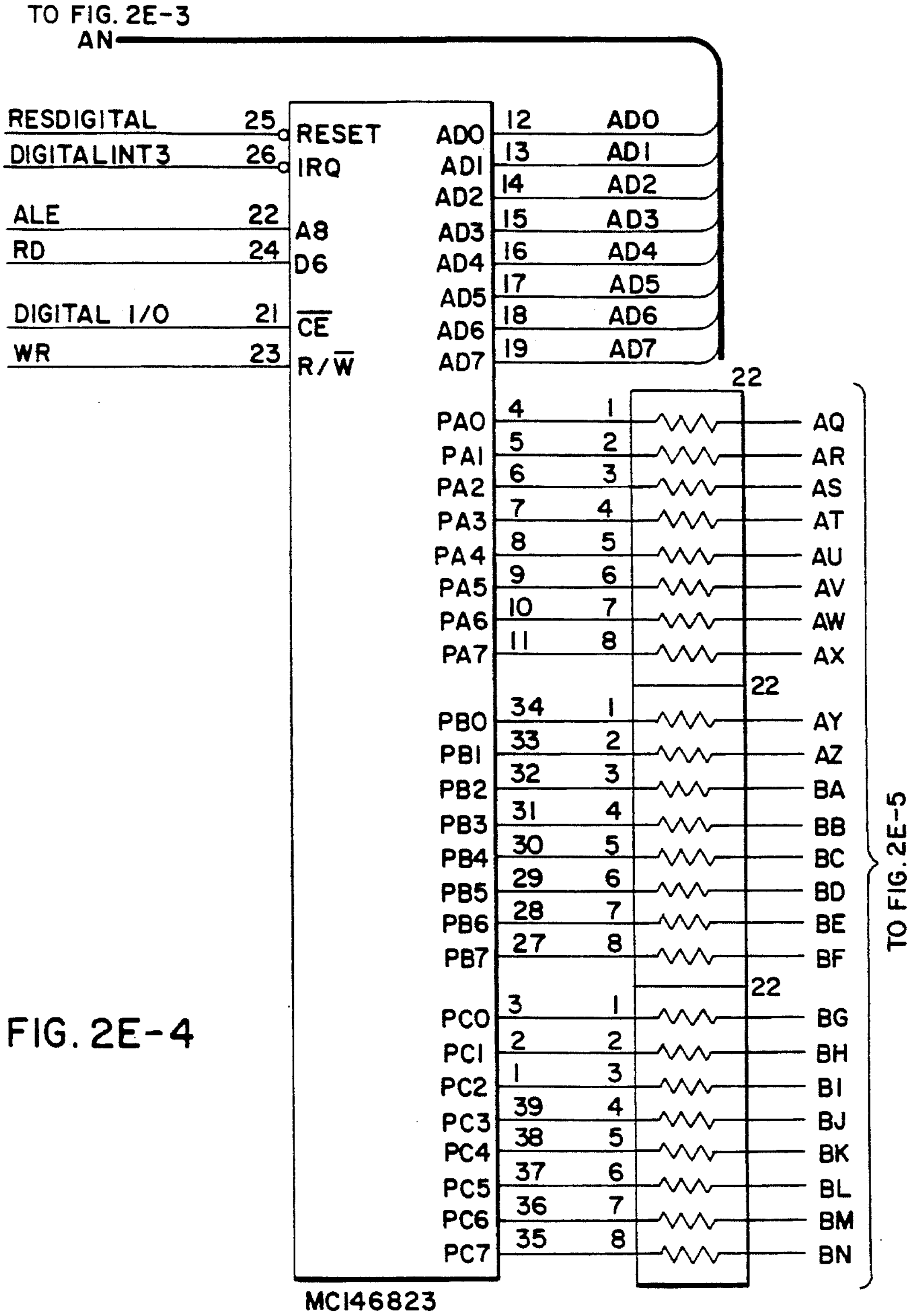
Figures 2, 2E, 3, 4, 5:
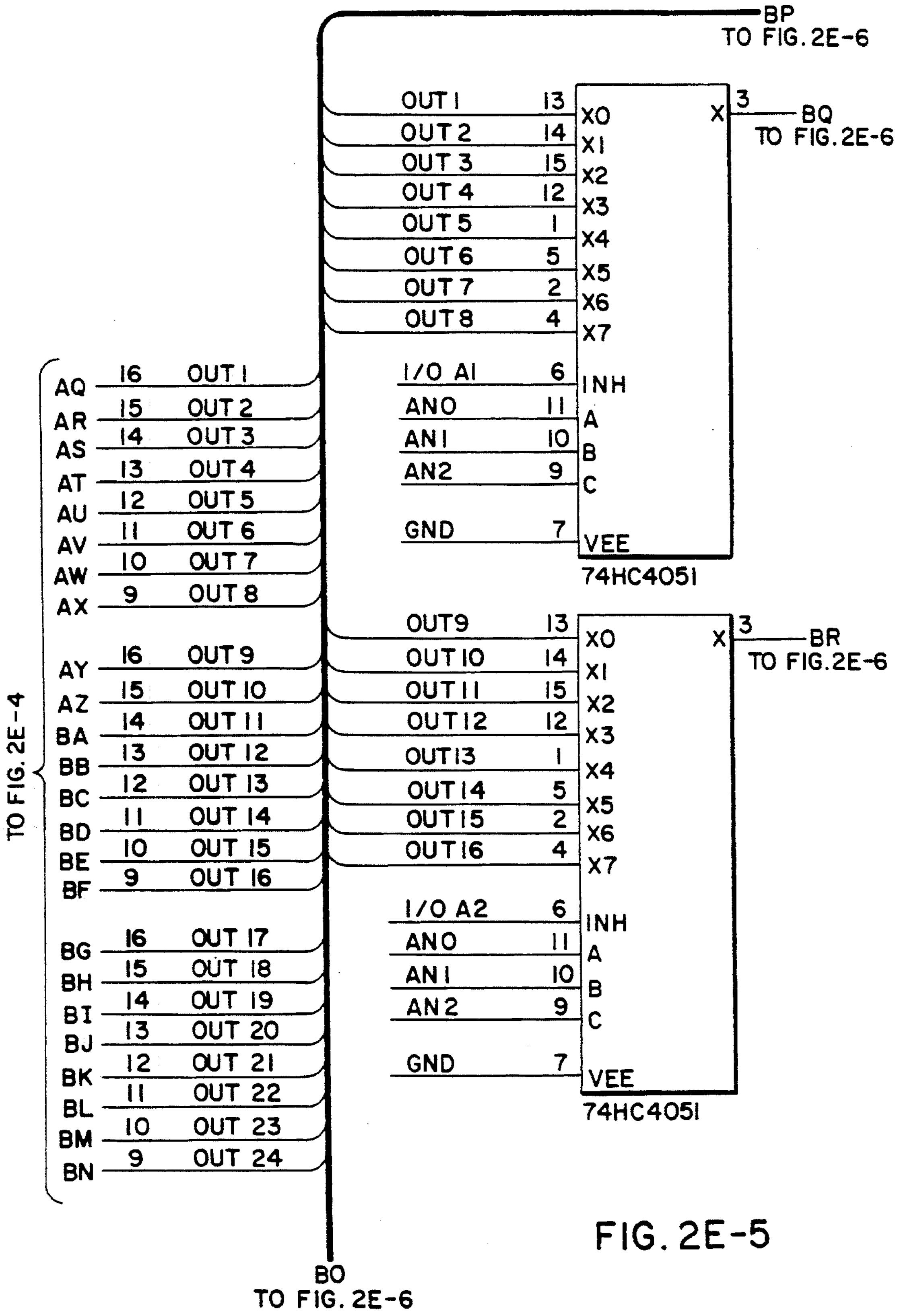

By way of example, the circuitry within the interface 59 for controlling the sprayer 36 is illustrated in more detail in FIGS. 2C and 2D. As described above, the interface box 59, includes an internal ARCnet board 60 along with the necessary electronic circuitry for controlling the auxiliary devices 20. The electronic circuitry includes an electrostatic tube driver 66 that upon receipt of an appropriate control signal from the ARCnet board 60, supplies an appropriate voltage to a high voltage transformer associated with the sprayer 36, which is arranged to cause the electrostatic tube to discharge. The signal or a separate signal may also be employed to drive an air valve for drawing powder to the sprayer 36 such as described in U.S. Pat. Nos. 5,083,710 and 5,213,271. The electronic circuitry, as shown in FIG. 2D-1 to 2D-4, also includes a driver 67 for operating the sprayer motor to rotate the roller for applying the powder.

Two signals are received from the sprayer 36 indicative of the fuse/motor status and the tube status, respectively. As described above, these signals are not at logic levels and thus must be converted by appropriate drivers before interfacing to the ARCnet board 60. These status conditions are updated in real-time on the display 46 in either the minimized image of the sprayer control panel, or if currently selected, on the maximized image thereof. The display of these status conditions is described in more detail below.

Although not necessary to the invention, the interface box 59 also provides circuitry 71 for manual back-up control of the sprayer 36. To this end, an electromechanical control panel (not shown) is provided for enabling the back-up operation and for setting the powder output level in the event of a computer failure.

In addition to interfacing the system controller 24 to the sprayer 36, the interface box 59 also interfaces the system controller 24 to the air knife 30, air evacuator 32 and auto-filler 34. Since the operation of these devices is well known, their particular operation will not be described in detail herein. Suffice it to say that drivers 65 within input-output circuitry 64 provide the proper voltage signals necessary for operating the air knife 30, air evacuator 32 and auto-filler 34 in accordance with commands from the system controller 24, and also return appropriate status signals to the system controller 24.

Figure 5A:
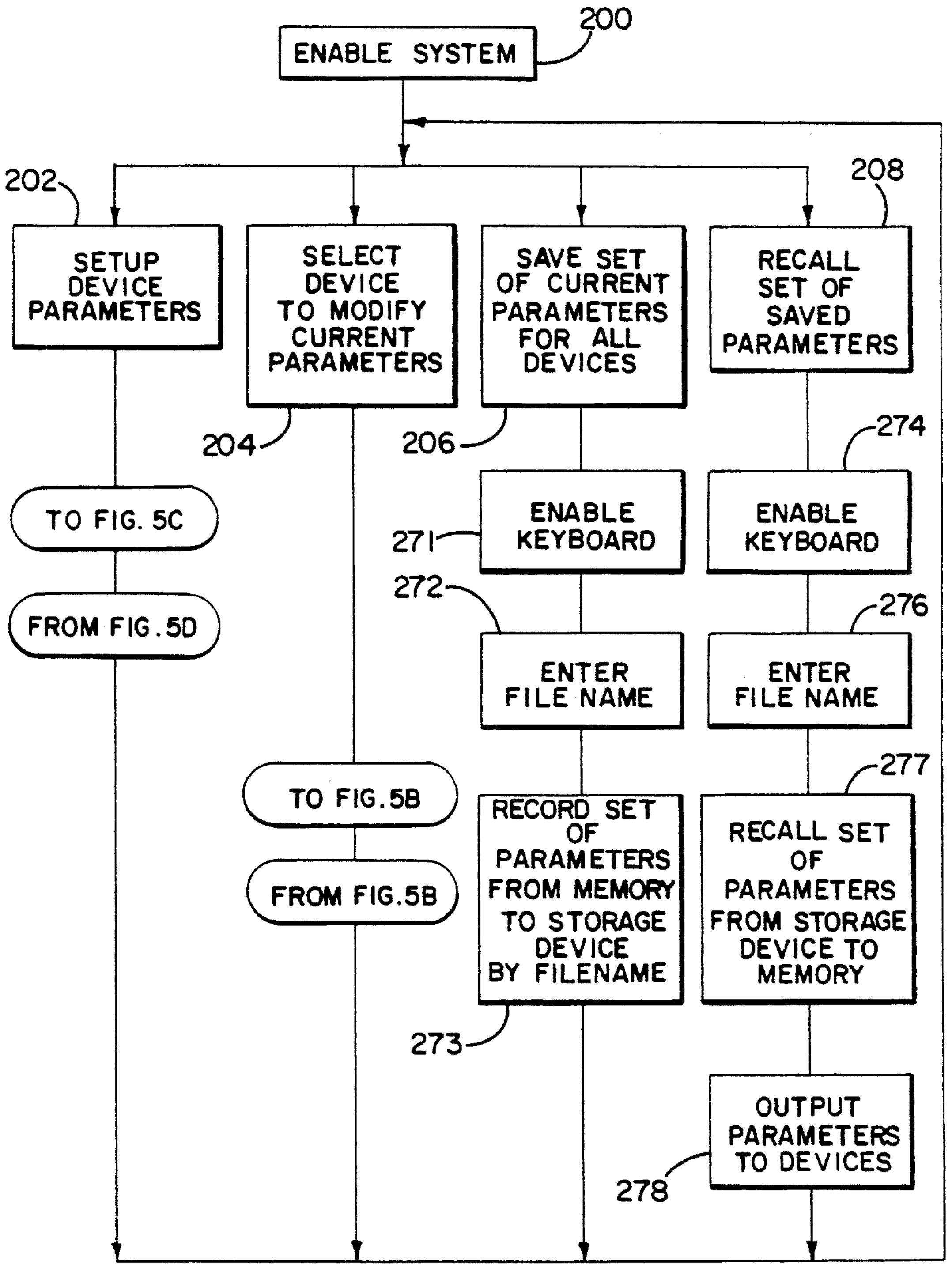
FIGS. 5A–5D are flowcharts representing general program steps for implementing the invention.

Turning now to an explanation of the operation of the invention with reference to the flowchart of FIGS. 5A–5D and the various screens in FIGS. 6–11, the operator first enables the system at step 200 of FIG. 5A. For example, the system controller 24 may automatically enable the system and allow an operator to perform certain operations on power-up. Alternatively, the operator may have to first enter a valid alphanumeric code, i.e., password, before the system controller 24 will authorize access to the system, or at least access to certain operating levels.

Figures 2, 2E, 3, 4, 5, 6:
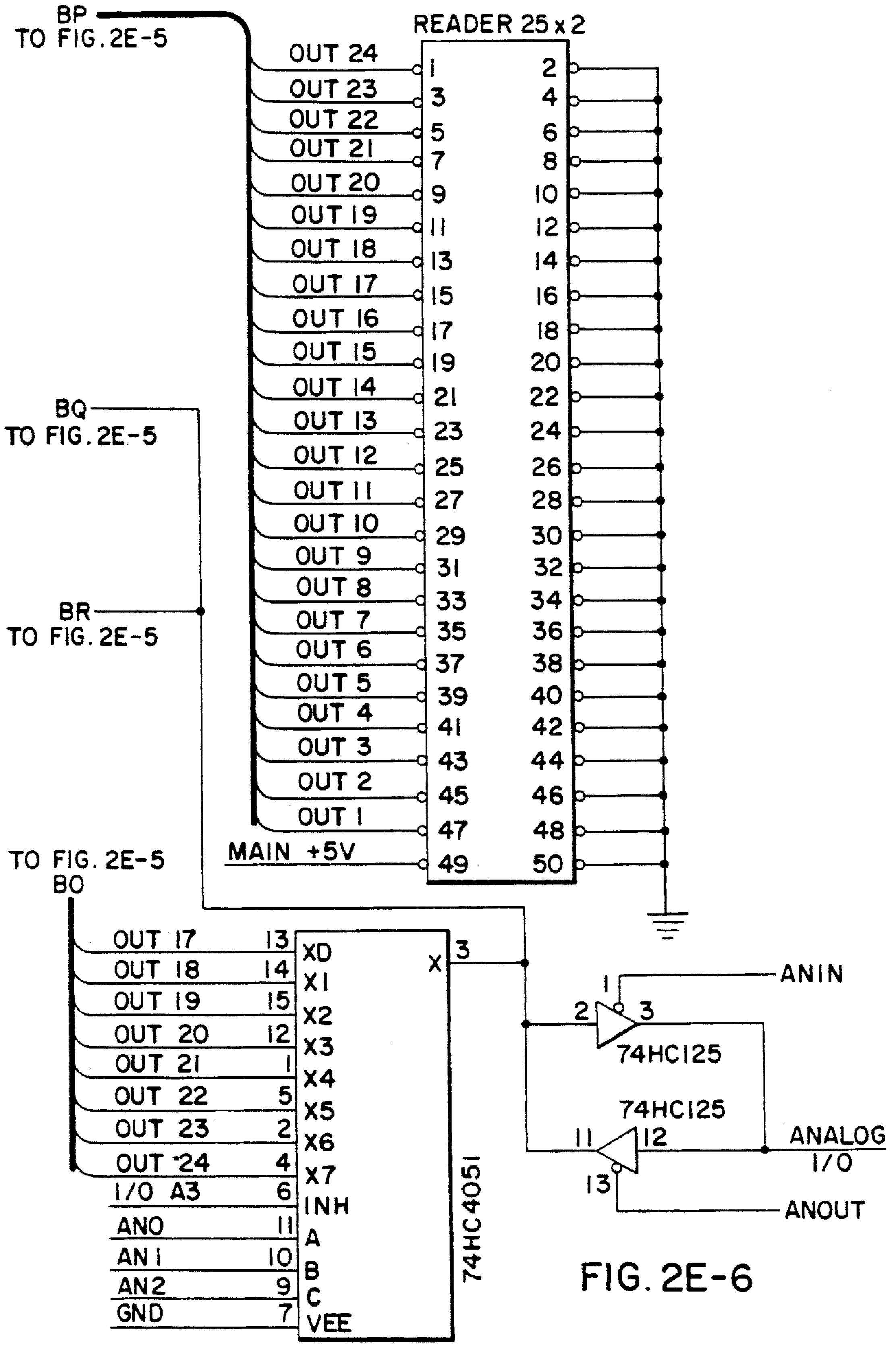

In the illustrated embodiment, the screen of FIG. 6 appears on the display 46 once the system is enabled. Of course, the particular screen that appears depends on certain default values previously entered into the system. Regardless of the actual screen displayed, as represented in the flowchart of FIG. 5A and the screen of FIG. 6, the operator is generally provided with four initial choices, which are:

1) Set up the operating parameters for the devices (including informing the system as to which auxiliary devices are installed). This choice, shown as step 202 (FIG. 5A), is accomplished by pointing at the displayed Setup button 150 (FIG. 6).

2) Select one of the devices for modifying its current settings, i.e., change the operating parameters thereof. This choice, shown as step 204 (FIG. 5A), is accomplished by pointing at one of the images 152 of the auxiliary device control panels (FIG. 6).

3) Save the set of operating parameters for all devices by providing a job name therefor. This choice, shown as step 206 (FIG. 5A), is accomplished by pointing at the displayed Save button 154 (FIG. 6).

4) Recall a previously entered set of operating parameters by providing a job name corresponding thereto (step 208). This choice, shown as step 208 (FIG. 5A), is accomplished by pointing at the displayed Recall button 156 (FIG. 6).

As described above with reference to FIGS. 1–4, the touch screen controller 52 provides the processor 40 with the coordinates of any area pointed at, which the processor 40 then translates into a command by looking up the corresponding command in the memory map reserved for that particular screen. Thus, when the screen appears as shown in FIG. 6, the system controller 24 is able to translate certain coordinates received from the touch screen controller 52 into a selection that corresponds to one of the four choices described above.

Figures 2, 2E, 3, 4, 5, 6, 7:
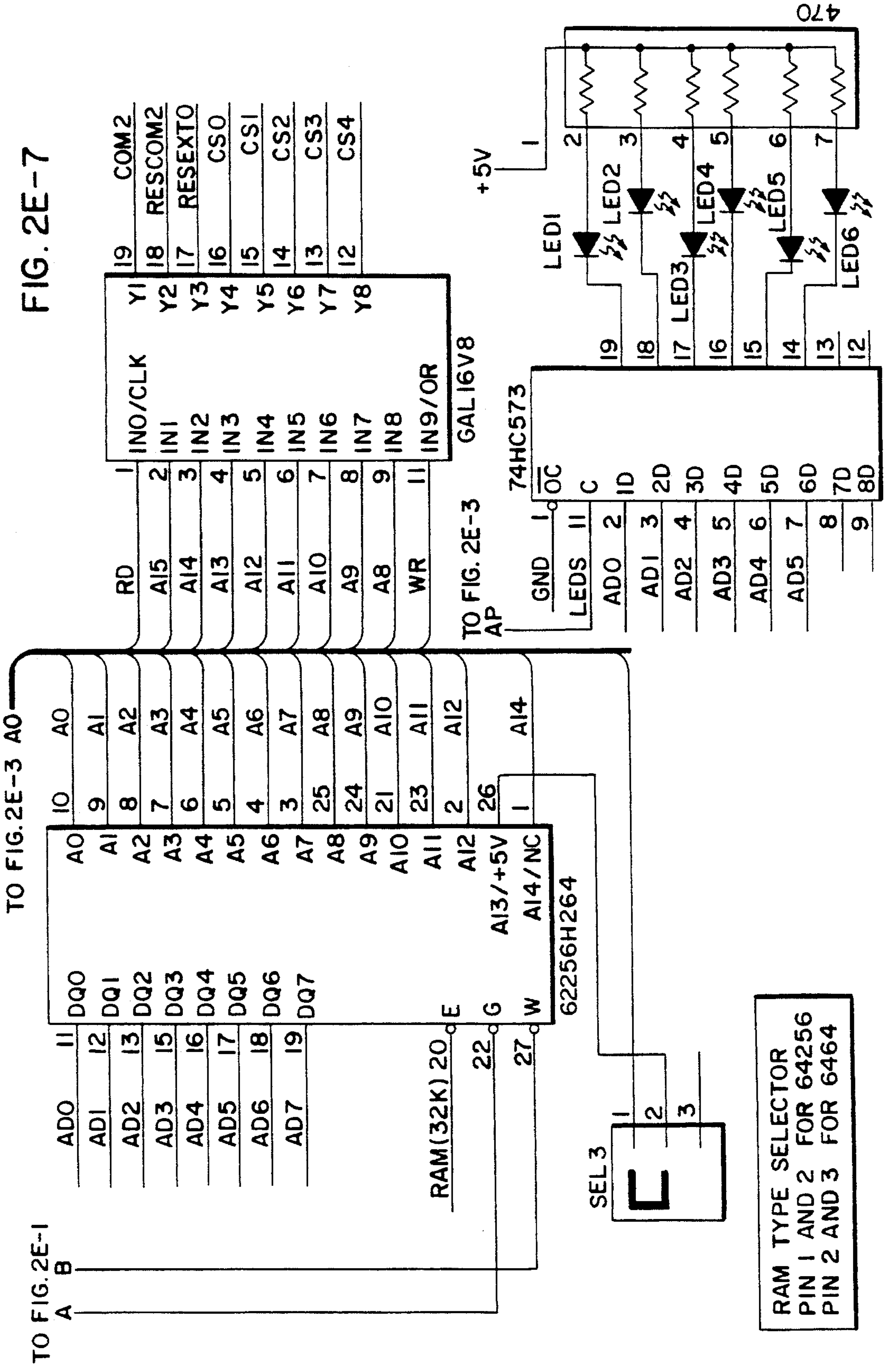
Figures 1, 2F:
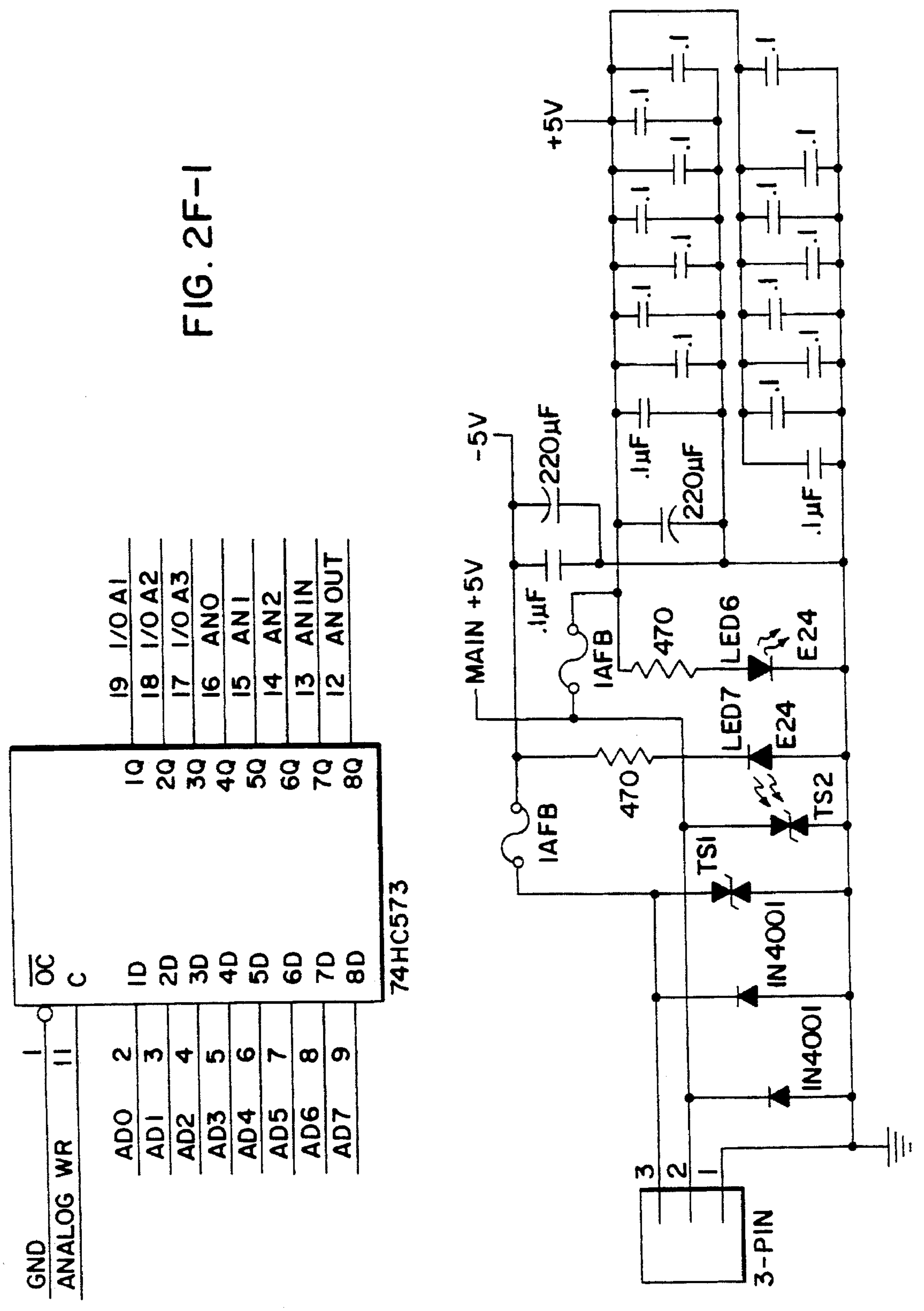
Figures 2, 2F:
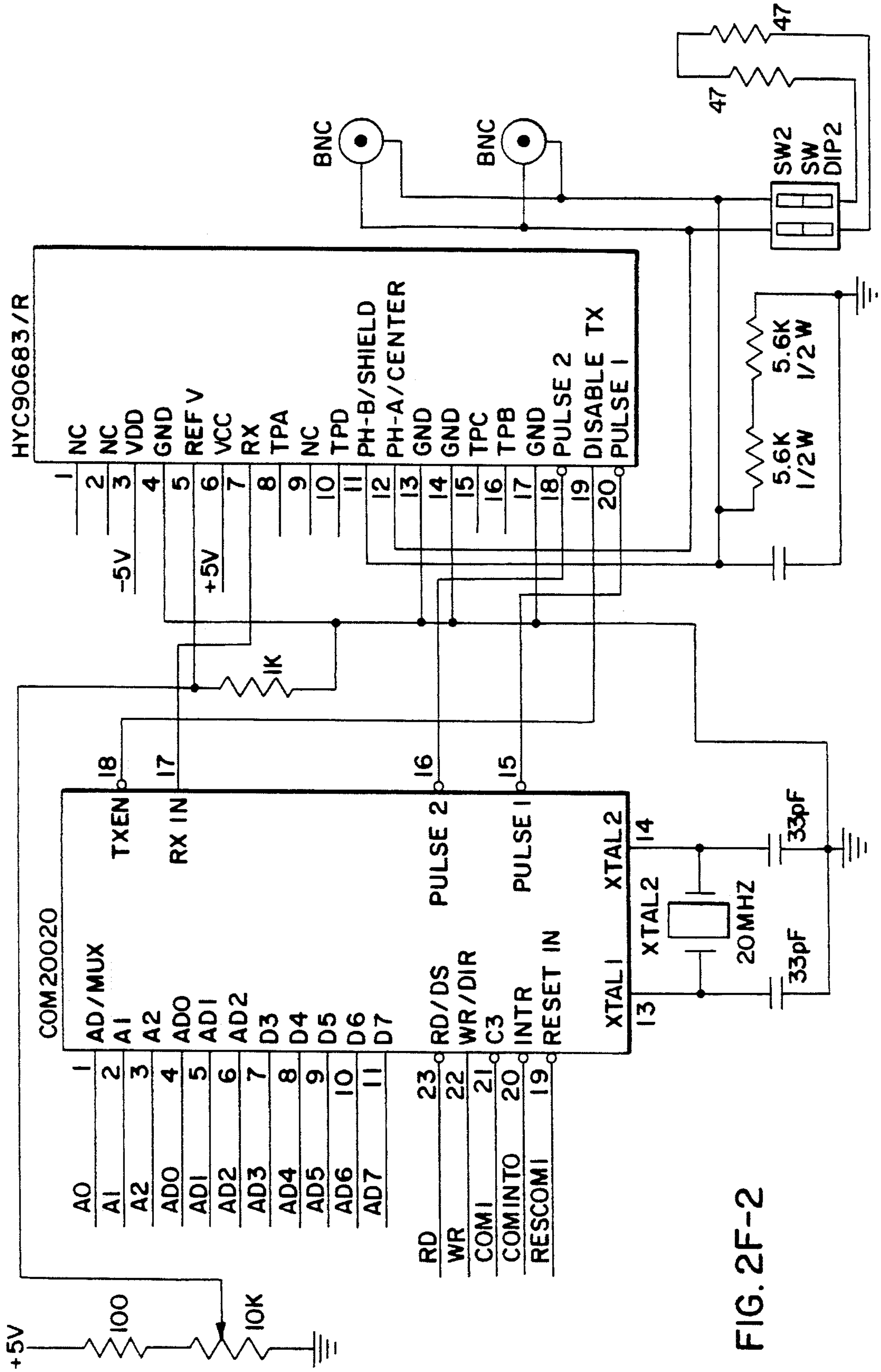
Figures 2, 2F, 3:
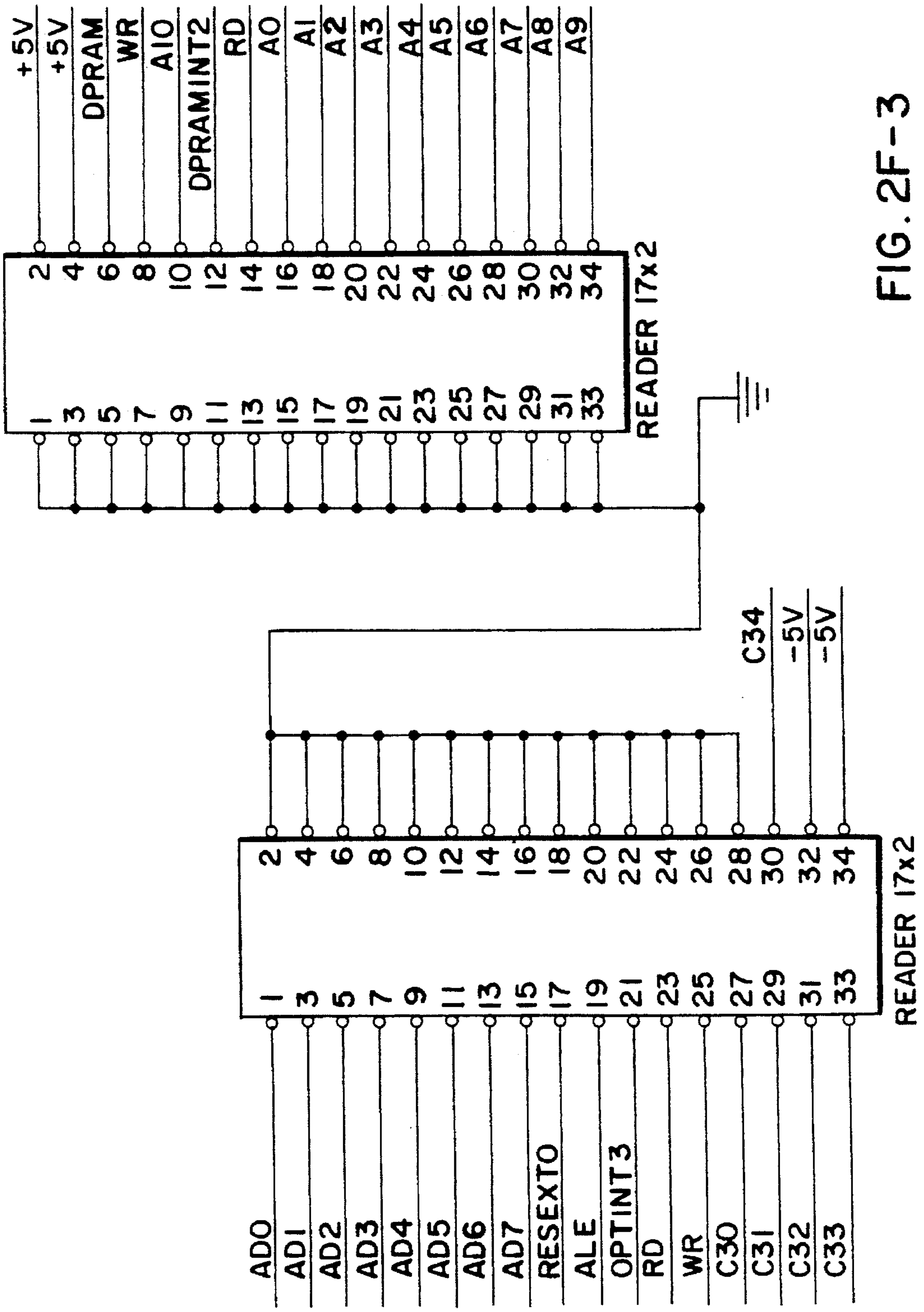
Figure 3:
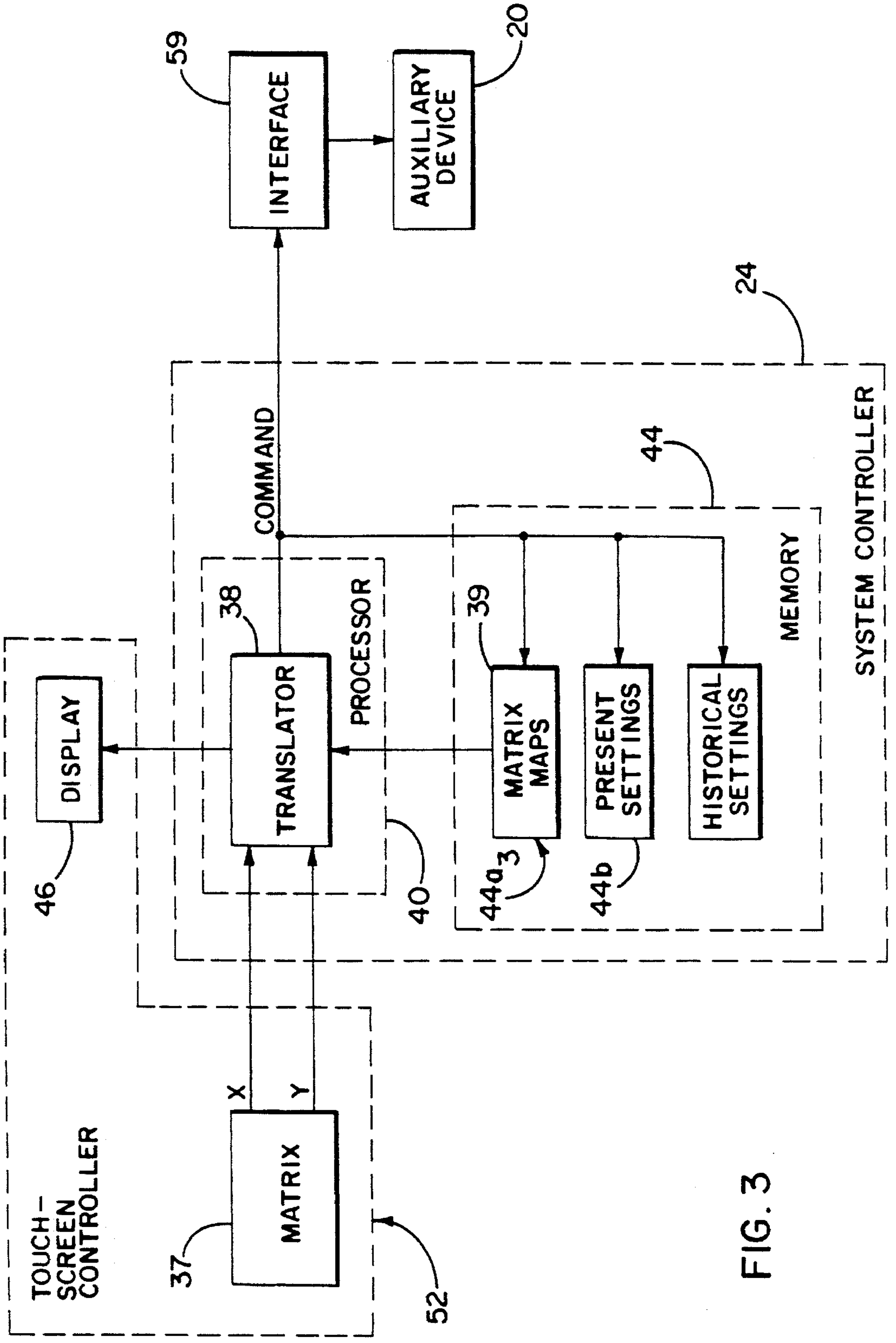

Assuming that the operator points to the setup key 150, the screen illustrated in FIG. 7 appears, requesting an operator access code on the prompt line 157. As described previously, the system may be configured so that certain levels of access require the entry of a password. The system controller 24 receives the operator identification (step 210 of FIG. 5C) as the operator points to the appropriate keys on the displayed keyboard (shown in this example as 6666), and then the Enter key 158. To assist with the code entry process, entered characters appear at display window 159, and a Backspace key 160 is provided in case a character is erroneously entered. As an additional feature, pointing to the small key 162 enables lowercase letters to be entered.

Figure 5B:
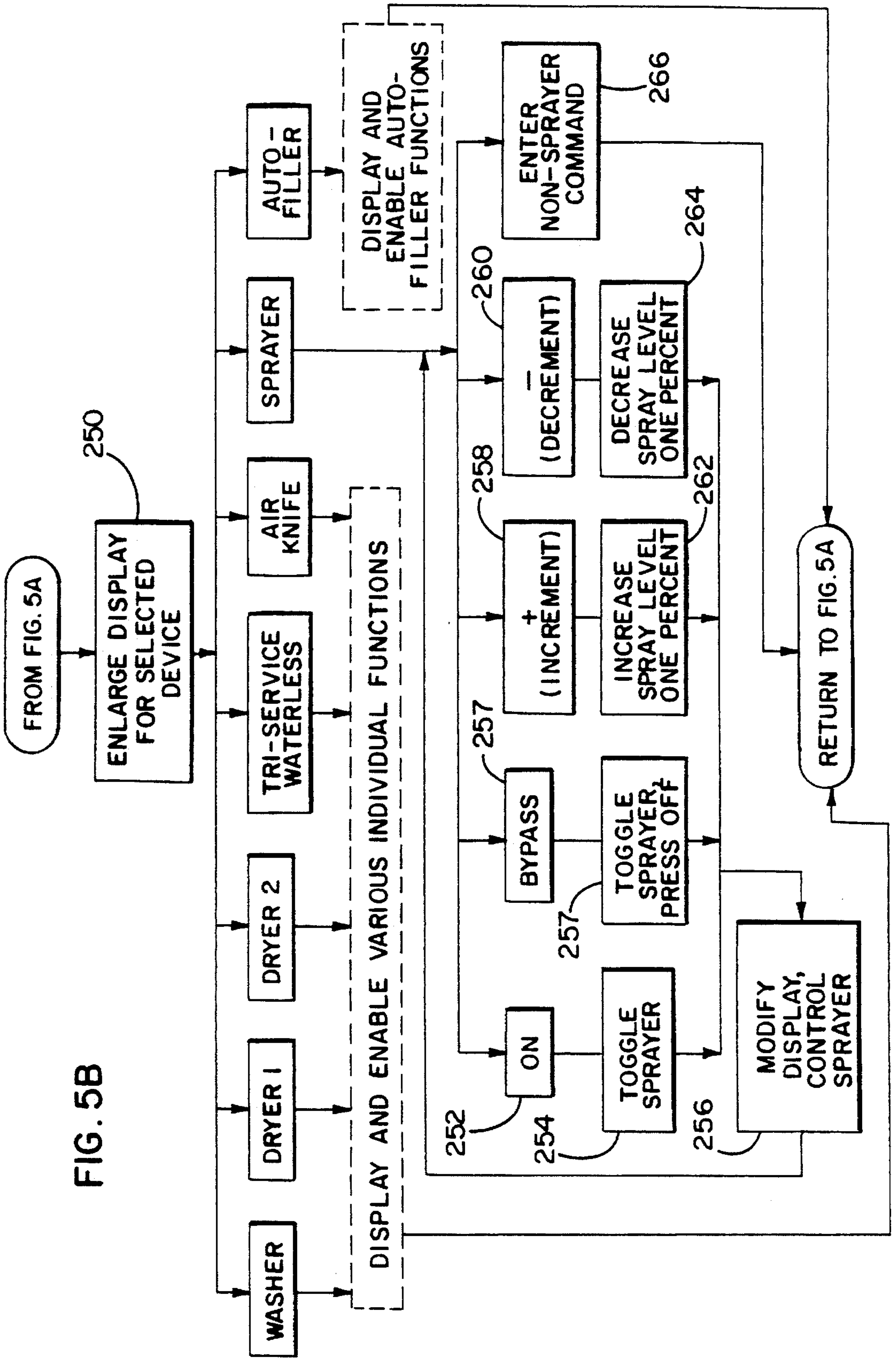
Figure 5C:
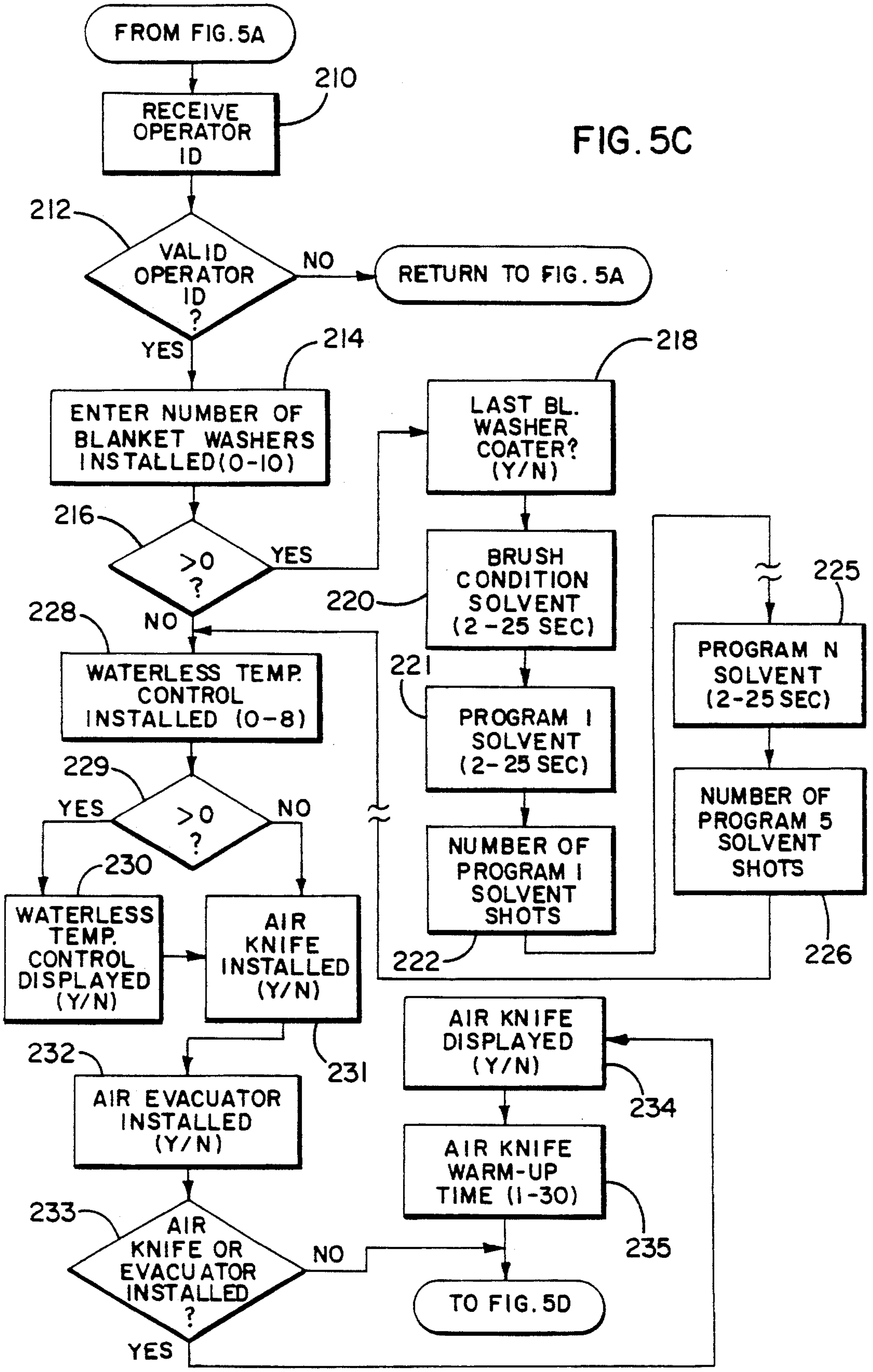
Figure 5D:
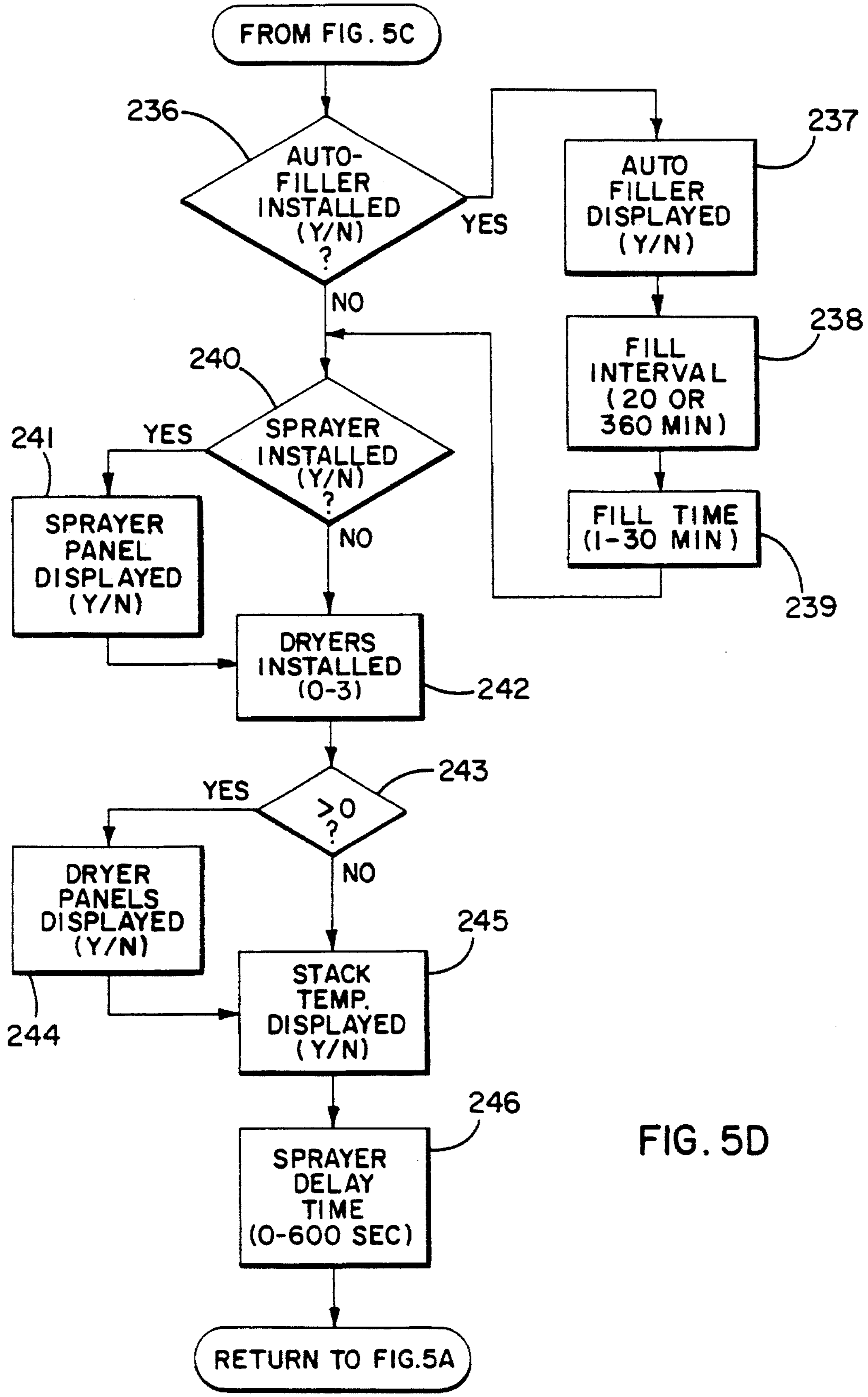
Figure 6:
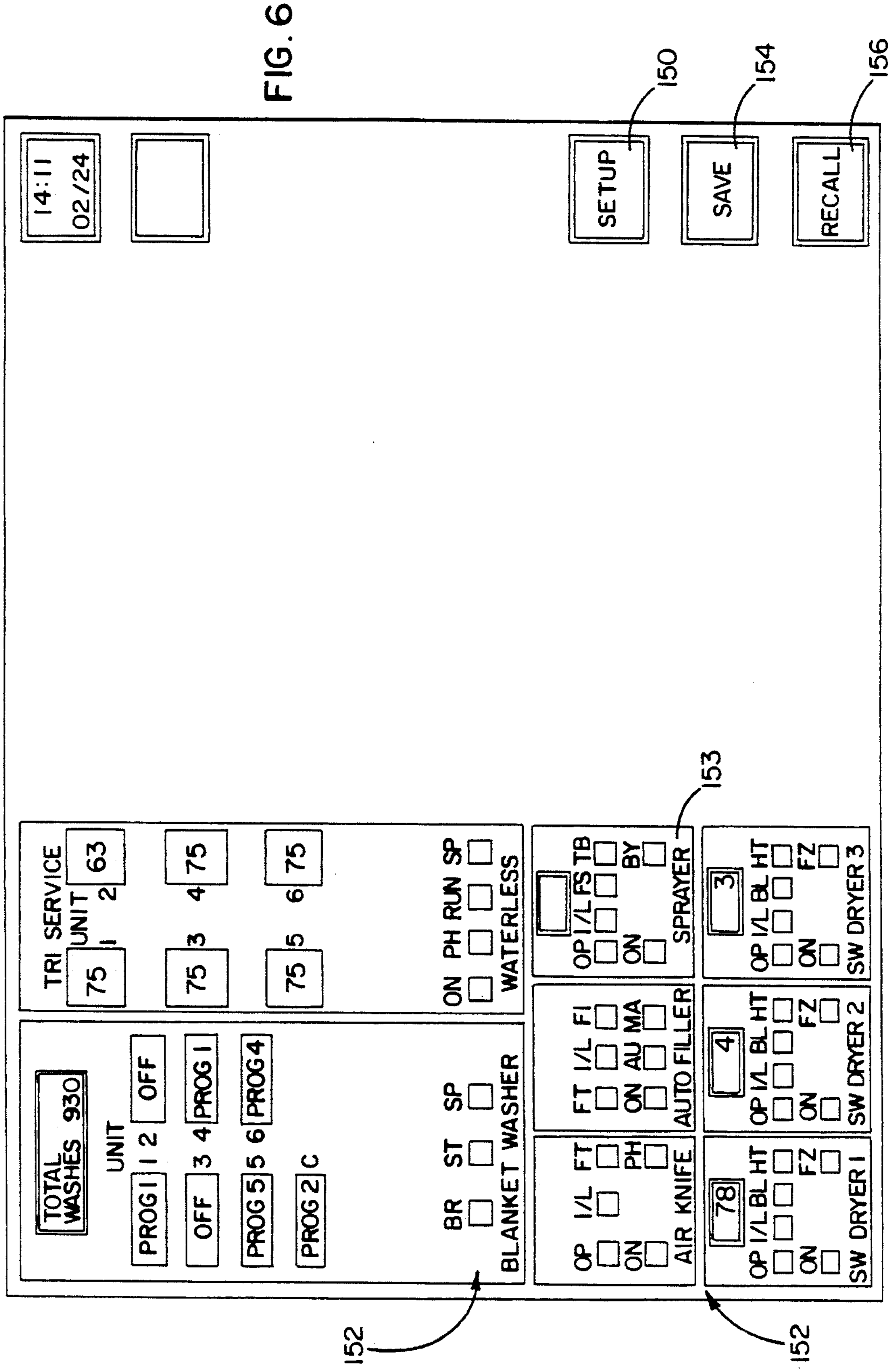
Figure 7:
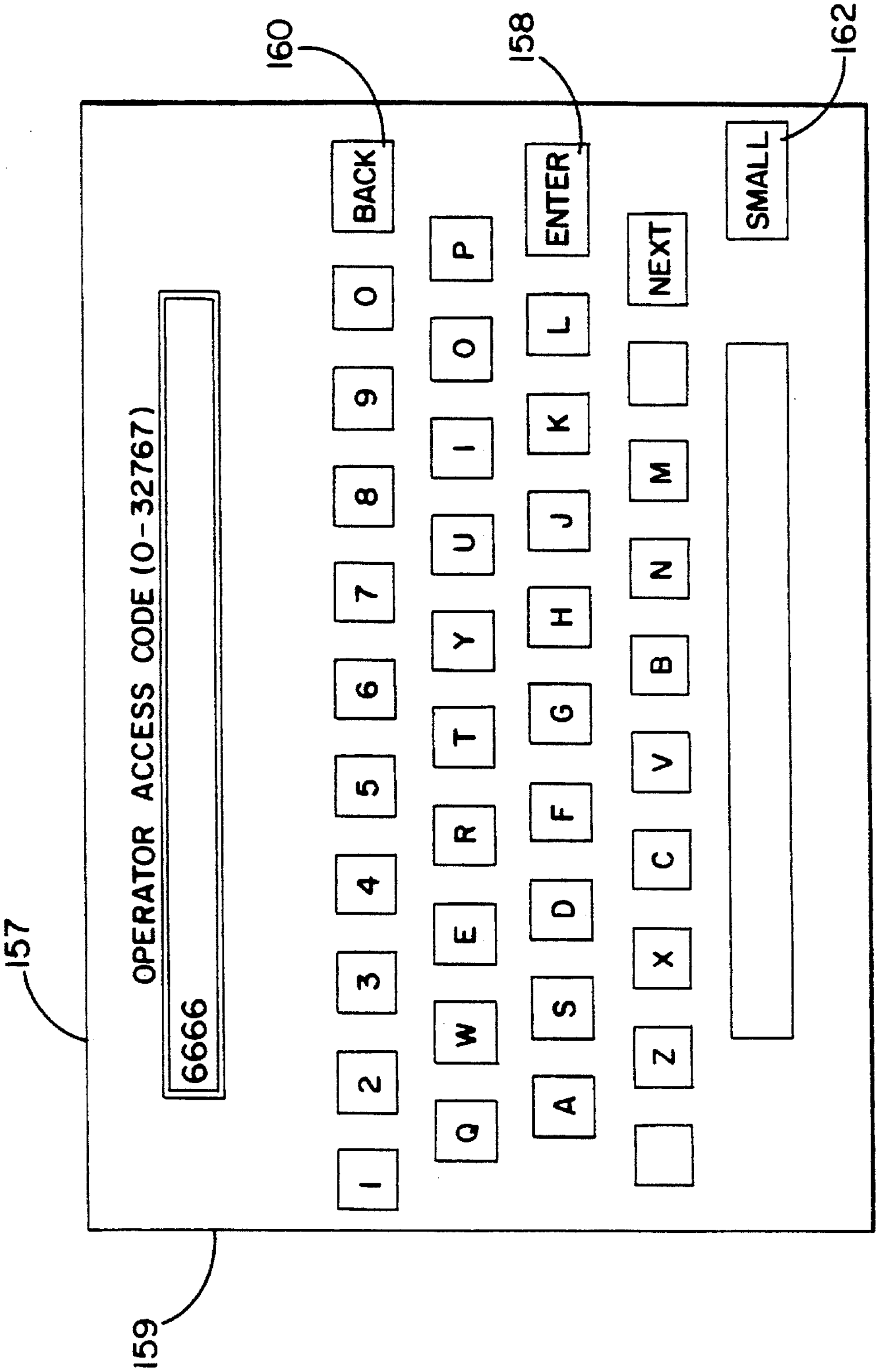

As shown at step 212 of FIG. 5C, once a valid code is entered and recognized by the system controller 24, the screens are modified on the display 46 to present the operator with a number of inquiries regarding the particular starting parameters for the auxiliary devices 20. As used herein, the term "parameters" is intended to include not only the settings that the installed auxiliary devices 20 operate at, but also an identification of which of the auxiliary devices 20 are installed in a particular configuration, and any other such device information.

Figure 8:
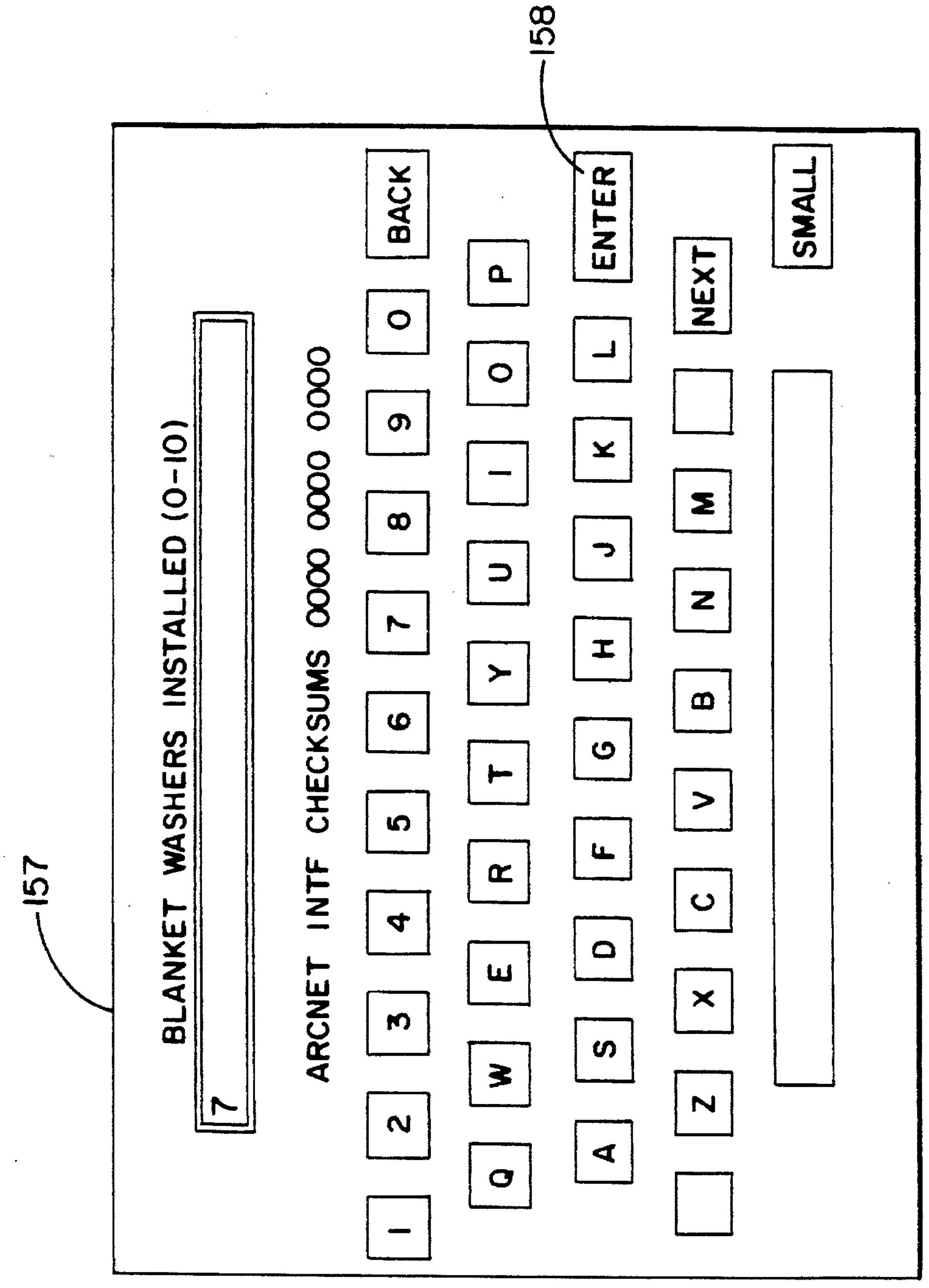
FIG. 8 is a representation of an input screen that appears after the entry of a Setup command to prompt for setup information.

For example, as shown in FIG. 8 and at step 214 of FIG. 5C, an initial prompt appears at prompt line 157 inquiring as to the number of blanket washers 26 installed in the current configuration. Up to ten washers may be installed, and the number is entered in the same manner as described above, i.e., by first pointing to the appropriate digit or digits followed by the Enter key 158. If at least one blanket washer 26 is installed, as determined at step 216 the program branches to step 218 in order to obtain general blanket washer information, e.g., whether the last washer is operating as a coater. Next, as shown at steps 220–226, initial settings for the blanket washers 26 are entered, shown herein as the times and number of shots for applying washing solvents.

Similar parameters are entered into the system controller data memory 44*b* (FIG. 4) for other auxiliary devices 20 which may be installed in a particular configuration. Although additional Setup screens are not shown herein for reasons of simplicity, the general program flow may be understood by following the remainder of the steps 228 through 246 in the Setup flowchart of FIGS. 5C and 5D. It can be readily appreciated that the appropriate parameters are similarly entered by modifying the prompt line 157 and receiving an appropriate entry for each device.

After the parameters for a particular job are set up, the screen is constructed and displayed in accordance therewith, for example as shown in FIG. 6. In general, the screen display 46 provides an image corresponding to each installed auxiliary device. Although not necessary to the invention, in the preferred system the images corresponding to the auxiliary devices 20 are displayed on the left side of the screen in a manner that generally represents the control panels that are present on conventional auxiliary devices. This allows an operator to obtain status information from the auxiliary devices 20 by merely looking at the screen display 46. Nevertheless, it is feasible to alternatively provide a simple image such as a labeled box corresponding to each device for operator selection.

Once the available devices are displayed, for example as shown on the left side of the screen depicted in FIG. 6, the operator can select one of the auxiliary devices 20 in order to modify its parameters. This is accomplished by pointing at the displayed image corresponding thereto, and corresponds to step 204 in the flowchart of FIG. 5A.

As soon as an auxiliary device is selected, an enlarged, or maximized image of the control panel corresponding thereto appears on the right side of the screen as indicated by step 250 of FIG. 5B. By way of example, when the sprayer 36 is first selected by pointing at its minimized image, or icon 153, such as for the purpose of turning it on and adjusting its spraying level, the screen is altered to appear as shown in FIG. 9A. Although not necessary to the invention, when maximized the selected device image (such as icon 153) no longer appears in the minimized window on the left side of the screen; instead it appears only as the enlarged image on the right. In the preferred embodiment, any control panel switches that appear on the images displayed on the left side (minimized format) are not enabled until the device is first selected and presented in the enlarged format. However, the state of the switches, indicators and readouts remain visible in the minimized window and are updated in real-time. For example, if the motor fuse blows in the sprayer 36, the image representing the motor fuse status indicator 174 is altered to visually indicate the condition, for example by changing color, increasing in intensity, flashing or otherwise changing.

While the preferred program attempts to generally replicate the control panel of each device while in the minimized state, thus providing an operator the ability to simultaneously assess the operating states of multiple control panels, any other symbol would be adequate for the purposes of selecting an image of a control panel. Indeed, a simple labeled box corresponding to the active control panels would be sufficient. However, in addition to the advantages provided by allowing simultaneous viewing of multiple control panels, by making the images of the control panels reasonable replicas of the actual panels on conventional auxiliary devices, operators familiar with the actual panels quickly recognize the corresponding box. As a result, operators adapt quickly to the touch screen system.

In accordance with one aspect of the invention, once selected and maximized, the icons representing push-button switches become enabled, i.e., pointing at the switches affects the settings on the auxiliary device as if the switches were actuated on a control panel ordinarily present on a conventional auxiliary device. As described previously, in the preferred embodiment this is performed upon detecting a touch to the screen as the processor 40 translates received screen coordinates into commands by referencing the appropriate data matrix corresponding to the current display. The touch screen controller 52 in conjunction with the displayed image thus enables the system to emulate a conventional control panel that an operator is familiar with, allowing the operator to select and control the auxiliary devices 20 from a common, centralized location.

For example, the maximized sprayer panel 163 shown in FIG. 9A has images of an increment, or "+" switch 164, a decrement, or "–" switch 166, an "ON" switch 168 and a "BYPASS" switch 170. In addition, the panel image includes status indicator lights 172–175 representing "OPERATE," "INTERLOCK," "MOTOR FUSE" and "TUBE," respectively. In general, the OPERATE indicator 172 is visually enhanced (preferably by changing color on the display) when the sprayer 36 is operating, the INTERLOCK indicator is visually enhanced when the press 22 is operating and properly connected to the sprayer 36, the MOTOR FUSE indicator image is visually altered (e.g. darkened) if the fuse is blown and the TUBE indicator is visually altered if the electrostatic tube is blown. As previously described, the status signals that ultimately regulate these indicators are fed back to the system controller 24 from the sprayer 36 via the ARCnet board so that the display more completely replicates a conventional sprayer control panel. Finally, the enlarged image includes a three digit readout 176 representing the setting of the operating level of the sprayer from 0 to 100 percent.

To turn on the sprayer 36, the operator points at the ON switch 168 (as represented by step 252 of FIG. 5B), causing the touch screen controller 52 to transmit the screen coordinates to the system controller 24, which the processor 40 translates to a "Sprayer On" command to turn the sprayer 36 on at steps 254 and 256. Of course, the ON switch toggles the sprayer 36 off when the sprayer 36 is already on, and thus step 254 is really a toggle step.

Figure 9B:
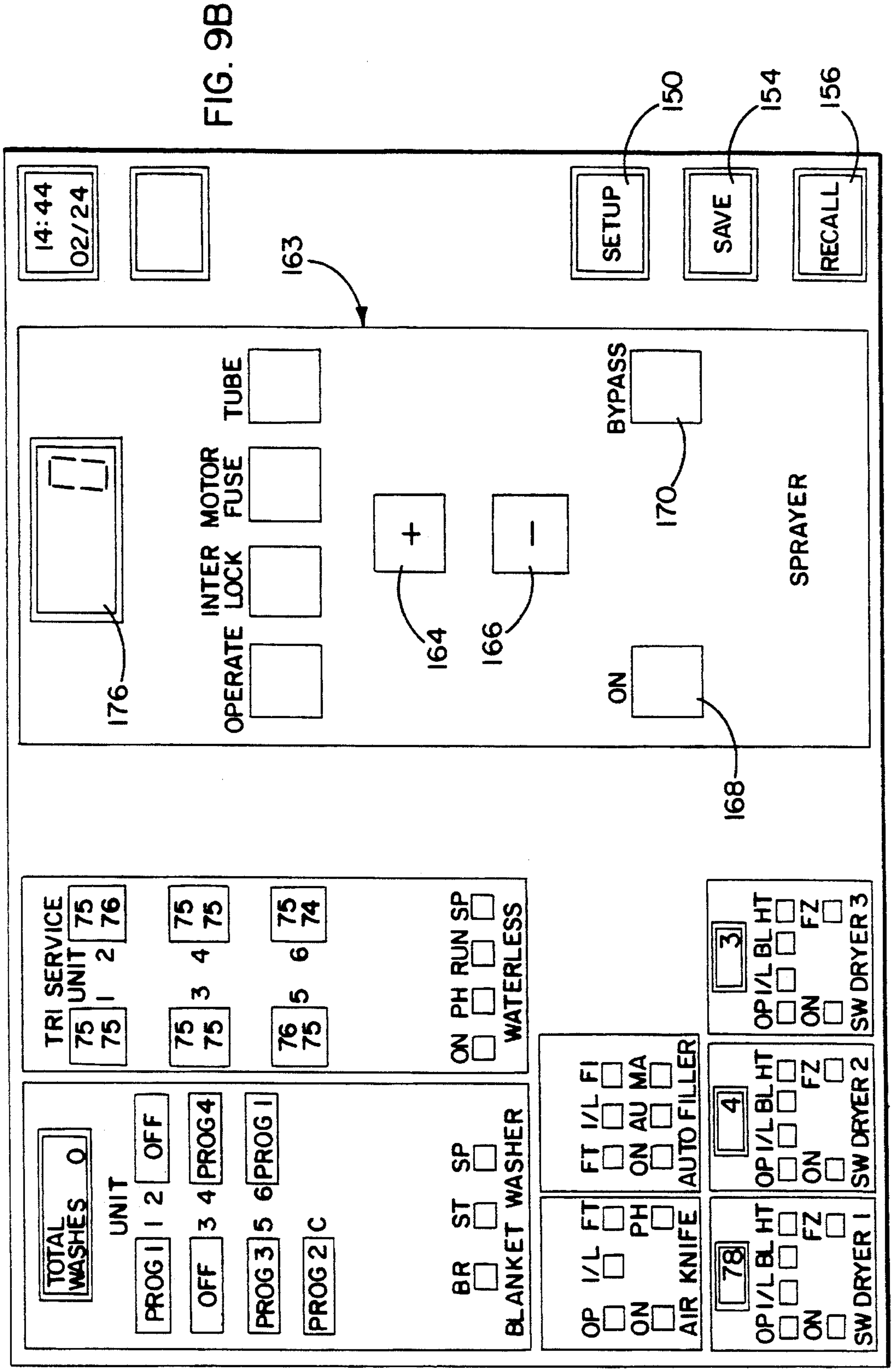

Nevertheless, assuming the sprayer 36 was previously off, as shown in FIG. 9B, the on state is indicated on the display screen 46 (step 256) and the image of the three digit readout 176 provides the current sprayer 36 operating level, presently set to zero percent. Although not readily apparent from FIG. 9, at this time the image of the ON switch is also visually enhanced, preferably by changing in color from white to yellow.

Even when displayed in the maximized image 163, the ON switch may also be disabled at certain times, for example, when the sprayer 36 is not connected to an operating press 22 as indicated by the interlock function. As can be appreciated, disabling of the ON switch in this instance may be accomplished in the processor 40 by a simple logical comparison with the interlock status. As is known to press operators, the BYPASS switch 170 is provided to override such conditions in order to operate the sprayer 36 as desired as shown in step 257.

Figure 9C:
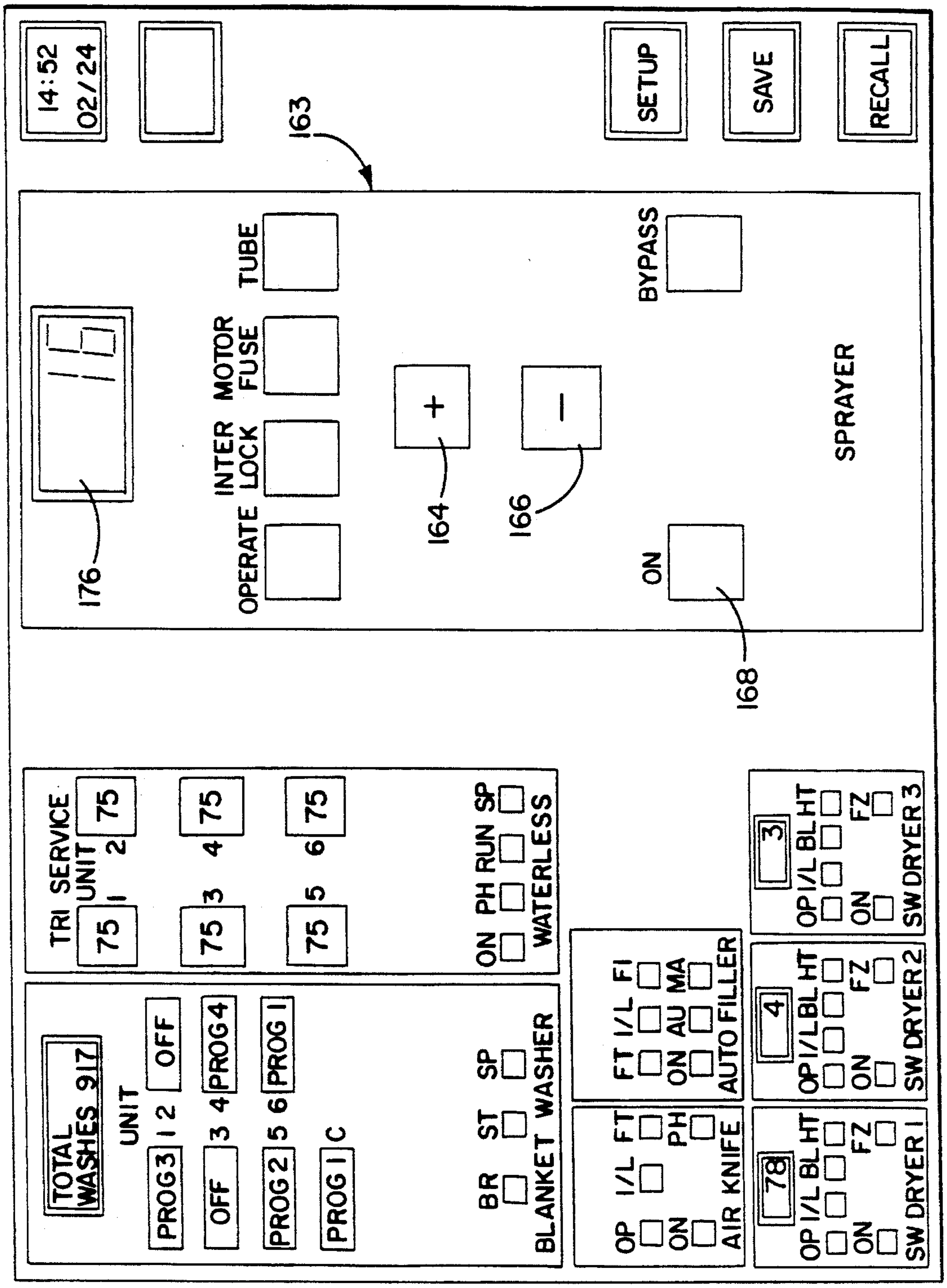
Figure 10:
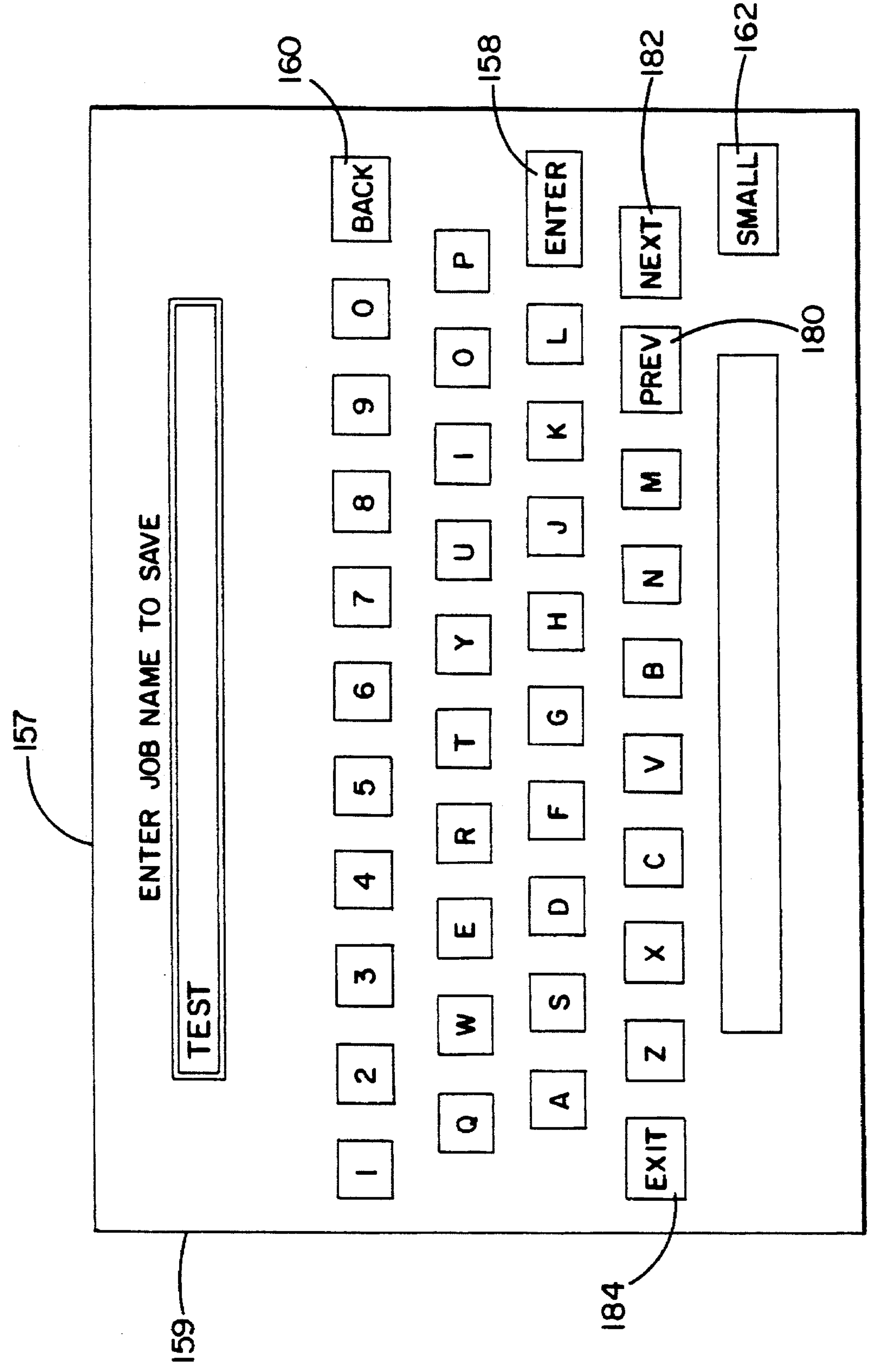
FIG. 10 is a representation of a filename input screen that appears after the entry of a Save command.
Figure 11:
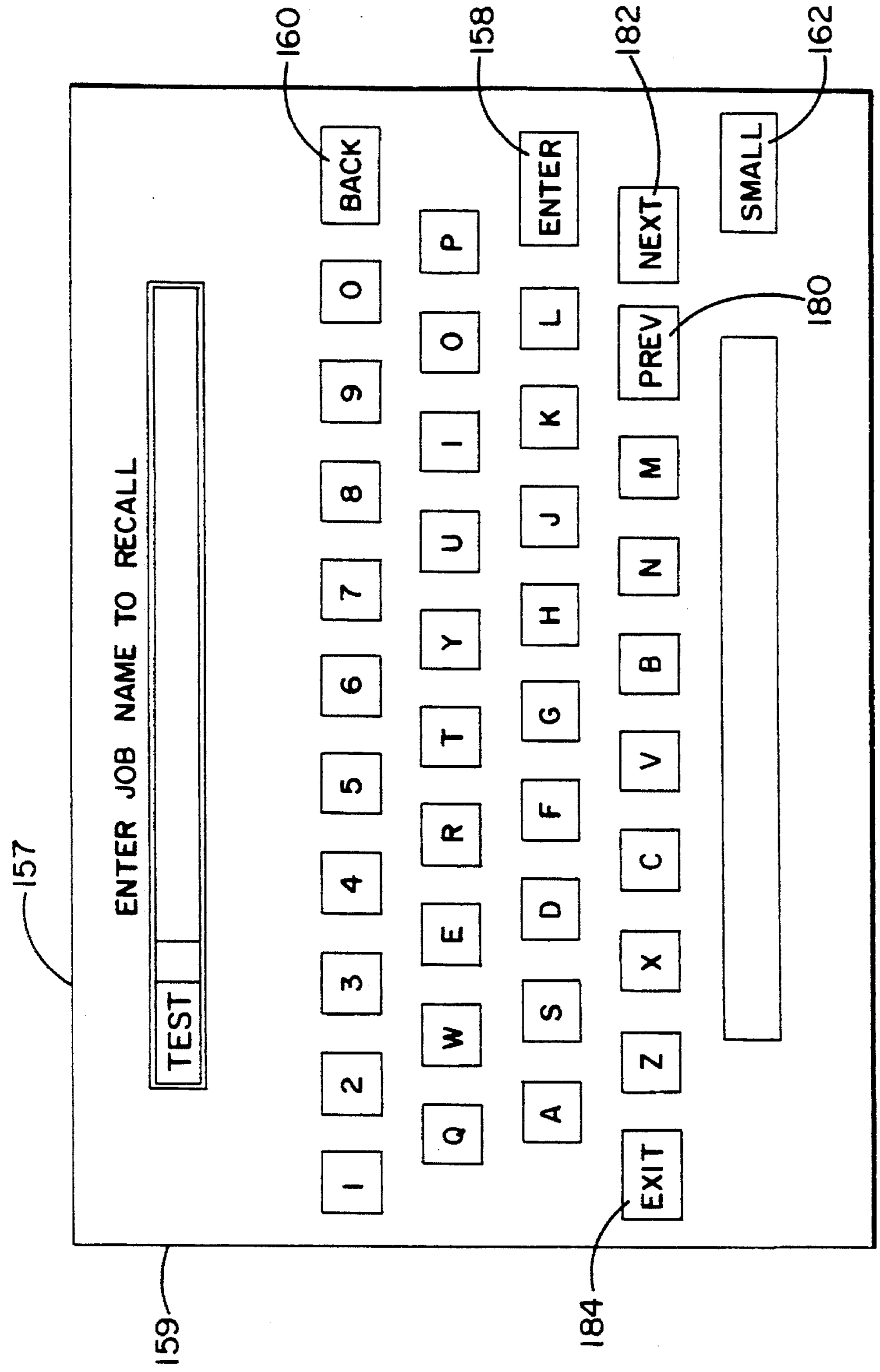
FIG. 11 is a representation of a filename input screen that appears after the entry of a Recall command.

Assuming the ON switch 168 is properly enabled and the sprayer 36 is turned on as in FIG. 9B, adjustments to the sprayer 36 output level are made with the increment key 164 and the decrement key 166 (steps 258 and 260 respectively). As shown in FIG. 9C, pointing to these keys adjusts the output level of the sprayer 36 in one percent increments as indicated by steps 262 and 264. The level is reflected in the three digit display 176, shown in FIG. 9C as sixteen percent.

Although not necessary to the invention, for convenience, the increment and decrement keys 164, 166 may be arranged to repeatedly change the output level if continuously touched, may increment or decrement the output level in an accelerated manner after being continuously touched for a period of time. The keys may further be arranged to turnover the output level from one-hundred percent to zero percent when incrementing or from zero percent to one-hundred percent when decrementing. Other well-known tactics such as resetting the level to a predetermined setting upon simultaneous activation of the increment and decrement keys are also feasible, such as with capacitive touchscreen sensing.

It can readily be appreciated that the system allows for the similar emulation of the control panels of other auxiliary devices 20, which are selected and enlarged by pointing to their minimized images in a similar manner. By pointing to a new minimized control panel image, the previously maximized control panel is returned to its minimized image while the newly selected panel is enlarged, in essence swapping the newly selected control panel images for the previously selected image. Thus, as shown in FIG. 5A at step 266, entering a non-sprayer command terminates control over the sprayer 36 until it is re-selected.

Since the operation of various conventional auxiliary devices through use of their individual control panels is well known, it is unnecessary to further describe herein the individual functions and displays for each auxiliary device 20 in the present system. Suffice it to say that the parameter entry system described herein allows selection and control of the several auxiliary devices 20 from a centralized location by emulating the control panels thereof in a manner substantially like that of the described sprayer control panel.

As an additional feature of the system, once the parameters have been set up for a particular job and device configuration, the parameters may be saved as a set. By providing a unique identifying label (job name or filename) with each set of parameters, complete parameters for jobs may be later retrieved, thus saving the operator substantial parameter entry time and eliminating the need for memorizing or otherwise looking-up all of the parameters for a specific job.

To save a set of parameters, as represented by step 206 of FIG. 5A, an image of a Save key 150 is provided, for example as shown on FIG. 6. Touching the Save key to request a save operation alters the screen display to that shown in FIG. 10, i.e, enables a display of a keyboard as shown in step 271 of FIG. 5A. Prompt line 157 provides a message prompting the user to enter a Job Name to Save of up to 20 alphanumeric characters, (step 272 of FIG. 5A), which may be accomplished by inputting the individual characters, or by scrolling through a list of jobs by use of the Prev (previous) and Next keys 180, 182, and then touching the Enter key 158. To assist with the job name entry process, entered characters appear at display window 159, and a Backspace key 160 is provided in case a character is erroneously entered. As an additional feature, pointing to the small key 162 enables lowercase letters to be entered. An Exit key 184 is also provided to enable the operator to return to the previous screen without performing the save operation.

Upon receipt of an entered job name, as shown in step 273 of FIG. 5A, the system controller 24 records the parameters from the data memory 44*b* to the storage device 50 in correlation with the entered job name (identifying label) for later recall. Of course, the system may first check to ensure that the job name is valid (at least one character) and may require confirmation or even authorization before overwriting an existing job.

Similarly, a Recall key 156 as shown in FIG. 6 is provided to load the data memory 44*b* with a previously saved set of job parameters. To recall (i.e., retrieve) a previously saved set of parameters, as represented by step 208 of FIG. 5A, an image of a Recall key 152 is provided, for example as shown on FIG. 6. Touching the Recall key to request a retrieve operation alters the screen display to that shown in FIG. 11, i.e, enables a display of a keyboard as shown in step 274 of FIG. 5A. Prompt line 157 provides a message prompting the user to enter a Job Name to Recall of up to 20 alphanumeric characters, (step 272 of FIG. 5A), which may be accomplished by inputting the individual characters, or by scrolling through a list of existing jobs by use of the Prev (previous) and Next keys 180, 182, and then touching the Enter key 158. To assist with the job name entry process, entered characters appear at display window 159, and a Backspace key 160 is provided in case a character is erroneously entered. An Exit key 184 is also provided to enable the operator to return to the previous screen without performing the Recall operation.

Upon entry of an existing job name, as shown in step 277 of FIG. 5A, the system controller 24 accesses a location of the storage device memory correlated with the job name (identifying label) to recall the parameters from the storage device 50 to the data memory 44*b* (FIGS. 2A, 4).

As can be seen, by emulating the control panels of active auxiliary devices 20 on the display screen 46, a level of flexibility is achieved that cannot be matched with dedicated electronic or mechanical control panels. By way of example, as auxiliary devices are added to a system, control panels are automatically displayed therefor in response to a simple Setup inquiry. If in the future new auxiliary devices are developed, a simple addition to the software will allow its corresponding new control panel to be emulated in a like manner.

As can be seen from the foregoing detailed description, there is provided a system and method that substantially reduces the amount of time required to setup the auxiliary devices of a printing press. The system and method improves the quality of the printing from run to run by enabling more consistent settings of the auxiliary device parameters. At the same time, a visualization of all settings is provided to ease the operator's ability to assess relative device settings.

C-DOC

| | | |
|---|---|---|
| GetKP | 32 | SFCONFIG.CPP |
| Heptad:: | 21 | HEPTAD.H |
| Heptad::Display | 36 | HEPTAD.CPP |
| Heptad::Heptad | 25 | HEPTAD.CPP |
| Heptad::LED | 122 | HEPTAD.CPP |
| Heptad::draw | 48 | HEPTAD.CPP |
| Heptad::reDraw | 131 | HEPTAD.CPP |
| KnifeSprayerFiller:: | 26 | KNIFE.H |
| KnifeSprayerFiller::Build | 113 | KNIFE.CPP |
| KnifeSprayerFiller::CanUse | 349 | KNIFE.CPP |
| KnifeSprayerFiller::DispInit | 373 | KNIFE.CPP |
| KnifeSprayerFiller::Hide | 405 | KNIFE.CPP |
| KnifeSprayerFiller::KnifeSprayer | 27 | KNIFE.CPP |
| KnifeSprayerFiller::MakePush | 416 | KNIFE.CPP |
| KnifeSprayerFiller::Max | 509 | KNIFE.CPP |
| KnifeSprayerFiller::Maxed | 520 | KNIFE.CPP |
| KnifeSprayerFiller::Min | 533 | KNIFE.CPP |
| KnifeSprayerFiller::TestActivity | 75 | KNIFE.H |
| KnifeSprayerFiller::Touched | 784 | KNIFE.CPP |
| KnifeSprayerFiller::UpdateSetup | 805 | KNIFE.CPP |
| KnifeSprayerFiller::getInterLock | 396 | KNIFE.CPP |
| KnifeSprayerFiller::runIO | 544 | KNIFE.CPP |
| KnifeSprayerFiller::~KnifeSpraye | 98 | KNIFE.CPP |
| MatrixDisplay:: | 57 | HEPTAD.H |
| MatrixDisplay::Display | 67 | HEPTAD.H |
| MatrixDisplay::MatrixDisplay | 146 | HEPTAD.CPP |
| MatrixDisplay::reDraw | 199 | HEPTAD.CPP |
| MatrixDisplay::~MatrixDisplay | 175 | HEPTAD.CPP |
| Panel:: | 79 | PANEL.H |
| Panel::DispVal | 695 | PANEL.CPP |
| Panel::Display | 663 | PANEL.CPP |
| Panel::DrawLogo | 730 | PANEL.CPP |
| Panel::Light | 849 | PANEL.CPP |
| Panel::Max | 860 | PANEL.CPP |
| Panel::Maxed | 891 | PANEL.CPP |
| Panel::Min | 897 | PANEL.CPP |
| Panel::OneShot | 929 | PANEL.CPP |
| Panel::Panel | 166 | PANEL.CPP |
| Panel::Switch | 951 | PANEL.CPP |
| Panel::Tag | 970 | PANEL.CPP |
| Panel::TempLight | 999 | PANEL.CPP |
| Panel::TempSwitch | 1010 | PANEL.CPP |
| Panel::TempTag | 981 | PANEL.CPP |
| Panel::Touched | 1020 | PANEL.CPP |
| Panel::UnLatch | 1042 | PANEL.CPP |
| Panel::addButton | 248 | PANEL.CPP |
| Panel::addLabel | 590 | PANEL.CPP |
| Panel::addMatDisp | 633 | PANEL.CPP |
| Panel::addReadOut | 648 | PANEL.CPP |
| Panel::drawMax | 766 | PANEL.CPP |
| Panel::drawMin | 807 | PANEL.CPP |
| Panel::~Panel | 204 | PANEL.CPP |
| ReadOut:: | 37 | HEPTAD.H |
| ReadOut::Display | 363 | HEPTAD.CPP |
| ReadOut::LED | 384 | HEPTAD.CPP |
| ReadOut::ReadOut | 239 | HEPTAD.CPP |
| ReadOut::char2Heptad | 287 | HEPTAD.CPP |
| ReadOut::reDraw | 393 | HEPTAD.CPP |
| ReadOut::~ReadOut | 279 | HEPTAD.CPP |
| RemoteStation | 1965 | ARCNET.CPP |
| RemoteStation:: | 22 | ARCNET.H |
| RemoteStation::ConfigIO | 72 | ARCNET.CPP |

C-DOC

```
GetKP                            32 SFCONFIG.CPP
Heptad::                         21 HEPTAD.H
Heptad::Display                  36 HEPTAD.CPP
Heptad::Heptad                   25 HEPTAD.CPP
Heptad::LED                      122 HEPTAD.CPP
Heptad::draw                     48 HEPTAD.CPP
Heptad::reDraw                   131 HEPTAD.CPP
KnifeSprayerFiller::             26 KNIFE.H
KnifeSprayerFiller::Build        113 KNIFE.CPP
KnifeSprayerFiller::CanUse       349 KNIFE.CPP
KnifeSprayerFiller::DispInit     373 KNIFE.CPP
KnifeSprayerFiller::Hide         405 KNIFE.CPP
KnifeSprayerFiller::KnifeSprayer 27 KNIFE.CPP
KnifeSprayerFiller::MakePush     416 KNIFE.CPP
KnifeSprayerFiller::Max          509 KNIFE.CPP
KnifeSprayerFiller::Maxed        520 KNIFE.CPP
KnifeSprayerFiller::Min          533 KNIFE.CPP
KnifeSprayerFiller::TestActivity 75 KNIFE.H
KnifeSprayerFiller::Touched      784 KNIFE.CPP
KnifeSprayerFiller::UpdateSetup  805 KNIFE.CPP
KnifeSprayerFiller::getInterLock 396 KNIFE.CPP
KnifeSprayerFiller::runIO        544 KNIFE.CPP
KnifeSprayerFiller::~KnifeSpraye 98 KNIFE.CPP
MatrixDisplay::                  57 HEPTAD.H
MatrixDisplay::Display           67 HEPTAD.H
MatrixDisplay::MatrixDisplay     146 HEPTAD.CPP
MatrixDisplay::reDraw            199 HEPTAD.CPP
MatrixDisplay::~MatrixDisplay    175 HEPTAD.CPP
Panel::                          79 PANEL.H
Panel::DispVal                   695 PANEL.CPP
Panel::Display                   663 PANEL.CPP
Panel::DrawLogo                  730 PANEL.CPP
Panel::Light                     849 PANEL.CPP
Panel::Max                       860 PANEL.CPP
Panel::Maxed                     891 PANEL.CPP
Panel::Min                       897 PANEL.CPP
Panel::OneShot                   929 PANEL.CPP
Panel::Panel                     166 PANEL.CPP
Panel::Switch                    951 PANEL.CPP
Panel::Tag                       970 PANEL.CPP
Panel::TempLight                 999 PANEL.CPP
Panel::TempSwitch                1010 PANEL.CPP
Panel::TempTag                   981 PANEL.CPP
Panel::Touched                   1020 PANEL.CPP
Panel::UnLatch                   1042 PANEL.CPP
Panel::addButton                 248 PANEL.CPP
Panel::addLabel                  590 PANEL.CPP
Panel::addMatDisp                633 PANEL.CPP
Panel::addReadOut                648 PANEL.CPP
Panel::drawMax                   766 PANEL.CPP
Panel::drawMin                   807 PANEL.CPP
Panel::~Panel                    204 PANEL.CPP
ReadOut::                        37 HEPTAD.H
ReadOut::Display                 363 HEPTAD.CPP
ReadOut::LED                     384 HEPTAD.CPP
ReadOut::ReadOut                 239 HEPTAD.CPP
ReadOut::char2Heptad             287 HEPTAD.CPP
ReadOut::reDraw                  393 HEPTAD.CPP
ReadOut::~ReadOut                279 HEPTAD.CPP
RemoteStation                    1965 ARCNET.CPP
RemoteStation::                  22 ARCNET.H
RemoteStation::ConfigIO          72 ARCNET.CPP
```

C-DOC

```
RemoteStation::GetAnalog       134 ARCNET.CPP
RemoteStation::GetAnalogInput    148 ARCNET.CPP
RemoteStation::GetDataBlock     207 ARCNET.CPP
RemoteStation::GetDataSpace     233 ARCNET.CPP
RemoteStation::GetDigital     289 ARCNET.CPP
RemoteStation::GetInputs      305 ARCNET.CPP
RemoteStation::NetworkDog      374 ARCNET.CPP
RemoteStation::RemoteStation     35 ARCNET.CPP
RemoteStation::ResetBoard     398 ARCNET.CPP
RemoteStation::Responding      55 ARCNET.H
RemoteStation::ReverseValue     422 ARCNET.CPP
RemoteStation::SetAnalog      454 ARCNET.CPP
RemoteStation::SetAnalogOutput   468 ARCNET.CPP
RemoteStation::SetDataBlock     506 ARCNET.CPP
RemoteStation::SetDataSpace     529 ARCNET.CPP
RemoteStation::SetDigital     556 ARCNET.CPP
RemoteStation::SetIOStatus     572 ARCNET.CPP
RemoteStation::SetOutput     609 ARCNET.CPP
RemoteStation::StopProgram     633 ARCNET.CPP
RemoteStation::doIOscan      99 ARCNET.CPP
RemoteStation::~RemoteStation    57 ARCNET.CPP
Reset              354 SHEETFED.CPP
SText::              68 PANEL.H
SText::SText           117 PANEL.CPP
SText::reDraw           151 PANEL.CPP
SText::~SText           130 PANEL.CPP
SheetFedConfig::          24 SFCONFIG.H
SheetFedConfig::Adjust       82 SFCONFIG.CPP
SheetFedConfig::BuildTerminal    780 SFCONFIG.CPP
SheetFedConfig::Configure     1138 SFCONFIG.CPP
SheetFedConfig::Confirm      1175 SFCONFIG.CPP
SheetFedConfig::FixConfig     1243 SFCONFIG.CPP
SheetFedConfig::GetBuffer     1332 SFCONFIG.CPP
SheetFedConfig::GetDataBlock    1455 SFCONFIG.CPP
SheetFedConfig::GetID       1490 SFCONFIG.CPP
SheetFedConfig::MakeCheckSum    1525 SFCONFIG.CPP
SheetFedConfig::RecallSetup    1539 SFCONFIG.CPP
SheetFedConfig::SaveSetup     1567 SFCONFIG.CPP
SheetFedConfig::SetDataBlock    1616 SFCONFIG.CPP
SheetFedConfig::Setup       1650 SFCONFIG.CPP
SheetFedConfig::SheetFedConfig   60 SFCONFIG.CPP
SheetFedConfig::Update       1715 SFCONFIG.CPP
SheetFedConfig::Valid       1727 SFCONFIG.CPP
SheetFedConfig::~SheetFedConfig  71 SFCONFIG.CPP
SheetFeed::            44 SHEETFED.H
SheetFeed::ChangeText       230 SHEETFED.CPP
SheetFeed::ChooseColor       247 SHEETFED.CPP
SheetFeed::ChooseFont       285 SHEETFED.CPP
SheetFeed::GetMsg         312 SHEETFED.CPP
SheetFeed::GetMsgColor       71 SHEETFED.H
SheetFeed::GetMsgFont       72 SHEETFED.H
SheetFeed::GetMsgText       73 SHEETFED.H
SheetFeed::HideMsg        331 SHEETFED.CPP
SheetFeed::SheetFeed       29 SHEETFED.CPP
SheetFeed::ShowMsg        678 SHEETFED.CPP
SheetFeed::TP_Where        76 SHEETFED.H
SheetFeed::run          363 SHEETFED.CPP
SheetFeed::runIO         625 SHEETFED.CPP
SheetFeed::~SheetFeed       209 SHEETFED.CPP
ThermoStat::           53 BUTTONS.H
ThermoStat::Tag1         363 BUTTONS.CPP
ThermoStat::Tag2         379 BUTTONS.CPP
```

C-DOC

| | | |
|---|---|---|
| ThermoStat::ThermoStat | 283 | BUTTONS.CPP |
| ThermoStat::draw | 294 | BUTTONS.CPP |
| Timer:: | 20 | TIMER.H |
| Timer::Expired | 93 | TIMER.CPP |
| Timer::Set | 101 | TIMER.CPP |
| Timer::TimeRemaining | 33 | TIMER.H |
| Timer::Timer | 27 | TIMER.CPP |
| Timer::TimerInt | 108 | TIMER.CPP |
| Timer::~Timer | 76 | TIMER.CPP |
| TouchPanel:: | 59 | TP.H |
| TouchPanel::FindTP | 114 | TP.CPP |
| TouchPanel::InitTP | 208 | TP.CPP |
| TouchPanel::PanelSize | 86 | TP.H |
| TouchPanel::Pushed | 87 | TP.H |
| TouchPanel::SendCommand | 225 | TP.CPP |
| TouchPanel::SetScaling | 239 | TP.CPP |
| TouchPanel::TouchInt | 247 | TP.CPP |
| TouchPanel::TouchPanel | 43 | TP.CPP |
| TouchPanel::Where | 308 | TP.CPP |
| TouchPanel::~TouchPanel | 93 | TP.CPP |
| WasherStation:: | 62 | ARCNET.H |
| WasherStation::BlanketWasher | 694 | ARCNET.CPP |
| WasherStation::BroadcastStart | 768 | ARCNET.CPP |
| WasherStation::BroadcastStop | 822 | ARCNET.CPP |
| WasherStation::MakeProgram | 918 | ARCNET.CPP |
| WasherStation::SendGeneratorPLC | 1654 | ARCNET.CPP |
| WasherStation::SendHeaderPLC | 1695 | ARCNET.CPP |
| WasherStation::SendProgramPLC | 1742 | ARCNET.CPP |
| WasherStation::SetBit | 1839 | ARCNET.CPP |
| WasherStation::StartPLC | 1897 | ARCNET.CPP |
| WasherStation::StopPLC | 1928 | ARCNET.CPP |
| WasherStation::WasherStation | 672 | ARCNET.CPP |
| WasherStation::doIOscan | 876 | ARCNET.CPP |
| WaterLessTemperature:: | 23 | WATERLES.H |
| WaterLessTemperature::Build | 127 | WATERLES.CPP |
| WaterLessTemperature::CanUse | 583 | WATERLES.CPP |
| WaterLessTemperature::DispInit | 595 | WATERLES.CPP |
| WaterLessTemperature::Hide | 628 | WATERLES.CPP |
| WaterLessTemperature::MakePush | 635 | WATERLES.CPP |
| WaterLessTemperature::Max | 700 | WATERLES.CPP |
| WaterLessTemperature::Maxed | 707 | WATERLES.CPP |
| WaterLessTemperature::Min | 716 | WATERLES.CPP |
| WaterLessTemperature::TestActivi | 75 | WATERLES.H |
| WaterLessTemperature::Touched | 984 | WATERLES.CPP |
| WaterLessTemperature::UpdateSetu | 994 | WATERLES.CPP |
| WaterLessTemperature::WaterLessT | 49 | WATERLES.CPP |
| WaterLessTemperature::runIO | 726 | WATERLES.CPP |
| WaterLessTemperature::~WaterLess | 114 | WATERLES.CPP |
| WaterStation:: | 100 | ARCNET.H |
| WaterStation::Dcoefficients | 1972 | ARCNET.CPP |
| WaterStation::GetStatus | 2022 | ARCNET.CPP |
| WaterStation::GetTemp | 2129 | ARCNET.CPP |
| WaterStation::HeaterDelay | 2142 | ARCNET.CPP |
| WaterStation::Icoefficients | 2152 | ARCNET.CPP |
| WaterStation::Ncoefficients | 2176 | ARCNET.CPP |
| WaterStation::NewSetPoints | 2199 | ARCNET.CPP |
| WaterStation::Pcoefficients | 2207 | ARCNET.CPP |
| WaterStation::PreHeat | 2231 | ARCNET.CPP |
| WaterStation::SelectSensor | 2240 | ARCNET.CPP |
| WaterStation::SetStatus | 2247 | ARCNET.CPP |
| WaterStation::Tcoefficients | 2330 | ARCNET.CPP |
| WaterStation::WaterStation | 1964 | ARCNET.CPP |

C-DOC

| | | |
|---|---|---|
| WaterStation::doIOscan | 1996 | ARCNET.CPP |
| main | 700 | SHEETFED.CPP |
| textheight | 136 | PANEL.CPP |

C-DOC GOBJECTS.H

```
/*****************************\
*                             *
*  gobjects.h                     *
*                             *
*  GPoint and GRect class ojects representing points  *
*  and rectangular regions in a graphics screen.      *
*                             *
*  (C) 1993 OXY-DRY CORPORATION          *
*                             *

#ifndef __GObjects
|  #define __GObjects
|
|  typedef unsigned char byte;
|  typedef unsigned short int uint;
|
|  #ifndef Booleans
|  |  #define Booleans
|  |  #ifndef __TTYPES_H
|  |  |  enum Boolean { False, True };
|  |  #endif                  // __TTYPES_H
|  #endif                     // Booleans
|
|  class GPoint
|  {
|  :
|  public:
|  :
|  :  GPoint();
|  :  GPoint( int X, int Y );
|  :
//   GPoint& operator + ( const GPoint& adder );      // vector addition
//   GPoint& operator - ( const GPoint& subber );     // vector subtraction
|  :  GPoint& operator += ( const GPoint& adder );// vector addition
|  :  GPoint& operator -= ( const GPoint& subber );// vector subtraction
|  :  Boolean operator == ( const GPoint& p ) const;
|  :  Boolean operator != ( const GPoint& p ) const;
|  :
|  :  int x,y;
|  :
|  };
|
|  inline GPoint::GPoint()
{
|  }
|
|  inline GPoint::GPoint( int X, int Y )
{
|     x = X;
|     y = Y;
|  }
|
/*
inline GPoint& GPoint::operator + ( const GPoint& adder )
{
:   return GPoint( x + adder.x, y + adder.y );
}
```

C-DOC GOBJECTS.H

```

inline GPoint& GPoint::operator - ( const GPoint& subber )
{
: return GPoint( x - subber.x, y - subber.y );
}
*/
|
| inline GPoint& GPoint::operator += ( const GPoint& adder )
{
|     x += adder.x;
|     y += adder.y;
========return *this;
| }
|
| inline GPoint& GPoint::operator -= ( const GPoint& subber )
{
|     x -= subber.x;
|     y -= subber.y;
========return *this;
| }
|
| inline Boolean GPoint::operator == ( const GPoint& p ) const
{
====return Boolean( x == p.x && y == p.y );
}
|
| inline Boolean GPoint::operator != ( const GPoint& p ) const
{
====return Boolean( !( *this == p ) );
}
|
!#ifdef __ipstream
!
!inline ipstream& operator >> ( ipstream& is, GPoint& p )
!   { return is >> p.x >> p.y; }
!
!inline ipstream& operator >> ( ipstream& is, GPoint*& p )
!   { return is >> p->x >> p->y; }
!
!#endif // __ipstream
|
!#ifdef __opstream
!
!inline opstream& operator << ( opstream& os, GPoint& p )
!   { return os << p.x << p.y; }
!
!inline opstream& operator << ( opstream& os, GPoint* p )
!   { return os << p->x << p->y; }
!
!#endif // __opstream
|
| class GRect
| {
| :
| public:
| :
| :  GRect( int l, int t, int r, int b );
| :  GRect( GPoint p1, GPoint p2 );
| :  GRect();
| :
| :  void move( int dX, int dY );
| :  void move( const GPoint& Vector );
```

C-DOC GOBJECTS.H

```
: void moveTo( int X, int Y );
: void moveTo( const GPoint& Anchor );
: void grow( int dX, int dY );
: void grow( const GPoint& Vector );
: void growTo( int X, int Y );
: void growTo( const GPoint& Size );
: void intersect( const GRect& r );
: void Union( const GRect& r );
: Boolean contains( const GPoint& p ) const;
: Boolean operator == ( const GRect& r ) const;
: Boolean operator != ( const GRect& r ) const;
: Boolean isEmpty();
:
: int left, top, right, bottom;
:
};

inline GRect::GRect( int l, int t, int r, int b )
{
    left = ( ( l < r ) ? l : r );
    top = ( ( t < b ) ? t : b );
    right = ( ( l > r ) ? l : r );
    bottom = ( ( t > b ) ? t : b );
}

inline GRect::GRect( GPoint p1, GPoint p2 )
{
    left = ( ( p1.x < p2.x ) ? p1.x : p2.x );
    top = ( ( p1.y < p2.y ) ? p1.y : p2.y );
    right = ( ( p1.x > p2.x ) ? p1.x : p2.x );
    bottom = ( ( p1.y > p2.y ) ? p1.y : p2.y );
}

inline GRect::GRect()
{
}

inline void GRect::move( int dX, int dY )
{
    left += dX;
    top += dY;
    right += dX;
    bottom += dY;
}

inline void GRect::move( const GPoint& Vector )
{
    left += Vector.x;
    top += Vector.y;
    right += Vector.x;
    bottom += Vector.y;
}

inline void GRect::moveTo( int X, int Y )
{
    bottom += Y - top;
    right += X - left;
    top = Y;
    left = X;
}

inline void GRect::moveTo( const GPoint& Anchor )
```

C-DOC GOBJECTS.H

```
{
    bottom += Anchor.y - top;
    right += Anchor.x - left;
    top = Anchor.y;
    left = Anchor.x;
 }

 inline void GRect::grow( int dX, int dY )
{
    right += dX;
    bottom += dY;
 }

 inline void GRect::grow( const GPoint& Vector )
{
    right += Vector.x;
    bottom += Vector.y;
 }

 inline void GRect::growTo( int X, int Y )
{
    right = left + X;
    bottom = top + Y;
 }

 inline void GRect::growTo( const GPoint& Size )
{
    right = left + Size.x;
    bottom = top + Size.y;
 }

 inline void GRect::intersect( const GRect& r )
{
    left = ( ( left > r.left ) ? left : r.left );
    top = ( ( top > r.top ) ? top : r.top );
    right = ( ( right < r.right ) ? right : r.right );
    bottom = ( ( bottom < r.bottom ) ? bottom : r.bottom );
 }

 inline void GRect::Union( const GRect& r )
{
    left = ( ( left < r.left ) ? left : r.left );
    top = ( ( top < r.top ) ? top : r.top );
    right = ( ( right > r.right ) ? right : r.right );
    bottom = ( ( bottom > r.bottom ) ? bottom : r.bottom );
 }

 inline Boolean GRect::contains( const GPoint& p ) const
{
====return Boolean(
 :  p.x >= left && p.x < right && p.y >= top && p.y < bottom
 );
}

 inline Boolean GRect::operator == ( const GRect& r) const
{
====return Boolean( left == r.left && top == r.top &&
 :  right == r.right && bottom == r.bottom );
}

 inline Boolean GRect::operator != ( const GRect& r ) const
{
```

C-DOC GOBJECTS.H

```
====return Boolean( !(*this == r) );
}

 inline Boolean GRect::isEmpty()
{
========return Boolean( left >= right | top >= bottom );
 }

#ifdef __ipstream

inline ipstream& operator >> ( ipstream& is, GRect& r )
  { return is >> r.left >> r.top >> r.right >> r.bottom; }

inline ipstream& operator >> ( ipstream& is, GRect*& r )
  { return is >> r->left >> r->top >> r->right >> r->bottom; }

#endif // __ipstream

#ifdef __opstream

inline opstream& operator << ( opstream& os, GRect& r )
  { return os << r.left << r.top << r.right << r.bottom; }

inline opstream& operator << ( opstream& os, GRect* r )
  { return os << r->left << r->top << r->right << r->bottom; }

#endif // __opstream

#endif                    // __GObjects
```

C-DOC KEYS.H

```

/*****************************\
*                            *
*  keys.h                    *
*                            *
*  Constants for key codes.            *
*                            *
*  Returned by C getch() and getche() functions    *
*                            *
\*****************************/

/*  getch() and getche() return the ASCII code for a key or one *\
\*  of these INTRO's followed by the scan code in the next call */

#define INTROkey        0     // non ASCII keys common to all keyboards
#define INTRO2key       0xe0  // non ASCII keys unique to 101 keyboards

enum Keys {
  BSkey = 8,              //  8
  TABkey,                 //  9
  ENTERkey = 13,          //  13
  ESCkey = 27,            //  27
  NULLkey = 131,          //  3
  SH_Tabkey = 143,        //  15
  ALT_Qkey,               //  16
  ALT_Wkey,               //  17
  ALT_Ekey,               //  18
  ALT_Rkey,               //  19
  ALT_Tkey,               //  20
  ALT_Ykey,               //  21
  ALT_Ukey,               //  22
  ALT_Ikey,               //  23
  ALT_Okey,               //  24
  ALT_Pkey,               //  25
  ALT_Akey = 158,         //  30
  ALT_Skey,               //  31
  ALT_Dkey,               //  32
  ALT_Fkey,               //  33
  ALT_Gkey,               //  34
  ALT_Hkey,               //  35
  ALT_Jkey,               //  36
  ALT_Kkey,               //  37
  ALT_Lkey,               //  38
  ALT_Zkey = 172,         //  44
  ALT_Xkey,               //  45
  ALT_Ckey,               //  46
  ALT_Vkey,               //  47
  ALT_Bkey,               //  48
  ALT_Nkey,               //  49
  ALT_Mkey,               //  50
  F1key = 187,            //  59
  F2key,                  //  60
  F3key,                  //  61
  F4key,                  //  62
  F5key,                  //  63
  F6key,                  //  64
  F7key,                  //  65
  F8key,                  //  66
  F9key,                  //  67
  F10key,                 //  68
  HOMEkey = 199,          //  71
  UPkey,                  //  72
```

C-DOC KEYS.H

```
PGUPkey,            // 73
LEFTkey = 203,      // 75
RIGHTkey = 205,     // 77
ENDkey = 207,       // 79
DOWNkey,            // 80
PGDNkey,            // 81
INSkey,             // 82
DELkey,             // 83
SH_F1key,           // 84
SH_F2key,           // 85
SH_F3key,           // 86
SH_F4key,           // 87
SH_F5key,           // 88
SH_F6key,           // 89
SH_F7key,           // 90
SH_F8key,           // 91
SH_F9key,           // 92
SH_F10key,          // 93
CTRL_F1key,         // 94
CTRL_F2key,         // 95
CTRL_F3key,         // 96
CTRL_F4key,         // 97
CTRL_F5key,         // 98
CTRL_F6key,         // 99
CTRL_F7key,         // 100
CTRL_F8key,         // 101
CTRL_F9key,         // 102
CTRL_F10key,        // 103
ALT_F1key,          // 104
ALT_F2key,          // 105
ALT_F3key,          // 106
ALT_F4key,          // 107
ALT_F5key,          // 108
ALT_F6key,          // 109
ALT_F7key,          // 110
ALT_F8key,          // 111
ALT_F9key,          // 112
ALT_F10key,         // 113
CTRL_PRTSCkey,      // 114
CTRL_LEFTkey,       // 115
CTRL_RIGHTkey,      // 116
CTRL_ENDkey,        // 117
CTRL_PGDNkey,       // 118
CTRL_HOMEkey,       // 119
ALT_1key,           // 120
ALT_2key,           // 121
ALT_3key,           // 122
ALT_4key,           // 123
ALT_5key,           // 124
ALT_6key,           // 125
ALT_7key,           // 126
ALT_8key,           // 127
ALT_9key,           // 128
ALT_0key,           // 129
ALT_minuskey,       // 130
ALT_equalskey,      // 131
CTRL_PGUPkey,       // 132
F11key,             // 133
F12key,             // 134
SH_F11key,          // 135
SH_F12key,          // 136
CTRL_F11key,        // 137
```

C-DOC KEYS.H

```
CTRL_F12key,                // 138
ALT_F11key,                 // 139
ALT_F12key,                 // 140
CTRL_UPkey,                 // 141
CTRL_DOWNkey = 273,         // 145
ALT_UPkey = 280,            // 152
ALT_DOWNkey = 288           // 160
};
```

C-DOC UART.H

```
/*------------------------------------------------------------
:    UART.H
*/

#ifndef _UART_H
  #define _UART_H

  enum Interrupts { IRQ2 = 0x0A, IRQ3, IRQ4, IRQ5, IRQ6, IRQ7 };
  enum COMports { COM1 = 0x3F8, COM2 = 0x2F8, COM3 = 0x3E8, COM4 = 0x2E8,
  :  COMA = 0x348, COMB = 0x340 };

  enum UARTports {
  :  uartRBR = 0,         // Receiver Buffer Register ( read only )
  :  uartTHR = 0,      // Transmitter Holding Register ( write only )
  :  uartIER = 1,             // Interrupt Enable Register
  :  uartIIR = 2,  // Interrupt Identification Register ( read only )
  :  uartLCR = 3,              // Line Control Register
  :  uartMCR = 4,               // Modem Control Register
  :  uartLSR = 5,            // Line Status Register ( read only )
  :  uartMSR = 6,            // Modem Status Register ( read only )
  :  uartDLL = 0,              // Divisor Latch Lsb
  :  uartDLM = 1               // Divisor Latch Msb
  };

  const uartIER_RDA = 1;        // Receive Data Available
  const uartIER_THRE = 2;       // Transmitter Holding Register Empty
  const uartIER_RLS = 4;        // Receiver Line Status
  const uartIER_MS = 8;         // Modem Status
  const uartIIR_IID = 7;        // Interrupt IDentification bits
  const uartIIR_None = 1;       // no interrupt from this uart
  const uartIIR_RLS = 6;        // Receiver Line Status
  const uartIIR_RDA = 4;        // Receive Data Available
  const uartIIR_THRE = 2;       // Transmitter Holding Register Empty
  const uartIIR_MS = 0;         // Modem Status
  const uartLCR_5Bit = 0;       // 5 Data Bits
  const uartLCR_6Bit = 1;       // 6 Data Bits
  const uartLCR_7Bit = 2;       // 7 Data Bits
  const uartLCR_8Bit = 3;       // 8 Data Bits
  const uartLCR_STB = 4;        // number of STop Bits
  const uartLCR_PEN = 8;        // Parity ENable
  const uartLCR_EPS = 16;       // Even Parity Select
  const uartLCR_SP = 32;        // Stick Parity
  const uartLCR_SB = 64;        // Set Break
  const uartLCR_DLAB = 128;       // Divisor Latch Access Bit
  const uartMCR_DTR = 1;        // Data Terminal Ready
  const uartMCR_RTS = 2;        // Request To Send
  const uartMCR_Out1 = 4;
  const uartMCR_Out2 = 8;
  const uartMCR_Loop = 16;
  const uartLSR_DR = 1;         // Data Ready
  const uartLSR_OE = 2;         // Overrun Error
  const uartLSR_PE = 4;         // Parity Error
  const uartLSR_FE = 8;         // Framing Error
  const uartLSR_BI = 16;        // Break Interrupt
  const uartLSR_THRE = 32;      // Transmitter Holding Register Empty
  const uartLSR_TSRE = 64;      // Transmitter Shift Register Empty
  const uartMSR_DCTS = 1;       // Delta 0 Clear To Send
  const uartMSR_DDSR = 2;       // Delta Data Set Ready
  const uartMSR_TERI = 4;       // Trailing Edge Ring Indicator
  const uartMSR_DDCD = 8;       // Delta Data Carrier Detect
  const uartMSR_CTS = 16;       // Clear To Send
  const uartMSR_DSR = 32;       // Data Set Ready
```

C-DOC UART.H

```
const uartMSR_RI = 64;          // Ring Indicator
const uartMSR_DCD = 128;        // Data Carrier Detect

#define BASE8259     0x20
#define EOI          0x20

#endif
```

C-DOC BUTTONS.H

```

/****************************\
*                            *
*  buttons.h                 *
*                            *
*  Push Button Graphics      *
*                            *
*  (C) 1993 OXY-DRY CORPORATION  *
*  all rights reserved       *
*                            *
\****************************/

// 1993 october 10    change copyright for listing

#ifndef __buttons_h
| #define __buttons_h
|
| #include <graphics.h>        // moveto(), line(), lineto(), set...
| #include "gobjects.h"        // GPoint, GRect
|
| class Button
| {
| public:
| : enum ButtonState { Out, Latch, In, Release, New };
| : enum ButtonType { Momentary, Latching, Indicator };
| private:
| : Boolean Pushed:1, WasPushed:1;
| : ButtonType Type;
| : char *Label;
| protected:
| : ButtonState State;
| : COLORS Color;
| : font_names FONT;
| : GRect Region;
| : virtual void draw( void );
| public:
| : Button( GRect& Box, ButtonType newType, char *Text = " ",
| : : font_names TextFont = SMALL_FONT );
| : ~Button();
| : COLORS Light( void );
| : void Light( COLORS NewColor );
| : Boolean Off( void );
| : Boolean On( void );
| : Boolean Once( void );
| : void reDraw( void ) { draw(); }
| : void Set( Boolean newState );
| : const char *Tag( void );
| : void Tag( const char *Text, font_names TextFont = SMALL_FONT );
| : Boolean Touched( const GPoint& Push );
| : void Unlatch( void );
| };
|
| class ThermoStat : public Button
| {
| : char buf0[6], buf1[6];
| : uint HowMany, Value[2], Which;
| protected:
| : virtual void draw( void );
| public:
| : ThermoStat( GRect& Box );
| : void Tag1( uint Value );     // display set point
| : void Tag2( uint Large, char *Value0, char *Value1 );// temp & time
```

C-DOC BUTTONS.H

```
   :  void Tag2( uint Large, uint Value0, uint Value1 );//  display sensors
  };

#endif                    //  __buttons_h
```

C-DOC HEPTAD.H

```

/*****************************\
*                             *
*  heptad.h                   *
*                             *
*  Seven Segment Display Graphic      *
*                             *
*  (C) 1993 OXY-DRY CORPORATION   *
*  all rights reserved         *
*                             *
\*****************************/

// 1993 october 10    change copyright for listing

#ifndef __Heptad_h
|  #define __Heptad_h
|
|  #include <graphics.h>        // moveto(), line(), lineto(), set...
|  #include "gobjects.h"         // GPoint, GRect
|
|  class Heptad
|  {
|  :  COLORS OffColor, OnColor;
|  :  GPoint Anchor, size;
|  :  uint digit;
|  public:
|  :  enum { Zero, One, Two, Three, Four, Five, Six, Seven, Eight, Nine, Ten,
|  :  :  Eleven, Twelve, Thirteen, Fourteen, Fifteen, Blank, smC, lgH, smH,
|  :  :  lgJ, lgL, smN, smO, lgP, smR, lgU, smU, lgY, Minus, Equal, Degree };
|  :  Heptad( GRect& Region, COLORS segments = RED, COLORS face = BLACK );
|  :  void Display( uint value );
|  :  virtual void draw( void );
|  :  void LED( COLORS segments );
|  :  void reDraw( void );
|  };
|
|  class ReadOut
|  {
|  :  char *dispBuf;
|  :  COLORS OnColor;
|  :  GPoint Anchor, size;
|  :  Heptad **Digit;
|  :  uint digits;
|  :  uint char2Heptad( char Chr );
|  public:
|  :  enum OnOff { Off, On };
|  :  ReadOut( const GRect& Frame, const GPoint& Size,
|  :  :  const uint Digits, const COLORS segments = YELLOW );
|  :  ~ReadOut();
|  :  char const*Display( void );
|  :  void Display( const char *msg );
|  :  void Display( int num );
|  :  void LED( OnOff Lit );
|  :  void reDraw( void );
|  };
|
|  class MatrixDisplay
|  {
|  :  char **dispBuf;
|  :  COLORS OnColor;
|  :  GPoint Anchor, size;
|  :  uint cols, rows;
```

C-DOC HEPTAD.H

```
| public:
| : MatrixDisplay( const GRect& Frame, const uint Cols,
| : : const uint Rows, const COLORS dots = YELLOW );
| : ~MatrixDisplay();
========const char **Display( void ) { return dispBuf; }
| : void Display( const char **msg );
| : void Display( uint Row, uint Col, char *msg );
| : void reDraw( void );
| };
|
#endif                    // __Heptad_h
```

C-DOC TIMER.H

```
/*************************\
*                        *
*  timer.h               *
*                        *
*  55 mS Timers          *
*                        *
*  (C) 1993 OXY-DRY CORPORATION
       all rights reserved   *
*                        *
\*************************/

// 1993 october 10    change copyright for listing

#ifndef __timer_h
| #define __timer_h
|
| #include "gobjects.h"          // Boolean, False, True
|
| class Timer
| {
| private:      // these members are accessible only to other members
| :  static void interrupt (far *oldTimer )(...);
| :  static void interrupt TimerInt(...);
| :  static byte far*ActiveTimers;
| :  static uint MaxTimers, far*Timers;
| :  uint index;
| public:                  // these members are availabe to all
| :  Timer( uint Ticks = 0 );      // the constructor
| :  ~Timer();                // the destructor
| :  Boolean Expired( void );
| :  void Set( uint Ticks );
========uint TimeRemaining( void ) { return Timers[index]; }
| };
|
#endif                     // __timer_h
```

C-DOC ARCNET.H

```

/***********************************\
*                                    *
*  arcnet.h                          *
*                                    *
*  class declarations for communication with remote stations over an  *
*  arcnet cable                      *
*                                    *
*  (C) 1993, OXY DRY CORPORATION  *
*  all rights reserved               *
*                                    *
\***********************************/

// 1993 october 10    change copyright for listing

#ifndef __Arcnet
| #define __Arcnet
|
| #include "gobjects.h"
| #include "timer.h"
|
| class RemoteStation
| {
| : uint GetAnalogInput( uint Station, byte Input, uint *InputValue );
| : uint GetDataSpace( uint Station, uint DataBank, byte *DataSpace );
| : void ResetBoard( void );
| : uint ReverseValue( uint Value );
| : uint SetDataSpace( uint Station, uint DataBank, byte *DataSpace );
| : uint SetOutput( uint Station, byte *Output );
| protected:
| : enum { OK, Fail };
| : enum { STATUS_REG = 0x2e0, COMMAND_REG };
| : enum { CLEAR_TRANS = 1, SEND_OK, TRANS_PAGE_0, RECEIVE_OK = 0x80,
| : : CLEAR_RECEIVE = 0x8c };
| : enum { TRY_COM = 3, WAIT_COM = 100 };
| : Boolean PLCactive, Responded;
| : byte ADconfig[3], IOconfig[3], IObits[3];
| : Timer *IOscan;
| : static uint LocalID;
| : uint AnaVal[24], c, RemoteID;
| : virtual void doIOscan( void );
| : void (RemoteStation::*doNetIOscan)( void );
| : uint GetInputs( uint Station, byte *InpTab );
| : uint NetworkDog( uint Station );
| : uint SetAnalogOutput( uint Station, uint Analog, byte OutNum );
| : uint SetIOStatus( uint Station, byte *IOstatus );
| public:
| : enum IOtype { DigitalInput, DigitalOutput, AnalogInput, AnalogOutput };
| : RemoteStation( uint StationNumber );// a construction initializer
| : ~RemoteStation();          // the destructive annihilator
| : void ConfigIO( uint channel, IOtype Type );
| : uint GetAnalog( uint channel );
| : void GetDataBlock( uint size, void *Buffer );
| : Boolean GetDigital( uint channel );
=========Boolean Responding( void ) { return Responded; }
| : void SetAnalog( uint channel, uint Value );
| : void SetDataBlock( uint size, void *Buffer );
| : void SetDigital( uint channel, Boolean State );
| : uint StopProgram( void );
| };
|
| class WasherStation : public RemoteStation
```

C-DOC ARCNET.H

```
{
: enum { OilFault, SolventRecovery, HydrolicMotor, BWInterLock,
: : BrushMotorA = 0, SolventPumpA, ScrubA, WipeA, BrushMotorB,
: : SolventPumpB, ScrubB, WipeB, BrushMotorC, SolventPumpC, ScrubC, WipeC,
: : BrushMotorD, SolventPumpD, ScrubD, WipeD, BrushMotorE, SolventPumpE,
: : ScrubE, WipeE, BrushMotorF, SolventPumpF, ScrubF, WipeF };
: byte Header[256], Program[480];
: struct { uint high, low; } Generator[8];
: uint BlanketMask, CounterPreset[16], ProgramLength, TimerPreset[16];
: void MakeProgram( Boolean AirBars );
: uint SendGeneratorPLC( void );
: uint SendHeaderPLC( void );
: uint SendProgramPLC( void );
: uint SetBit( byte BitMask, byte ByteNumber, Boolean SetFlag );
: uint StartPLC( void );
: uint StopPLC( void );
protected:
: virtual void doIOscan( void );
public:
: WasherStation( uint StatNumber );
: void BlanketWasher( uint Mask,
: : uint GeneratorBlanket0Low, uint GeneratorBlanket0High,
: : uint GeneratorBlanket1Low, uint GeneratorBlanket1High,
: : uint GeneratorBlanket2Low, uint GeneratorBlanket2High,
: : uint GeneratorBlanket3Low, uint GeneratorBlanket3High,
: : uint GeneratorBlanket4Low, uint GeneratorBlanket4High,
: : uint GeneratorBlanket5Low, uint GeneratorBlanket5High,
: : uint GeneratorFinalShotsLow, uint GeneratorFinalShotsHigh,
: : uint SprayerShots0, uint SprayerShots1, uint SprayerShots2,
: : uint SprayerShots3, uint SprayerShots4, uint SprayerShots5,
: : uint ScrubTime, uint StartToEndFinalShot, uint BrushMotorTime,
: : uint WiperRollerTime, uint ScrubDelay, uint WiperDelay,
: : Boolean AirBars );
: static void BroadcastStart( void );
: static void BroadcastStop( void );
};

class WaterStation : public RemoteStation
{
: struct water {
: : byte control, output;
: : uint WR_temperature, IR_temperature,// *.02°C
: :     WR_setpoint, IR_setpoint,// 0 to 4095 *.02°C
: :     WR_gain, IR_gain,    // 0 to 99
: :     WR_integral, IR_integral,// 1 to 999
: :     WR_derivative, IR_derivative,// 0 to 999
: :     WR_sampleT, IR_sampleT,// 1 to 999 *50mS
: :     WR_Nsample, IR_Nsample;// 0 to 199
: } WaterStatus[8];
: uint DeadBand, HeaterDelayTime, IRErrorFactor, PreHeatTime;// °F, minutes, seconds
: uint GetStatus( water Answer[] );
: uint SetStatus( byte Mask, water waterChannel[] );
protected:
: virtual void doIOscan( void );
public:
: enum { InfraRed = 0x80, ThermoCouple, Off, WarmUp };
: WaterStation( uint StationNumber );
: void Dcoefficients( uint Channel,
: : uint PlateCoefficient, uint WaterCoefficient );
: uint GetTemp( uint Channel, uint Sensor );
: void HeaterDelay( uint Time );
: void Icoefficients( uint Channel,
```

C-DOC ARCNET.H

```
| : : uint PlateCoefficient, uint WaterCoefficient );
| : void NewSetPoints( uint Channel, uint PlateTemp, uint WaterTemp );
| : void Ncoefficients( uint Channel,
| : : uint PlateCoefficient, uint WaterCoefficient );
| : void Pcoefficients( uint Channel,
| : : uint PlateCoefficient, uint WaterCoefficient );
| : void PreHeat( uint Time );
| : void SelectSensor( uint Channel, uint Sensor );
| : void Tcoefficients( uint Channel,
| : : uint PlateCoefficient, uint WaterCoefficient );
| };
|
#endif                    // __Arcnet
```

C-DOC PANEL.H

```
/****************************\
*                           *
*  panel.h                  *
*                           *
*  Generic Control Panel    *
*                           *
*  (C) 1993 OXY-DRY CORPORATION  *
*  all rights reserved      *
*                           *
\****************************/

// 1993 october 10    change copyright for listing

#ifndef __panel_h
  #define __panel_h

  #include <graphics.h>    // closegraph, initgraph, registerbgidriver
  #include "buttons.h"// Latching & Momentary Push Buttons & Indicators
  #include "gobjects.h"          // GPoint, GRect
  #include "heptad.h"            // 7 Segment Displays

  extern const GPoint AFminAnchor, AKminAnchor, BWminAnchor, ClockPoint,
                D1minAnchor, D2minAnchor, D3minAnchor, DispAnchor, DispSize, Key0, Key1,
                Key2, Key3, Key4, Key5, Key6, Key7, Key8, Key9, KeyA, KeyB, KeyBack, KeyC,
                KeyCancel, KeyD, KeyE, KeyEnter, KeyF, KeyG, KeyH, KeyI, KeyJ, KeyK, KeyL,
                KeyM, KeyN, KeyNext, KeyO, KeyP, KeyPrev, KeyQ, KeyR, KeyS, KeySpace, KeyT,
                KeyU, KeyV, KeyW, KeyX, KeyY, KeyZ, LargePanelSize, MaxButton2ndRow,
                MaxButton3rdRow, MaxButtonCol1of3, MaxButtonCol1of4, MaxButtonCol2of3,
                MaxButtonCol2of4, MaxButtonCol3of3, MaxButtonCol3of4, MaxButtonCol4of4,
                MaxButtonLowRow, MaxButtonSize, MaxButtonTopRow, MaxDecButton;
  extern const GPoint MaxDigitSize, MaxDispOffset, MaxDispSize, MaxIncButton,
                MaxIncDecSize, MaxMatDispAnchor, MaxMatDispSize, MaxPanelAnchor,
                MaxPanelSize, MaxSwitchCol1of3, MaxSwitchCol1of4, MaxSwitchCol2of3,
                MaxSwitchCol2of4, MaxSwitchCol3of3, MaxSwitchCol3of4, MaxSwitchCol4of4,
                MaxSwitchRow, MaxSwitchSize, MaxTemp1Anchor, MaxTemp1Dec, MaxTemp1Inc,
                MaxTemp1Label, MaxTemp2Anchor, MaxTemp2Dec, MaxTemp2Inc, MaxTemp2Label,
                MaxTemp3Anchor, MaxTemp3Dec, MaxTemp3Inc, MaxTemp3Label, MaxTemp4Anchor,
                MaxTemp4Dec, MaxTemp4Inc, MaxTemp4Label, MaxTemp5Anchor, MaxTemp5Dec,
                MaxTemp5Inc, MaxTemp5Label, MaxTemp6Anchor, MaxTemp6Dec, MaxTemp6Inc,
                MaxTemp6Label, MaxTemp7Anchor, MaxTemp7Dec, MaxTemp7Inc, MaxTemp7Label,
                MaxTemp8Anchor, MaxTemp8Dec, MaxTemp8Inc, MaxTemp8Label, MaxTempLabel,
                MaxTempSize, MaxTStext, MaxUnit10Anchor, MaxUnit10Label, MaxUnit1Anchor,
                MaxUnit1Label, MaxUnit2Anchor, MaxUnit2Label, MaxUnit3Anchor,
                MaxUnit3Label, MaxUnit4Anchor, MaxUnit4Label, MaxUnit5Anchor;
  extern const GPoint MaxUnit5Label, MaxUnit6Anchor, MaxUnit6Label,
                MaxUnit7Anchor, MaxUnit7Label, MaxUnit8Anchor, MaxUnit8Label,
                MaxUnit9Anchor, MaxUnit9Label, MaxUnitLabel, MaxWLanchor, MaxWLsize,
                MinButtonCol1of3, MinButtonCol1of4, MinButtonCol2of3, MinButtonCol2of4,
                MinButtonCol3of3, MinButtonCol3of4, MinButtonCol4of4, MinButtonLowRow,
                MinButtonSize, MinButtonTopRow, MinDigitSize, MinDispOffset, MinDispSize,
                MinMatDispAnchor, MinMatDispSize, MinPanelSize, MinSwitchCol1of3,
                MinSwitchCol1of4, MinSwitchCol2of3, MinSwitchCol2of4, MinSwitchCol3of3,
                MinSwitchCol3of4, MinSwitchCol4of4, MinSwitchRow, MinSwitchSize,
                MinTemp1Anchor, MinTemp1Label, MinTemp2Anchor, MinTemp2Label,
                MinTemp3Anchor, MinTemp3Label, MinTemp4Anchor, MinTemp4Label,
                MinTemp5Anchor, MinTemp5Label, MinTemp6Anchor, MinTemp6Label,
                MinTemp7Anchor, MinTemp7Label, MinTemp8Anchor, MinTemp8Label, MinTempLabel,
                MinTempSize, MinTStext, MinUnit10Anchor, MinUnit10Label, MinUnit1Anchor,
                MinUnit1Label, MinUnit2Anchor, MinUnit2Label, MinUnit3Anchor,
                MinUnit3Label;
  extern const GPoint MinUnit4Anchor, MinUnit4Label, MinUnit5Anchor, MinUnit5Label, MinUnit6Anchor,
```

C-DOC PANEL.H

```
            MinUnit6Label, MinUnit7Anchor, MinUnit7Label, MinUnit8Anchor,
            MinUnit8Label, MinUnit9Anchor, MinUnit9Label, MinUnitLabel, PanelAnchor,
            PanelSize, RecallPoint, SavePoint, SetupPoint, SpaceBarSize, SpMinAnchor,
            StackPoint, WLminAnchor;

class SText
{
:  char *Text;
:  GPoint Center;
:  uint size;
public:
:  SText( const GPoint& Anchor, uint Psize, char *Label );
:  ~SText();
:  void reDraw( void );
};

class Panel
{
:  Boolean Quit:1, Shrunk:1;
:  Button **MaxButton, **MinButton;
:  char *Title;
:  GPoint MaxAnchor, MaxSize, MinAnchor, MinSize;
:  MatrixDisplay *MaxMatDisp, *MinMatDisp;
:  ReadOut *MaxReadOut, *MinReadOut;
:  SText **MaxLabel, **MinLabel;
:  ThermoStat **MaxTemp, **MinTemp;
:  uint MaxButtons, MaxLabels, MaxTemps, MinButtons, MinLabels, MinTemps;
:  void DrawLogo( GPoint& Origin, GPoint& Size );
:  void drawMax( void );
:  void drawMin( void );
public:
:  enum { MaxTextHeight = 15, MinTextHeight = 9 };
:  Panel( GRect& MaxRegion, GRect& MinRegion, char* Name );
:  ~Panel();
:  void addButton( Boolean Maxed, Button *newButton );
:  void addButton( Boolean Maxed, GRect& Frame, Button::ButtonType Type,
:  :  char *Text );
:  void addButton( Boolean Maxed, ThermoStat *newTemp );
:  void addButton( GRect& MaxFrame, GRect& MinFrame,
:  :  Button::ButtonType Type, char *Text );
:  void addButton( GRect& MaxFrame, GRect& MinFrame,
:  :  Button::ButtonType Type, char *MaxText, char *MinText );
:  void addLabel( Boolean Maxed, const GPoint& Anchor, char *Label );
:  void addMatDisp( Boolean Maxed, MatrixDisplay *newMatDisp );
:  void addReadOut( Boolean Maxed, ReadOut *newReadOut );
:  void Display( char *Text );
:  void Display( ReadOut::OnOff Lit );
:  void Display( uint Row, uint Col, char *msg );
:  int DispVal( void );
:  void DispVal( int value );
//  void Hide( void ) { Hidden = True; }
:  void Light( uint index, COLORS newColor );
:  void Max( void );
:  Boolean Maxed( void );
:  void Min( void );
:  Boolean OneShot( uint index );
//  void reDraw( void );
:  Boolean Switch( uint index );
:  void Switch( uint index, Boolean State );
:  void Tag( uint index, const char *Text = " ",
:  :  font_names TextFont = SMALL_FONT );
:  void TempTag( uint index, uint Value );
```

C-DOC PANEL.H

```
 :  void TempTag( uint index, uint Which, uint Value0, uint Value1 );
 :  void TempLight( uint index, COLORS newColor );
 :  Boolean TempSwitch( uint index );
 :  Boolean Touched( const GPoint& Push );
 :  void UnLatch( uint index );
 };

#endif                          // __panel_h
```

C-DOC SFCONFIG.H

```

/***********************************\
*                                  *
*  sfconfig.h                      *
*                                  *
*  Sheet Feed Printing Press Installation and Configuration Data  *
*                                  *
*  (C) 1993 OXY-DRY CORPORATION all rights reserved  *
*                                  *
\***********************************/

// 1993 october 10    change copyright for listing

#ifndef __sfconfig
|  #define __sfconfig
|
|  #include "gobjects.h"        // Boolean
|  #include "panel.h"           // Panel
|
// extern const uint Psize;  // height of prompt text in configuration panel
|
|  extern uint GetKP( void );
|
|  class SheetFedConfig
|  {
|  public:
|  :  uint
|  :     BWcycles,              // blanket washer cycle counter
|  :     BWunits,               // blanket washer scrubbing units
|  :     DryerUnits,            // number of installed dryers
|  :     FillInterval, // seconds between fillings @ 100% application
|  :     FillTime,              // fill time in 18.2Hz ticks
|  :     InstallerPassword,     // installer's access code
|  :     PlateCoefficientD,     // differential component for ir
|  :     PlateCoefficientI,     // integral component for ir
|  :     PlateCoefficientN,     // number of samples for ir
|  :     PlateCoefficientP,     // proportional component for ir
|  :     PlateCoefficientT,// time interval for ir samples in milliseconds
|  :     SetupPassword,         // operator's access code
|  :     SprayDelay,   // delay from interlock to powder application
|  :     TempUnits,             // waterless temperature controllers
|  :     WarmUpTime,            // air knife preheat time in ticks
|  :     WaterCoefficientD,     // differential component for tc
|  :     WaterCoefficientI,     // integral component for tc
|  :     WaterCoefficientN,     // number of samples for tc
|  :     WaterCoefficientP,     // proportional component for tc
|  :     WaterCoefficientT,// time interval for tc samples in milliseconds
|  :     WLHeatDelayTime,  // water less heater delay time in seconds
|  :     WLPreHeatTime;         // water less pre heat time in minutes
|  :  Boolean
|  :  BWairBars:1,     // blanket washer has air bars or wiper rollers
|  :  BW16IOs:1,       // blanket washers use 16 channel i/o boards
|  :  EvacInstalled:1,           // air knife evacuator option
|  :  FillerInstalled:1,         // auto filler for sprayer
|  :  KnifeInstalled:1,          // air knife option
|  :  SprayerInstalled:1;        // powder application option
|  private:
|  :  uint index;                // saved setup array position
|  public:
|  :  Boolean
|  :  BWcoater:1,                // last blanket washer unit is coater
|  :  Dryer1Full:1,              // dryer #1 full zone switch state
```

C-DOC SFCONFIG.H

```
: Dryer1On:1,          // dryer #1 on switch state
: Dryer2Full:1,        // dryer #2 full zone switch state
: Dryer2On:1,          // dryer #2 on switch state
: Dryer3Full:1,        // dryer #3 full zone switch state
: Dryer3On:1,          // dryer #3 on switch state
: FillerAuto:1,        // filler auto switch state
: FillerDisplayed:1,   // auto filler panel displayed
: FillerOn:1,          // filler on switch state
: KnifeDisplayed:1,    // air knife panel displayed
: KnifeOn:1,           // air knife on switch state
: SprayerBypass:1,     // sprayer bypass switch state
: SprayerDisplayed:1,  // powder sprayer panel displayed
: SprayerOn:1,         // sprayer on switch state
: StackTempDisp:1,     // display stack temperature
: WLOnSw:1,            // water less on switch state
: WLPHSw:1,            // water less pre heat switch state
: WLRunSw:1,           // water less run switch state
: WLSPSw:1;            // water less set point switch state
: uint
:   BWbuttons,         // blanket washer program select buttons
:   BWprog[10],        // blanket washer program settings
:   Dryer1Speed,       // dryer # 1 power level
:   Dryer2Speed,       // dryer # 2 power level
:   Dryer3Speed,       // dryer # 3 power level
:   DryersDisplayed,   // number of displayed dryer panels
:   PlateSetPoint[8],  // IR temperature control
:   SpraySpeed,        // powder application rate
:   TempMode[8],       // IR or water highlighted
:   WashProg0Time,     // blanket washer brush condition solvent
:   WashProg1Time, // blanket washer program 1 solvent spray time
:   WashProg1Shots,// blanket washer program 1 solvent spray shots
:   WashProg2Time, // blanket washer program 2 solvent spray time
:   WashProg2Shots,// blanket washer program 2 solvent spray shots
:   WashProg3Time, // blanket washer program 3 solvent spray time
:   WashProg3Shots,// blanket washer program 3 solvent spray shots
:   WashProg4Time, // blanket washer program 4 solvent spray time
:   WashProg4Shots,// blanket washer program 4 solvent spray shots
:   WashProg5Time, // blanket washer program 5 solvent spray time
:   WashProg5Shots,// blanket washer program 5 solvent spray shots
:   WaterSetPoint[8],  // waterless temperature control
:   WLtempButtons;     // buttons on waterless panel
: char SetupName[21];  // user entered job name
private:
: uint WatchWord;      // checksum must be last!
: const static char *ColorNames[], *FontNames[];
: const static uint KeyCode[];
: enum { DateSet, ClockSet, Msg1Color, Msg2Color, Msg3Color, Msg4Color,
: : Msg5Color, Msg6Color, Msg7Color, Msg8Color, Msg1Font, Msg2Font,
: : Msg3Font, Msg4Font, Msg5Font, Msg6Font, Msg7Font, Msg8Font, Msg1Text,
: : Msg2Text, Msg3Text, Msg4Text, Msg5Text, Msg6Text, Msg7Text, Msg8Text,
: : SPdelay, OperatorItems };
: enum { InstallerCode = OperatorItems, OperatorCode, NumWashers, WasherBars,
: : BW_Buttons, BW_Coat, BWBrushTime, BWprog1Time, BWprog1Shots,
: : BWprog2Time, BWprog2Shots, BWprog3Time, BWprog3Shots, BWprog4Time,
: : BWprog4Shots, BWprog5Time, BWprog5Shots, NumTemps, WL_Buttons,
: : WLheatDelay, WLpreHeat, WL_P_plate, WL_I_plate, WL_D_plate, WL_N_plate,
: : WL_T_plate, WL_P_water, WL_I_water, WL_D_water, WL_N_water, WL_T_water,
: : KnifeIn, EvacIn, AK_Panel, AKwarmUp, FillIn, AF_Panel, AFinterval,
: : AFtime, SprayIn, SP_Panel, NumDryers, DryerPanels, ST_Disp,
: : InstallerItems };
: Panel *Terminal;
: uint Adjust( uint Item, Boolean Configured );
```

C-DOC SFCONFIG.H

```
| : void BuildTerminal( char *Title );
| : Boolean Confirm( char *Prompt );
| : void FixConfig( void );
| : uint GetBuffer( char *Prompt, char BlankChar = '_', uint right = 0,
| : : uint left = 0 );
| : void GetDataBlock( void );
| : Boolean GetID( char *Prompt );
| : uint MakeCheckSum( void );
| : void SetDataBlock( void );
| public:
| : SheetFedConfig();
| : ~SheetFedConfig();
| : void Configure( void );
| : void RecallSetup( void );
| : void SaveSetup( void );
| : void Setup( void );
| : Boolean Valid( void );
| : void Update( void );
| };
|
#endif                          // __sfconfig
```

C-DOC TP.H

```

/****************************\
*                           *
*  tp.h                     *
*                           *
*  Touch Panel Interface            *
*                           *
*  (C) 1993 OXY-DRY CORPORATION   *
*  all rights reserved            *
*                           *
\****************************/

// 1993 october 10    change copyright for listing

#ifndef __tp_h
|  #define __tp_h
|
|  #include "gobjects.h"
|  #include "timer.h"
|  #include "uart.h"
|
|  #define FlushPipe() __emit__( (byte)0xeb, 0, (byte)0xeb, 0 );
|
|  enum TPRxCmd {
|  :  GOODBAUD = 0x50,
|  :  COORDREPORT,          // 0x51
|  :  ENTERPOINT,           // 0x52
|  :  EXITPOINT,            // 0x53
|  :  UNDEFINED,            // 0x54
|  :  FRAMING,              // 0x55
|  :  INTERNAL,             // 0x56
|  :  BADBEAM,              // 0x57
|  :  NOPOINT,              // 0x58
|  };
|
|  enum TxCmd {
|  :  AUTOBAUD = 0x20,
|  :  ENEXIT = 0x41,
|  :  DSEXIT,               // 0x42
|  :  ENENTER,              // 0x43
|  :  DSENTER,              // 0x44
|  :  ENCOORD,              // 0x45
|  :  DSCOORD,              // 0x46
|  :  ENTOUCH,              // 0x47
|  :  DSTOUCH,              // 0x48
|  :  BEAMREPORT,           // 0x49
|  :  ENXFER,               // 0x4A
|  :  DSXFER,               // 0x4B
|  :  REPORT,               // 0x4C
|  :  RESET,                // 0x4D
|  :  ENBEEP,               // 0x4E
|  :  DSBEEP,               // 0x4F
|  :  BEEP,                 // 0x50
|  :  PROGMODE,             // 0x51
|  :  ENTABMODE,            // 0x52
|  :  DSTABMODE,            // 0x53
|  };
|
|  class TouchPanel
|  {
|  public:                  // these members are availabe to all
|  :  enum TPstate { GET_REPORT, GET_X_COORD, GET_Y_COORD, GET_BADBEAM };
```

C-DOC TP.H

```
| private:        // these members are accessible only to other members
| : enum { InitDelayTime = 2, WatchDogTime = 200 };
| : Boolean Scaled;
| : byte oldDLL, oldDLM, oldIER, oldLCR, oldMCR;
| : GPoint Panel_Size, Poke, ScreenComp, ScreenSize;
| : static Boolean RXBaudFlag, Touched;
| : static COMports BasePort;
| : static Interrupts interruptNumber;
| : static Timer *WatchDog;
| : static TPstate RXState;
| : static uint ScanCol, ScanRow;
| : static void interrupt (far *oldVector )(...);
| : uint cmd;
| : Boolean FindTP( COMports UARTbasePort = COM1,
| : : Interrupts VectorNumber = IRQ4, long Baud = 9600,
| : : Boolean ShouldRestore = True );
| : void InitTP( void );
| : static void interrupt TouchInt(...);
| : static void SendCommand( char command );
| public:                  // these members are availabe to all
| : TouchPanel( COMports UARTbasePort = COM1,
| : : Interrupts VectorNumber = IRQ4, long Baud = 9600 );
| : ~TouchPanel();             // the destructor
========const GPoint& PanelSize( void ) { return Panel_Size; }
========Boolean Pushed( void ) { return Touched; }
| : void SetScaling( GPoint ScreenSize, GPoint ScreenComp );
| : const GPoint& Where ( void );
| };
|
#endif                   // __tp_h
```

C-DOC KNIFE.H

```

/***************************\
*                          *
*  knife.h                 *
*                          *
*  Sheet Feed Printing Press AirKnife/Sprayer/Filler *
*  Control Panel           *
*                          *
*  (C) 1993 OXY-DRY CORPORATION  *
*  all rights reserved     *
*                          *
\***************************/

// 1993 october 10    change copyright for listing

#ifndef __knife_h
|  #define __knife_h
|
|  #include <time.h>          // time()
|  #include "arcnet.h"        // remote station io
|  #include "gobjects.h"      // GPoint & GRect
|  #include "panel.h"         // control panels
|  #include "sfconfig.h"      // configuration parameters
|  #include "timer.h"         // timers
|
|  class KnifeSprayerFiller
|  {
|  :  enum { Filler, Knife, Sprayer, Panels };
|  :  enum { FillFault, FillInterLock, Filling, FillOn, FillAuto, FillManual };
|  :  enum { KnifeOperate, KnifeInterLock, KnifeFault, KnifeON, KnifePreHeat };
|  :  enum { SprayOperate, SprayerInterLock, SprayFuse, SprayTube, SprayOn,
|  :  :  SprayManual, SprayInc, SprayDec };
|  :  enum { SprayMotor,        // #0 AnalogOutput
|  :  :  Reserved1,           // 1 DigitalInput
|  :  :  Reserved2,           // 2 DigitalInput
|  :  :  Reserved3,           // 3 DigitalInput
|  :  :  Reserved4,           // 4 DigitalInput
|  :  :  Reserved5,           // 5 DigitalInput
|  :  :  FuseOK,              // 6 DigitalInput
|  :  :  TubeOK,              // 7 DigitalInput
|  :  :  TransAir,            // 8 DigitalOutput
|  :  :  FillSense,           // 9 DigitalInput
|  :  :  FillMotor,           // 10 DigitalOutput
|  :  :  KnifeSense,          // 11 DigitalInput
|  :  :  KnifeMotor,          // 12 DigitalOutput
|  :  :  EvacSense,           // 13 DigitalInput
|  :  :  EvacMotor,           // 14 DigitalOutput
|  :  :  LastImpression,      // 15 DigitalInput
|  :  :  InterLock };         // 16 DigitalOutput
|  :  Boolean Active:1, EvacInstalled:1, FillAutoSw:1, FillerDisplayed:1,
|  :  FillerInstalled:1, FillOnSw:1, InterLockOn:1, KnifeDisplayed:1,
|  :  KnifeInstalled:1, KnifeOnSw:1, Maximized:1, SprayerDisplayed:1,
|  :  SprayerInstalled:1, SprayInterLock:1, SprayManSw:1, SprayOnSw:1,
|  :  OK2Max[Panels];
|  :  Panel *Control[Panels];
|  :  RemoteStation *KnifeSprayFill;
|  :  Timer *FillFaultDelay, *Fill, *KnifeFaultDelay, *SprayDelay, *typeOmatic,
|  :     *warmUp;
|  :  time_t Begin, Elapsed;
|  :  uint FillTime, Interval, SprayDelayTime, SprayRate, warmUpTime;
|  :  void Build( void );      // (re)build panels
|  public:
```

C-DOC KNIFE.H

```
//   KnifeSprayerFiller();    // the constructor
| :  KnifeSprayerFiller( SheetFedConfig *ConfigData );// the constructor
| :  ~KnifeSprayerFiller();        // the destructor
| :  Boolean CanUse( uint Key );
| :  void DispInit( SheetFedConfig *ConfigData );
| :  Boolean getInterLock( void );
| :  void Hide( void );
| :  GPoint& MakePush( uint Key );
| :  void Max( void );
| :  Boolean Maxed( void );
| :  void Min( void );
| :  void runIO( void );
========Boolean TestActivity( void ) { return Active; }
| :  Boolean Touched( GPoint& Push );
| :  void UpdateSetup( SheetFedConfig *ConfigData );
|  };
|
#endif                        // __knife_h
```

C-DOC DRYERS.H

```
/****************************\
*                            *
*  dryers.h                  *
*                            *
*  Sheet Feed Printing Press Control Panel    *
*                            *
*  (C) 1993 OXY-DRY CORPORATION  *
*  all rights reserved          *
*                            *
\****************************/

// 1993 october 10    change copyright for listing

#ifndef __dryers_h
|  #define __dryers_h
|
|  #include "arcnet.h"          // remote station io
|  #include "gobjects.h"        // GPoint & GRect
|  #include "panel.h"           // control panels
|  #include "sfconfig.h"        // configuration parameters
|  #include "timer.h"           // timers
|
|  class Dryers
|  {
|  :  enum { Dryer1, Dryer2, Dryer3 };
|  :  enum { OperateL, InterLock, Blower, Heat, On, Full, Inc, Dec };
|  :  enum { PowerOn,          // DigitalInput #0
|  :  :  Speed1,              // AnalogOutput 1
|  :  :  Speed2,              // AnalogOutput 2
|  :  :  Speed3,              // AnalogOutput 3
|  :  :  Operating1,          // DigitalInput 4
|  :  :  Heat1,               // DigitalInput 5
|  :  :  Blower1,             // DigitalInput 6
|  :  :  Operating2,          // DigitalInput 7
|  :  :  On1,                 // DigitalOutput 8
|  :  :  Full1,               // DigitalOutput 9
|  :  :  Operate,             // DigitalOutput 10
|  :  :  On2,                 // DigitalOutput 11
|  :  :  Heat2,               // DigitalInput 12
|  :  :  Full2,               // DigitalOutput 13
|  :  :  Blower2,             // DigitalInput 14
|  :  :  PressInterLock,      // DigitalInput 15
|  :  :  On3,                 // DigitalOutput 16
|  :  :  Operating3,          // DigitalInput 17
|  :  :  Heat3,               // DigitalInput 18
|  :  :  Full3,               // DigitalOutput 19
|  :  :  Blower3,             // DigitalInput 20
|  :  :  LastImpression = 23 };   // DigitalInput
|  :  Boolean Active:1, FullSw[3], OK2Max[3], OnSw[3], OperateOn[3],
|  :  SprayInterLock:1;
|  :  Panel *Control[3];
|  :  RemoteStation *Dryer;
|  :  Timer *typeOmatic;
|  :  uint BlowerOn[3], DryersDisplayed, DryerUnits, FullZone[3], HeatOn[3],
|  :     OnSignal[3], Operating[3], Power[3], Speed[3];
|  :  void Build( void );
|  public:
|  :  Dryers( SheetFedConfig *ConfigData );// the constructor
|  :  ~Dryers();                 // the destructor
|  :  Boolean CanUse( uint Key );
|  :  void DispInit( SheetFedConfig *ConfigData );
```

C-DOC DRYERS.H

```
| : void Hide( void );
| : GPoint& MakePush( uint Key );
| : void Max( void );
| : Boolean Maxed( void );
| : void Min( void );
| : void runIO( void );
| : void setInterLock( Boolean Active );
========Boolean TestActivity( void ) { return Active; }
| : Boolean Touched( GPoint& Push );
| : void UpdateSetup( SheetFedConfig *ConfigData );
| };
|
#endif                    // __dryers_h
```

C-DOC WASHER.H

```

/*******************************\
*                              *
*  washer.h                    *
*                              *
*  Blanket Washer controls for the Sheet Fed printing press  *
*                              *
*  (C) 1993 OXY-DRY CORPORATION          *
*  all rights reserved            *
*                              *
\*******************************/

// 1993 october 10   change copyright for listing

#ifndef __washer_h
|  #define __washer_h
|
|  #include "arcnet.h"        // remote station io
|  #include "gobjects.h"      // GPoint & GRect
|  #include "panel.h"         // control panels
|  #include "sfconfig.h"      // configuration parameters
|  #include "timer.h"         // timers
|
|  extern const char *Prog[];
|
|  class BlanketWasher
|  {
|  :  enum { Brush, Start, Stop, Unit1, Unit2, Unit3, Unit4,
|  :  :  Unit5, Unit6, Unit7, Unit8, Unit9, Unit10 };// Buttons
|  :  enum { First, Second, Third }; // IO Boards
|  :  enum { OilFault,           // DigitalInput  0 \
|  :  :  SolventRecovery,       // DigitalInput  1 \ First Board Only
|  :  :  HydrolicMotor,         // DigitalOutput 2 /
|  :  :  BWInterLock,           // DigitalInput  3 /
|  :  :  BrushMotorA = 0,       // DigitalOutput 0 \
|  :  :  SolventPumpA,          // DigitalOutput 1 \ Second & Third
|  :  :  ScrubA,                // DigitalOutput 2 / Boards
|  :  :  WipeA,                 // DigitalOutput 3 /
|  :  :  BrushMotorB,           // DigitalOutput 4 \
|  :  :  SolventPumpB,          // DigitalOutput 5 \
|  :  :  ScrubB,                // DigitalOutput 6 /
|  :  :  WipeB,                 // DigitalOutput 7 /
|  :  :  BrushMotorC,           // DigitalOutput 8 \
|  :  :  SolventPumpC,          // DigitalOutput 9 \
|  :  :  ScrubC,                // DigitalOutput 10 /
|  :  :  WipeC,                 // DigitalOutput 11 /
|  :  :  BrushMotorD,           // DigitalOutput 12 \
|  :  :  SolventPumpD,          // DigitalOutput 13 \
|  :  :  ScrubD,                // DigitalOutput 14 /
|  :  :  WipeD,                 // DigitalOutput 15 /
|  :  :  BrushMotorE,           // DigitalOutput 16 \
|  :  :  SolventPumpE,          // DigitalOutput 17 \
|  :  :  ScrubE,                // DigitalOutput 18 /
|  :  :  WipeE,                 // DigitalOutput 19 /
|  :  :  BrushMotorF,           // DigitalOutput 20 \
|  :  :  SolventPumpF,          // DigitalOutput 21 \
|  :  :  ScrubF,                // DigitalOutput 22 /
|  :  :  WipeF,                 // DigitalOutput 23 /
|  :  :  PLCrunning };          // Dummy Input to keep PLC running
|  :  enum { Idle, Condition, Wash, Post } State;// operating modes
|  :  enum { WashCount, Conditioning, Washing, SolventWarning, HydrolicFault,
|  :  :  InterLockFault } NewMessage, OldMessage;
```

C-DOC WASHER.H

```
| : Boolean Active:1, AirBars:1, BWcoater:1, Fault:1, OK2Max:1, Use16IOs:1;
| : Panel *Control;
| : WasherStation *Washer[3];
| : Timer *CycleTimer;
| : uint BrushMotorTime, BWbuttons, Generator[6], ScrubDelay, ScrubTime,
| :     SolventShots[6], Washers, Washes, WashProg[10], WiperDelay,
| :     WiperRollerTime;
| : void Build( void );        // (re)build the panel
| : void ConditionBrushes( void );
| : void WashBlankets( void );
| public:
| : BlanketWasher( SheetFedConfig *ConfigData );// the constructor
| : ~BlanketWasher();          // the destructor
| : Boolean CanUse( uint Key );
| : void DispInit( SheetFedConfig *ConfigData );
| : void Hide( void );
| : GPoint& MakePush( uint Key );
| : void Max( void );
| : Boolean Maxed( void );
| : void Min( void );
| : void runIO( void );
========Boolean TestActivity( void ) { return Active; }
| : Boolean Touched( GPoint& Push );
| : void UpdateSetup( SheetFedConfig *ConfigData );
| };
|
#endif                     // __washer_h
```

C-DOC WATERLES.H

```
/***********************************\
*                                    *
*  waterles.h                        *
*                                    *
*  Waterless temperature controls for the Sheet Fed printing press  *
*                                    *
*  (C) 1993 OXY-DRY CORPORATION all rights reserved  *
*                                    *
\***********************************/

// 1993 october 10    change copyright for listing

#ifndef __water_less_h
| #define __water_less_h
|
| #include "arcnet.h"          // remote station io
| #include "gobjects.h"        // GPoint & GRect
| #include "panel.h"           // control panels
| #include "sfconfig.h"        // configuration parameters
| #include "timer.h"           // timers
|
| class WaterLessTemperature
| {
| : enum { On, PreHeat, Run, SetPoint, Unit1Inc, Unit1Dec,
| : : Unit2Inc, Unit2Dec, Unit3Inc, Unit3Dec, Unit4Inc, Unit4Dec,
| : : Unit5Inc, Unit5Dec, Unit6Inc, Unit6Dec, Unit7Inc, Unit7Dec,
| : : Unit8Inc, Unit8Dec };   // Buttons
| : enum { Valves, // #0 DigitalOutput  Power for all mixing valves
| : : Heater1,          // 1 DigitalOutput  Unit #1
| : : Heater2,          // 2 DigitalOutput  Unit #2
| : : Heater3,          // 3 DigitalOutput  Unit #3
| : : Heater4,          // 4 DigitalOutput  Unit #4
| : : Heater5,          // 5 DigitalOutput  Unit #5
| : : Heater6,          // 6 DigitalOutput  Unit #6
| : : Heater7,          // 7 DigitalOutput  Unit #7
| : : Heater8,          // 8 DigitalOutput  Unit #8
| : : Spare9,           // 9
| : : Spare10,          // 10
| : : Spare11,          // 11
| : : Spare12,          // 12
| : : ZonePump,         // 13 DigitalOutput  Circulation Enable
| : : Spare14,          // 14
| : : Impression };     // 15 DigitalInput  Interlock Input
| : enum { PlateDisp, WaterDisp }; // for set points
| : enum { Off, Heating, Ready, Running } OpMode;
| : Boolean Active:1, InterLockOn:1, NewSetPoint:1, OK2Max:1, OnSw:1, PHSw:1,
| : RunSw:1, SPSw:1;
| : Panel *Control;
| : RemoteStation *WaterIO;
| : static const GPoint DecButton[], IncButton[], TempButton[];
| : static const uint DecSw[], Heater[], IncSw[];
| : Timer **HeaterDelay, *typeOmatic, *WarmUp;
| : uint ActiveTemp, DisplayMode[8], FakePlateTemp[8], FakeWaterTemp[8],
| :     HeaterDelayTime, PlateCoefficientD, PlateCoefficientI,
| :     PlateCoefficientN, PlateCoefficientP, PlateCoefficientT,
| :     PlateSetPoint[8], PlateTemp[8], PreHeatTime, TempMode[8], TempUnits,
| :     WaterCoefficientD, WaterCoefficientI, WaterCoefficientN,
| :     WaterCoefficientP, WaterCoefficientT, WaterSetPoint[8], WaterTemp[8],
| :     WLtempButtons;
| : WaterStation *WaterWiz;
| : void Build( void );      // (re)build the panel
```

C-DOC WATERLES.H

```
 public:
 :  enum { PlateSense, WaterSense, Modes };
 :  WaterLessTemperature( SheetFedConfig *ConfigData );// the constructor
 :  ~WaterLessTemperature();      // the destructor
 :  Boolean CanUse( uint Key );
 :  void DispInit( SheetFedConfig *ConfigData );
 :  void Hide( void );
 :  GPoint& MakePush( uint Key );
 :  void Max( void );
 :  Boolean Maxed( void );
 :  void Min( void );
 :  void runIO( void );
========Boolean TestActivity( void ) { return Active; }
 :  Boolean Touched( GPoint& Push );
 :  void UpdateSetup( SheetFedConfig *ConfigData );
 };

#endif                    // __water_less_h
```

C-DOC SHEETFED.H

```
/****************************\
*                           *
*  sheetfed.h               *
*                           *
*  Sheet Feed Printing Press Control Panel     *
*                           *
*  (C) 1993 OXY-DRY CORPORATION  *
*  all rights reserved      *
*                           *
\****************************/

// 1993 october 10    change copyright for listing

#ifndef __sheetfed_h
| #define __sheetfed_h
|
| #include <graphics.h>        // graphics primitives
| #include "buttons.h"         // Push Buttons
| #include "dryers.h"          // dryers
| #include "gobjects.h"        // GPoint & GRect
| #include "knife.h"           // air knife panel
| #include "panel.h"           // control panels
| #include "sfconfig.h"        // press interface
| #include "tp.h"              // touch panel
| #include "washer.h"          // blanket washer
| #include "waterles.h"        // water les temperature controller
|
!#ifdef __cplusplus
!extern "C" {
!#endif
|
|  extern int far _Cdecl script_font_far[];
|  extern int far _Cdecl simplex_font_far[];
|  extern int far _Cdecl triplex_scr_font_far[];
|  extern int far _Cdecl complex_font_far[];
|  extern int far _Cdecl euro_font_far[];
|  extern int far _Cdecl bold_font_far[];
|
!#ifdef __cplusplus
!}
!#endif
|
|  class SheetFeed
|  {
|  :  enum { Psize = 10 };// height of prompt text in configuration panel
|  :  enum { ControllerMem, WasherIO, KnifeSprayFillIO, DryerIO, Boards };
|  :  BlanketWasher *Washer;
|  :  Boolean Active:1, endless:1, IOup:1, MsgUp:1, NewValue:1, Quit:1;
|  :  Button *RecallButton, *SaveButton, *SetupButton;
|  :  char heapStr[15];
|  :  Dryers *Dryer;
|  :  KnifeSprayerFiller *KnifeSprayFill;
|  :  SheetFedConfig *ConfigData;
|  :  struct { font_names Font; COLORS Color; char *Text; } Msg[8];
|  :  ThermoStat *Clock, *StackTemp;
|  :  Timer *SafetyNet;
|  :  TouchPanel *TP;
|  :  uint LastMinute;
|  :  unsigned long HeapSize;
|  :  WaterLessTemperature * Water;
|  :  void GetMsg( void );
```

C-DOC SHEETFED.H

```
| : void HideMsg( void );
| : void ShowMsg( void );
| public:
| : SheetFeed();              // the constructor
| : ~SheetFeed();             // the destructor
| : void ChangeText( uint line, char *phrase );
| : void ChooseColor( uint line, char *phrase );
| : void ChooseFont( uint line, char *phrase );
========COLORS GetMsgColor( uint line ) { return Msg[line].Color; }
========font_names GetMsgFont( uint line ) { return Msg[line].Font; }
========const char *GetMsgText( uint line ) { return Msg[line].Text; }
| : void run( void );
| : void runIO( void );
========const GPoint& TP_Where( void ) { return TP->Where(); }
| };
|
#endif                        // __sheetfed_h
```

C-DOC ARCNET.CPP

```
/************************************\
*                                    *
*  arcnet.cpp                        *
*                                    *
*  class declarations for communication with remote stations over an  *
*  arcnet cable                      *
*                                    *
*  (C) 1993, OXY-DRY CORPORATION  *
*  all rights reserved               *
*                                    *
\************************************/

// 1993 june 11      force analog output bit 12 low
// 1993 june 29      scale temperatures to °F
// 1993 july 26      restrict waterless parameters
// 1993 august 8     add air bar option to blanket washer
// 1993 october 10   change copyright for listing

#include <conio.h>
#include <dos.h>
#include <iostream.h>
#include <mem.h>
#include <stdio.h>
#include <stdlib.h>
#include "arcnet.h"

const uint ArcMemSeg = 0xcd80, ArcRxBuf = 0x0200, ArcTxBuf = 0x0000;
const MaxReTries = 5;
const MaxNetTime = 3;            // 110 - 165 mS

uint RemoteStation::LocalID = 0;

// create remote station object with specified station number
RemoteStation::RemoteStation( uint StationNumber )
{
  PLCactive = False;
  Responded = False;
  for( uint b = 0; b < 3; b++ )
  {
  #  ADconfig[b] = 0;          // all channels initially digital
  #  IOconfig[b] = 0;          // inputs
  #  IObits[b] = 0;            // with low state
  }
  for( uint c = 0; c < 24; c++ )
  #  AnaVal[c] = 0;
  if( !( IOscan = new Timer ) )
  {
  |  cerr << "RemoteStation unable to create IOscan Timer" << endl;
  |  exit( EXIT_FAILURE );
  }
  RemoteID = StationNumber;
  ResetBoard();
}

// shut down all activity and release all memory buffers
RemoteStation::~RemoteStation()      // the destructive annihilator
{
  PLCactive = False;
  for( uint b = 0; b < 3; b++ )
  {
  #  ADconfig[b] = 0;          // all channels restored to digital
```

C-DOC ARCNET.CP

```
  #  IOconfig[b] = 0;          // inputs
  #  IObits[b] = 0;            // with low state
  }
  IOscan->Set( 0 );            // force IOscan
  doIOscan();
  delete IOscan;
}

// configure an io channel
void RemoteStation::ConfigIO( uint channel, IOtype Type )
{
  if( channel >= 24 )
========return;
  if( Type == AnalogOutput && channel >= 8 )// AnalogOut chan < 8
========return;
  if( Type == AnalogOutput && IOconfig[0] & ~ADconfig[0] )// no Dout
========return;
  if( Type == DigitalOutput && channel < 8 && IOconfig[0] & ADconfig[0] )
========return;
  byte bit = 1 << ( channel % 8 );
  uint group = channel / 8;
  if( Type == AnalogInput || Type == AnalogOutput )
  |  ADconfig[group] |= bit;      // Analog
  else
  |  ADconfig[group] &= ~bit;     // Digital
  if( Type == DigitalOutput || Type == AnalogOutput )
  |  IOconfig[group] |= bit;      // Output
  else
  |  IOconfig[group] &= ~bit;     // Input
  byte adio[3];
  for( uint b = 0; b < 3; b++ )
  #  adio[b] = IOconfig[b] & ~ADconfig[b];
  SetIOStatus( RemoteID, adio );
}

// do an IO scan of this board
void RemoteStation::doIOscan( void )
{
  if( IOscan->Expired() )
  | if( NetworkDog( RemoteID ) == OK )
  | {
  | | Responded = True;
  | | if( PLCactive == False )
  | | | StopProgram();
  | | SetIOStatus( RemoteID, IOconfig );
  | | c++;
  | | c %= 8;
  | | byte bit = 1 << c;
  | | if( ADconfig[0] & IOconfig[0] & bit )
  | | | SetAnalogOutput( RemoteID, AnaVal[c], bit );
  | | SetOutput( RemoteID, IObits );
  | | GetInputs( RemoteID, IObits );
  | | IOscan->Set( 5 );
  | }
  | else
  | {
  | | Responded = False;
  | | for( uint i = 0; i < 24; i++ )
  | | {
  | | #  byte b = 1 << ( i % 8 );
  | | #  uint g = i / 8;
  | | #  if( ~IOconfig[g] & b )
```

C-DOC ARCNET.CPP

```
| | # | IObits[g] &= ~b;
| | }
| | IOscan->Set( 1 );
| }
if( IOscan->TimeRemaining() > 5 )
| IOscan->Set( 5 );
}

// get an analog input value from a specified channel
uint RemoteStation::GetAnalog( uint channel )
{
  if( channel >= 24 )
========return 0;
  byte bit = 1 << ( channel % 8 );
  uint group = channel / 8;
  if( ( ADconfig[group] & ~IOconfig[group] & bit ) == 0 )
========return 0;
  uint AnalogIn;
  GetAnalogInput( RemoteID, channel, &AnalogIn );
====return AnalogIn;
}

// ***************************************************************** /
uint RemoteStation::GetAnalogInput( uint Station,
  :  byte Input, uint *InputValue )
{
  uint HiByte, LoByte, ReTries = MaxReTries;
  byte far *DataMem = (byte*)MK_FP( ArcMemSeg, ArcTxBuf );

// *== SEND REQUEST TO SEND BACK ANALOG INPUT ==* /

  while( --ReTries )
  {
  #  *InputValue = 0;
  #  outportb( COMMAND_REG, 0x0d );
  #  outportb( COMMAND_REG, 0x8c );
  #  *DataMem++  = LocalID;
  #  *DataMem++ = (byte)Station;
  #  *DataMem++ = 0x04;
  #  *DataMem++ = 0x00;
  #  *DataMem++ = 0x09;          // * send back analog input * /
  #  *DataMem++ = LocalID;       // * send to number LocalID * /
  #  *DataMem++ = Input / 8;
  #  *DataMem++ = Input % 8;
  #  IOscan->Set( MaxNetTime );
  #  outportb( COMMAND_REG, 0x01 );// * clear any pending transmition * /
  #  outportb( COMMAND_REG, 0x03 ); // * transmit from page 0 * /
  #  outportb( COMMAND_REG, 0x08c );// * clear any pending recieve * /
  #  while( !IOscan->Expired() )
  #  #  if( inportb( STATUS_REG ) & 0x02 )// transmition acknowledged
  #  #========break;
  #  if( IOscan->Expired() )
=============return Fail;
  #
// *== GET ANSWER ==* /
  #
  #  IOscan->Set( MaxNetTime );
  #  DataMem = (byte*)MK_FP( ArcMemSeg, ArcRxBuf );
  #  while( !IOscan->Expired() )
  #  #  if( inportb( STATUS_REG ) & RECEIVE_OK )// message received
  #  #========break;
  #  if( IOscan->Expired() )
```

C-DOC ARCNET.CPP

```
============return Fail;
  #  if( DataMem[0] == RemoteID && DataMem[1] == LocalID )
  #  {
  #  |  LoByte = (byte)( DataMem[4] );
  #  |  HiByte = (byte)( DataMem[5] );
  #  |  LoByte |= HiByte << 8;
  #  |  if( ( LoByte < 491801 ) && ( LoByte > 26708 ) )
  #  |  |  *InputValue = ((long)765000000l/((long)( LoByte + 1 )
  #  |  |  :  :  * 12/11.05 ) - 14321 ) * 2500/14321;
  #  |  if( LoByte > 491801 )
  #  |  |  *InputValue = 0;
  #  |  if( LoByte < 26708 )
  #  |  |  *InputValue = 2500;
============return OK;
  #  }
  }
====return Fail;
}

// get a block of data from the remote board
void RemoteStation::GetDataBlock( uint size, void *Buffer )
{
  byte DataSpace[249];
  uint b;

  if( GetDataSpace( RemoteID, 0, DataSpace ) != OK )
========return;
  if( size < 249 )
  |  for( b = 0; b < size; b++ )
  |  #  ((byte *)Buffer)[b] = DataSpace[b];
  else
  |  for( b = 0; b < 249; b++ )
  |  #  ((byte *)Buffer)[b] = DataSpace[b];
====if( size <= 249 ) return;
  if( GetDataSpace( RemoteID, 1, DataSpace ) != OK )
========return;
  if( size - 249 < 249 )
  |  for( b = 0; b < size - 249; b++ )
  |  #  ((byte *)Buffer)[b + 249] = DataSpace[b];
  else
  |  for( b = 0; b < 249; b++ )
  |  #  ((byte *)Buffer)[b + 249] = DataSpace[b];
}

// *
// ************************************************************************** /
uint RemoteStation::GetDataSpace( uint Station,
  :  uint DataBank, byte *DataSpace )
{
  uint y;
  byte far *DataMem = (byte*)MK_FP( ArcMemSeg, ArcTxBuf );

// *==  SEND REQUEST TO SEND BACK DATA SPACE  ==* /

  outportb( COMMAND_REG, 0x0d );
  outportb( COMMAND_REG, 0x8c );
  *DataMem++  = LocalID;
  *DataMem++ = (byte)Station;
  *DataMem++ = 0x04;
  *DataMem++ = 0x00;
  *DataMem++ = 0x0b;            // * send back data space * /
  *DataMem++ = (byte)DataBank;
```

C-DOC ARCNET.CPP

```
*DataMem++ = LocalID;          // * send to number LocalID * /
uint status, Track, Trans;
for( Trans = 0; Trans < 100; Trans++ )
{
#  Track = 1;
#
#  outportb( COMMAND_REG, 0x01 );// * clear any pending transmition * /
#  outportb( COMMAND_REG, 0x03 ); // * transmit from page 0 * /
#  outportb( COMMAND_REG, 0x08c );// * clear any pending recieve * /
#
#  delay( 50 );
#  status = (uint)inportb( STATUS_REG ) & 0xFF ;
#
#  if( status & 0x02 )
#  {
#  |  Track = 0;
#=======break;
#  }
}

// *==  GET ANSWER  ==* /

DataMem = (byte*)MK_FP( ArcMemSeg, ArcRxBuf );

for( Trans = 0; Trans < 1000; Trans++ )
{
#  status = (uint)inportb( STATUS_REG ) & 0xFF ;
#  if(( status & 0x80 ) == 0x80 )
#  {
#  |  for( y = 0; y < 249; y++ )
#  |  #  DataSpace[y] = *( DataMem + y + 4 );
#=======break;
#  }
#  delay( 1 );
}

====return( Track );
}

// get the current state of a digital input
Boolean RemoteStation::GetDigital( uint channel )
{
  doIOscan();
  if( channel >= 24 )
========return False;
  byte bit = 1 << ( channel % 8 );
  uint group = channel / 8;
  if( ( ~ADconfig[group] & bit ) == 0 )// & ~IOconfig[group]
========return False;
  if( ( IObits[group] & bit ) == 0 )
========return False;
====return True;
}

// *
// ************************************************************************ /
uint RemoteStation::GetInputs( uint Station, byte InpTab[] )
{
  uint ReTries = MaxReTries, status, Trans, Track;
  byte far *DataMem = (byte*)MK_FP( ArcMemSeg, ArcTxBuf );

// *==  SEND REQUEST TO SEND BACK INPUTS  ==* /
```

C-DOC ARCNET.CPP

```
    while( --ReTries )
    {
    #  outportb( COMMAND_REG, 0x0d );
    #  outportb( COMMAND_REG, 0x8c );
    #
    #  *DataMem++ = LocalID;
    #  *DataMem++ = (byte)Station;
    #  *DataMem++ = 0x04;
    #  *DataMem++ = 0x00;
    #
    #  *DataMem++ = 0x06;          // * send back info * /
    #  *DataMem++ = LocalID;        // * send to number LocalID * /
    #
    #  for( Trans = 0; Trans < 10; Trans++ )
    #  {
    #  #  Track = 1;
    #  #
    #  #  outportb( COMMAND_REG, 0x01 );// * clear any pending transmition * /
    #  #  outportb( COMMAND_REG, 0x03 );// * transmit from page 0 * /
    #  #  outportb( COMMAND_REG, 0x08c );// * clear any pending recieve * /
    #  #
    #  #  delay( 10 );
    #  #  status = (uint)inportb( STATUS_REG ) & 0xFF ;
    #  #
    #  #  if( status & 0x02 )
    #  #  {
    #  #  |  Track = 0;
    #  #=======break;
    #  #  }
    #  }
    #
// *==  GET ANSWER  ==* /
    #
    #  DataMem = (byte*)MK_FP( ArcMemSeg, ArcRxBuf );
    #
    #  for( Trans = 0; Trans < 10; Trans++ )
    #  {
    #  #  delay( 10 );
    #  #  status = (uint)inportb( STATUS_REG ) & 0xFF ;
    #  #  if( status & RECEIVE_OK &&
    #  #  |  :  DataMem[0] == RemoteID && DataMem[1] == LocalID )
    #  #  {
//           InpTab[ 0 ] = *( DataMem + 5 );// * statusIO[ 0 ] * /
//           InpTab[ 1 ] = *( DataMem + 6 );
//           InpTab[ 2 ] = *( DataMem + 7 );
    #  #  |
    #  #  |  InpTab[0] = DataMem[15];// * input[ 0 ] * /
    #  #  |  InpTab[1] = DataMem[16];
    #  #  |  InpTab[2] = DataMem[17];
================return Track;
    #  #  }
    #  #  if( status & RECEIVE_OK && (
    #  #  |  :  :  DataMem[0] != RemoteID || DataMem[1] != LocalID ) )
    #  #=======break;
    #  #  delay( 1 );
    #  }
    }
====return( Track );
}
// * /
```

C-DOC ARCNET.CPP

```
// ************************************************************************
uint RemoteStation::NetworkDog( uint Station )
{
  byte far *DataMem = (byte*)MK_FP( ArcMemSeg, ArcTxBuf );

// *==  NETWORK WATCH DOG  ==*/

  *DataMem++  = LocalID;
  *DataMem++ = (byte)Station;
  *DataMem++ = 0x04;
  *DataMem++ = 0x00;
  *DataMem++ = 0xff;            // * network watch dog * /
  Timer WatchDogTimer;
  WatchDogTimer.Set( MaxNetTime );
  outportb( COMMAND_REG, 0x01 ); // * clear any pending transmition * /
  outportb( COMMAND_REG, 0x03 );   // * transmit from page 0 * /
  while( !WatchDogTimer.Expired() )
  #  if( inportb( STATUS_REG ) & 0x02 )
  #=======break;
  if( WatchDogTimer.Expired() )
========return Fail;
====return OK;
}

// ************************************************************************ /
void RemoteStation::ResetBoard( void )
{
// uint status, Diagstatus, NodeID, Config;
// byte DataBuff;

  if( LocalID == inportb( 0x02e5 ) )
========return;
  outportb( 0x02e8, 0x00 );       // * reset board * /
  delay( 2000 );
// *  status = (uint)inportb( STATUS_REG ) & 0xFF ; * /
  outportb( COMMAND_REG, 0x1e );   // * clear flags * /
// *  status = (uint)inportb( STATUS_REG ) & 0xFF ; * /
  outportb( STATUS_REG, 0x00 );    // * mask all interrupts * /
// *  status = (uint)inportb( STATUS_REG ) & 0xFF ;* /
  outportb( COMMAND_REG, 0x0d );   // * both sizes of packets * /
// *  status = (uint)inportb( STATUS_REG ) & 0xFF ; * /
  outportb( COMMAND_REG, 0x08c );  // * enable recieve to page 1 * /
// *  status = (uint)inportb( STATUS_REG ) & 0xff;
//   Diagstatus = (uint)inportb( COMMAND_REG ) & 0xff;
//   Config = (uint)inportb( 0x02e2 ) & 0xff;* /
  LocalID = (uint)inportb( 0x02e5 ) & 0xff;
}

// ******************************************************************* /
uint RemoteStation::ReverseValue( uint Value )
{
  uint RetValue = 0;

  if( Value & 0x0800 )
  |  RetValue |= 0x0001;
  if( Value & 0x0400 )
  |  RetValue |= 0x0002;
  if( Value & 0x0200 )
  |  RetValue |= 0x0004;
  if( Value & 0x0100 )
  |  RetValue |= 0x0008;
  if( Value & 0x0080 )
```

```
  |  RetValue |= 0x0010;
  if( Value & 0x0040 )
  |  RetValue |= 0x0020;
  if( Value & 0x0020 )
  |  RetValue |= 0x0040;
  if( Value & 0x0010 )
  |  RetValue |= 0x0080;
  if( Value & 0x0008 )
  |  RetValue |= 0x0100;
  if( Value & 0x0004 )
  |  RetValue |= 0x0200;
  if( Value & 0x0002 )
  |  RetValue |= 0x0400;
//   if( Value & 0x0001 )
//     RetValue |= 0x0800;
====return( RetValue );
}

// set an analog output value
void RemoteStation::SetAnalog( uint channel, uint Value )
{
  if( channel >= 8 )
========return;
  byte bit = 1 << ( channel % 8 );
  uint group = channel / 8;
  if( ( ADconfig[group] & IOconfig[group] & bit ) == 0 )
========return;
//   SetAnalogOutput( RemoteID, Value, bit );
  AnaVal[channel] = Value;
  doIOscan();
}

// ******************************************************************* /
uint RemoteStation::SetAnalogOutput( uint Station, uint Analog, byte OutNum )
{
  byte far *DataMem = (byte*)MK_FP( ArcMemSeg, ArcTxBuf );

  *DataMem++  = LocalID;
  *DataMem++ = (byte)Station;
  *DataMem++ = 0x04;
  *DataMem++ = 0x00;
  *DataMem++ = 0x07;            // * Set analog output * /
  *DataMem++ = OutNum;          // * R4 * /
  *DataMem++ = (byte)ReverseValue( Analog );// * R5 * /
  *DataMem++ = (byte)( ReverseValue( Analog ) >> 8 );// * R6 * /
  for( uint Trans = 0; Trans < 100; Trans++ )
  {
  #  outportb( COMMAND_REG, 0x01 ); /* clear any pending transmition */
  #  outportb( COMMAND_REG, 0x03 ); /* transmit from page 0        */
  #
  #  delay( 10 );
  #  uint status = (uint)inportb( STATUS_REG ) & 0xFF ;
  #
  #  if( status & 0x02 )
  #  {
============return( 0 );
  #  }
  }
====return( 1 );
//   IOscan->Set( MaxNetTime );
//   outportb( COMMAND_REG, 0x01 );  // * clear any pending transmition * /
//   outportb( COMMAND_REG, 0x03 );  // * transmit from page 0 * /
```

C-DOC ARCNET.CPF

```
//   while( !IOscan->Expired() )
//     if( inportb( STATUS_REG ) & 0x02 )
//        break;
//   if( IOscan->Expired() )
//     return Fail;
//   return OK;
}

// send a block of data to the remote board
void RemoteStation::SetDataBlock( uint size, void *Buffer )
{
   byte DataSpace[249];
   uint b;

   if( size < 249 )
   |  for( b = 0; b < size; b++ )
   |  #   DataSpace[b] = ((byte *)Buffer)[b];
   else
   |  for( b = 0; b < 249; b++ )
   |  #   DataSpace[b] = ((byte *)Buffer)[b];
   SetDataSpace( RemoteID, 0, DataSpace );
====if( size <= 249 ) return;
   if( size - 249 < 249 )
   |  for( b = 0; b < size - 249; b++ )
   |  #   DataSpace[b] = ((byte *)Buffer)[b + 249];
   else
   |  for( b = 0; b < 249; b++ )
   |  #   DataSpace[b] = ((byte *)Buffer)[b + 249];
   SetDataSpace( RemoteID, 1, DataSpace );
}

// ***********************************************************************
uint RemoteStation::SetDataSpace( uint Station,
   :  uint DataBank, byte *DataSpace )
{
   byte far *DataMem = (byte*)MK_FP( ArcMemSeg, ArcTxBuf );

// *==  SET DATA SPACE  ==*/

   *DataMem++  = LocalID;
   *DataMem++ = (byte)Station;
   *DataMem++ = 0x04;
   *DataMem++ = 0x00;
   *DataMem++ = 0x0a;
   *DataMem++ = (byte)DataBank;
   for( uint p = 0; p < 249; p++ )
   #   *DataMem++ = DataSpace[p];
   Timer NetTime( MaxNetTime );
   outportb( COMMAND_REG, 0x01 ); // * clear any pending transmition */
   outportb( COMMAND_REG, 0x03 );    // * transmit from page 0 */
   while( !NetTime.Expired() )
   #  if( inportb( STATUS_REG ) & 0x02 )
   #=======break;
   if( NetTime.Expired() )
========return Fail;
====return OK;
}

// set a digital output bit
void RemoteStation::SetDigital( uint channel, Boolean State )
{
   if( channel >= 24 )
```

C-DOC ARCNET.CPP

```
========return;
  byte bit = 1 << ( channel % 8 );
  uint group = channel / 8;
  if( ( ~ADconfig[group] & IOconfig[group] & bit ) == 0 )
========return;
  if( State != False )
  |  IObits[group] |= bit;
  else
  |  IObits[group] &= ~bit;
  doIOscan();
}

// ******************************************************************* /
uint RemoteStation::SetIOStatus( uint Station, byte IOstatus[] )
{
  byte far *DataMem = (byte*)MK_FP( ArcMemSeg, ArcTxBuf );

  *DataMem++  = LocalID;
  *DataMem++ = (byte)Station;
  *DataMem++ = 0x04;
  *DataMem++ = 0x00;
  *DataMem++ = 0x05;          // * Insert Data * /
  *DataMem++ = 0x55;          // * changes in statusIO * /
  *DataMem++ = IOstatus[ 0 ];
  *DataMem++ = IOstatus[ 1 ];
  *DataMem++ = IOstatus[ 2 ];
  *DataMem++ = 0xff;          // * do not change IntBit * /
  *DataMem++ = 0xff;
  *DataMem++ = 0xff;
  *DataMem++ = 0xff;
  *DataMem++ = 0xff;          // * do not change IntBit * /
  *DataMem++ = 0xff;
  *DataMem++ = 0xff;
  *DataMem++ = 0xff;
  *DataMem++ = 0xff;          // * do not change IntBit * /
  *DataMem++ = 0xff;
  *DataMem++ = 0xff;
  *DataMem++ = 0xff;
  Timer NetTime( MaxNetTime );
  outportb( COMMAND_REG, 0x01 ); // * clear any pending transmition * /
  outportb( COMMAND_REG, 0x03 );    // * transmit from page 0 * /
  while( !NetTime.Expired() )
  #  if( inportb( STATUS_REG ) & 0x02 )
  #=======break;
  if( NetTime.Expired() )
========return Fail;
====return OK;
}

// ******************************************************************* /
uint RemoteStation::SetOutput( uint  Station, byte Output[] )
{
  byte far *DataMem = (byte*)MK_FP( ArcMemSeg, ArcTxBuf );

  *DataMem++  = LocalID;
  *DataMem++ = (byte)Station;
  *DataMem++ = 0x04;
  *DataMem++ = 0x00;
  *DataMem++ = 0x08;          // * SetOutput * /
  *DataMem++ = Output[ 0 ];
  *DataMem++ = Output[ 1 ];
  *DataMem++ = Output[ 2 ];
```

C-DOC ARCNET.CPP

```
  Timer NetTime( MaxNetTime );
  outportb( COMMAND_REG, 0x01 ); // * clear any pending transmition * /
  outportb( COMMAND_REG, 0x03 );    // * transmit from page 0 * /
  while( !NetTime.Expired() )
  #  if( inportb( STATUS_REG ) & 0x02 )
  #=======break;
  if( NetTime.Expired() )
========return Fail;
====return OK;
}

// ************************************************************************ /
uint RemoteStation::StopProgram( void )
{
  byte far *DataMem = (byte*)MK_FP( ArcMemSeg, ArcTxBuf );

// *== STOP ==* /

  PLCactive = False;
  *DataMem++ = LocalID;
  *DataMem++ = RemoteID;
  *DataMem++ = 0x04;
  *DataMem++ = 0x00;
  *DataMem++ = 0x02;          // * stop * /
  Timer NetTime( MaxNetTime );
  outportb( COMMAND_REG, 0x01 ); // * clear any pending transmition * /
  outportb( COMMAND_REG, 0x03 );    // * transmit from page 0 * /
  while( !NetTime.Expired() )
  #  if( inportb( STATUS_REG ) & 0x02 )
  #=======break;
  if( NetTime.Expired() )
========return Fail;
====return OK;
}

// new additions for blanket washer

//
//===== DEFINITION OF COMMUNICATION FUNCTIONS =====
//

//====================================

// #include <conio.h>
// #include <dos.h>
// #include <mem.h>
// #include <stdio.h>

// #include "communit.h";;;;;;;;;;;;;

//====================================
WasherStation::WasherStation( uint StatNumber ) : RemoteStation( StatNumber )
{
  BlanketMask = 0;
  for( uint a = 0; a < 8; a++ )
  {
  #  Generator[a].high = 0;
  #  Generator[a].low = 0;
  }
  for( uint b = 0; b < 16; b++ )
  {
  #  CounterPreset[b] = 0;
```

C-DOC ARCNET.CPP

```
    # TimerPreset[b] = 0;
    }
    for( uint c = 0; c < 256; c++ )
    {
    # Header[c] = 0;
    # Program[c] = 0;
    }
    ProgramLength = 0;
}

// this blanket washer can have duration and number of shots user controlled
void WasherStation::BlanketWasher( uint Mask,
    : uint GeneratorBlanket0Low, uint GeneratorBlanket0High,
    : uint GeneratorBlanket1Low, uint GeneratorBlanket1High,
    : uint GeneratorBlanket2Low, uint GeneratorBlanket2High,
    : uint GeneratorBlanket3Low, uint GeneratorBlanket3High,
    : uint GeneratorBlanket4Low, uint GeneratorBlanket4High,
    : uint GeneratorBlanket5Low, uint GeneratorBlanket5High,
    : uint GeneratorFinalShotsLow, uint GeneratorFinalShotsHigh,
    : uint SprayerShots0, uint SprayerShots1, uint SprayerShots2,
    : uint SprayerShots3, uint SprayerShots4, uint SprayerShots5,
    : uint ScrubTime, uint StartToEndFinalShot, uint BrushMotorTime,
    : uint WiperRollerTime, uint ScrubDelay, uint WiperDelay, Boolean AirBars )
{
    double Seconds = 11.0592 / ( 12.000 * 0.025 );// ticks are 25mS @ 12MHz
    BlanketMask = Mask;

    TimerPreset[0] = (uint)( ScrubTime * Seconds );// * SCRUB TIME ( from START TO END OF SCRUB - 10s preset * /
    TimerPreset[1] = (uint)( StartToEndFinalShot * Seconds );// * FROM START TO THE END OF FINAL SHOTS * /
    TimerPreset[2] = (uint)( BrushMotorTime * Seconds );// * BRUSH MOTOR TIME * /
    TimerPreset[3] = (uint)( WiperRollerTime * Seconds );// * WIPER ROLLER TIME * /
    TimerPreset[4] = (uint)( WiperDelay * Seconds );// * WIPER ROLLER Delay TIME * /

    TimerPreset[5] = 0;
    TimerPreset[6] = 0;
    TimerPreset[7] = 0;

    TimerPreset[8] = (uint)( ScrubDelay * Seconds );// * DELAY FROM START TIME * /

    TimerPreset[9]  = (uint)( ( SprayerShots0 * ( GeneratorBlanket0Low +
    : : : GeneratorBlanket0High ) - GeneratorBlanket0High ) * Seconds );
    TimerPreset[10] = (uint)( ( SprayerShots1 * ( GeneratorBlanket1Low +
    : : : GeneratorBlanket1High ) - GeneratorBlanket1High ) * Seconds );
    TimerPreset[11] = (uint)( ( SprayerShots2 * ( GeneratorBlanket2Low +
    : : : GeneratorBlanket2High ) - GeneratorBlanket2High ) * Seconds );
    TimerPreset[12] = (uint)( ( SprayerShots3 * ( GeneratorBlanket3Low +
    : : : GeneratorBlanket3High ) - GeneratorBlanket3High ) * Seconds );
    TimerPreset[13] = (uint)( ( SprayerShots4 * ( GeneratorBlanket4Low +
    : : : GeneratorBlanket4High ) - GeneratorBlanket4High ) * Seconds );
    TimerPreset[14] = (uint)( ( SprayerShots5 * ( GeneratorBlanket5Low +
    : : : GeneratorBlanket5High ) - GeneratorBlanket5High ) * Seconds );

    TimerPreset[15] = 0;

    Generator[0].low = (uint)( GeneratorBlanket0Low * Seconds );
    Generator[0].high = (uint)( GeneratorBlanket0High * Seconds );// * solvent shot at scrub time * /

    Generator[1].low = (uint)( GeneratorBlanket1Low * Seconds );
    Generator[1].high = (uint)( GeneratorBlanket1High * Seconds );

    Generator[2].low = (uint)( GeneratorBlanket2Low * Seconds );
    Generator[2].high = (uint)( GeneratorBlanket2High * Seconds );
```

C-DOC ARCNET.CPP

```
   Generator[3].low = (uint)( GeneratorBlanket3Low * Seconds );
   Generator[3].high = (uint)( GeneratorBlanket3High * Seconds );

   Generator[4].low = (uint)( GeneratorBlanket4Low * Seconds );
   Generator[4].high = (uint)( GeneratorBlanket4High * Seconds );

   Generator[5].low = (uint)( GeneratorBlanket5Low * Seconds );
   Generator[5].high = (uint)( GeneratorBlanket5High * Seconds );

   Generator[7].low = (uint)( GeneratorFinalShotsLow * Seconds );
   Generator[7].high = (uint)( GeneratorFinalShotsHigh * Seconds );// * final shots * /

   StopProgram();
   MakeProgram( AirBars );
   SendHeaderPLC();
   SendGeneratorPLC();
   SendProgramPLC();
   PLCactive = True;
   StartPLC();
}

// broadcast a request to start all PLC programs
void WasherStation::BroadcastStart( void )
{
   byte far *DataMem = (byte *)MK_FP( ArcMemSeg, ArcTxBuf );
//   uint status, Trans, tryCom;
   Timer PrePurge( 1 );
   while( !PrePurge.Expired() );
   *DataMem++ = LocalID;
   *DataMem++ = 0x00;           // (byte)RemoteID;
   *DataMem++ = 0x04;
   *DataMem++ = 0x00;
   *DataMem++ = 0x05;           // * Insert Data * /
   *DataMem++ = 0xff;           // * do not change statusIO * /
   *DataMem++ = 0xff;
   *DataMem++ = 0xff;
   *DataMem++ = 0xff;
   *DataMem++ = 0x55;           // * change IntBit * /
//   if( SetFlag )
   *DataMem++ = 0xaa;           // * set bit * /
//   else
//     *DataMem++ = 0xbb; // * clear bit * /
   *DataMem++ = 0x0c;      // (byte)ByteNumber; // * byte number * /
//   if( SetFlag )
   *DataMem++ = 0x01;           // (byte)BitMask; // * mask bit * /
//   else
//     *DataMem++ = (byte)~BitMask;
   *DataMem++ = 0xff;           // * don't change IntBit * /
   *DataMem++ = 0xaa;           // * set bit * /
   *DataMem++ = 0x0a;           // * which byte * /
   *DataMem++ = 0x01;           // * mask bit * /
   *DataMem++ = 0xff;           // * don't change IntBit * /
   *DataMem++ = 0xaa;
   *DataMem++ = 0x0e;
   *DataMem++ = 0x01;
//   for( Trans = 0; Trans < TRY_COM; Trans++ )
//   {
//     delay( 10 );
   outportb( COMMAND_REG, CLEAR_TRANS );// * clear any pending transmition * /
   outportb( COMMAND_REG, TRANS_PAGE_0 );// * transmit from page 0 * /
//     if( RemoteID == 0x00 )
```

C-DOC ARCNET.CPP

```
//        return( OK ); // if BROADCAST assume that transmition is OK
//     for( tryCom = 0; tryCom < WAIT_COM; tryCom++ )
//     {
//        delay( 1 );
//        status = inportb( STATUS_REG );
//        if( status & SEND_OK )
//           return( OK );
//     }
//  }
//  return( Fail );
   Timer PostPurge( 1 );
   while( !PostPurge.Expired() );
}

// broadcast a request to stop all PLC programs
void WasherStation::BroadcastStop( void )
{
   byte far *DataMem = (byte *)MK_FP( ArcMemSeg, ArcTxBuf );
//   uint status, Trans, tryCom;
   Timer PrePurge( 1 );
   while( !PrePurge.Expired() );
   *DataMem++ = LocalID;
   *DataMem++ = 0x00;           // (byte)RemoteID;
   *DataMem++ = 0x04;
   *DataMem++ = 0x00;
   *DataMem++ = 0x05;           // * Insert Data * /
   *DataMem++ = 0xff;           // * do not change statusIO * /
   *DataMem++ = 0xff;
   *DataMem++ = 0xff;
   *DataMem++ = 0xff;
   *DataMem++ = 0x55;           // * change IntBit * /
//   if( SetFlag )
//     *DataMem++ = 0xaa; // * set bit * /
//   else
   *DataMem++ = 0xbb;           // * clear bit * /
   *DataMem++ = 0x0c;     // (byte)ByteNumber; // * byte number * /
//   if( SetFlag )
//     *DataMem++ = 0x01;   // (byte)BitMask; // * mask bit * /
//   else
   *DataMem++ = 0xfe;           // (byte)~BitMask;
   *DataMem++ = 0xff;           // * don't change IntBit * /
   *DataMem++ = 0xaa;           // * set bit * /
   *DataMem++ = 0x0a;           // * which byte * /
   *DataMem++ = 0x01;           // * mask bit * /
   *DataMem++ = 0xff;           // * don't change IntBit * /
   *DataMem++ = 0xaa;
   *DataMem++ = 0x0e;
   *DataMem++ = 0x01;
//   for( Trans = 0; Trans < TRY_COM; Trans++ )
//   {
//     delay( 10 );
   outportb( COMMAND_REG, CLEAR_TRANS );// * clear any pending transmition * /
   outportb( COMMAND_REG, TRANS_PAGE_0 );// * transmit from page 0 * /
//     if( RemoteID == 0x00 )
//        return( OK ); // if BROADCAST assume that transmition is OK
//     for( tryCom = 0; tryCom < WAIT_COM; tryCom++ )
//     {
//        delay( 1 );
//        status = inportb( STATUS_REG );
//        if( status & SEND_OK )
//           return( OK );
//     }
```

C-DOC ARCNET.CPP

```
//  }
//  return( Fail );
   Timer PostPurge( 1 );
   while( !PostPurge.Expired() );
}

// do an IO scan of this board
void WasherStation::doIOscan( void )
{
   if( IOscan->Expired() )
   | if( NetworkDog( RemoteID ) == OK )
   | {
   | | Responded = True;
   | | if( PLCactive == False )
   | | | StopProgram();
   | | SetIOStatus( RemoteID, IOconfig );
//       c++;
//       c %= 8;
//       byte bit = 1 << c;
//       if( ADconfig[0] & IOconfig[0] & bit )
//          SetAnalogOutput( RemoteID, AnaVal[c], bit );
//       SetOutput( RemoteID, IObits );
   | | byte BitMask = 1 << ( HydrolicMotor % 8 );
   | | byte ByteNumber = HydrolicMotor / 8;
   | | if( ( IOconfig[ByteNumber] & 0x0f ) == BitMask )// only HydrolicMotor
   | | | if( IObits[ByteNumber] & BitMask )
   | | | | SetBit( BitMask, ByteNumber, True );
   | | | else
   | | | | SetBit( BitMask, ByteNumber, False );
   | | GetInputs( RemoteID, IObits );
   | | IOscan->Set( 5 );
   | }
   | else
   | {
   | | Responded = False;
   | | for( uint i = 0; i < 24; i++ )
   | | {
   | | #  byte b = 1 << ( i % 8 );
   | | #  uint g = i / 8;
   | | #  if( ~IOconfig[g] & b )
   | | #  | IObits[g] &= ~b;
   | | }
   | | IOscan->Set( 1 );
   | }
   if( IOscan->TimeRemaining() > 5 )
   | IOscan->Set( 5 );
}

// *************************************************************************** /
void WasherStation::MakeProgram( Boolean AirBars )
{
   byte Temp1, Temp2, Temp3;
   uint count = 0;

//  Program[5] = 160; // * number of 3-byte instructions * /
//  Program[6] = 0x00;      // * ladder starting address   lo * /
//  Program[7] = 0x00;      // *                            hi * /

//  count = 8;

   Program[count++] = 0x01;
   Program[count++] = 0xff;
```

C-DOC ARCNET.CPP

```
Program[count++] = 0xff;
Program[count++] = 0x02;
Program[count++] = 0x00;
Program[count++] = 0x1F;// * ENABLE TIMER 0 ( FROM START TO THE END OF SCRUB )* /
// * ENABLE TIMER 1 ( FROM START TO THE END OF FINAL SHOTS )* /
// * ENABLE TIMER 2 ( FROM START TO THE END OF BRASH MOTORS )* /
// * ENABLE TIMER 3 ( FROM START TO THE END OF WIPER ROLLER TIME )* /
// * ENABLE TIMER 4 ( FROM START TO BEGINING OF AIR BARS( WIPER ROLLERS ) )* /
Program[count++] = 0x02;
Program[count++] = 0x08;
Program[count++] = 0x7F;// * ENABLE TIMER 8 ( DELAY FROM START TO SCRUB BEGIN )* /
// * ENABLE TIMER 9 ( NUMBER OF SPRAYER SHOTS FOR BLANKET 0 )* /
// * ENABLE TIMER 10 ( NUMBER OF SPRAYER SHOTS FOR BLANKET 1 )* /
// * ENABLE TIMER 11 ( NUMBER OF SPRAYER SHOTS FOR BLANKET 2 )* /
// * ENABLE TIMER 12 ( NUMBER OF SPRAYER SHOTS FOR BLANKET 3 )* /
// * ENABLE TIMER 13 ( NUMBER OF SPRAYER SHOTS FOR BLANKET 4 )* /
// * ENABLE TIMER 14 ( NUMBER OF SPRAYER SHOTS FOR BLANKET 5 )* /
Program[count++] = 0x01;
Program[count++] = 0xff;
Program[count++] = 0xff;
Program[count++] = 0x06;
Program[count++] = 0x0C;
Program[count++] = 0x01;        // * EX ON BIT 12.0 - START BIT * /
Program[count++] = 0x03;
Program[count++] = 0x00;
Program[count++] = 0x01;// * PRESET TIMER 0 - FROM START TO THE END OF SCRUB * /
Program[count++] = 0x03;
Program[count++] = 0x01;
Program[count++] = 0x02;// * PRESET TIMER 1 - FROM START TO THE END OF FINAL SHOTS * /
Program[count++] = 0x03;
Program[count++] = 0x02;
Program[count++] = 0x04;// * PRESET TIMER 2 - FROM START TO THE END OF BRASH MOTORS * /
Program[count++] = 0x03;
Program[count++] = 0x03;
Program[count++] = 0x08;// * PRESET TIMER 3 - FROM START TO THE END OF WIPER ROLLER * /
Program[count++] = 0x03;
Program[count++] = 0x04;
Program[count++] = 0x10;// * PRESET TIMER 4 - FROM START TO THE BEGINING OF AIR BARS( WIPER ROLLER ) - if option Air Bars selected * /
Program[count++] = 0x03;
Program[count++] = 0x08;
Program[count++] = 0x01;// * PRESET TIMER 8 - DELAY FROM START TO SCRUB * /
Program[count++] = 0x03;
Program[count++] = 0x09;
Program[count++] = 0x02;// * PRESET TIMER 9 - DELAY FROM START TO THE END OF SPRAYER SHOTS OF BLANKET 0 * /
Program[count++] = 0x03;
Program[count++] = 0x0A;
Program[count++] = 0x04;// * PRESET TIMER 10 - DELAY FROM START TO THE END OF SPRAYER SHOTS OF BLANKET 1 * /
Program[count++] = 0x03;
Program[count++] = 0x0B;
Program[count++] = 0x08;// * PRESET TIMER 11 - DELAY FROM START TO THE END OF SPRAYER SHOTS OF BLANKET 2 * /
```

C-DOC ARCNET.CPP

```
Program[count++] = 0x03;
Program[count++] = 0x0C;
Program[count++] = 0x10;// * PRESET TIMER 12 - DELAY FROM START TO THE END OF SPRAYER SHOTS OF BLANKET 3 * /

Program[count++] = 0x03;
Program[count++] = 0x0D;
Program[count++] = 0x20;// * PRESET TIMER 13 - DELAY FROM START TO THE END OF SPRAYER SHOTS OF BLANKET 4 * /

Program[count++] = 0x03;
Program[count++] = 0x0E;
Program[count++] = 0x40;// * PRESET TIMER 14 - DELAY FROM START TO THE END OF SPRAYER SHOTS OF BLANKET 5 * /

Program[count++] = 0x08;
Program[count++] = 0x0A;
Program[count++] = (byte)BlanketMask;// * ENABLE only ACTIVE blanket washers generators * /

Program[count++] = 0x01;
Program[count++] = 0xff;
Program[count++] = 0xff;

Program[count++] = 0x07;
Program[count++] = 0x08;
Program[count++] = 0x01;        // * EX OFF TIMER 0 * /

Program[count++] = 0x08;
Program[count++] = 0x0A;
Program[count++] = 0x80;        // * ENABLE gen. 7 * /

// *=========================================* /
// *=========== BLANKETS OUPUTS ==========* /
// *=========================================* /

Program[count++] = 0x01;
Program[count++] = 0xff;
Program[count++] = 0xff;

Program[count++] = 0x06;
Program[count++] = 0x08;
Program[count++] = 0x04;  // * EX ON TIMER 2 output - BRASH MOTOR * /

Temp1 = 0x00;
if( BlanketMask & 0x01 )
| Temp1 |= 0x01;
if( BlanketMask & 0x02 )
| Temp1 |= 0x10;

Program[count++] = 0x08;
Program[count++] = 0x00;
Program[count++] = Temp1;     // * SET ON output 0,4 if SELECTED * /
// * - BRUSH MOTORS * /

Temp2 = 0x00;
if( BlanketMask & 0x04 )
| Temp2 |= 0x01;
if( BlanketMask & 0x08 )
| Temp2 |= 0x10;

Program[count++] = 0x08;
Program[count++] = 0x01;
Program[count++] = Temp2;     // * SET ON output 8,12 if SELECTED * /
// * - BRUSH MOTORS * /
```

C-DOC ARCNET.CPP

```
Temp3 = 0x00;
if( BlanketMask & 0x10 )
|  Temp3 |= 0x01;
if( BlanketMask & 0x20 )
|  Temp3 |= 0x10;

Program[count++] = 0x08;
Program[count++] = 0x02;
Program[count++] = Temp3;    // * SET ON output 16,20 if SELECTED * /
// * - BRUSH MOTORS * /

Program[count++] = 0x0E;
Program[count++] = 0x00;
Program[count++] = Temp1; // * CLEAR OFF output 0,4 - BRUSH MOTORS * /

Program[count++] = 0x0E;
Program[count++] = 0x01;
Program[count++] = Temp2;// * CLEAR OFF output 8,12 - BRUSH MOTORS * /

Program[count++] = 0x0E;
Program[count++] = 0x02;
Program[count++] = Temp3;// * CLEAR OFF output 16,20 - BRUSH MOTORS * /

Program[count++] = 0x01;
Program[count++] = 0xff;
Program[count++] = 0xff;

Program[count++] = 0x06;
Program[count++] = 0x08;
Program[count++] = 0x01;    // * EX ON TIMER 0 output - SCRAB TIME * /

Program[count++] = 0x07;
Program[count++] = 0x09;
Program[count++] = 0x01;// * EX OFF TIMER 8 output - DELAY FROM START * /

Temp1 = 0x00;
if( BlanketMask & 0x01 )
|  Temp1 |= 0x04;
if( BlanketMask & 0x02 )
|  Temp1 |= 0x40;

Program[count++] = 0x08;
Program[count++] = 0x00;
Program[count++] = Temp1;// * SET ON output 2,6 if SELECTED - SCRUB * /

Temp2 = 0x00;
if( BlanketMask & 0x04 )
|  Temp2 |= 0x04;
if( BlanketMask & 0x08 )
|  Temp2 |= 0x40;

Program[count++] = 0x08;
Program[count++] = 0x01;
Program[count++] = Temp2;// * SET ON output 10,14 if SELECTED - SCRUB * /

Temp3 = 0x00;
if( BlanketMask & 0x10 )
|  Temp3 |= 0x04;
if( BlanketMask & 0x20 )
|  Temp3 |= 0x40;

Program[count++] = 0x08;
```

C-DOC ARCNET.CPP

```
Program[count++] = 0x02;
Program[count++] = Temp3;// * SET ON output 18,22 if SELECTED - SCRUB * /

Program[count++] = 0x0E;
Program[count++] = 0x00;
Program[count++] = Temp1;      // * CLEAR OFF output 2,6 - SCRUB * /

Program[count++] = 0x0E;
Program[count++] = 0x01;
Program[count++] = Temp2;     // * CLEAR OFF output 10,14 - SCRUB * /

Program[count++] = 0x0E;
Program[count++] = 0x02;
Program[count++] = Temp3;     // * CLEAR OFF output 18,22 - SCRUB * /

Program[count++] = 0x01;
Program[count++] = 0xff;
Program[count++] = 0xff;

if( AirBars )
{
| Program[count++] = 0x07;
| Program[count++] = 0x08;
| Program[count++] = 0x10;// * EX OFF TIMER 4 output - if DELAY FOR AIR BARS is OVER * /
| // * if option Air Bars choosen ( AirBars = TRUE )* /
}
else
{
| Program[count++] = 0x07;
| Program[count++] = 0x08;
| Program[count++] = 0x01;// * EX OFF TIMER 0 output - if SCRAB TIME is OVER * /
| // * if option Wiper Roller choosen ( AirBars = FALSE ) * /
}

Program[count++] = 0x06;
Program[count++] = 0x08;
Program[count++] = 0x08;// * EX ON TIMER 3 output - if STILL WIPER ROLLER * /
// * or AIRBARS are ON * /

Temp1 = 0x00;
if( BlanketMask & 0x01 )
| Temp1 |= 0x08;
if( BlanketMask & 0x02 )
| Temp1 |= 0x80;

if( AirBars )
| Temp1 = 0x88;// * if Air Bars option choosen turn ON AirBars even if unit is NOT active * /

Program[count++] = 0x08;
Program[count++] = 0x00;
Program[count++] = Temp1;// * SET ON output 3,7 if SELECTED - WIPER ROLLER * /

Temp2 = 0x00;
if( BlanketMask & 0x04 )
| Temp2 |= 0x08;
if( BlanketMask & 0x08 )
| Temp2 |= 0x80;

if( AirBars )
| Temp2 = 0x88;// * if Air Bars option choosen turn ON AirBars even if unit is NOT active * /

Program[count++] = 0x08;
```

C-DOC ARCNET.CPP

```
Program[count++] = 0x01;
Program[count++] = Temp2;// * SET ON output 11,15 if SELECTED - WIPER ROLLER * /

Temp3 = 0x00;
if( BlanketMask & 0x10 )
| Temp3 |= 0x08;
if( BlanketMask & 0x20 )
| Temp3 |= 0x80;

if( AirBars )
| Temp3 = 0x88;// * if Air Bars option choosen turn ON AirBars eaven if unit is NOT active * /

Program[count++] = 0x08;
Program[count++] = 0x02;
Program[count++] = Temp3;// * SET ON output 19,23 if SELECTED - WIPER ROLLER * /

Program[count++] = 0x0E;
Program[count++] = 0x00;
Program[count++] = Temp1; // * CLEAR OFF output 3,7 - WIPER ROLLER * /

Program[count++] = 0x0E;
Program[count++] = 0x01;
Program[count++] = Temp2;// * CLEAR OFF output 11,15 - WIPER ROLLER * /

Program[count++] = 0x0E;
Program[count++] = 0x02;
Program[count++] = Temp3;// * CLEAR OFF output 19,23 - WIPER ROLLER * /

// *============================================* /
// *=========== BLANKET WASHER 0 =============* /
// *============================================* /
if( BlanketMask & 0x01 )
{
| Program[count++] = 0x01;
| Program[count++] = 0xff;
| Program[count++] = 0xff;
|
| Program[count++] = 0x06;
| Program[count++] = 0x0B;
| Program[count++] = 0x01;      // * EX ON gen. 0 output * /
|
| Program[count++] = 0x06;
| Program[count++] = 0x08;
| Program[count++] = 0x01;// * EX ON TIMER 0 output - if SCRUB STILL ACTIVE * /
|
| Program[count++] = 0x06;
| Program[count++] = 0x09;
| Program[count++] = 0x02;// * EX ON TIMER 9 output - if time allowed for sprayer not expired * /
|
| // *========== OR BEGIN ==========* /
|
| Program[count++] = 0x0A;
| Program[count++] = 0xff;
| Program[count++] = 0xff;
|
| Program[count++] = 0x06;
| Program[count++] = 0x0B;
| Program[count++] = 0x80;      // * EX ON gen. 7 output * /
|
| Program[count++] = 0x07;
| Program[count++] = 0x08;
| Program[count++] = 0x01;// * EX OFF TIMER 0 output - if SCRUB ALREADY FINISHE * /
```

C-DOC ARCNET.CPP

```
|
| Program[count++] = 0x06;
| Program[count++] = 0x08;
| Program[count++] = 0x02;// * EX ON TIMER 1 output - if READY FOR FINAL SHOTS * /
|
| Program[count++] = 0x0B;
| Program[count++] = 0xff;
| Program[count++] = 0xff;
|
| //*========== OR END ===========* /
|
| Program[count++] = 0x08;
| Program[count++] = 0x00;
| Program[count++] = 0x02;    // * SET ON output 1 - SPRAYER 0 * /
|
| Program[count++] = 0x0E;
| Program[count++] = 0x00;
| Program[count++] = 0x02;  // * CLEAR OFF output 1 - SPRAYER 0 * /
}
// *===============================================* /
// *=========== BLANKET WASHER 1 ==============* /
// *===============================================* /
if( BlanketMask & 0x02 )
{
| Program[count++] = 0x01;
| Program[count++] = 0xff;
| Program[count++] = 0xff;
|
| Program[count++] = 0x06;
| Program[count++] = 0x0B;
| Program[count++] = 0x02;     // * EX ON gen. 1 output * /
|
| Program[count++] = 0x06;
| Program[count++] = 0x08;
| Program[count++] = 0x01;// * EX ON TIMER 0 output - if SCRUB STILL ACTIVE * /
|
| Program[count++] = 0x06;
| Program[count++] = 0x09;
| Program[count++] = 0x04;// * EX ON TIMER 10 output - if time allowed for sprayer not expired * /
|
| // *========== OR BEGIN ===========* /
|
| Program[count++] = 0x0A;
| Program[count++] = 0xff;
| Program[count++] = 0xff;
|
| Program[count++] = 0x06;
| Program[count++] = 0x0B;
| Program[count++] = 0x80;     // * EX ON gen. 7 output * /
|
| Program[count++] = 0x07;
| Program[count++] = 0x08;
| Program[count++] = 0x01;// * EX OFF TIMER 0 output - if SCRUB ALREADY FINISHE * /
|
| Program[count++] = 0x06;
| Program[count++] = 0x08;
| Program[count++] = 0x02;// * EX ON TIMER 1 output - if READY FOR FINAL SHOTS * /
|
| Program[count++] = 0x0B;
| Program[count++] = 0xff;
| Program[count++] = 0xff;
|
```

C-DOC ARCNET.CPP

```
| //*==========  OR END  ===========*/
|
| Program[count++] = 0x08;
| Program[count++] = 0x00;
| Program[count++] = 0x20;     //* SET ON output 5 */
|
| Program[count++] = 0x0E;
| Program[count++] = 0x00;
| Program[count++] = 0x20;     //* CLEAR OFF output 5 */
}
//*===========================================*/
//*=========== BLANKET WASHER 2 =============*/
//*===========================================*/
if( BlanketMask & 0x04 )
{
| Program[count++] = 0x01;
| Program[count++] = 0xff;
| Program[count++] = 0xff;
|
| Program[count++] = 0x06;
| Program[count++] = 0x0B;
| Program[count++] = 0x04;     //* EX ON gen. 2 output */
|
| Program[count++] = 0x06;
| Program[count++] = 0x08;
| Program[count++] = 0x01;//* EX ON TIMER 0 output - if SCRUB STILL ACTIVE */
|
| Program[count++] = 0x06;
| Program[count++] = 0x09;
| Program[count++] = 0x08;//* EX ON TIMER 11 output - if time allowed for sprayer not expired */
|
| //*=========  OR BEGIN  ==========*/
|
| Program[count++] = 0x0A;
| Program[count++] = 0xff;
| Program[count++] = 0xff;
|
| Program[count++] = 0x06;
| Program[count++] = 0x0B;
| Program[count++] = 0x80;     //* EX ON gen. 7 output */
|
| Program[count++] = 0x07;
| Program[count++] = 0x08;
| Program[count++] = 0x01;//* EX OFF TIMER 0 output - if SCRUB ALREADY FINISHE */
|
| Program[count++] = 0x06;
| Program[count++] = 0x08;
| Program[count++] = 0x02;//* EX ON TIMER 1 output - if READY FOR FINAL SHOTS  */
|
| Program[count++] = 0x0B;
| Program[count++] = 0xff;
| Program[count++] = 0xff;
|
| //*==========  OR END  ==========*/
|
| Program[count++] = 0x08;
| Program[count++] = 0x01;
| Program[count++] = 0x02;     //* SET ON output 9 */
|
| Program[count++] = 0x0E;
| Program[count++] = 0x01;
| Program[count++] = 0x02;     //* CLEAR OFF output 9 */
```

C-DOC ARCNET.CPP

```
}
// *==========================================* /
// *========== BLANKET WASHER 3 =============* /
// *==========================================* /
if( BlanketMask & 0x08 )
{
| Program[count++] = 0x01;
| Program[count++] = 0xff;
| Program[count++] = 0xff;
|
| Program[count++] = 0x06;
| Program[count++] = 0x0B;
| Program[count++] = 0x08;     // * EX ON gen. 3 output * /
|
| Program[count++] = 0x06;
| Program[count++] = 0x08;
| Program[count++] = 0x01;// * EX ON TIMER 0 output - if SCRUB STILL ACTIVE * /
|
| Program[count++] = 0x06;
| Program[count++] = 0x09;
| Program[count++] = 0x10;// * EX ON TIMER 12 output - if time allowed for sprayer not expired * /
|
| // *========== OR BEGIN ===========* /
|
| Program[count++] = 0x0A;
| Program[count++] = 0xff;
| Program[count++] = 0xff;
|
| Program[count++] = 0x06;
| Program[count++] = 0x0B;
| Program[count++] = 0x80;     // * EX ON gen. 7 output * /
|
| Program[count++] = 0x07;
| Program[count++] = 0x08;
| Program[count++] = 0x01;// * EX OFF TIMER 0 output - if SCRUB ALREADY FINISHED * /
|
| Program[count++] = 0x06;
| Program[count++] = 0x08;
| Program[count++] = 0x02;// * EX ON TIMER 1 output - if READY FOR FINAL SHOTS * /
|
| Program[count++] = 0x0B;
| Program[count++] = 0xff;
| Program[count++] = 0xff;
|
| // *========== OR END ===========* /
|
| Program[count++] = 0x08;
| Program[count++] = 0x01;
| Program[count++] = 0x20;     // * SET ON output 13 * /
|
| Program[count++] = 0x0E;
| Program[count++] = 0x01;
| Program[count++] = 0x20;     // * CLEAR OFF output 13 * /
}
// *==========================================* /
// *========== BLANKET WASHER 4 =============* /
// *==========================================* /
if( BlanketMask & 0x10 )
{
| Program[count++] = 0x01;
| Program[count++] = 0xff;
| Program[count++] = 0xff;
```

C-DOC ARCNET.CPP

```
|
| Program[count++] = 0x06;
| Program[count++] = 0x0B;
| Program[count++] = 0x10;     //* EX ON gen. 4 output */
|
| Program[count++] = 0x06;
| Program[count++] = 0x08;
| Program[count++] = 0x01;//* EX ON TIMER 0 output - if SCRUB STILL ACTIVE */
|
| Program[count++] = 0x06;
| Program[count++] = 0x09;
| Program[count++] = 0x20;//* EX ON TIMER 13 output - if time allowed for sprayer not expired */
|
| //*==========  OR BEGIN  ===========*/
|
| Program[count++] = 0x0A;
| Program[count++] = 0xff;
| Program[count++] = 0xff;
|
| Program[count++] = 0x06;
| Program[count++] = 0x0B;
| Program[count++] = 0x80;     //* EX ON gen. 7 output */
|
| Program[count++] = 0x07;
| Program[count++] = 0x08;
| Program[count++] = 0x01;//* EX OFF TIMER 0 output - if SCRUB ALREADY FINISHED */
|
| Program[count++] = 0x06;
| Program[count++] = 0x08;
| Program[count++] = 0x02;//* EX ON TIMER 1 output - if READY FOR FINAL SHOTS */
|
| Program[count++] = 0x0B;
| Program[count++] = 0xff;
| Program[count++] = 0xff;
|
| //*==========  OR END  ===========*/
|
| Program[count++] = 0x08;
| Program[count++] = 0x02;
| Program[count++] = 0x02;     //* SET ON output 17 */
|
| Program[count++] = 0x0E;
| Program[count++] = 0x02;
| Program[count++] = 0x02;     //* CLEAR OFF output 17 */
}
//*==============================================*/
//*========== BLANKET WASHER 5 =============*/
//*==============================================*/
if( BlanketMask & 0x20 )
{
| Program[count++] = 0x01;
| Program[count++] = 0xff;
| Program[count++] = 0xff;
|
| Program[count++] = 0x06;
| Program[count++] = 0x0B;
| Program[count++] = 0x20;     //* EX ON gen. 5 output */
|
| Program[count++] = 0x06;
| Program[count++] = 0x08;
| Program[count++] = 0x01;//* EX ON TIMER 0 output - if SCRUB STILL ACTIVE */
|
```

C-DOC ARCNET.CPP

```
| Program[count++] = 0x06;
| Program[count++] = 0x09;
| Program[count++] = 0x40;// * EX ON TIMER 14 output - if time allowed for sprayer not expired * /
|
| //*==========  OR BEGIN  ==========* /
|
| Program[count++] = 0x0A;
| Program[count++] = 0xff;
| Program[count++] = 0xff;
|
| Program[count++] = 0x06;
| Program[count++] = 0x0B;
| Program[count++] = 0x80;     // * EX ON gen. 7 output * /
|
| Program[count++] = 0x07;
| Program[count++] = 0x08;
| Program[count++] = 0x01;// * EX OFF TIMER 0 output - if SCRUB ALREADY FINISHED * /
|
| Program[count++] = 0x06;
| Program[count++] = 0x08;
| Program[count++] = 0x02;// * EX ON TIMER 1 output - if READY FOR FINAL SHOTS  * /
|
| Program[count++] = 0x0B;
| Program[count++] = 0xff;
| Program[count++] = 0xff;
|
| //*==========  OR END  ==========* /
|
| Program[count++] = 0x08;
| Program[count++] = 0x02;
| Program[count++] = 0x20;     // * SET ON output 21 * /
|
| Program[count++] = 0x0E;
| Program[count++] = 0x02;
| Program[count++] = 0x20;     // * CLEAR OFF output 21 * /
}

//*====================================* /

//   if( BlanketMask & 0x01 )
//   {
   Program[count++] = 0x01;
   Program[count++] = 0xff;
   Program[count++] = 0xff;

   Program[count++] = 0x06;
   Program[count++] = 0x0C;
   Program[count++] = 0x01;        // * EX ON BIT 12.0 - START BIT * /

   Program[count++] = 0x0E;
   Program[count++] = 0x00;
   Program[count++] = 0x0F;     // * CLEAR OFF all blanket 0 outputs * /
//   }

//   if( BlanketMask & 0x02 )
//   {
   Program[count++] = 0x01;
   Program[count++] = 0xff;
   Program[count++] = 0xff;

   Program[count++] = 0x06;
   Program[count++] = 0x0C;
```

```
Program[count++] = 0x01;        //* EX ON BIT 12.0 - START BIT */

Program[count++] = 0x0E;
Program[count++] = 0x00;
Program[count++] = 0xF0;      //* CLEAR OFF all blanket 1 outputs */
//  }

//  if( BlanketMask & 0x04 )
//  {
Program[count++] = 0x01;
Program[count++] = 0xff;
Program[count++] = 0xff;

Program[count++] = 0x06;
Program[count++] = 0x0C;
Program[count++] = 0x01;        //* EX ON BIT 12.0 - START BIT */

Program[count++] = 0x0E;
Program[count++] = 0x01;
Program[count++] = 0x0F;      //* CLEAR OFF all blanket 2 outputs */
//  }

//  if( BlanketMask & 0x08 )
//  {
Program[count++] = 0x01;
Program[count++] = 0xff;
Program[count++] = 0xff;

Program[count++] = 0x06;
Program[count++] = 0x0C;
Program[count++] = 0x01;        //* EX ON BIT 12.0 - START BIT */

Program[count++] = 0x0E;
Program[count++] = 0x01;
Program[count++] = 0xF0;      //* CLEAR OFF all blanket 3 outputs */
//  }

//  if( BlanketMask & 0x10 )
//  {
Program[count++] = 0x01;
Program[count++] = 0xff;
Program[count++] = 0xff;

Program[count++] = 0x06;
Program[count++] = 0x0C;
Program[count++] = 0x01;        //* EX ON BIT 12.0 - START BIT */

Program[count++] = 0x0E;
Program[count++] = 0x02;
Program[count++] = 0x0F;      //* CLEAR OFF all blanket 4 outputs */
//  }

//  if( BlanketMask & 0x20 )
//  {
Program[count++] = 0x01;
Program[count++] = 0xff;
Program[count++] = 0xff;

Program[count++] = 0x06;
Program[count++] = 0x0C;
Program[count++] = 0x01;        //* EX ON BIT 12.0 - START BIT */

```

```
    Program[count++] = 0x0E;
    Program[count++] = 0x02;
    Program[count++] = 0xF0;    //* CLEAR OFF all blanket 5 outputs */
//  }

    Program[count++] = 0x01;
    Program[count++] = 0xff;
    Program[count++] = 0xff;       // start rung

    Program[count++] = 0x06;
    Program[count++] = 0x0c;
    Program[count++] = 0x01;       // examine on bit 12.0 - start

    Program[count++] = 0x09;
    Program[count++] = 0x08;
    Program[count++] = 0x10;       // set off timer for air bar delay

    Program[count++] = 0x0e;
    Program[count++] = 0x0a;
    Program[count++] = 0xff;    // clear off all generator start bits

    Program[count++] = 0x0e;
    Program[count++] = 0x0b;
    Program[count++] = 0xff;    // clear off all generator output bits

    Program[count++] = 0x77;
    Program[count++] = 0x77;
    Program[count++] = 0x77;       // end program

    Program[count++] = 0x77;
    Program[count++] = 0x77;
    Program[count++] = 0x77;

//*   Program[count++] = 0x;
//    Program[count++] = 0x;
//    Program[count++] = 0x; */

    ProgramLength = count;
}

//*==================================*/
uint WasherStation::SendGeneratorPLC()
{
    byte far *DataMem;
    uint count, status, Trans, tryCom;

    DataMem = (byte*)MK_FP( ArcMemSeg, ArcTxBuf );

    *DataMem++ = LocalID;
    *DataMem++ = (byte)RemoteID;
    *DataMem++ = 0x04;
    *DataMem++ = 0x00;
    *DataMem++ = 0x0c;          //* load generators presets */

    for( count = 0; count < 8; count++ )
    {
    #  *DataMem++ = (byte)Generator[count].low;
    #  *DataMem++ = (byte)( Generator[count].low >> 8 );
    #  *DataMem++ = (byte)Generator[count].high;
    #  *DataMem++ = (byte)( Generator[count].high >> 8 );
    }

```

C-DOC ARCNET.CPP

```
// *=====  TRANSMIT GENERATORS PRESETS  =======* /

   for( Trans = 0; Trans < TRY_COM; Trans++ )
   {
   #  outportb( COMMAND_REG, CLEAR_TRANS );// * clear any pending transmition * /
   #  outportb( COMMAND_REG, TRANS_PAGE_0 );// * transmit from page 0 * /
   #
   #  for( tryCom = 0; tryCom < WAIT_COM; tryCom++ )
   #  {
   #  #  delay( 1 );
   #  #  status = inportb( STATUS_REG );
   #  #
   #  #  if( status & SEND_OK )
================return( OK );
   #  }
   }
====return( Fail );
}

// ****************************************************************** /
uint WasherStation::SendHeaderPLC()
{
   byte far *DataMem = (byte*)MK_FP( ArcMemSeg, ArcTxBuf );
   uint count, status, Trans, tryCom;

   Header[0] = LocalID;
   Header[1] = (byte)RemoteID;
   Header[2] = 0x04;
   Header[3] = 0x00;
   Header[4] = 0x04;            // * send header * /

   // * Timers Preset * /
   for( count = 0; count < 16; count++ )
   {
   #  Header[count*2 + 5 + 0]  = TimerPreset[count];
   #  Header[count*2 + 5 + 1]  = TimerPreset[count] >> 8;
   }

   // * Counters Preset * /
   for( count = 0; count < 16; count++ )
   {
   #  Header[count*2 + 5 + 32 + 0]  = CounterPreset[count];
   #  Header[count*2 + 5 + 32 + 1]  = CounterPreset[count] >> 8;
   }

   for( count = 0; count < 256; count++ )
   {
   #  *DataMem++ = Header[count];
   }

   for( Trans = 0; Trans < TRY_COM; Trans++ )
   {
   #  outportb( COMMAND_REG, CLEAR_TRANS );// * clear any pending transmition * /
   #  outportb( COMMAND_REG, TRANS_PAGE_0 );// * transmit from page 0 * /
   #
   #  for( tryCom = 0; tryCom < WAIT_COM; tryCom++ )
   #  {
   #  #  delay( 1 );
   #  #  status = inportb( STATUS_REG );
   #  #  if( status & SEND_OK )
================return( OK );
   #  }
```

C-DOC ARCNET.CPP

```
  }
====return( Fail );
}

//==================================
uint WasherStation::SendProgramPLC( void )
{
  byte far *DataMem = (byte*)MK_FP( ArcMemSeg, ArcTxBuf );
  uint count, offset, status, step, Trace, Trans, tryCom;


  DataMem[0] = LocalID;          // Program[0] = LocalID;
  DataMem[1] = (byte)RemoteID;     // Program[1] = (byte)RemoteID;
  DataMem[2] = 0x04;             // Program[2] = 0x04;
  DataMem[3] = 0x00;             // Program[3] = 0x00;

  DataMem[4] = 0x01;    // Program[4] = 0x01;  // * load program * /
  DataMem[5] = 160;// Program[5] = 160;  // * number of 3-byte instructions * /
  DataMem[6] = 0x00;// Program[6] = 0x00;  // * ladder starting address   lo * /
  DataMem[7] = 0x00;// Program[7] = 0x00;  // *                          hi * /


  for( count = 0; count < 240; count++ )
  {
  #  offset = count + 8;
  #  step = count;
  #  if( step >= ProgramLength )
  #=======break;
  #  DataMem[offset] = Program[step];
  }

// *======  TRANSMIT PROGRAM - PART 1  =======* /

  Trace = 1;

  for( Trans = 0; Trans < TRY_COM; Trans++ )
  {
  #  outportb( COMMAND_REG, CLEAR_TRANS );// * clear any pending transmition * /
  #  outportb( COMMAND_REG, TRANS_PAGE_0 );// * transmit from page 0 * /
  #
  #  for( tryCom = 0; tryCom < WAIT_COM; tryCom++ )
  #  {
  #  #  delay( 1 );
  #  #  status = inportb( STATUS_REG );
  #  #
  #  #  if( status & SEND_OK )
  #  #  {
  #  #  |  Trace = 0;
  #  #=======break;
  #  #  }
  #  }
  }

  if( Trace == 1 )
=======return( Fail );

  DataMem[0] = LocalID;          // Program[0] = LocalID;
  DataMem[1] = (byte)RemoteID;     // Program[1] = (byte)RemoteID;
  DataMem[2] = 0x04;             // Program[2] = 0x04;
  DataMem[3] = 0x00;             // Program[3] = 0x00;

  DataMem[4] = 0x01;    // Program[4] = 0x01;  // * load program * /
```

C-DOC ARCNET.CPP

```
DataMem[5] = 160;// Program[5] = 160;  // * number of 3-byte instructions * /
DataMem[6] = 80;// Program[6] = 80;  // * ladder starting address   lo * /
DataMem[7] = 0x00;// Program[7] = 0x00;  // *                        hi * /

//  DataMem = (byte*)MK_FP( ArcMemSeg, ArcTxBuf );

//  for( count = 0; count < 8; count++ )
//  {
//   *DataMem++ = Program[count];
//  }

for( count = 0; count < 240; count++ )
{
#  offset = count + 8;
#  step = count + 240;
#  if( step >= ProgramLength )
#=======break;
#  DataMem[offset] = Program[step];
}

// *======  TRANSMIT PROGRAM - PART 2  =======* /

for( Trans = 0; Trans < TRY_COM; Trans++ )
{
#  outportb( COMMAND_REG, CLEAR_TRANS );// * clear any pending transmition * /
#  outportb( COMMAND_REG, TRANS_PAGE_0 );// * transmit from page 0 * /
#
#  for( tryCom = 0; tryCom < WAIT_COM; tryCom++ )
#  {
#  #  delay( 1 );
#  #  status = inportb( STATUS_REG );
#  #
#  #  if( status & SEND_OK )
================return( OK );
#  }
}
====return( Fail );
}

// ************************************************************************ /
uint WasherStation::SetBit( byte BitMask, byte ByteNumber, Boolean SetFlag )
{
byte far *DataMem = ( byte * )MK_FP( ArcMemSeg, ArcTxBuf );
uint status, Trans, tryCom;

*DataMem++ = LocalID;
*DataMem++ = (byte)RemoteID;
*DataMem++ = 0x04;
*DataMem++ = 0x00;

*DataMem++ = 0x05;            // * Insert Data * /

*DataMem++ = 0xff;            // * do not change statusIO * /
*DataMem++ = 0xff;
*DataMem++ = 0xff;
*DataMem++ = 0xff;

*DataMem++ = 0x55;            // * change IntBit * /

if( SetFlag )
|  *DataMem++ = 0xaa;         // * set bit * /
else
```

C-DOC ARCNET.CPP

```
| *DataMem++ = 0xbb;        // * clear bit * /

*DataMem++ = (byte)ByteNumber;   // * byte number * /

if( SetFlag )
| *DataMem++ = (byte)BitMask;   // * mask bit * /
else
| *DataMem++ = (byte)~BitMask;

*DataMem++ = 0xff;          // * don't change IntBit * /
*DataMem++ = 0xaa;          // * set bit * /
*DataMem++ = 0x0a;          // * which byte * /
*DataMem++ = 0x01;          // * mask bit * /

*DataMem++ = 0xff;          // * don't change IntBit * /
*DataMem++ = 0xaa;
*DataMem++ = 0x0e;
*DataMem++ = 0x01;

for( Trans = 0; Trans < TRY_COM; Trans++ )
{
#  delay( 10 );
#  outportb( COMMAND_REG, CLEAR_TRANS );// * clear any pending transmition * /
#  outportb( COMMAND_REG, TRANS_PAGE_0 );// * transmit from page 0 * /
#  for( tryCom = 0; tryCom < WAIT_COM; tryCom++ )
#  {
#  #  delay( 1 );
#  #  status = inportb( STATUS_REG );
#  #  if( status & SEND_OK )
===============return( OK );
#  }
}
====return( Fail );
}

// ****************************************************************** /
uint WasherStation::StartPLC()
{
byte far *DataMem = (byte*)MK_FP( ArcMemSeg, ArcTxBuf );
uint status, Trans, tryCom;

PLCactive = True;
*DataMem++ = LocalID;
*DataMem++ = (byte)RemoteID;
*DataMem++ = 0x04;
*DataMem++ = 0x00;

*DataMem++ = 0x03;          // * start * /

for( Trans = 0; Trans < TRY_COM; Trans++ )
{
#  outportb( COMMAND_REG, CLEAR_TRANS );// * clear any pending transmition * /
#  outportb( COMMAND_REG, TRANS_PAGE_0 );// * transmit from page 0 * /
#
#  for( tryCom = 0; tryCom < WAIT_COM; tryCom++ )
#  {
#  #  delay( 1 );
#  #  status = inportb( STATUS_REG );
#  #
#  #  if( status & SEND_OK )
===============return( OK );
#  }
```

C-DOC ARCNET.CPP

```
  }
====return( Fail );
}

// *********************************************************************** /
uint WasherStation::StopPLC()
{
  uint status, Trans, tryCom;
  byte far *DataMem = (byte*)MK_FP( ArcMemSeg, ArcTxBuf );

  PLCactive = False;
  *DataMem++  = LocalID;
  *DataMem++ = (byte)RemoteID;
  *DataMem++ = 0x04;
  *DataMem++ = 0x00;

  *DataMem++ = 0x02;           // * stop * /

  for( Trans = 0; Trans < TRY_COM; Trans++ )
  {
  #  outportb( COMMAND_REG, CLEAR_TRANS );// * clear any pending transmition * /
  #  outportb( COMMAND_REG, TRANS_PAGE_0 );// * transmit from page 0 * /
  #
  #  for( tryCom = 0; tryCom < WAIT_COM; tryCom++ )
  #  {
  #  #  delay( 1 );
  #  #  status = inportb( STATUS_REG );
  #  #
  #  #  if( status & SEND_OK )
===============return( OK );
  #  }
  }
====return( Fail );
}

//==================================

//
//=====  DEFINITION OF COMMUNICATION FUNCTIONS WITH WATERLESS =====
//      GetStatus & SetStatus     by Mariusz Kloza  5/93

WaterStation::WaterStation( uint StationNumber ) :
RemoteStation( StationNumber )
{
  DeadBand = 1;
  GetStatus( &WaterStatus[0] );
}

// set the coefficient for the differential parameter
void WaterStation::Dcoefficients( uint Channel,
  :  uint PlateCoefficient, uint WaterCoefficient )
{
  Boolean scan = False;
  if( Channel < 8 )
  {
  |  if( WaterStatus[Channel].IR_derivative != PlateCoefficient &&
  |  |  :  PlateCoefficient <= 999 )
  |  {
  |  |  WaterStatus[Channel].IR_derivative = PlateCoefficient;
  |  |  scan = True;
  |  }
  |  if( WaterStatus[Channel].WR_derivative != WaterCoefficient &&
```

C-DOC ARCNET.CPP

```
| | :  WaterCoefficient <= 999 )
| {
| |  WaterStatus[Channel].WR_derivative = WaterCoefficient;
| |  scan = True;
| }
| if( scan )
| |  doIOscan();
}
}

// do an IO scan of this board
void WaterStation::doIOscan( void )
{
 if( IOscan->Expired() )
 | if( NetworkDog( RemoteID ) == OK )
 | {
 | |  Responded = True;
 | |  DeadBand = 1;
 | |  SetStatus( 0xff, WaterStatus );
 | |  GetStatus( WaterStatus );
 | |  IOscan->Set( 5 );
 | }
 | else
 | {
 | |  Responded = False;
 | |  for( uint i = 0; i < 8; i++ )
 | | {
 | | #  WaterStatus[i].IR_temperature = 4066;//  81°C
 | | #  WaterStatus[i].WR_temperature = 4066;//  81°C
 | | }
 | |  IOscan->Set( 1 );
 | }
 if( IOscan->TimeRemaining() > 5 )
 |  IOscan->Set( 5 );
}

// ******************************************************************** /
uint WaterStation::GetStatus( water WaterStatus[] )
{
 uint chan, ReTries = MaxReTries, status, Track, Trans, tryCom;
 byte far *DataMem = (byte*)MK_FP( ArcMemSeg, ArcTxBuf );

// *==  SEND REQUEST TO SEND BACK DATA SPACE  ==* /

 while( --ReTries )
 {
 #  outportb( COMMAND_REG, 0x0d );
 #  outportb( COMMAND_REG, 0x8c );
 #
 #  *DataMem++ = LocalID;
 #  *DataMem++ = (byte)RemoteID;
 #  *DataMem++ = 0x04;
 #  *DataMem++ = 0x00;
 #  *DataMem++ = 0x22;          // * send back data space * /
 #
 #  for( Trans = 0; Trans < TRY_COM; Trans++ )
 #  {
 #  #  Track = Fail;
 #  #  outportb( COMMAND_REG, CLEAR_TRANS );// * clear any pending transmition * /
 #  #  outportb( COMMAND_REG, TRANS_PAGE_0 );// * transmit from page 0 * /
 #  #  outportb( COMMAND_REG, CLEAR_RECEIVE );// * clear any pending recieve * /
 #  #
```

C-DOC ARCNET.CPP

```
# # for( tryCom = 0; tryCom < WAIT_COM; tryCom++ )
# # {
# # #  delay( 1 );
# # #  status = inportb( STATUS_REG );
# # #
# # #  if( status & SEND_OK )
# # #  {
# # #  |  Track = OK;
# # #=======break;
# # #  }
# # }
# #
# # if( Track == OK )
# #=======break;
# }
#
//*==  GET ANSWER  ==*/
#
# DataMem = (byte*)MK_FP( ArcMemSeg, ArcRxBuf );
#
# for( Trans = 0; Trans < WAIT_COM; Trans++ )
# {
# # status = inportb( STATUS_REG );
# # if( ( status & RECEIVE_OK ) && ( DataMem[0] == RemoteID ) &&
# # | :  ( DataMem[1] == LocalID ) )
# # {
# # | for( chan = 0; chan < 8; chan++ )
# # | {
# # | #  uint c = sizeof( water ) * chan + 4;
# # | #  WaterStatus[chan].control = *( DataMem + c + 0 );
# # | #  WaterStatus[chan].output = *( DataMem + c + 1 );
# # | #
# # | #  WaterStatus[chan].WR_temperature = (uint)*( DataMem + c + 2 );
# # | #  WaterStatus[chan].WR_temperature |= (uint)*( DataMem + c + 3 ) << 8;
# # | #  WaterStatus[chan].IR_temperature = (uint)*( DataMem + c + 4 );
# # | #  WaterStatus[chan].IR_temperature |= (uint)*( DataMem + c + 5 ) << 8;
# # | #
# # | #  WaterStatus[chan].WR_setpoint = (uint)*( DataMem + c + 6 );
# # | #  WaterStatus[chan].WR_setpoint |= (uint)*( DataMem + c + 7 ) << 8;
# # | #  WaterStatus[chan].IR_setpoint = (uint)*( DataMem + c + 8 );
# # | #  WaterStatus[chan].IR_setpoint |= (uint)*( DataMem + c + 9 ) << 8;
# # | #
# # | #  WaterStatus[chan].WR_gain = (uint)*( DataMem + c + 10 );
# # | #  WaterStatus[chan].WR_gain |= (uint)*( DataMem + c + 11 ) << 8;
# # | #  WaterStatus[chan].IR_gain = (uint)*( DataMem + c + 12 );
# # | #  WaterStatus[chan].IR_gain |= (uint)*( DataMem + c + 13 ) << 8;
# # | #
# # | #  WaterStatus[chan].WR_integral = (uint)*( DataMem + c + 14 );
# # | #  WaterStatus[chan].WR_integral |= (uint)*( DataMem + c + 15 ) << 8;
# # | #  WaterStatus[chan].IR_integral = (uint)*( DataMem + c + 16 );
# # | #  WaterStatus[chan].IR_integral |= (uint)*( DataMem + c + 17 ) << 8;
# # | #
# # | #  WaterStatus[chan].WR_derivative = (uint)*( DataMem + c + 18 );
# # | #  WaterStatus[chan].WR_derivative |= (uint)*( DataMem + c + 19 ) << 8;
# # | #  WaterStatus[chan].IR_derivative = (uint)*( DataMem + c + 20 );
# # | #  WaterStatus[chan].IR_derivative |= (uint)*( DataMem + c + 21 ) << 8;
# # | #
# # | #  WaterStatus[chan].WR_sampleT = (uint)*( DataMem + c + 22 );
# # | #  WaterStatus[chan].WR_sampleT |= (uint)*( DataMem + c + 23 ) << 8;
# # | #  WaterStatus[chan].IR_sampleT = (uint)*( DataMem + c + 24 );
# # | #  WaterStatus[chan].IR_sampleT |= (uint)*( DataMem + c + 25 ) << 8;
# # | #
```

C-DOC ARCNET.CPP

```
  # # | #  WaterStatus[chan].WR_Nsample = (uint)*( DataMem + c + 26 );
  # # | #  WaterStatus[chan].WR_Nsample |= (uint)*( DataMem + c + 27 ) << 8;
  # # | #  WaterStatus[chan].IR_Nsample = (uint)*( DataMem + c + 28 );
  # # | #  WaterStatus[chan].IR_Nsample |= (uint)*( DataMem + c + 29 ) << 8;
  # # | #
  # # | #  PreHeatTime = (uint)*( DataMem + 7 * sizeof( water ) + 30 );
  # # | #  HeaterDelayTime = (uint)*( DataMem + 7 * sizeof( water ) + 31 );
  # # | #  IRErrorFactor = (uint)*( DataMem + 7 * sizeof( water ) + 32 );
  # # | }
================return( Track );
  # # }
  # # if( ( status & RECEIVE_OK ) &&
  # # | : ( DataMem[0] != RemoteID || DataMem[1] != LocalID ) )
  # #=======break;
  # # delay( 1 );
  # }
  }
====return( Track );
}

uint WaterStation::GetTemp( uint Channel, uint Sensor )
{
  doIOscan();
  if( Sensor == InfraRed
  | : && !( WaterStatus[Channel].IR_temperature & -4096 ) )
========return WaterStatus[Channel].IR_temperature * 9 / 251 + 32;
  if( Sensor == ThermoCouple
  | : && !( WaterStatus[Channel].WR_temperature & -4096 ) )
========return WaterStatus[Channel].WR_temperature * 9 / 251 + 32;
====return 130;
}

// set heater delay seconds
void WaterStation::HeaterDelay( uint Time )
{
  if( HeaterDelayTime != Time && 10 <= Time && Time <= 60 )
  {
  | HeaterDelayTime = Time;
  | doIOscan();
  }
}

// set the coefficient for the integral
void WaterStation::Icoefficients( uint Channel,
  : uint PlateCoefficient, uint WaterCoefficient )
{
  Boolean scan = False;
  if( Channel < 8 )
  {
  | if( WaterStatus[Channel].IR_integral != PlateCoefficient &&
  | | : 1 <= PlateCoefficient && PlateCoefficient <= 999 )
  | {
  | | WaterStatus[Channel].IR_integral = PlateCoefficient;
  | | scan = True;
  | }
  | if( WaterStatus[Channel].WR_integral != WaterCoefficient &&
  | | : 1 <= WaterCoefficient && WaterCoefficient <= 999 )
  | {
  | | WaterStatus[Channel].WR_integral = WaterCoefficient;
  | | scan = True;
  | }
  | if( scan )
```

C-DOC ARCNET.CPP

```
  | | doIOscan();
  }
}

// set the number of samples
void WaterStation::Ncoefficients( uint Channel,
  : uint PlateCoefficient, uint WaterCoefficient )
{
  Boolean scan = False;
  if( Channel < 8 )
  {
  | if( WaterStatus[Channel].IR_Nsample != PlateCoefficient &&
  | | : PlateCoefficient <= 199 )
  | {
  | | WaterStatus[Channel].IR_Nsample = PlateCoefficient;
  | | scan = True;
  | }
  | if( WaterStatus[Channel].WR_Nsample != WaterCoefficient &&
  | | : WaterCoefficient <= 199 )
  | {
  | | WaterStatus[Channel].WR_Nsample = WaterCoefficient;
  | | scan = True;
  | }
  | if( scan )
  | | doIOscan();
  }
}

void WaterStation::NewSetPoints( uint Channel, uint PlateTemp, uint WaterTemp )
{
  WaterStatus[Channel].IR_setpoint = ( PlateTemp - 32 ) * 251 / 9;
  WaterStatus[Channel].WR_setpoint = ( WaterTemp - 32 ) * 251 / 9;
  doIOscan();
}

// set the proportional gain
void WaterStation::Pcoefficients( uint Channel,
  : uint PlateCoefficient, uint WaterCoefficient )
{
  Boolean scan = False;
  if( Channel < 8 )
  {
  | if( WaterStatus[Channel].IR_gain != PlateCoefficient &&
  | | : PlateCoefficient <= 99 )
  | {
  | | WaterStatus[Channel].IR_gain = PlateCoefficient;
  | | scan = True;
  | }
  | if( WaterStatus[Channel].WR_gain != WaterCoefficient &&
  | | : WaterCoefficient <= 99 )
  | {
  | | WaterStatus[Channel].WR_gain = WaterCoefficient;
  | | scan = True;
  | }
  | if( scan )
  | | doIOscan();
  }
}

// set pre heat minutes
void WaterStation::PreHeat( uint Time )
{
```

```
    if( PreHeatTime != Time && 1 <= Time && Time <= 60 )
    {
    |  PreHeatTime = Time;
    |  doIOscan();
    }
}

void WaterStation::SelectSensor( uint Channel, uint Sensor )
{
    WaterStatus[Channel].control = Sensor;
    doIOscan();
}

//==========================================
uint WaterStation::SetStatus( byte Mask, water WaterStatus[] )
{
    byte far *DataMem = (byte*)MK_FP( ArcMemSeg, ArcTxBuf );
    uint chan, status, Trace, Trans, tryCom;

// * 0 * /
    *DataMem++ = LocalID;
    *DataMem++ = (byte)RemoteID;
    *DataMem++ = 0x04;
    *DataMem++ = 0x00;
    *DataMem++ = 0x21;            // * SET_STATUS COMMAND * /

    for( chan = 0; chan < 8; chan++ )
    {
    #  if( Mask & ( 0x01 << chan ))
    #  |  *DataMem++ = 0x55;        // * allow to change parameters * /
    #  else
    #  |  *DataMem++ = 0x00;
    #
    #  *DataMem++ = WaterStatus[chan].control;
    #  *DataMem++ = (byte)WaterStatus[chan].WR_setpoint;
    #  *DataMem++ = (byte)( WaterStatus[chan].WR_setpoint >> 8 );
    #  *DataMem++ = (byte)WaterStatus[chan].IR_setpoint;
    #  *DataMem++ = (byte)( WaterStatus[chan].IR_setpoint >> 8 );
    #
    #  *DataMem++ = (byte)WaterStatus[chan].WR_gain;
    #  *DataMem++ = (byte)( WaterStatus[chan].WR_gain >> 8 );
    #  *DataMem++ = (byte)WaterStatus[chan].IR_gain;
    #  *DataMem++ = (byte)( WaterStatus[chan].IR_gain >> 8 );
    #
    #  *DataMem++ = (byte)WaterStatus[chan].WR_integral;
    #  *DataMem++ = (byte)( WaterStatus[chan].WR_integral >> 8 );
    #  *DataMem++ = (byte)WaterStatus[chan].IR_integral;
    #  *DataMem++ = (byte)( WaterStatus[chan].IR_integral >> 8 );
    #
    #  *DataMem++ = (byte)WaterStatus[chan].WR_derivative;
    #  *DataMem++ = (byte)( WaterStatus[chan].WR_derivative >> 8 );
    #  *DataMem++ = (byte)WaterStatus[chan].IR_derivative;
    #  *DataMem++ = (byte)( WaterStatus[chan].IR_derivative >> 8 );
    #
    #  *DataMem++ = (byte)WaterStatus[chan].WR_sampleT;
    #  *DataMem++ = (byte)( WaterStatus[chan].WR_sampleT >> 8 );
    #  *DataMem++ = (byte)WaterStatus[chan].IR_sampleT;
    #  *DataMem++ = (byte)( WaterStatus[chan].IR_sampleT >> 8 );
    #
    #  *DataMem++ = (byte)WaterStatus[chan].WR_Nsample;
    #  *DataMem++ = (byte)( WaterStatus[chan].WR_Nsample >> 8 );
    #  *DataMem++ = (byte)WaterStatus[chan].IR_Nsample;
```

C-DOC ARCNET.CPP

```
#  *DataMem++ = (byte)( WaterStatus[chan].IR_Nsample >> 8 );
#
#  *DataMem++ = (byte)DeadBand;
#  *DataMem++ = (byte)( DeadBand >> 8 );
}

*DataMem++ = (byte)PreHeatTime;
*DataMem++ = (byte)HeaterDelayTime;
*DataMem++ = (byte)IRErrorFactor;

// *======  TRANSMIT PROGRAM  =======* /

Trace = Fail;

for( Trans = 0; Trans < TRY_COM; Trans++ )
{
#  outportb( COMMAND_REG, CLEAR_TRANS );// * clear any pending transmition * /
#  outportb( COMMAND_REG, TRANS_PAGE_0 );// * transmit from page 0 * /
#
#  for( tryCom = 0; tryCom < WAIT_COM; tryCom++ )
#  {
#  #  delay( 1 );
#  #  status = inportb( STATUS_REG );
#  #
#  #  if( status & SEND_OK )
#  #  {
#  #  |  Trace = OK;
#  #=======break;
#  #  }
#  }
}
====return( Trace );
}

// set the sample times in milliseconds
void WaterStation::Tcoefficients( uint Channel,
  :  uint PlateCoefficient, uint WaterCoefficient )
{
  Boolean scan = False;
  if( Channel < 8 )
  {
  |  if( WaterStatus[Channel].IR_sampleT != PlateCoefficient &&
  |  |  :  50 <= PlateCoefficient && PlateCoefficient <= 49950L )
  |  {
  |  |  WaterStatus[Channel].IR_sampleT = PlateCoefficient / 50;
  |  |  scan = True;
  |  }
  |  if( WaterStatus[Channel].WR_sampleT != WaterCoefficient &&
  |  |  :  50 <= WaterCoefficient && WaterCoefficient <= 49950L )
  |  {
  |  |  WaterStatus[Channel].WR_sampleT = WaterCoefficient / 50;
  |  |  scan = True;
  |  }
  |  if( scan )
  |  |  doIOscan();
  }
}
```

C-DOC BUTTONS.CPP

```

/****************************\
*                          *
*  buttons.cpp               *
*                          *
*  Push Button Graphics          *
*                          *
*  (C) 1993 OXY-DRY CORPORATION  *
*  all rights reserved           *
*                          *
\****************************/

//  1993 june 2 enlarge frame around button graphic to make it easier to push
//  1993 september 9 make button graphic more esthetically pleasing
//  1993 march 11 give button ability to change its text
//  1993 april 29 button state can now be restored
//  1993 july 7        fix strstream bug
//  1993 october 10    change copyright for listing

#include <iomanip.h>              //  iostream manipulators
#include <iostream.h>             //  ostream_withassign
#include <math.h>                //  fabs()
#include <stdlib.h>              //  exit()
#include <string.h>              //  strcpy(), strlen()
#include <strstrea.h>            //  strstream
#include "buttons.h"

const BorderSize = 10;

//  Construct a push button
Button::Button( GRect& Box, ButtonType newType, char *Text,
:  font_names TextFont )
{
   Region = Box;
   Color = DARKGRAY;
   State = New;
   Type = newType;
   if( !( Label = new char[strlen( Text ) + 1] ) )
   {
   |  cerr << "Button unable to create Label" << endl;
   |  exit( EXIT_FAILURE );
   }
   strcpy( Label, Text );
   FONT = TextFont;
   if( FONT == DEFAULT_FONT )
   |  FONT = SMALL_FONT;
   draw();
}

//  button now needs a destructor
Button::~Button()
{
   delete []Label;
}

//  draw the push button in the correct position and color
void Button::draw( void )
{
   GPoint corners[8],
        size( Region.right - Region.left, Region.bottom - Region.top );
   settextjustify( CENTER_TEXT, CENTER_TEXT );
   settextstyle( FONT, HORIZ_DIR, 0 );
```

C-DOC BUTTONS.CPP

```
setusercharsize( 1, 1, 1, 1 );
int multx = size.x - 5, divx = textwidth( Label ),
multy = size.y / 2, divy = textheight( Label );
setusercharsize( multx, divx, multy, divy );
setviewport( Region.left, Region.top, Region.right, Region.bottom, False );
setcolor( BLACK );
setlinestyle( SOLID_LINE, 0xffff, THICK_WIDTH );
if( ( Color & LIGHTGRAY ) == BLACK || ( Color | DARKGRAY ) == WHITE )
|  setfillstyle( SOLID_FILL, LIGHTGRAY );
else
|  setfillstyle( SOLID_FILL, Color | DARKGRAY );
if( State == New )
|  State = Out;
corners[0] = GPoint( 4, 4 );     // ( 20, 30 ), ( 80, 70 )
corners[1] = GPoint( 4, size.y - 1 );
corners[2] = GPoint( size.x - 2, size.y - 1 );
corners[3] = GPoint( size.x - 2, 4 );
corners[4] = GPoint( 4, 4 );
fillpoly( 5, (int *)corners );
corners[0] = GPoint( 0, 0 );     // ( 20, 30 ), ( 80, 70 )
corners[1] = GPoint( 0, size.y );
corners[2] = GPoint( size.x, size.y );
corners[3] = GPoint( size.x, 0 );
corners[4] = GPoint( 0, 0 );
drawpoly( 5, (int *)corners );
setlinestyle( SOLID_LINE, 0xffff, NORM_WIDTH );
if( ( Color & LIGHTGRAY ) == BLACK || ( Color | DARKGRAY ) == WHITE )
|  setcolor( DARKGRAY );
else
|  setcolor( Color & LIGHTGRAY );
if( State == Out || State == Release )
{
|  corners[0] = GPoint( 2, size.y - 2 );
|  corners[1] = GPoint( size.x - 2, size.y - 2 );
|  corners[2] = GPoint( size.x - 2, 2 );
|  corners[3] = GPoint( size.x - 3, 3 );
|  corners[4] = GPoint( size.x - 3, size.y - 3 );
|  corners[5] = GPoint( 3, size.y - 3 );
|  corners[6] = GPoint( 2, size.y - 2 );
|  drawpoly( 7, (int *)corners );
|  setcolor( WHITE );
|  corners[0] = GPoint( 2, size.y - 3 );
|  corners[1] = GPoint( 2, 2 );
|  corners[2] = GPoint( size.x - 3, 2 );
|  corners[3] = GPoint( size.x - 4, 3 );
|  corners[4] = GPoint( 3, 3 );
|  corners[5] = GPoint( 3, size.y - 4 );
|  corners[6] = GPoint( 2, size.y - 3 );
|  drawpoly( 7, (int *)corners );
|  setcolor( BLACK );
|  outtextxy( size.x / 2 - 0, size.y / 3 - 0, Label );
}
else
{
|  corners[0] = GPoint( 2, size.y - 2 );
|  corners[1] = GPoint( 2, 2 );
|  corners[2] = GPoint( size.x - 2, 2 );
|  corners[3] = GPoint( size.x - 2, 3 );
|  corners[4] = GPoint( 3, 3 );
|  corners[5] = GPoint( 3, size.y - 2 );
|  drawpoly( 6, (int *)corners );
|  setcolor( BLACK );
```

C-DOC BUTTONS.CPI

```
  |  outtextxy( size.x / 2 + 2, size.y / 3 + 2, Label );
  }
}

// This multi-colored light can even tell its active color
COLORS Button::Light( void )
{
====return Color;
}

// Set the light color
void Button::Light( COLORS NewColor )
{
  if( Color != NewColor )
  {
  |  Color = NewColor;
  |  draw();
  }
}

// Test the On & Off state of the switch contacts
Boolean Button::Off( void )
{
  if( State == Out || State == Release )
========return True;
  else
========return False;
}
Boolean Button::On( void )
{
  if( State == Out || State == Release )
========return False;
  else
========return True;
}

// give a single shot responce to a change in button state
Boolean Button::Once( void )
{
  if( WasPushed != Pushed )
  {
  |  WasPushed = Pushed;
========return True;
  }
  else
========return False;
}

// set the new state for this button
void Button::Set( Boolean newState )
{
  if( newState != False )
  |  State = Latch;
  else
  |  State = Release;
}

// pass back a copy of the current tag text
const char *Button::Tag( void )
{
====return Label;
}
```

C-DOC BUTTONS.CPP

```

// Change the text on the tag that labels this button
void Button::Tag( const char *Text, font_names TextFont )
{
   delete []Label;
   if( strlen( Text ) )
   {
   |  if( !( Label = new char[strlen( Text ) + 1] ) )
   |  {
   |  |  cerr << "Button::Tag unable to create new Label" << endl;
   |  |  exit( EXIT_FAILURE );
   |  }
   |  strcpy( Label, Text );
   }
   else
   {
   |  if( !( Label = new char[2] ) )
   |  {
   |  |  cerr << "Button::Tag unable to create blank Label" << endl;
   |  |  exit( EXIT_FAILURE );
   |  }
   |  strcpy( Label, " " );
   }
   FONT = TextFont;
   if( FONT == DEFAULT_FONT )
   |  FONT = SMALL_FONT;
   draw();
}

// Is the current push point touching the button?
// Adjust the button's state and draw the button.
Boolean Button::Touched( const GPoint& Push )
{
   GRect Zone( Region.left - BorderSize, Region.top - BorderSize,
      :  Region.right + BorderSize, Region.bottom + BorderSize );
   Pushed = Zone.contains( Push );
   switch( State )
   {
   case Out:
   |  if( Pushed )
   |  {
   |  |  if( Type == Momentary )
   |  |  |  State = In;
   |  |  if( Type == Latching )
   |  |  |  State = Latch;
   |  |  if( Type != Indicator )
   |  |  |  draw();
   |  }
   |===break;
   case Latch:
   |  if( !Pushed )
   |  {
   |  |  State = In;
   |  |  draw();
   |  }
   |===break;
   case In:
   |  if( Type == Momentary && !Pushed )
   |  {
   |  |  State = Out;
   |  |  draw();
   |  }
```

C-DOC BUTTONS.CPP

```
  | if( Type == Latching && Pushed )
  | {
  | | State = Release;
  | | draw();
  | }
  |===break;
  case Release:
  | if( !Pushed )
  | {
  | | State = Out;
  | | draw();
  | }
  |===break;
  }
====return( Pushed );
}

// unlatch the latching type switch
void Button::Unlatch( void )
{
  if( Pushed )
  {
  | State = Release;
  | draw();
  }
  else
  | if( State != Out )
  | {
  | | State = Out;
  | | draw();
  | }
}

// construct a button that displays two double values
ThermoStat::ThermoStat( GRect& Box ) : Button( Box, Button::Momentary )
{
  strcpy( buf0, " " );
  strcpy( buf1, " " );
  HowMany = 0;
  Value[0] = 0;
  Value[1] = 0;
  Which = 0;
}

// draw the values on the button
void ThermoStat::draw( void )
{
  if( HowMany == 1 )
  | Button::draw();
  else
  {
  | GPoint corners[5],
  |      size( Region.right - Region.left, Region.bottom - Region.top );
  | setviewport( Region.left, Region.top, Region.right, Region.bottom,
  | :  False );
  | setcolor( BLACK );
  | setlinestyle( SOLID_LINE, 0xffff, THICK_WIDTH );
//   setfillstyle( SOLID_FILL, Color | DARKGRAY );
  | if( ( Color & LIGHTGRAY ) == BLACK || ( Color | DARKGRAY ) == WHITE )
  | | setfillstyle( SOLID_FILL, LIGHTGRAY );
  | else
  | | setfillstyle( SOLID_FILL, Color | DARKGRAY );
```

C-DOC BUTTONS.CPP

```
    |  corners[0] = GPoint( 2, 2 );  // ( 20, 30 ), ( 80, 70 )
    |  corners[1] = GPoint( 2, size.y - 1 );
    |  corners[2] = GPoint( size.x - 2, size.y - 1 );
    |  corners[3] = GPoint( size.x - 2, 2 );
    |  corners[4] = GPoint( 2, 2 );
    |  fillpoly( 5, (int *)corners );
    |  corners[0] = GPoint( 0, 0 );  // ( 20, 30 ), ( 80, 70 )
    |  corners[1] = GPoint( 0, size.y );
    |  corners[2] = GPoint( size.x, size.y );
    |  corners[3] = GPoint( size.x, 0 );
    |  corners[4] = GPoint( 0, 0 );
    |  drawpoly( 5, (int *)corners );
    |  settextjustify( CENTER_TEXT, CENTER_TEXT );
    |  settextstyle( FONT, HORIZ_DIR, 0 );
    |  setviewport( Region.left, Region.top, Region.right, Region.bottom, False );
    |  setusercharsize( 1, 1, 1, 1 );
    |  uint multx, divx, multy, divy;
    |  divx = textwidth( buf0 );
    |  divy = textheight( buf0 );
    |  multx = size.x - 5;
    |  if( Which == 0 )
    |  {
    |  |  multy = size.y * 5 / 8;
    |  |  setusercharsize( multx, divx, multy, divy );
    |  |  outtextxy( size.x / 2 + 1, size.y * 4 / 16 - 1, buf0 );
    |  }
    |  else
    |  {
    |  |  multy = size.y * 3 / 8;
    |  |  setusercharsize( multx, divx, multy, divy );
    |  |  outtextxy( size.x / 2 + 1, size.y * 2 / 16 + 3, buf0 );
    |  }
    |  setusercharsize( 1, 1, 1, 1 );
    |  divx = textwidth( buf1 );
    |  divy = textheight( buf1 );
    |  multx = size.x - 5;
    |  if( Which == 0 )
    |  {
    |  |  multy = size.y * 3 / 8;
    |  |  setusercharsize( multx, divx, multy, divy );
    |  |  outtextxy( size.x / 2 + 1, size.y * 12 / 16 - 1, buf1 );
    |  }
    |  else
    |  {
    |  |  multy = size.y * 5 / 8;
    |  |  setusercharsize( multx, divx, multy, divy );
    |  |  outtextxy( size.x / 2 + 1, size.y * 10 / 16 - 1, buf1 );
    |  }
    }
}

// display a setpoint
void ThermoStat::Tag1( uint SetPoint )
{
   if( HowMany != 1 || Value[0] != SetPoint )
   {
   |  HowMany = 1;
   |  Value[0] = SetPoint;
   |  char buf[6];
   |  ostrstream ValText( buf, 6 );
//    ValText.seekp( ios::beg );
   |  ValText << SetPoint << ends;
```

C-DOC BUTTONS.CPP

```
    | Tag( ValText.str() );
//    draw();
    }
}

// display the time & temperature
void ThermoStat::Tag2( uint Large, char *Value0, char *Value1 )
{
    if( HowMany != 0 || strncmp( buf0, Value0, sizeof buf0 )
    | : || strncmp( buf1, Value1, sizeof buf1 ) || Which != Large )
    {
    | HowMany = 2;
    | strncpy( buf0, Value0, sizeof buf0 );
    | strncpy( buf1, Value1, sizeof buf1 );
    | Which = Large;
    | draw();
    }
}

// display the temperatures
void ThermoStat::Tag2( uint Large, uint Value0, uint Value1 )
{
    if( HowMany != 2 || Which != Large || Value[0] != Value0 ||
    | :  Value[1] != Value1 )
    {
    | HowMany = 2;
    | Which = Large;
    | Value[0] = Value0;
    | Value[1] = Value1;
    | ostrstream Value0( buf0, sizeof buf0 ), Value1( buf1, sizeof buf1 );
    | Value0 << Value[0] << ends;
    | Value1 << Value[1] << ends;
    | draw();
    }
}
```

C-DOC DRYERS.CPP

```

/*****************************\
*                             *
*   dryers.cpp                *
*                             *
*   Sheet Feed Printing Press Dryers Control Panel   *
*                             *
*   (C) 1993 OXY-DRY CORPORATION   *
*   all rights reserved       *
*                             *
\*****************************/

// 1993 june 11      fix handling of impression interlock
// 1993 august 11    allow panel to function with io disabled
// 1993 october 10   change copyright for listing

#include <ctype.h>           // is...(), toupper()
#include <graphics.h>        // graphics primitives
#include <iostream.h>        // iostream_withassign
#include <stdlib.h>          // exit()
#include <string.h>          // str...()
#include "dryers.h"

Dryers::Dryers( SheetFedConfig *ConfigData )// the constructor
{
    Active = False;
    BlowerOn[Dryer1] = Blower1;
    BlowerOn[Dryer2] = Blower2;
    BlowerOn[Dryer3] = Blower3;
    for( uint u = 0; u < 3; u++ )
    {
    #   Control[u] = 0;
    #   OK2Max[u] = False;
    #   OperateOn[u] = False;
    }
    Dryer = 0;
    DryersDisplayed = ConfigData->DryersDisplayed;
    DryersDisplayed %= 4;
    DryerUnits = ConfigData->DryerUnits;
    DryerUnits %= 4;
    FullSw[Dryer1] = ConfigData->Dryer1Full;
    FullSw[Dryer2] = ConfigData->Dryer2Full;
    FullSw[Dryer3] = ConfigData->Dryer3Full;
    FullZone[Dryer1] = Full1;
    FullZone[Dryer2] = Full2;
    FullZone[Dryer3] = Full3;
    HeatOn[Dryer1] = Heat1;
    HeatOn[Dryer2] = Heat2;
    HeatOn[Dryer3] = Heat3;
    SprayInterLock = False;
    OnSignal[Dryer1] = On1;
    OnSignal[Dryer2] = On2;
    OnSignal[Dryer3] = On3;
    OnSw[Dryer1] = ConfigData->Dryer1On;
    OnSw[Dryer2] = ConfigData->Dryer2On;
    OnSw[Dryer3] = ConfigData->Dryer3On;
    Operating[Dryer1] = Operating1;
    Operating[Dryer2] = Operating2;
    Operating[Dryer3] = Operating3;
    Power[Dryer1] = ConfigData->Dryer1Speed;
    Power[Dryer2] = ConfigData->Dryer2Speed;
    Power[Dryer3] = ConfigData->Dryer3Speed;
```

C-DOC DRYERS.CPP

```
  Speed[Dryer1] = Speed1;
  Speed[Dryer2] = Speed2;
  Speed[Dryer3] = Speed3;
  if( !( typeOmatic = new Timer ) )
  {
  | cerr << "Dryers unable to create typeOmatic Timer" << endl;
  | exit( EXIT_FAILURE );
  }
  Build();
}

Dryers::~Dryers()                // the destructor
{
  for( uint u = 0; u < 3; u++ )
  #  delete Control[u];
  delete Dryer;
  delete typeOmatic;
}

// (re)build the control panels for the installed dryers
void Dryers::Build( void )
{
  char *Label[] = { "SW DRYER 1", "SW DRYER 2", "SW DRYER 3" };
  GPoint minAnchor[] = { { D1minAnchor }, { D2minAnchor }, { D3minAnchor } };
  GRect MaxFrame, MinFrame;
  void *TempPointer;
  if( !DryerUnits )
  {
  | delete Dryer;
  | Dryer = 0;
  }
  if( DryerUnits && !Dryer )
  | if( !( Dryer = new RemoteStation( 6 ) ) )
  | {
  | | cerr << "Dryers unable to create RemoteStation" << endl;
  | | exit( EXIT_FAILURE );
  | }
  for( uint u = 0; u < 3; u++ )
  {
  # if( DryerUnits )
  # {
  # | Dryer->ConfigIO( BlowerOn[u], RemoteStation::DigitalInput );
  # | Dryer->ConfigIO( FullZone[u], RemoteStation::DigitalOutput );
  # | Dryer->ConfigIO( HeatOn[u], RemoteStation::DigitalInput );
  # | Dryer->ConfigIO( LastImpression, RemoteStation::DigitalInput );
  # | Dryer->ConfigIO( OnSignal[u], RemoteStation::DigitalOutput );
  # | Dryer->ConfigIO( Operate, RemoteStation::DigitalOutput );
  # | Dryer->ConfigIO( Operating[u], RemoteStation::DigitalInput );
  # | Dryer->ConfigIO( PowerOn, RemoteStation::DigitalInput );
  # | Dryer->ConfigIO( PressInterLock, RemoteStation::DigitalInput );
  # | Dryer->ConfigIO( Speed[u], RemoteStation::AnalogOutput );
  # }
  # delete Control[u];
  # OK2Max[u] = False;
  # // construct both views of a dryer panel
  # MaxFrame.moveTo( MaxPanelAnchor ); MaxFrame.growTo( MaxPanelSize );
  # MinFrame.moveTo( minAnchor[u] ); MinFrame.growTo( MinPanelSize );
  # if( !( Control[u] = new Panel( MaxFrame, MinFrame, Label[u] ) ) )
  # {
  # | cerr << "Dryers::Build unable to create Control Panel" << endl;
  # | exit( EXIT_FAILURE );
  # }
```

C-DOC DRYERS.CPP

```
# if( u < DryersDisplayed )
# {
# | MaxFrame.moveTo( MaxPanelAnchor ); MaxFrame.growTo( MaxDispSize );
# | MaxFrame.move( MaxDispOffset );
# | if( !( TempPointer = new ReadOut( MaxFrame, MaxDigitSize, 3,
# | | : : : GREEN )))
# | {
# | | cerr << "Dryers::Build unable to create ReadOut" << endl;
# | | exit( EXIT_FAILURE );
# | }
# | Control[u]->addReadOut( True, (ReadOut*)TempPointer );
# | MinFrame.moveTo( minAnchor[u] ); MinFrame.growTo( MinDispSize );
# | MinFrame.move( MinDispOffset );
# | if( !( TempPointer = new ReadOut( MinFrame, MinDigitSize, 3,
# | | : : : YELLOW )))
# | {
# | | cerr << "Dryers::Build unable to create ReadOut" << endl;
# | | exit( EXIT_FAILURE );
# | }
# | Control[u]->addReadOut( False, (ReadOut*)TempPointer );
# | Control[u]->Display( ReadOut::Off );
# | Control[u]->DispVal( Power[u] );
# | MaxFrame.moveTo( MaxPanelAnchor ); MaxFrame.growTo( MaxButtonSize );
# | MaxFrame.move( MaxButtonTopRow ); MaxFrame.move( MaxButtonCol1of4 );
# | MinFrame.moveTo( minAnchor[u] ); MinFrame.growTo( MinButtonSize );
# | MinFrame.move( MinButtonTopRow ); MinFrame.move( MinButtonCol1of4 );
# | Control[u]->addButton( MaxFrame, MinFrame, Button::Indicator,
# | : "OPERATE", "OP" );
# | MaxFrame.moveTo( MaxPanelAnchor ); MaxFrame.growTo( MaxButtonSize );
# | MaxFrame.move( MaxButtonTopRow ); MaxFrame.move( MaxButtonCol2of4 );
# | MinFrame.moveTo( minAnchor[u] ); MinFrame.growTo( MinButtonSize );
# | MinFrame.move( MinButtonTopRow ); MinFrame.move( MinButtonCol2of4 );
# | Control[u]->addButton( MaxFrame, MinFrame, Button::Indicator,
# | : "INTER LOCK", "I/L" );
# | MaxFrame.moveTo( MaxPanelAnchor ); MaxFrame.growTo( MaxButtonSize );
# | MaxFrame.move( MaxButtonTopRow ); MaxFrame.move( MaxButtonCol3of4 );
# | MinFrame.moveTo( minAnchor[u] ); MinFrame.growTo( MinButtonSize );
# | MinFrame.move( MinButtonTopRow ); MinFrame.move( MinButtonCol3of4 );
# | Control[u]->addButton( MaxFrame, MinFrame, Button::Indicator,
# | : "BLOWER", "BL" );
# | MaxFrame.moveTo( MaxPanelAnchor ); MaxFrame.growTo( MaxButtonSize );
# | MaxFrame.move( MaxButtonTopRow ); MaxFrame.move( MaxButtonCol4of4 );
# | MinFrame.moveTo( minAnchor[u] ); MinFrame.growTo( MinButtonSize );
# | MinFrame.move( MinButtonTopRow ); MinFrame.move( MinButtonCol4of4 );
# | Control[u]->addButton( MaxFrame, MinFrame, Button::Indicator,
# | : "HEAT", "HT" );
# | MaxFrame.moveTo( MaxPanelAnchor ); MaxFrame.growTo( MaxButtonSize );
# | MaxFrame.move( MaxButtonLowRow ); MaxFrame.move( MaxButtonCol1of4 );
# | MinFrame.moveTo( minAnchor[u] ); MinFrame.growTo( MinButtonSize );
# | MinFrame.move( MinButtonLowRow ); MinFrame.move( MinButtonCol1of4 );
# | Control[u]->addButton( MaxFrame, MinFrame, Button::Latching,
# | : "ON", "ON" );
# | Control[u]->Switch( On, OnSw[u] );
# | MaxFrame.moveTo( MaxPanelAnchor ); MaxFrame.growTo( MaxButtonSize );
# | MaxFrame.move( MaxButtonLowRow ); MaxFrame.move( MaxButtonCol4of4 );
# | MinFrame.moveTo( minAnchor[u] ); MinFrame.growTo( MinButtonSize );
# | MinFrame.move( MinButtonLowRow ); MinFrame.move( MinButtonCol4of4 );
# | Control[u]->addButton( MaxFrame, MinFrame, Button::Latching,
# | : "FULL ZONE", "FZ" );
# | Control[u]->Switch( Full, FullSw[u] );
# | MaxFrame.moveTo( MaxPanelAnchor ); MaxFrame.growTo( MaxButtonSize );
# | MaxFrame.move( MaxIncButton );
```

C-DOC DRYERS.CPP

```
    #  |  if( !( TempPointer = new Button( MaxFrame, Button::Momentary,
    #  |  |  :  :  :  " + ", GOTHIC_FONT ) ) )
    #  |  {
    #  |  |  cerr << "Dryers::Build unable to addButton" << endl;
    #  |  |  exit( EXIT_FAILURE );
    #  |  }
    #  |  Control[u]->addButton( True, (Button*)TempPointer );
    #  |  MaxFrame.moveTo( MaxPanelAnchor ); MaxFrame.growTo( MaxButtonSize );
    #  |  MaxFrame.move( MaxDecButton );
    #  |  if( !( TempPointer = new Button( MaxFrame, Button::Momentary,
    #  |  |  :  :  :  " - ", GOTHIC_FONT ) ) )
    #  |  {
    #  |  |  cerr << "Dryers::Build unable to addButton" << endl;
    #  |  |  exit( EXIT_FAILURE );
    #  |  }
    #  |  Control[u]->addButton( True, (Button*)TempPointer );
    #  |  Control[u]->DispVal( Power[u] );
    #  }
    #  Control[u]->Max(); Control[u]->Min();
    }
}

// is this key press appropriate for this panel
Boolean Dryers::CanUse( uint Key )
{
    uint k;
    if( isdigit( Key ) && ( k = Key - '6' ) < DryersDisplayed &&
    |  :  Control[k] && !Control[k]->Maxed() )
=======return True;
    for( uint u = 0; u < DryersDisplayed; u++ )
    #  if( Control[u] && Control[u]->Maxed() &&
    #  |  :  strchr( "OF+-", toupper( Key ) ) )
============return True;
====return False;
}

// initialize the panel displays
void Dryers::DispInit( SheetFedConfig *ConfigData )
{
    DryersDisplayed = ConfigData->DryersDisplayed;
    DryerUnits = ConfigData->DryerUnits;
    FullSw[Dryer1] = ConfigData->Dryer1Full;
    FullSw[Dryer2] = ConfigData->Dryer2Full;
    FullSw[Dryer3] = ConfigData->Dryer3Full;
    OnSw[Dryer1] = ConfigData->Dryer1On;
    OnSw[Dryer2] = ConfigData->Dryer2On;
    OnSw[Dryer3] = ConfigData->Dryer3On;
    Power[Dryer1] = ConfigData->Dryer1Speed;
    Power[Dryer2] = ConfigData->Dryer2Speed;
    Power[Dryer3] = ConfigData->Dryer3Speed;
    Build();
}

// make all dryer panels hide their display updates
void Dryers::Hide( void )
{
    delete Control[Dryer1];
    Control[Dryer1] = 0;
    delete Control[Dryer2];
    Control[Dryer2] = 0;
    delete Control[Dryer3];
    Control[Dryer3] = 0;
```

C-DOC DRYERS.CPP

```
}

// translate the key press into a push point
GPoint& Dryers::MakePush( uint Key )
{
   static GPoint Push( -1, -1 );
   uint k;
   if( isdigit( Key ) && ( k = Key - '6' ) < 3 )
   {
   | Push.x = MinPanelSize.x / 2;
   | Push.y = MinPanelSize.y / 2;
   | switch( k )
   | {
   | case Dryer1: Push += D1minAnchor; break;
   | case Dryer2: Push += D2minAnchor; break;
   | case Dryer3: Push += D3minAnchor; break;
   | }
   }
   if( strchr( "OF+-", toupper( Key ) ) )
   {
   | Push.x = MaxButtonSize.x / 2;
   | Push.y = MaxButtonSize.y / 2;
   | Push += MaxPanelAnchor;
   | switch( toupper( Key ) )
   | {
   | case 'O':
   | | Push += MaxButtonLowRow;
   | | Push += MaxButtonCol1of4;
   | |===break;
   | case 'F':
   | | Push += MaxButtonLowRow;
   | | Push += MaxButtonCol4of4;
   | |===break;
   | case '+':
   | | Push += MaxIncButton;
   | |===break;
   | case '-':
   | | Push += MaxDecButton;
   | |===break;
   | }
   }
====return Push;
}

// see if we should maximize
void Dryers::Max( void )
{
   for( uint u = 0; u < 3; u++ )    // MaxDryerUnits
   # if( Control[u] && OK2Max[u] )
   # | Control[u]->Max();
}

// see if we are maximized
Boolean Dryers::Maxed( void )
{
   Boolean Maximized = False;
   for( uint u = 0; u < 3; u++ )    // MaxDryerUnits
   # if( Control[u] && Control[u]->Maxed() )
   # | Maximized = True;
====return Maximized;
}
```

C-DOC DRYERS.CPP

```
// minimize this panel
void Dryers::Min( void )
{
   for( uint u = 0; u < 3; u++ )     // MaxDryerUnits
   #  if( Control[u] )
   #  |  Control[u]->Min();
}

// do the io functions
void Dryers::runIO( void )
{
   Active = False;
   for( uint u = 0; u < 3; u++ )     // MaxDryerUnits
   {
   #  Boolean InterLockOn = False;
   #  if( Dryer )
   #  {
   #  |  if( Dryer->GetDigital( PressInterLock ) )
   #  |  |  Active = InterLockOn = True;
   #  |  if( DryerUnits == 3 && Dryer->GetDigital( LastImpression ) )
   #  |  |  Active = InterLockOn = True;
   #  |  if( Dryer->GetDigital( PowerOn ) && OnSw[u] &&
   #  |  |  :  u < DryerUnits && u < DryersDisplayed )
   #  |  {
   #  |  |  Dryer->SetDigital( OnSignal[u], True );
   #  |  |  if( InterLockOn )
   #  |  |  {
   #  |  |  |  OperateOn[u] = True;
   #  |  |  |  Dryer->SetAnalog( Speed[u],
   #  |  |  |  :  (uint)( Power[u] * 4095L / 100L ) );// 12 bits
//                    (uint)( Power[u] * 4095L / 100L ) & ~1 );     // 11 bit even
//                    (uint)( Power[u] * 4095L / 100L ) | 1 );      // 11 bit odd
   #  |  |  }
   #  |  |  else
   #  |  |  {
   #  |  |  |  OperateOn[u] = False;
   #  |  |  |  Dryer->SetAnalog( Speed[u], 0 );
   #  |  |  }
   #  |  |  if( FullSw[u] )
   #  |  |  |  Dryer->SetDigital( FullZone[u], True );
   #  |  |  else
   #  |  |  |  Dryer->SetDigital( FullZone[u], False );
   #  |  }
   #  |  else
   #  |  {
   #  |  |  Dryer->SetDigital( OnSignal[u], False );
   #  |  |  Dryer->SetAnalog( Speed[u], 0 );
   #  |  |  Dryer->SetDigital( FullZone[u], False );
   #  |  |  OperateOn[u] = False;
   #  |  }
   #  |  if( OperateOn[Dryer1] || OperateOn[Dryer2] || OperateOn[Dryer3] ||
   #  |  |  :  SprayInterLock )
   #  |  |  Dryer->SetDigital( Operate, True );
   #  |  else
   #  |  |  Dryer->SetDigital( Operate, False );
   #  }
   #  if( u < DryersDisplayed && Control[u] )
   #  {
   #  |  FullSw[u] = Control[u]->Switch( Full );
   #  |  OnSw[u] = Control[u]->Switch( On );
   #  |  Power[u] = Control[u]->DispVal();
   #  |  if( OnSw[u] )
```

C-DOC DRYERS.CPP

```
  # | {
  # | | Control[u]->Display( ReadOut::On );
  # | | if( typeOmatic->Expired() && ( Control[u]->Switch( Inc ) ||
  # | | | : : Control[u]->Switch( Dec ) ) )
  # | | {
  # | | | if( Control[u]->Switch( Inc ) &&
  # | | | | : Control[u]->DispVal() < 100 )
  # | | | | Control[u]->DispVal( Control[u]->DispVal() + 1 );
  # | | | if( Control[u]->Switch( Dec ) &&
  # | | | | : Control[u]->DispVal() > 0 )
  # | | | | Control[u]->DispVal( Control[u]->DispVal() - 1 );
  # | | | typeOmatic->Set( 4 );
  # | | }
  # | | if( FullSw[u] )
  # | | | Control[u]->Light( Full, YELLOW );
  # | | else
  # | | | Control[u]->Light( Full, DARKGRAY );
  # | | if( InterLockOn )
  # | | | Control[u]->Light( InterLock, GREEN );
  # | | else
  # | | | Control[u]->Light( InterLock, DARKGRAY );
  # | | Control[u]->Light( On, YELLOW );
  # | | if( Dryer )
  # | | {
  # | | | if( Dryer->GetDigital( BlowerOn[u] ) )
  # | | | | Control[u]->Light( Blower, GREEN );
  # | | | else
  # | | | | Control[u]->Light( Blower, DARKGRAY );
  # | | | if( Dryer->GetDigital( HeatOn[u] ) )
  # | | | | Control[u]->Light( Heat, GREEN );
  # | | | else
  # | | | | Control[u]->Light( Heat, DARKGRAY );
  # | | | if( Dryer->GetDigital( Operating[u] ) )
  # | | | | Control[u]->Light( OperateL, GREEN );
  # | | | else
  # | | | | Control[u]->Light( OperateL, DARKGRAY );
  # | | }
  # | | else
  # | | {
  # | | | Control[u]->Light( Blower, DARKGRAY );
  # | | | Control[u]->Light( Heat, DARKGRAY );
  # | | | Control[u]->Light( OperateL, DARKGRAY );
  # | | }
  # | }
  # | else
  # | {
  # | | Control[u]->Display( ReadOut::Off );
  # | | Control[u]->Light( Blower, DARKGRAY );
  # | | Control[u]->Light( Full, DARKGRAY );
  # | | Control[u]->Light( Heat, DARKGRAY );
  # | | Control[u]->Light( InterLock, DARKGRAY );
  # | | Control[u]->Light( On, DARKGRAY );
  # | | Control[u]->Light( OperateL, DARKGRAY );
  # | }
  # }
  }
}

// set the interlock state
void Dryers::setInterLock( Boolean Active )
{
  SprayInterLock = Active;
```

C-DOC DRYERS.CPP

```
}

// do the finger poking thing
Boolean Dryers::Touched( GPoint& Push )
{
    for( uint u = 0; u < 3; u++ )
    #  if( u < DryersDisplayed && Control[u] )
    #  |  OK2Max[u] = Control[u]->Touched( Push );
    #  else
    #  |  OK2Max[u] = False;
====return(Boolean)( OK2Max[Dryer1] || OK2Max[Dryer2] || OK2Max[Dryer3] );
}

// change configuration
void Dryers::UpdateSetup( SheetFedConfig *ConfigData )
{
    ConfigData->Dryer1Full = FullSw[Dryer1];
    ConfigData->Dryer1On = OnSw[Dryer1];
    ConfigData->Dryer1Speed = Power[Dryer1];
    ConfigData->Dryer2Full = FullSw[Dryer2];
    ConfigData->Dryer2On = OnSw[Dryer2];
    ConfigData->Dryer2Speed = Power[Dryer2];
    ConfigData->Dryer3Full = FullSw[Dryer3];
    ConfigData->Dryer3On = OnSw[Dryer3];
    ConfigData->Dryer3Speed = Power[Dryer3];
}
```

C-DOC HEPTAD.CPP

```

/*****************************\
*                              *
*  heptad.cpp                  *
*                              *
*  Seven Segment Display Graphic  *
*                              *
*  (C) 1993 OXY-DRY CORPORATION  *
*  all rights reserved         *
*                              *
\*****************************/

// 1993 october 25    create seven segment display
// 1993 march 11      and dot matrix display
// 1993 october 10    change copyright for listing

#include <iomanip.h>          // stream i/o manipulators
#include <iostream.h>         // ostream_withassign
#include <stdlib.h>           // exit()
#include <string.h>           // string handling functions
#include <strstrea.h>         // string stream functions
#include "heptad.h"

// Construct a seven segment digit
Heptad::Heptad( GRect& Region, COLORS segments, COLORS face )
{
   Anchor = GPoint( Region.left, Region.top );
   size = GPoint( Region.right - Region.left, Region.bottom - Region.top );
   OnColor = segments;
   OffColor = face;
   digit = Blank;
   reDraw();
}

// Set the display digit
void Heptad::Display( uint value )
{
   if( value > Degree )
   |  value = Blank;
   if( digit != value )
   {
   |  digit = value;
   |  draw();
   }
}

// draw the seven segments in the correct color
void Heptad::draw( void )
{
   setviewport( Anchor.x, Anchor.y,
   :  Anchor.x + size.x, Anchor.y + size.y, True );
   if( size.x > 15 )
   |  setlinestyle( SOLID_LINE, 0xffff, THICK_WIDTH );
   else
   |  setlinestyle( SOLID_LINE, 0xffff, NORM_WIDTH );
   uint n = digit;

   // segment 'a' (top)
   if( n == Zero || n == Two || n == Three || n == Five || n == Six ||
   |  :  n == Seven || n == Eight || n == Nine || n == Ten || n == Twelve ||
   |  :  n == Fourteen || n == Fifteen || n == lgP )
   |  setcolor( OnColor );
```

C-DOC HEPTAD.CPP

```
else
| setcolor( OffColor );
line( 3 * size.x / 10, size.y / 10, 9 * size.x / 10, size.y / 10 );

// segment 'b' (upper right)
if( n == Zero || n == One || n == Two || n == Three || n == Four ||
| : n == Seven || n == Eight || n == Nine || n == Ten || n == Thirteen ||
| : n == lgH || n == lgJ || n == lgP || n == lgU || n == lgY ||
| : n == Degree )
| setcolor( OnColor );
else
| setcolor( OffColor );
line( 9 * size.x / 10, size.y / 10, 8 * size.x / 10, 5 * size.y / 10 );

// segment 'c' (lower right)
if( n == Two || n == Twelve || n == Fourteen || n == Fifteen ||
| : n == Blank || n == smC || n == lgL || n == lgP || n == smR ||
| : n == Minus || n == Equal || n == Degree )
| setcolor( OffColor );
else
| setcolor( OnColor );
line( 8 * size.x / 10, 5 * size.y / 10, 7 * size.x / 10, 9 * size.y / 10 );

// segment 'd' (bottom)
if( n == One || n == Four || n == Seven || n == Ten || n == Fifteen ||
| : n == Blank || n == lgH || n == smH || n == smN || n == lgP ||
| : n == smR || n == Minus || n == Degree )
| setcolor( OffColor );
else
| setcolor( OnColor );
line( 7 * size.x / 10, 9 * size.y / 10, size.x / 10, 9 * size.y / 10 );

// segment 'e' (lower left)
if( n == One || n == Three || n == Four || n == Five || n == Seven ||
| : n == Nine || n == Blank || n == lgY || n == Minus || n == Equal ||
| : n == Degree )
| setcolor( OffColor );
else
| setcolor( OnColor );
line( size.x / 10, 9 * size.y / 10, 2 * size.x / 10, 5 * size.y / 10 );

// segment 'f' (upper left)
if( n == One || n == Two || n == Three || n == Seven || n == Thirteen ||
| : n == Blank || n == smC || n == lgJ || n == smN || n == smO ||
| : n == smR || n == smU || n == Minus || n == Equal )
| setcolor( OffColor );
else
| setcolor( OnColor );
line( 2 * size.x / 10, 5 * size.y / 10, 3 * size.x / 10, size.y / 10 );

// segment 'g' (center)
if( n == Zero || n == One || n == Seven || n == Twelve || n == Blank ||
| : n == lgJ || n == lgL || n == lgU || n == smU )
| setcolor( OffColor );
else
| setcolor( OnColor );
line( 2 * size.x / 10, 5 * size.y / 10, 8 * size.x / 10, 5 * size.y / 10 );
}

void Heptad::LED( COLORS segments )
{
  if( OnColor != segments )
```

C-DOC HEPTAD.CPP

```
{
| OnColor = segments;
| draw();
}
}

void Heptad::reDraw( void )
{
setcolor( OffColor );
setfillstyle( SOLID_FILL, OffColor );
setviewport( Anchor.x, Anchor.y,
:  Anchor.x + size.x, Anchor.y + size.y, True );
GPoint corners[] = { { GPoint( 0, 0 ) },
{ GPoint( 0, size.y ) },
{ GPoint( size.x, size.y ) },
{ GPoint( size.x, 0 ) },
{ GPoint( 0, 0 ) } };
fillpoly( 5, (int *)corners );
draw();
}

MatrixDisplay::MatrixDisplay( const GRect& Frame,
:  const uint Cols, const uint Rows, const COLORS dots )
{
cols = Cols;
rows = Rows;
if( !( dispBuf = new ( char ( *[rows] ) ) ) )
{
| cerr << "MatrixDisplay can't create dispBuf" << endl;
| exit( EXIT_FAILURE );
}
for( uint r = 0; r < rows; r++ )
{
#  if( !( dispBuf[r] = new char[cols + 1] ) )
#  {
#  | cerr << "MatrixDisplay can't create dispBuf" << endl;
#  | exit( EXIT_FAILURE );
#  }
#  for( uint c = 0; c < cols; c++ )
#  #  dispBuf[r][c] = ' ';
#  dispBuf[r][c] = '\0';
}
OnColor = dots;
Anchor.x = Frame.left;
Anchor.y = Frame.top;
size.x = Frame.right - Frame.left;
size.y = Frame.bottom - Frame.top;
reDraw();
}

MatrixDisplay::~MatrixDisplay()
{
for( uint r = 0; r < rows; r++ )
#  delete []dispBuf[r];
delete []dispBuf;
}

void MatrixDisplay::Display( const char **msg )
{
for( uint r = 0; r < rows; r++ )
#  strncpy( dispBuf[r], msg[r], cols );
reDraw();
```

C-DOC HEPTAD.CPP

```
}

void MatrixDisplay::Display( uint Row, uint Col, char *msg )
{
   if( strncmp( &dispBuf[Row][Col], msg,
   | : : (strlen( msg ) > cols - Col) ? strlen( msg ) : cols - Col ) )
   | {
   | : strncpy( &dispBuf[Row][Col], msg, cols - Col );
   | : reDraw();
   | }
}

void MatrixDisplay::reDraw( void )
{
   GPoint corners[] = { { GPoint( 0, 0 ) },
   { GPoint( 0, size.y ) },
   { GPoint( size.x, size.y ) },
   { GPoint( size.x, 0 ) },
   { GPoint( 0, 0 ) } };
   setcolor( LIGHTGRAY );
   setfillstyle( SOLID_FILL, DARKGRAY );
   setviewport( Anchor.x, Anchor.y, Anchor.x + size.x, Anchor.y + size.y,
   : True );
   fillpoly( 5, (int *)corners );
   uint scale = 10;
   while( scale )
   {
   #  settextstyle( DEFAULT_FONT, HORIZ_DIR, scale );
   #  if( textwidth( "B" ) * cols < size.x &&
   #  | : textheight( "B" ) * rows < size.y )
   #  {
   #  | GPoint border( ( size.x - textwidth( "B" ) * cols ) / 2,
   #  | : ( size.y - textheight( "B" ) * rows ) / 2 );
   #  | setcolor( BLACK );
   #  | setfillstyle( SOLID_FILL, BLACK );
   #  | corners[0] = GPoint( border.x, border.y );
   #  | corners[1] = GPoint( border.x, size.y - border.y );
   #  | corners[2] = GPoint( size.x - border.x, size.y - border.y );
   #  | corners[3] = GPoint( size.x - border.x, border.y );
   #  | corners[4] = GPoint( border.x, border.y );
   #  | fillpoly( 5, (int *)corners );
   #  | settextjustify( LEFT_TEXT, BOTTOM_TEXT );
   #  | setcolor( YELLOW );
   #  | for( uint r = 0; r < rows; r++ )
   #  | #  outtextxy( border.x, textheight( "B" ) * ( r + 1 ) + border.y,
   #  | #  : dispBuf[r] );
   #=======break;
   #  }
   #  scale--;
   }
}

ReadOut::ReadOut( const GRect& Frame,
: const GPoint& Size, const uint Digits, const COLORS segments )
{
   if( !( dispBuf = new char[Digits + 1] ) )
   {
   | cerr << "ReadOut can't create dispBuf" << endl;
   | exit( EXIT_FAILURE );
   }
   Anchor.x = Frame.left;
   Anchor.y = Frame.top;
```

C-DOC HEPTAD.CPP

```
    size.x = Frame.right - Frame.left;
    size.y = Frame.bottom - Frame.top;
    if( !( Digit = new ( Heptad( *[Digits] ) ) ) )
    {
    |  cerr << "ReadOut can't create Heptad Digits" << endl;
    |  exit( EXIT_FAILURE );
    }
    OnColor = segments;
    digits = 0;
    reDraw();
    GPoint aPoint( size.x, size.y );
    aPoint.x -= Size.x * Digits;
    aPoint.y -= Size.y - 1;
    aPoint.x /= 2;
    aPoint.y /= 2;
    aPoint += Anchor;
    for( uint d = 0; d < Digits; d++ )
    {
    #  if( !( Digit[d] = new Heptad( GRect( aPoint.x, aPoint.y,
    #  |  :  :  :  :  aPoint.x + Size.x, aPoint.y + Size.y ), segments ) ) )
    #  {
    #  |  cerr << "MatrixDisplay can't create Heptad Digit" << endl;
    #  |  exit( EXIT_FAILURE );
    #  }
    #  aPoint.x += Size.x;
    #  dispBuf[d] = ' ';
    }
    digits = Digits;
}

ReadOut::~ReadOut()
{
    delete []dispBuf;
    for( uint d = 0; d < digits; d++ )
    #  delete Digit[d];
    delete []Digit;
}

uint ReadOut::char2Heptad( char Chr )
{
    switch( Chr )
    {
    case '0':
=======return Heptad::Zero;
    case '1':
=======return Heptad::One;
    case '2':
=======return Heptad::Two;
    case '3':
=======return Heptad::Three;
    case '4':
=======return Heptad::Four;
    case '5':
    case 'S':
=======return Heptad::Five;
    case '6':
=======return Heptad::Six;
    case '7':
=======return Heptad::Seven;
    case '8':
    case 'B':
=======return Heptad::Eight;
```

C-DOC HEPTAD.CPP

```
    case '9':
    case 'g':
========return Heptad::Nine;
    case 'A':
========return Heptad::Ten;
    case 'b':
========return Heptad::Eleven;
    case 'C':
========return Heptad::Twelve;
    case 'd':
========return Heptad::Thirteen;
    case 'E':
========return Heptad::Fourteen;
    case 'F':
========return Heptad::Fifteen;
    case ' ':
========return Heptad::Blank;
    case 'c':
========return Heptad::smC;
    case 'H':
========return Heptad::lgH;
    case 'h':
========return Heptad::smH;
    case 'J':
========return Heptad::lgJ;
    case 'L':
========return Heptad::lgL;
    case 'n':
========return Heptad::smN;
    case 'o':
========return Heptad::smO;
    case 'P':
========return Heptad::lgP;
    case 'r':
========return Heptad::smR;
    case 'U':
========return Heptad::lgU;
    case 'u':
========return Heptad::smU;
    case 'Y':
    case 'y':
========return Heptad::lgY;
    case '-':
========return Heptad::Minus;
    case '=':
========return Heptad::Equal;
    case '@':
========return Heptad::Degree;
    }
====return Heptad::Blank;
}

char const*ReadOut::Display( void )
{
    dispBuf[digits] = '\0';
====return dispBuf;
}

void ReadOut::Display( char const*msg )
{
    strncpy( dispBuf, msg, digits );
    for( uint d = 0; d < digits; d++ )
```

C-DOC HEPTAD.CPP

```
   #  Digit[d]->Display( char2Heptad( dispBuf[d] ) );
}

void ReadOut::Display( int num )
{
   strstream Dsp( dispBuf, digits, ios::out );
   Dsp << setw( digits ) << num;
   for( uint d = 0; d < digits; d++ )
   #  Digit[d]->Display( char2Heptad( dispBuf[d] ) );
}

void ReadOut::LED( OnOff Lit )
{
   for( uint d = 0; d < digits; d++ )
   #  if( Lit )
   #  |  Digit[d]->LED( OnColor );
   #  else
   #  |  Digit[d]->LED( BLACK );
}

void ReadOut::reDraw( void )
{
   GPoint corners[] = { { GPoint( 0, 0 ) },
   { GPoint( 0, size.y ) },
   { GPoint( size.x, size.y ) },
   { GPoint( size.x, 0 ) },
   { GPoint( 0, 0 ) } };
   setcolor( LIGHTGRAY );
   setfillstyle( SOLID_FILL, DARKGRAY );
   setviewport( Anchor.x, Anchor.y, Anchor.x + size.x, Anchor.y + size.y,
   :  True );
   fillpoly( 5, (int *)corners );
   for( uint d = 0; d < digits; d++ )
   #  Digit[d]->reDraw();
}
```

C-DOC KNIFE.CPP

```
/****************************\
*                            *
*  knife.cpp                 *
*                            *
*  Sheet Feed Printing Press AirKnife/Sprayer/Filler *
*  Control Panel             *
*                            *
*  (C) 1993 OXY-DRY CORPORATION *
*  all rights reserved       *
*                            *
\****************************/

// 1993 april 22 construct blank panels and let configuration add details
// 1993 july 17      revised spec for pre-heat handling
// 1993 august 11    allow panels to function with io disabled
// 1993 october 10   change copyright for listing

#include <ctype.h>            // is...(), toupper()
#include <graphics.h>         // graphics primitives
#include <iostream.h>         // ostream_withassign
#include <stdlib.h>           // exit()
#include <string.h>           // str...()
#include "knife.h"

// the constructor
KnifeSprayerFiller::KnifeSprayerFiller( SheetFedConfig *ConfigData )
{
   Active = False;
   Control[Filler] = 0;// new Panel( MaxFrame, MinFrame, "AUTO FILLER" );
   Control[Knife] = 0; // new Panel( MaxFrame, MinFrame, "AIR KNIFE" );
   Control[Sprayer] = 0; // new Panel( MaxFrame, MinFrame, "SPRAYER" );
   EvacInstalled = ConfigData->EvacInstalled;
   Fill = 0;
   FillFaultDelay = 0;
   FillAutoSw = ConfigData->FillerAuto;
   FillerDisplayed = ConfigData->FillerDisplayed;
   FillerInstalled = ConfigData->FillerInstalled;
   FillOnSw = ConfigData->FillerOn;
   FillTime = ConfigData->FillTime;
   InterLockOn = False;
   Interval = ConfigData->FillInterval;
   KnifeFaultDelay = 0;
   KnifeDisplayed = ConfigData->KnifeDisplayed;
   KnifeInstalled = ConfigData->KnifeInstalled;
   KnifeOnSw = ConfigData->KnifeOn;
   KnifeSprayFill = 0;
   OK2Max[Filler] = False;
   OK2Max[Knife] = False;
   OK2Max[Sprayer] = False;
   SprayDelay = 0;
   SprayDelayTime = ConfigData->SprayDelay;
   SprayerDisplayed = ConfigData->SprayerDisplayed;
   SprayerInstalled = ConfigData->SprayerInstalled;
   SprayInterLock = False;
   SprayManSw = ConfigData->SprayerBypass;
   SprayOnSw = ConfigData->SprayerOn;
   SprayRate = ConfigData->SpraySpeed;
   typeOmatic = 0;
   warmUp = 0;
   warmUpTime = ConfigData->WarmUpTime;
   time( &Begin );
```

C-DOC KNIFE.CPP

```
Elapsed = difftime( Begin, time(0) );
if( !( Fill = new Timer ) )
{
| cerr << "KnifeSprayerFiller can't create Fill Timer" << endl;
| exit( EXIT_FAILURE );
}
if( !( FillFaultDelay = new Timer ) )
{
| cerr << "KnifeSprayerFiller can't create FillFaultDelay Timer" << endl;
| exit( EXIT_FAILURE );
}
if( !( KnifeFaultDelay = new Timer ) )
{
| cerr << "KnifeSprayerFiller can't create KnifeFaultDelay Timer"
| << endl;
| exit( EXIT_FAILURE );
}
if( !( SprayDelay = new Timer ) )
{
| cerr << "KnifeSprayerFiller can't create SprayDelay Timer" << endl;
| exit( EXIT_FAILURE );
}
if( !( typeOmatic = new Timer ) )
{
| cerr << "KnifeSprayerFiller can't create typeOmatic Timer" << endl;
| exit( EXIT_FAILURE );
}
if( !( warmUp = new Timer ) )
{
| cerr << "KnifeSprayerFiller can't create warmUp Timer" << endl;
| exit( EXIT_FAILURE );
}
Build();
}

KnifeSprayerFiller::~KnifeSprayerFiller()// the destructor
{
  delete Control[Filler];
  delete Control[Knife];
  delete Control[Sprayer];
  delete Fill;
  delete FillFaultDelay;
  delete KnifeFaultDelay;
  delete KnifeSprayFill;
  delete SprayDelay;
  delete typeOmatic;
  delete warmUp;
}

// (re)build the control panels for the air knife, auto filler and sprayer
void KnifeSprayerFiller::Build( void )
{
  if( FillerInstalled || KnifeInstalled || SprayerInstalled )
  {
  | if( !KnifeSprayFill )
  | | if( !( KnifeSprayFill = new RemoteStation( 4 ) ) )
  | | {
  | | | cerr << "KnifeSprayerFiller can't create RemoteStation" << endl;
  | | | exit( EXIT_FAILURE );
  | | }
  | KnifeSprayFill->ConfigIO( EvacMotor, RemoteStation::DigitalOutput );
  | KnifeSprayFill->ConfigIO( EvacSense, RemoteStation::DigitalInput );
```

C-DOC KNIFE.CPP

```
| KnifeSprayFill->ConfigIO( FillMotor, RemoteStation::DigitalOutput );
| KnifeSprayFill->ConfigIO( FillSense, RemoteStation::DigitalInput );
| KnifeSprayFill->ConfigIO( FuseOK, RemoteStation::DigitalInput );
| KnifeSprayFill->ConfigIO( InterLock, RemoteStation::DigitalOutput );
| KnifeSprayFill->ConfigIO( KnifeMotor, RemoteStation::DigitalOutput );
| KnifeSprayFill->ConfigIO( KnifeSense, RemoteStation::DigitalInput );
| KnifeSprayFill->ConfigIO( LastImpression, RemoteStation::DigitalInput );
| KnifeSprayFill->ConfigIO( SprayMotor, RemoteStation::AnalogOutput );
| KnifeSprayFill->ConfigIO( TransAir, RemoteStation::DigitalOutput );
| KnifeSprayFill->ConfigIO( TubeOK, RemoteStation::DigitalInput );
}
else
{
| delete KnifeSprayFill;
| KnifeSprayFill = 0;
}
delete Control[Filler];
delete Control[Knife];
delete Control[Sprayer];
GRect MaxFrame, MinFrame;
void *TempPointer;
// construct both views of the air knife panel
if( KnifeSprayFill && !KnifeInstalled )
{
| KnifeSprayFill->SetDigital( EvacMotor, False );
| KnifeSprayFill->SetDigital( KnifeMotor, False );
}
MaxFrame.moveTo( MaxPanelAnchor ); MaxFrame.growTo( MaxPanelSize );
MinFrame.moveTo( AKminAnchor ); MinFrame.growTo( MinPanelSize );
if( !( Control[Knife] = new Panel( MaxFrame, MinFrame, "AIR KNIFE" ) ) )
{
| cerr << "KnifeSprayerFiller::Build can't create Knife Control Panel"
| << endl;
| exit( EXIT_FAILURE );
}
if( KnifeDisplayed )
{
| MaxFrame.moveTo( MaxPanelAnchor ); MaxFrame.growTo( MaxButtonSize );
| MaxFrame.move( MaxButtonTopRow ); MaxFrame.move( MaxButtonCol1of4 );
| MinFrame.moveTo( AKminAnchor ); MinFrame.growTo( MinButtonSize );
| MinFrame.move( MinButtonTopRow ); MinFrame.move( MinButtonCol1of4 );
| Control[Knife]->addButton( MaxFrame, MinFrame, Button::Indicator,
| :  "OPERATE", "OP" );
| MaxFrame.moveTo( MaxPanelAnchor ); MaxFrame.growTo( MaxButtonSize );
| MaxFrame.move( MaxButtonTopRow ); MaxFrame.move( MaxButtonCol2of3 );
| MinFrame.moveTo( AKminAnchor ); MinFrame.growTo( MinButtonSize );
| MinFrame.move( MinButtonTopRow ); MinFrame.move( MinButtonCol2of3 );
| Control[Knife]->addButton( MaxFrame, MinFrame, Button::Indicator,
| :  "INTER LOCK", "I/L" );
| MaxFrame.moveTo( MaxPanelAnchor ); MaxFrame.growTo( MaxButtonSize );
| MaxFrame.move( MaxButtonTopRow ); MaxFrame.move( MaxButtonCol4of4 );
| MinFrame.moveTo( AKminAnchor ); MinFrame.growTo( MinButtonSize );
| MinFrame.move( MinButtonTopRow ); MinFrame.move( MinButtonCol4of4 );
| Control[Knife]->addButton( MaxFrame, MinFrame, Button::Indicator,
| :  "ELECTRIC FAULT", "FT" );
| MaxFrame.moveTo( MaxPanelAnchor ); MaxFrame.growTo( MaxButtonSize );
| MaxFrame.move( MaxButtonLowRow ); MaxFrame.move( MaxButtonCol1of4 );
| MinFrame.moveTo( AKminAnchor ); MinFrame.growTo( MinButtonSize );
| MinFrame.move( MinButtonLowRow ); MinFrame.move( MinButtonCol1of4 );
| Control[Knife]->addButton( MaxFrame, MinFrame, Button::Latching,
| :  "ON", "ON" );
| Control[Knife]->Switch( KnifeON, KnifeOnSw );
```

C-DOC KNIFE.CPP

```
| MaxFrame.moveTo( MaxPanelAnchor ); MaxFrame.growTo( MaxButtonSize );
| MaxFrame.move( MaxButtonLowRow ); MaxFrame.move( MaxButtonCol4of4 );
| MinFrame.moveTo( AKminAnchor ); MinFrame.growTo( MinButtonSize );
| MinFrame.move( MinButtonLowRow ); MinFrame.move( MinButtonCol4of4 );
| Control[Knife]->addButton( MaxFrame, MinFrame, Button::Latching,
| : "PREHEAT", "PH" );
}
Control[Knife]->Max(); Control[Knife]->Min();
// construct both views of the auto filler panel
if( KnifeSprayFill && !FillerInstalled )
{
| KnifeSprayFill->SetDigital( FillMotor, False );
}
MaxFrame.moveTo( MaxPanelAnchor ); MaxFrame.growTo( MaxPanelSize );
MinFrame.moveTo( AFminAnchor ); MinFrame.growTo( MinPanelSize );
if( !( Control[Filler] = new Panel( MaxFrame, MinFrame, "AUTO FILLER" ) ) )
{
| cerr << "KnifeSprayerFiller::Build can't create Filler Control Panel"
| << endl;
| exit( EXIT_FAILURE );
}
if( FillerDisplayed )
{
| MaxFrame.moveTo( MaxPanelAnchor ); MaxFrame.growTo( MaxButtonSize );
| MaxFrame.move( MaxButtonTopRow ); MaxFrame.move( MaxButtonCol1of3 );
| MinFrame.moveTo( AFminAnchor ); MinFrame.growTo( MinButtonSize );
| MinFrame.move( MinButtonTopRow ); MinFrame.move( MinButtonCol1of3 );
| Control[Filler]->addButton( MaxFrame, MinFrame, Button::Indicator,
| : "ELECTRIC FAULT", "FT" );
| MaxFrame.moveTo( MaxPanelAnchor ); MaxFrame.growTo( MaxButtonSize );
| MaxFrame.move( MaxButtonTopRow ); MaxFrame.move( MaxButtonCol2of3 );
| MinFrame.moveTo( AFminAnchor ); MinFrame.growTo( MinButtonSize );
| MinFrame.move( MinButtonTopRow ); MinFrame.move( MinButtonCol2of3 );
| Control[Filler]->addButton( MaxFrame, MinFrame, Button::Indicator,
| : "INTER LOCK", "I/L" );
| MaxFrame.moveTo( MaxPanelAnchor ); MaxFrame.growTo( MaxButtonSize );
| MaxFrame.move( MaxButtonTopRow ); MaxFrame.move( MaxButtonCol3of3 );
| MinFrame.moveTo( AFminAnchor ); MinFrame.growTo( MinButtonSize );
| MinFrame.move( MinButtonTopRow ); MinFrame.move( MinButtonCol3of3 );
| Control[Filler]->addButton( MaxFrame, MinFrame, Button::Indicator,
| : "FILLING", "FI" );
| MaxFrame.moveTo( MaxPanelAnchor ); MaxFrame.growTo( MaxButtonSize );
| MaxFrame.move( MaxButtonLowRow ); MaxFrame.move( MaxButtonCol1of3 );
| MinFrame.moveTo( AFminAnchor ); MinFrame.growTo( MinButtonSize );
| MinFrame.move( MinButtonLowRow ); MinFrame.move( MinButtonCol1of3 );
| Control[Filler]->addButton( MaxFrame, MinFrame, Button::Latching,
| : "ON", "ON" );
| Control[Filler]->Switch( FillOn, FillOnSw );
| MaxFrame.moveTo( MaxPanelAnchor ); MaxFrame.growTo( MaxButtonSize );
| MaxFrame.move( MaxButtonLowRow ); MaxFrame.move( MaxButtonCol2of3 );
| MinFrame.moveTo( AFminAnchor ); MinFrame.growTo( MinButtonSize );
| MinFrame.move( MinButtonLowRow ); MinFrame.move( MinButtonCol2of3 );
| Control[Filler]->addButton( MaxFrame, MinFrame, Button::Latching,
| : "AUTO", "AU" );
| Control[Filler]->Switch( FillAuto, FillAutoSw );
| MaxFrame.moveTo( MaxPanelAnchor ); MaxFrame.growTo( MaxButtonSize );
| MaxFrame.move( MaxButtonLowRow ); MaxFrame.move( MaxButtonCol3of3 );
| MinFrame.moveTo( AFminAnchor ); MinFrame.growTo( MinButtonSize );
| MinFrame.move( MinButtonLowRow ); MinFrame.move( MinButtonCol3of3 );
| Control[Filler]->addButton( MaxFrame, MinFrame, Button::Momentary,
| : "MANUAL", "MA" );
}
```

C-DOC KNIFE.CPP

```
Control[Filler]->Max(); Control[Filler]->Min();
// construct both views of the sprayer panel
if( KnifeSprayFill && !SprayerInstalled )
{
| KnifeSprayFill->SetAnalog( SprayMotor, 0 );
| KnifeSprayFill->SetDigital( InterLock, False );
| SprayInterLock = False;
| KnifeSprayFill->SetDigital( TransAir, SprayInterLock );
}
MaxFrame.moveTo( MaxPanelAnchor ); MaxFrame.growTo( MaxPanelSize );
MinFrame.moveTo( SpMinAnchor ); MinFrame.growTo( MinPanelSize );
if( !( Control[Sprayer] = new Panel( MaxFrame, MinFrame, "SPRAYER" ) ) )
{
| cerr << "KnifeSprayerFiller::Build can't create Sprayer Control Panel"
| << endl;
| exit( EXIT_FAILURE );
}
if( SprayerDisplayed )
{
| MaxFrame.moveTo( MaxPanelAnchor ); MaxFrame.growTo( MaxDispSize );
| MaxFrame.move( MaxDispOffset );
| if( !( TempPointer = new ReadOut( MaxFrame, MaxDigitSize, 3,
| | : : : GREEN ) ) )
| {
| | cerr << "KnifeSprayerFiller::Build can't addReadOut" << endl;
| | exit( EXIT_FAILURE );
| }
| Control[Sprayer]->addReadOut( True, (ReadOut*)TempPointer );
| MinFrame.moveTo( SpMinAnchor ); MinFrame.growTo( MinDispSize );
| MinFrame.move( MinDispOffset );
| if( !( TempPointer = new ReadOut( MinFrame, MinDigitSize, 3,
| | : : : YELLOW ) ) )
| {
| | cerr << "KnifeSprayerFiller::Build can't addReadOut" << endl;
| | exit( EXIT_FAILURE );
| }
| Control[Sprayer]->addReadOut( False, (ReadOut*)TempPointer );
| Control[Sprayer]->Display( ReadOut::Off );
| Control[Sprayer]->DispVal( SprayRate );
| MaxFrame.moveTo( MaxPanelAnchor ); MaxFrame.growTo( MaxButtonSize );
| MaxFrame.move( MaxButtonTopRow ); MaxFrame.move( MaxButtonCol1of4 );
| MinFrame.moveTo( SpMinAnchor ); MinFrame.growTo( MinButtonSize );
| MinFrame.move( MinButtonTopRow ); MinFrame.move( MinButtonCol1of4 );
| Control[Sprayer]->addButton( MaxFrame, MinFrame, Button::Indicator,
| : "OPERATE", "OP" );
| MaxFrame.moveTo( MaxPanelAnchor ); MaxFrame.growTo( MaxButtonSize );
| MaxFrame.move( MaxButtonTopRow ); MaxFrame.move( MaxButtonCol2of4 );
| MinFrame.moveTo( SpMinAnchor ); MinFrame.growTo( MinButtonSize );
| MinFrame.move( MinButtonTopRow ); MinFrame.move( MinButtonCol2of4 );
| Control[Sprayer]->addButton( MaxFrame, MinFrame, Button::Indicator,
| : "INTER LOCK", "I/L" );
| MaxFrame.moveTo( MaxPanelAnchor ); MaxFrame.growTo( MaxButtonSize );
| MaxFrame.move( MaxButtonTopRow ); MaxFrame.move( MaxButtonCol3of4 );
| MinFrame.moveTo( SpMinAnchor ); MinFrame.growTo( MinButtonSize );
| MinFrame.move( MinButtonTopRow ); MinFrame.move( MinButtonCol3of4 );
| Control[Sprayer]->addButton( MaxFrame, MinFrame, Button::Indicator,
| : "MOTOR FUSE", "FS" );
| MaxFrame.moveTo( MaxPanelAnchor ); MaxFrame.growTo( MaxButtonSize );
| MaxFrame.move( MaxButtonTopRow ); MaxFrame.move( MaxButtonCol4of4 );
| MinFrame.moveTo( SpMinAnchor ); MinFrame.growTo( MinButtonSize );
| MinFrame.move( MinButtonTopRow ); MinFrame.move( MinButtonCol4of4 );
| Control[Sprayer]->addButton( MaxFrame, MinFrame, Button::Indicator,
```

C-DOC KNIFE.CPP

```
| : "TUBE", "TB" );
| MaxFrame.moveTo( MaxPanelAnchor ); MaxFrame.growTo( MaxButtonSize );
| MaxFrame.move( MaxButtonLowRow ); MaxFrame.move( MaxButtonCol1of4 );
| MinFrame.moveTo( SpMinAnchor ); MinFrame.growTo( MinButtonSize );
| MinFrame.move( MinButtonLowRow ); MinFrame.move( MinButtonCol1of4 );
| Control[Sprayer]->addButton( MaxFrame, MinFrame, Button::Latching,
| : "ON", "ON" );
| Control[Sprayer]->Switch( SprayOn, SprayOnSw );
| MaxFrame.moveTo( MaxPanelAnchor ); MaxFrame.growTo( MaxButtonSize );
| MaxFrame.move( MaxButtonLowRow ); MaxFrame.move( MaxButtonCol4of4 );
| MinFrame.moveTo( SpMinAnchor ); MinFrame.growTo( MinButtonSize );
| MinFrame.move( MinButtonLowRow ); MinFrame.move( MinButtonCol4of4 );
| Control[Sprayer]->addButton( MaxFrame, MinFrame, Button::Latching,
| : "BYPASS", "BY" );
| Control[Sprayer]->Switch( SprayManual, SprayManSw );
| MaxFrame.moveTo( MaxPanelAnchor ); MaxFrame.growTo( MaxButtonSize );
| MaxFrame.move( MaxIncButton );
| if( !( TempPointer = new Button( MaxFrame, Button::Momentary,
| | : : : "+", GOTHIC_FONT ) ) )
| {
| | cerr << "KnifeSprayerFiller::Build can't addButton" << endl;
| | exit( EXIT_FAILURE );
| }
| Control[Sprayer]->addButton( True, (Button*)TempPointer );
| MaxFrame.moveTo( MaxPanelAnchor ); MaxFrame.growTo( MaxButtonSize );
| MaxFrame.move( MaxDecButton );
| if( !( TempPointer = new Button( MaxFrame, Button::Momentary,
| | : : : "-", GOTHIC_FONT ) ) )
| {
| | cerr << "KnifeSprayerFiller::Build can't addButton" << endl;
| | exit( EXIT_FAILURE );
| }
| Control[Sprayer]->addButton( True, (Button*)TempPointer );
}
Control[Sprayer]->Max(); Control[Sprayer]->Min();
}

// is this key press appropriate for this panel
Boolean KnifeSprayerFiller::CanUse( uint Key )
{
if( Control[Knife] && !Control[Knife]->Maxed()
| : && KnifeDisplayed && Key == '3' )
========return True;
if( Control[Filler] && !Control[Filler]->Maxed()
| : && FillerDisplayed && Key == '4' )
========return True;
if( Control[Sprayer] && !Control[Sprayer]->Maxed()
| : && SprayerDisplayed && Key == '5' )
========return True;
if( Control[Knife] && Control[Knife]->Maxed() &&
| : strchr( "OP", toupper( Key ) ) )
========return True;
if( Control[Filler] && Control[Filler]->Maxed() &&
| : strchr( "OAM", toupper( Key ) ) )
========return True;
if( Control[Sprayer] && Control[Sprayer]->Maxed() &&
| : strchr( "OTM+-", toupper( Key ) ) )
========return True;
====return False;
}

// initialize the panel display
```

C-DOC KNIFE.CPP

```
void KnifeSprayerFiller::DispInit( SheetFedConfig *ConfigData )
{
   EvacInstalled = ConfigData->EvacInstalled;
   FillAutoSw = ConfigData->FillerAuto;
   FillerDisplayed = ConfigData->FillerDisplayed;
   FillerInstalled = ConfigData->FillerInstalled;
   FillOnSw = ConfigData->FillerOn;
   FillTime = ConfigData->FillTime;
   Interval = ConfigData->FillInterval;
   KnifeDisplayed = ConfigData->KnifeDisplayed;
   KnifeInstalled = ConfigData->KnifeInstalled;
   KnifeOnSw = ConfigData->KnifeOn;
   SprayDelayTime = ConfigData->SprayDelay;
   SprayerDisplayed = ConfigData->SprayerDisplayed;
   SprayerInstalled = ConfigData->SprayerInstalled;
   SprayManSw = ConfigData->SprayerBypass;
   SprayOnSw = ConfigData->SprayerOn;
   SprayRate = ConfigData->SpraySpeed;
   warmUpTime = ConfigData->WarmUpTime;
   Build();
}

// get the interlock state
Boolean KnifeSprayerFiller::getInterLock( void )
{
   if( KnifeSprayFill )
========return SprayInterLock;
   else
========return False;
}

// make control panels hide their display updates
void KnifeSprayerFiller::Hide( void )
{
   delete Control[Knife];
   delete Control[Filler];
   delete Control[Sprayer];
   Control[Knife] = 0;
   Control[Filler] = 0;
   Control[Sprayer] = 0;
}

// translate the key press into a push point
GPoint& KnifeSprayerFiller::MakePush( uint Key )
{
   static GPoint Push( -1, -1 );
   if( Control[Knife] && !Control[Knife]->Maxed() && Key == '3' )
   {
   |  Push.x = MinPanelSize.x / 2;
   |  Push.y = MinPanelSize.y / 2;
   |  Push += AKminAnchor;
   }
   if( Control[Filler] && !Control[Filler]->Maxed() && Key == '4' )
   {
   |  Push.x = MinPanelSize.x / 2;
   |  Push.y = MinPanelSize.y / 2;
   |  Push += AFminAnchor;
   }
   if( Control[Sprayer] && !Control[Sprayer]->Maxed() && Key == '5' )
   {
   |  Push.x = MinPanelSize.x / 2;
   |  Push.y = MinPanelSize.y / 2;
```

C-DOC KNIFE.CPP

```
| Push += SpMinAnchor;
}
if( Control[Knife] && Control[Knife]->Maxed() &&
| : strchr( "OP", toupper( Key ) ) )
{
| Push.x = MaxButtonSize.x / 2;
| Push.y = MaxButtonSize.y / 2;
| Push += MaxPanelAnchor;
| switch( toupper( Key ) )
| {
| case 'O':
| | Push += MaxButtonLowRow;
| | Push += MaxButtonCol1of4;
| |===break;
| case 'P':
| | Push += MaxButtonLowRow;
| | Push += MaxButtonCol4of4;
| |===break;
| }
}
if( Control[Filler] && Control[Filler]->Maxed() &&
| : strchr( "OAM", toupper( Key ) ) )
{
| Push.x = MaxButtonSize.x / 2;
| Push.y = MaxButtonSize.y / 2;
| Push += MaxPanelAnchor;
| switch( toupper( Key ) )
| {
| case 'O':
| | Push += MaxButtonLowRow;
| | Push += MaxButtonCol1of3;
| |===break;
| case 'A':
| | Push += MaxButtonLowRow;
| | Push += MaxButtonCol2of3;
| |===break;
| case 'M':
| | Push += MaxButtonLowRow;
| | Push += MaxButtonCol3of3;
| |===break;
| }
}
if( Control[Sprayer] && Control[Sprayer]->Maxed() &&
| : strchr( "OTM+-", toupper( Key ) ) )
{
| Push.x = MaxButtonSize.x / 2;
| Push.y = MaxButtonSize.y / 2;
| Push += MaxPanelAnchor;
| switch( toupper( Key ) )
| {
| case 'O':
| | Push += MaxButtonLowRow;
| | Push += MaxButtonCol1of4;
| |===break;
| case 'T':
| | Push += MaxButtonLowRow;
| | Push += MaxButtonCol2of3;
| |===break;
| case 'M':
| | Push += MaxButtonLowRow;
| | Push += MaxButtonCol4of4;
| |===break;
```

C-DOC KNIFE.CPP

```
  | case '+':
  | | Push += MaxIncButton;
  | |===break;
  | case '-':
  | | Push += MaxDecButton;
  | |===break;
  | }
  }
====return Push;
}
// see if we should maximize
void KnifeSprayerFiller::Max( void )
{
  if( OK2Max[Filler] && Control[Filler] )
  | Control[Filler]->Max();
  if( OK2Max[Knife] && Control[Knife] )
  | Control[Knife]->Max();
  if( OK2Max[Sprayer] && Control[Sprayer] )
  | Control[Sprayer]->Max();
}
// answer the query is either panel in the maximized view
Boolean KnifeSprayerFiller::Maxed( void )
{
  Maximized = False;
  if( Control[Filler] && Control[Filler]->Maxed() )
  | Maximized = True;
  if( Control[Knife] && Control[Knife]->Maxed() )
  | Maximized = True;
  if( Control[Sprayer] && Control[Sprayer]->Maxed() )
  | Maximized = True;
====return Maximized;
}
// minimize this panel
void KnifeSprayerFiller::Min( void )
{
  if( Control[Filler] )
  | Control[Filler]->Min();
  if( Control[Knife] )
  | Control[Knife]->Min();
  if( Control[Sprayer] )
  | Control[Sprayer]->Min();
}
// do the io functions
void KnifeSprayerFiller::runIO( void )
{
  const uint Minutes = 1092;      // ticks @ 18.2Hz
  Active = False;
  if( KnifeSprayFill )
  {
  | Boolean OnImpression = KnifeSprayFill->GetDigital( LastImpression );
  | double Seconds = 65536.0 / 3600.0;
  | if( !OnImpression && InterLockOn )
  | | SprayDelay->Set( (uint)( SprayDelayTime * Seconds ) );
  | InterLockOn = OnImpression;
  | if( SprayerDisplayed && SprayerInstalled && SprayOnSw )
  | {
  | | if( InterLockOn || !SprayDelay->Expired() || SprayManSw )
  | | {
```

C-DOC KNIFE.CPP

```
| | | Active = SprayInterLock = True;
| | | KnifeSprayFill->SetDigital( TransAir, SprayInterLock );
| | | KnifeSprayFill->SetAnalog( SprayMotor,
| | | :  (uint)( SprayRate * 4095L / 100L ) );
//          (uint)( SprayRate * 4095L / 100L ) & ~1 ); // even
//          (uint)( SprayRate * 4095L / 100L ) | 1 ); // odd
| | | Elapsed += difftime( Begin, time(0) ) * SprayRate / 100;
| | | time( &Begin );
| | }
| | else
| | {
| | | SprayInterLock = False;
| | | KnifeSprayFill->SetDigital( TransAir, SprayInterLock );
| | | KnifeSprayFill->SetAnalog( SprayMotor, 0 );
| | | time( &Begin );
| | }
| | if( InterLockOn || SprayManSw )
| | | KnifeSprayFill->SetDigital( InterLock, True );
| | else
| | | KnifeSprayFill->SetDigital( InterLock, False );
| }
| else
| {
| | KnifeSprayFill->SetAnalog( SprayMotor, 0 );
| | KnifeSprayFill->SetDigital( InterLock, False );
| | SprayInterLock = False;
| | KnifeSprayFill->SetDigital( TransAir, SprayInterLock );
| | time( &Begin );
| }
| if( KnifeDisplayed && KnifeInstalled && KnifeOnSw )
| {
| | if( !warmUp->Expired() || InterLockOn )
| | {
| | | Active = True;
| | | KnifeSprayFill->SetDigital( EvacMotor, True );
| | | KnifeSprayFill->SetDigital( KnifeMotor, True );
| | }
| | else
| | {
| | | KnifeSprayFill->SetDigital( EvacMotor, False );
| | | KnifeSprayFill->SetDigital( KnifeMotor, False );
| | }
| | if( KnifeSprayFill->GetDigital( KnifeMotor ) ==
| | | :  KnifeSprayFill->GetDigital( KnifeSense ) && (
| | | :  :  !EvacInstalled ||
| | | :  :  KnifeSprayFill->GetDigital( EvacMotor ) ==
| | | :  :  KnifeSprayFill->GetDigital( EvacSense ) ) )
| | | KnifeFaultDelay->Set( 9 );
| }
| else
| {
| | KnifeSprayFill->SetDigital( EvacMotor, False );
| | KnifeSprayFill->SetDigital( KnifeMotor, False );
| | KnifeFaultDelay->Set( 9 );
| }
| if( FillerDisplayed && FillerInstalled && FillOnSw )
| {
| | if( !Fill->Expired() )
| | {
| | | Active = True;
| | | KnifeSprayFill->SetDigital( FillMotor, True );
| | }
```

C-DOC KNIFE.CPP

```
| | else
| | {
| | | KnifeSprayFill->SetDigital( FillMotor, False );
| | }
| | if( KnifeSprayFill->GetDigital( FillSense ) ==
| | | :  KnifeSprayFill->GetDigital( FillMotor ) )
| | | FillFaultDelay->Set( 9 );
| }
| else
| {
| | KnifeSprayFill->SetDigital( FillMotor, False );
| | FillFaultDelay->Set( 9 );
| | Fill->Set( 0 );
| }
}
if( FillerDisplayed && Control[Filler] )
{
| if( FillOnSw )
| {
| | if( FillAutoSw )
| | | Control[Filler]->Light( FillAuto, YELLOW );
| | else
| | | Control[Filler]->Light( FillAuto, DARKGRAY );
| | if( FillFaultDelay->Expired() )
| | | Control[Filler]->Light( FillFault, YELLOW );
| | else
| | | Control[Filler]->Light( FillFault, DARKGRAY );
| | if( InterLockOn )
| | | Control[Filler]->Light( FillInterLock, GREEN );
| | else
| | | Control[Filler]->Light( FillInterLock, DARKGRAY );
| | if( !Fill->Expired() )
| | | Control[Filler]->Light( Filling, GREEN );
| | else
| | {
| | | Control[Filler]->Light( Filling, DARKGRAY );
| | | Control[Filler]->Light( FillManual, DARKGRAY );
| | }
| | if( Control[Filler]->Switch( FillManual ) )
| | | Control[Filler]->Light( FillManual, YELLOW );
| | Control[Filler]->Light( FillOn, YELLOW );
| | if( Control[Filler]->Switch( FillManual ) ||
| | | :  ( FillAutoSw && Elapsed > 60.0 * Interval ) )
| | {
| | | Fill->Set( FillTime * Minutes );
| | | time( &Begin );
| | | Elapsed = difftime( Begin, time(0) );
| | }
| }
| else
| {
| | Control[Filler]->Light( FillAuto, DARKGRAY );
| | Control[Filler]->Light( FillFault, DARKGRAY );
| | Control[Filler]->Light( Filling, DARKGRAY );
| | Control[Filler]->Light( FillInterLock, DARKGRAY );
| | Control[Filler]->Light( FillManual, DARKGRAY );
| | Control[Filler]->Light( FillOn, DARKGRAY );
| | Fill->Set( 0 );
| }
| FillAutoSw = Control[Filler]->Switch( FillAuto );
| FillOnSw = Control[Filler]->Switch( FillOn );
}
```

C-DOC KNIFE.CPP

```
if( KnifeDisplayed && Control[Knife] )
{
| if( KnifeOnSw )
| {
| | if( KnifeFaultDelay->Expired() )
| | | Control[Knife]->Light( KnifeFault, YELLOW );
| | else
| | | Control[Knife]->Light( KnifeFault, DARKGRAY );
| | if( InterLockOn )
| | | Control[Knife]->Light( KnifeInterLock, GREEN );
| | else
| | | Control[Knife]->Light( KnifeInterLock, DARKGRAY );
| | if( !warmUp->Expired() || InterLockOn )
| | | Control[Knife]->Light( KnifeOperate, GREEN );
| | else
| | | Control[Knife]->Light( KnifeOperate, DARKGRAY );
| | if( Control[Knife]->OneShot( KnifePreHeat ) )
| | | if( Control[Knife]->Switch( KnifePreHeat ) )
| | | | warmUp->Set( warmUpTime * Minutes );
| | | else
| | | | warmUp->Set( 0 );
| | if( !warmUp->Expired() )
| | | Control[Knife]->Light( KnifePreHeat, YELLOW );
| | else
| | {
| | | Control[Knife]->UnLatch( KnifePreHeat );
| | | Control[Knife]->Light( KnifePreHeat, DARKGRAY );
| | }
| | Control[Knife]->Light( KnifeON, YELLOW );
| }
| else
| {
| | Control[Knife]->Light( KnifeFault, DARKGRAY );
| | Control[Knife]->Light( KnifeInterLock, DARKGRAY );
| | Control[Knife]->Light( KnifeON, DARKGRAY );
| | Control[Knife]->Light( KnifeOperate, DARKGRAY );
| | Control[Knife]->Light( KnifePreHeat, DARKGRAY );
| | warmUp->Set( 0 );
| }
| KnifeOnSw = Control[Knife]->Switch( KnifeON );
}
if( SprayerDisplayed && Control[Sprayer] )
{
| if( SprayOnSw )
| {
| | Control[Sprayer]->Display( ReadOut::On );
| | if( typeOmatic->Expired() && ( Control[Sprayer]->Switch( SprayInc )
| | | : : || Control[Sprayer]->Switch( SprayDec ) ) )
| | {
| | | if( Control[Sprayer]->Switch( SprayInc ) &&
| | | | : Control[Sprayer]->DispVal() < 100 )
| | | | Control[Sprayer]->DispVal( Control[Sprayer]->DispVal() + 1 );
| | | if( Control[Sprayer]->Switch( SprayDec ) &&
| | | | : Control[Sprayer]->DispVal() > 0 )
| | | | Control[Sprayer]->DispVal( Control[Sprayer]->DispVal() - 1 );
| | | typeOmatic->Set( 4 );
| | }
| | if( KnifeSprayFill )
| | {
| | | if( KnifeSprayFill->GetDigital( FuseOK ) )
| | | | Control[Sprayer]->Light( SprayFuse, GREEN );
| | | else
```

```
| | | | Control[Sprayer]->Light( SprayFuse, DARKGRAY );
| | | if( KnifeSprayFill->GetDigital( TubeOK ) )
| | | | Control[Sprayer]->Light( SprayTube, GREEN );
| | | else
| | | | Control[Sprayer]->Light( SprayTube, DARKGRAY );
| | }
| | else
| | | Control[Sprayer]->Light( SprayFuse, DARKGRAY );
| | if( InterLockOn )
| | | Control[Sprayer]->Light( SprayerInterLock, GREEN );
| | else
| | | Control[Sprayer]->Light( SprayerInterLock, DARKGRAY );
| | if( SprayManSw )
| | | Control[Sprayer]->Light( SprayManual, YELLOW );
| | else
| | | Control[Sprayer]->Light( SprayManual, DARKGRAY );
| | Control[Sprayer]->Light( SprayOn, YELLOW );
| | if( InterLockOn || !SprayDelay->Expired() || SprayManSw )
| | | Control[Sprayer]->Light( SprayOperate, GREEN );
| | else
| | | Control[Sprayer]->Light( SprayOperate, DARKGRAY );
| }
| else
| {
| | Control[Sprayer]->Display( ReadOut::Off );
| | Control[Sprayer]->Light( SprayFuse, DARKGRAY );
| | Control[Sprayer]->Light( SprayerInterLock, DARKGRAY );
| | Control[Sprayer]->Light( SprayManual, DARKGRAY );
| | Control[Sprayer]->Light( SprayOn, DARKGRAY );
| | Control[Sprayer]->Light( SprayOperate, DARKGRAY );
| | Control[Sprayer]->Light( SprayTube, DARKGRAY );
| }
| SprayManSw = Control[Sprayer]->Switch( SprayManual );
| SprayOnSw = Control[Sprayer]->Switch( SprayOn );
| SprayRate = Control[Sprayer]->DispVal();
}
}

// do the finger poking thing
Boolean KnifeSprayerFiller::Touched( GPoint& Push )
{
if( FillerDisplayed && Control[Filler] &&
| : Control[Filler]->Touched( Push ) )
| OK2Max[Filler] = True;
else
| OK2Max[Filler] = False;
if( KnifeDisplayed && Control[Knife] &&
| : Control[Knife]->Touched( Push ) )
| OK2Max[Knife] = True;
else
| OK2Max[Knife] = False;
if( SprayerDisplayed && Control[Sprayer] &&
| : Control[Sprayer]->Touched( Push ) )
| OK2Max[Sprayer] = True;
else
| OK2Max[Sprayer] = False;
====return(Boolean)( OK2Max[Filler] || OK2Max[Knife] || OK2Max[Sprayer] );
}

// change some configurable parameters
void KnifeSprayerFiller::UpdateSetup( SheetFedConfig *ConfigData )
{
```

C-DOC KNIFE.CPP

```
    if( Control[Filler] )
    {
    |  ConfigData->FillerAuto = FillAutoSw;
    |  ConfigData->FillerOn = FillOnSw;
    }
    if( Control[Knife] )
    {
    |  ConfigData->KnifeOn = KnifeOnSw;
    }
    if( Control[Sprayer] )
    {
    |  ConfigData->SprayerBypass = SprayManSw;
    |  ConfigData->SprayerOn = SprayOnSw;
    |  ConfigData->SpraySpeed = SprayRate;
    }
}
```

C-DOC PANEL.CPP

```

/*****************************\
*                            *
*  panel.cpp                 *
*                            *
*  Generic Control Panel     *
*                            *
*  (C) 1993 OXY-DRY CORPORATION *
*  all rights reserved       *
*                            *
\*****************************/

// 1993 november 22
// 1993 march 11     add member functions to support dot matrix display
// 1993 april 29     panel now knows how to redraw itself
// 1993 october 10   change copyright for listing

#include <constrea.h>       // cerr
#include <conio.h>          // getch(), kbhit()
#include <ctype.h>          // is...()
#include <dir.h>            // findfirst()
#include <iomanip.h>        // stream manipulators
#include <iostream.h>       // ostream_withassign
#include <stdlib.h>         // exit()
#include <string.h>         // str...()
#include <strstrea.h>       // strstream
#include "panel.h"

const GPoint AFminAnchor( 86, 289 ), AKminAnchor( 8, 289 ),
BWminAnchor( 8, 8 ), ClockPoint( 590, 10 ), D1minAnchor( 8, 382 ),
D2minAnchor( 86, 382 ), D3minAnchor( 164, 382 ), DispAnchor( 76, 50 ),
DispSize( 488, 32 ), Key0( 540, 150 ), Key1( 0, 150 ), Key2( 60, 150 ),
Key3( 120, 150 ), Key4( 180, 150 ), Key5( 240, 150 ), Key6( 300, 150 ),
Key7( 360, 150 ), Key8( 420, 150 ), Key9( 480, 150 ), KeyA( 45, 270 ),
KeyB( 315, 330 ), KeyBack( 599, 150 ), KeyC( 195, 330 ),
KeyCancel( 15, 330 ), KeyD( 165, 270 ), KeyE( 150, 210 ),
KeyEnter( 585, 270 ), KeyF( 225, 270 ), KeyG( 285, 270 ), KeyH( 345, 270 ),
KeyI( 450, 210 ), KeyJ( 405, 270 ), KeyK( 465, 270 ), KeyL( 525, 270 ),
KeyM( 435, 330 ), KeyN( 375, 330 ), KeyNext( 555, 330 ), KeyO( 510, 210 ),
KeyP( 570, 210 ), KeyPrev( 495, 330 ), KeyQ( 30, 210 ), KeyR( 210, 210 ),
KeyS( 105, 270 ), KeySpace( 105, 390 ), KeyT( 270, 210 ), KeyU( 390, 210 ),
KeyV( 255, 330 ), KeyW( 90, 210 ), KeyX( 135, 330 ), KeyY( 330, 210 ),
KeyZ( 75, 330 ), LargePanelSize( 114, 278 ), MaxButton2ndRow( 0, 200 ),
MaxButton3rdRow( 0, 270 ), MaxButtonCol1of3( 26, 0 ),
MaxButtonCol1of4( 13, 0 ), MaxButtonCol2of3( 93, 0 ),
MaxButtonCol2of4( 66, 0 ), MaxButtonCol3of3( 160, 0 ),
MaxButtonCol3of4( 120, 0 ), MaxButtonCol4of4( 173, 0 ),
MaxButtonLowRow( 0, 340 ), MaxButtonSize( 40, 40 ),
MaxButtonTopRow( 0, 130 ), MaxDecButton( 93, 270 );
const GPoint MaxDigitSize( 30, 54 ), MaxDispOffset( 68, 6 ),
MaxDispSize( 96, 59 ), MaxIncButton( 93, 200 ), MaxIncDecSize( 20, 20 ),
MaxMatDispAnchor( 29, 6 ), MaxMatDispSize( 168, 40 ),
MaxPanelAnchor( 326, 8 ), MaxPanelSize( 226, 464 ),
MaxSwitchCol1of3( 29, 0 ), MaxSwitchCol1of4( 24, 0 ),
MaxSwitchCol2of3( 93, 0 ), MaxSwitchCol2of4( 88, 0 ),
MaxSwitchCol3of3( 157, 0 ), MaxSwitchCol3of4( 152, 0 ),
MaxSwitchCol4of4( 216, 0 ), MaxSwitchRow( 0, 355 ),
MaxSwitchSize( 60, 40 ), MaxTemp1Anchor( 60, 20 ), MaxTemp1Dec( 20, 60 ),
MaxTemp1Inc( 20, 20 ), MaxTemp1Label( 130, 50 ), MaxTemp2Anchor( 160, 20 ),
MaxTemp2Dec( 240, 60 ), MaxTemp2Inc( 240, 20 ), MaxTemp2Label( 150, 50 ),
MaxTemp3Anchor( 60, 100 ), MaxTemp3Dec( 20, 140 ), MaxTemp3Inc( 20, 100 ),
MaxTemp3Label( 130, 130 ), MaxTemp4Anchor( 160, 100 ),
```

C-DOC PANEL.CPP

```
MaxTemp4Dec( 240, 140 ), MaxTemp4Inc( 240, 100 ),
MaxTemp4Label( 150, 130 ), MaxTemp5Anchor( 60, 180 ),
MaxTemp5Dec( 20, 220 ), MaxTemp5Inc( 20, 180 ), MaxTemp5Label( 130, 210 ),
MaxTemp6Anchor( 160, 180 ), MaxTemp6Dec( 240, 220 ),
MaxTemp6Inc( 240, 180 ), MaxTemp6Label( 150, 210 ),
MaxTemp7Anchor( 60, 260 ), MaxTemp7Dec( 20, 300 ), MaxTemp7Inc( 20, 260 ),
MaxTemp7Label( 130, 290 ), MaxTemp8Anchor( 160, 260 ),
MaxTemp8Dec( 240, 300 ), MaxTemp8Inc( 240, 260 ),
MaxTemp8Label( 150, 290 ), MaxTempLabel( 140, 10 ), MaxTempSize( 60, 60 ),
MaxTStext( 170, 408 ), MaxUnit10Anchor( 137, 290 ),
MaxUnit10Label( 125, 307 ), MaxUnit1Anchor( 29, 70 ),
MaxUnit1Label( 95, 87 ), MaxUnit2Anchor( 137, 70 ),
MaxUnit2Label( 130, 87 ), MaxUnit3Anchor( 29, 125 ),
MaxUnit3Label( 95, 142 ), MaxUnit4Anchor( 137, 125 ),
MaxUnit4Label( 130, 142 ), MaxUnit5Anchor( 29, 180 );
const GPoint MaxUnit5Label( 95, 197 ), MaxUnit6Anchor( 137, 180 ),
MaxUnit6Label( 130, 197 ), MaxUnit7Anchor( 29, 235 ),
MaxUnit7Label( 95, 252 ), MaxUnit8Anchor( 137, 235 ),
MaxUnit8Label( 130, 252 ), MaxUnit9Anchor( 29, 290 ),
MaxUnit9Label( 95, 307 ), MaxUnitLabel( 113, 60 ), MaxWLanchor( 300, 8 ),
MaxWLsize( 280, 464 ), MinButtonCol1of3( 8, 0 ), MinButtonCol1of4( 3, 0 ),
MinButtonCol2of3( 30, 0 ), MinButtonCol2of4( 21, 0 ),
MinButtonCol3of3( 52, 0 ), MinButtonCol3of4( 39, 0 ),
MinButtonCol4of4( 57, 0 ), MinButtonLowRow( 0, 60 ),
MinButtonSize( 15, 15 ), MinButtonTopRow( 0, 34 ), MinDigitSize( 10, 18 ),
MinDispOffset( 20, 2 ), MinDispSize( 34, 21 ), MinMatDispAnchor( 15, 15 ),
MinMatDispSize( 84, 20 ), MinPanelSize( 75, 90 ),
MinSwitchCol1of3( 15, 0 ), MinSwitchCol1of4( 11, 0 ),
MinSwitchCol2of3( 47, 0 ), MinSwitchCol2of4( 37, 0 ),
MinSwitchCol3of3( 79, 0 ), MinSwitchCol3of4( 62, 0 ),
MinSwitchCol4of4( 88, 0 ), MinSwitchRow( 0, 245 ), MinSwitchSize( 30, 20 ),
MinTemp1Anchor( 5, 20 ), MinTemp1Label( 51, 40 ), MinTemp2Anchor( 69, 20 ),
MinTemp2Label( 63, 40 ), MinTemp3Anchor( 5, 75 ), MinTemp3Label( 51, 95 ),
MinTemp4Anchor( 69, 75 ), MinTemp4Label( 63, 95 ),
MinTemp5Anchor( 5, 130 ), MinTemp5Label( 51, 150 ),
MinTemp6Anchor( 69, 130 ), MinTemp6Label( 63, 150 ),
MinTemp7Anchor( 5, 185 ), MinTemp7Label( 51, 205 ),
MinTemp8Anchor( 69, 185 ), MinTemp8Label( 63, 205 ),
MinTempLabel( 57, 25 ), MinTempSize( 40, 40 ), MinTStext( 57, 10 ),
MinUnit10Anchor( 69, 180 ), MinUnit10Label( 62, 188 ),
MinUnit1Anchor( 15, 60 ), MinUnit1Label( 50, 68 ),
MinUnit2Anchor( 69, 60 ), MinUnit2Label( 65, 68 ),
MinUnit3Anchor( 15, 90 ), MinUnit3Label( 50, 98 );
const GPoint MinUnit4Anchor( 69, 90 ), MinUnit4Label( 65, 98 ),
MinUnit5Anchor( 15, 120 ), MinUnit5Label( 50, 128 ),
MinUnit6Anchor( 69, 120 ), MinUnit6Label( 65, 128 ),
MinUnit7Anchor( 15, 150 ), MinUnit7Label( 50, 158 ),
MinUnit8Anchor( 69, 150 ), MinUnit8Label( 65, 158 ),
MinUnit9Anchor( 15, 180 ), MinUnit9Label( 50, 188 ),
MinUnitLabel( 57, 53 ), PanelAnchor( 0, 0 ), PanelSize( 639, 479 ),
RecallPoint( 590, 430 ), SavePoint( 590, 370 ), SetupPoint( 590, 310 ),
SpaceBarSize( 430, 40 ), SpMinAnchor( 164, 289 ), StackPoint( 590, 70 ),
WLminAnchor( 125, 8 );

SText::SText( const GPoint& Anchor, uint Psize, char *Label )
{
  if( !( Text = new char[strlen( Label ) + 1] ) )
  {
  | cerr << "SText can't create Text" << endl;
  | exit( EXIT_FAILURE );
  }
  strcpy( Text, Label );
```

C-DOC PANEL.CPP

```
   Center = Anchor;
   size = Psize;
   reDraw();
}

SText::~SText()
{
   settextstyle( SMALL_FONT, HORIZ_DIR, 0 );
   setusercharsize( 1, 1, 1, 1 );
   int mul = size, div = textheight( Text );
   setusercharsize( mul, div, mul, div );
   int halfHigh = 5 + textheight( Text ) / 2,
   halfWide = 3 + textwidth( Text ) / 2;
   GPoint aPoint, corners[] = {
        { GPoint( Center.x - halfWide - 0, 2 + Center.y - halfHigh ) },
        { GPoint( Center.x - halfWide - 0, 2 + Center.y + halfHigh ) },
        { GPoint( Center.x + halfWide - 0, 2 + Center.y + halfHigh ) },
        { GPoint( Center.x + halfWide - 0, 2 + Center.y - halfHigh ) },
        { GPoint( Center.x - halfWide - 0, 2 + Center.y - halfHigh ) } };
   setcolor( BLACK );
   setfillstyle( SOLID_FILL, BLACK );
   setviewport( 0, 0, getmaxx(), getmaxy(), False );
   fillpoly( 5, (int *)corners );
   delete []Text;
}

void SText::reDraw( void )
{
   if( strlen( Text ) && size )
   {
   |  setviewport( 0, 0, getmaxx(), getmaxy(), False );
   |  settextjustify( CENTER_TEXT, CENTER_TEXT );
   |  settextstyle( SMALL_FONT, HORIZ_DIR, 0 );
   |  setusercharsize( 1, 1, 1, 1 );
   |  int mul = size, div = textheight( Text );
   |  setusercharsize( mul, div, mul, div );
   |  setcolor( WHITE );
   |  outtextxy( Center.x, Center.y, Text );
   }
}

Panel::Panel( GRect& MaxRegion, GRect& MinRegion, char* Name )
{
//   Hidden = False;
   MaxAnchor.x = MaxRegion.left;
   MaxAnchor.y = MaxRegion.top;
   MaxButton = 0;
   MaxButtons = 0;
   MaxLabel = 0;
   MaxLabels = 0;
   MaxMatDisp = 0;
   MaxReadOut = 0;
   MaxSize.x = MaxRegion.right - MaxRegion.left;
   MaxSize.y = MaxRegion.bottom - MaxRegion.top;
   MaxTemp = 0;
   MaxTemps = 0;
   MinAnchor.x = MinRegion.left;
   MinAnchor.y = MinRegion.top;
   MinButton = 0;
   MinButtons = 0;
   MinLabel = 0;
   MinLabels = 0;
```

C-DOC PANEL.CPP

```
    MinMatDisp = 0;
    MinReadOut = 0;
    MinSize.x = MinRegion.right - MinRegion.left;
    MinSize.y = MinRegion.bottom - MinRegion.top;
    MinTemp = 0;
    MinTemps = 0;
    Shrunk = False;
    if( !( Title = new char[strlen( Name ) + 1] ) )
    {
    |  cerr << "Panel can't create Title" << endl;
    |  exit( EXIT_FAILURE );
    }
    strcpy( Title, Name );
    drawMax();
    drawMin();
}

Panel::~Panel()
{
    uint b;
    for( b = 0; b < MaxButtons; b++ )
    #   delete MaxButton[b];
    delete []MaxButton;
    for( b = 0; b < MaxLabels; b++ )
    #   delete MaxLabel[b];
    delete []MaxLabel;
    delete MaxMatDisp;
    delete MaxReadOut;
    for( b = 0; b < MinButtons; b++ )
    #   delete MinButton[b];
    delete []MinButton;
    for( b = 0; b < MinLabels; b++ )
    #   delete MinLabel[b];
    delete []MinLabel;
    delete MinMatDisp;
    delete MinReadOut;
    delete []Title;
    GPoint corners[] = { { GPoint( 0, 0 ) },
    { GPoint( 0, MaxSize.y ) },
    { GPoint( MaxSize.x, MaxSize.y ) },
    { GPoint( MaxSize.x, 0 ) },
    { GPoint( 0, 0 ) } };
    setcolor( DARKGRAY );
    setlinestyle( SOLID_LINE, 0xffff, NORM_WIDTH );
    setfillstyle( SOLID_FILL, DARKGRAY );
    setviewport( MaxAnchor.x, MaxAnchor.y,
    :   MaxSize.x + MaxAnchor.x, MaxAnchor.y + MaxSize.y, True );
    if( !Shrunk && MaxSize.x && MaxSize.y )
    |  fillpoly( 5, (int *)corners );
    corners[0] = GPoint( 0, 0 );
    corners[1] = GPoint( 0, MinSize.y );
    corners[2] = GPoint( MinSize.x, MinSize.y );
    corners[3] = GPoint( MinSize.x, 0 );
    corners[4] = GPoint( 0, 0 );
    setviewport( MinAnchor.x, MinAnchor.y,
    :   MinSize.x + MinAnchor.x, MinAnchor.y + MinSize.y, True );
    if( Shrunk && MinSize.x && MinSize.y )
    |  fillpoly( 5, (int *)corners );
}

// add a push button or indicator to this panel
void Panel::addButton( Boolean Maxed, Button *newButton )
```

```
{
   Button **newList, **oldList;
   uint b;
   if( Maxed )
   {
   |  oldList = MaxButton;
   |  if( !( newList = new ( Button ( *[MaxButtons + 1] ) ) ) )
   |  {
   |  |  cerr << "Panel::addButton can't create newList[MaxButtons]"
   |  |  << endl;
   |  |  exit( EXIT_FAILURE );
   |  }
   |  for( b = 0; b < MaxButtons; b++ )
   |  #  newList[b] = oldList[b];
   |  newList[MaxButtons++] = newButton;
   |  MaxButton = newList;
   }
   else
   {
   |  oldList = MinButton;
   |  if( !( newList = new ( Button ( *[MinButtons + 1] ) ) ) )
   |  {
   |  |  cerr << "Panel::addButton can't create newList[MinButtons]"
   |  |  << endl;
   |  |  exit( EXIT_FAILURE );
   |  }
   |  for( b = 0; b < MinButtons; b++ )
   |  #  newList[b] = oldList[b];
   |  newList[MinButtons++] = newButton;
   |  MinButton = newList;
   }
   delete []oldList;
}

// add a push button or indicator to this panel with text over the button
void Panel::addButton( Boolean Maxed, GRect& Frame, Button::ButtonType Type,
   :  char *Text )
{
   Quit = False;
   Button **newList, **oldList;
   GPoint Point;
   char *word;
   if( !( word = new char[strlen( Text ) + 1] ) )
   {
   |  cerr << "Panel::addButton can't create word"
   |  << endl;
   |  exit( EXIT_FAILURE );
   }
   istrstream Strm( Text ), TextStrm( Text );
   uint b, l, w = 0;
//   Strm << Text;
//   TextStrm << Text;
   while( !Quit )
   {
   #  TextStrm >> word;
   #  if( strlen( word ) == 0 )
   #  |  Quit = True;
   #  else
   #  |  w++;
   }
   if( Maxed )
   {
```

C-DOC PANEL.CPP

```
| if( w )
| {
| | Point.x = ( Frame.left + Frame.right ) / 2;
| | Point.y = Frame.top + 3 - MaxTextHeight * w;
//    TextStrm.seekg( ios::beg );
| | for( l = 0; l < w; l++ )
| | {
| | #  Strm >> word;
| | #  addLabel( Maxed, Point, word );
| | #  Point.y += MaxTextHeight;
| | }
| }
| oldList = MaxButton;
| if( !( newList = new ( Button ( *[MaxButtons + 1] ) ) ) )
| {
| | cerr << "Panel::addButton can't create newList[MaxButtons]"
| | << endl;
| | exit( EXIT_FAILURE );
| }
| for( b = 0; b < MaxButtons; b++ )
| #  newList[b] = oldList[b];
| if( !( newList[MaxButtons++] = new Button( Frame, Type ) ) )
| {
| | cerr << "Panel::addButton can't create Button" << endl;
| | exit( EXIT_FAILURE );
| }
| MaxButton = newList;
}
else
{
| if( w )
| {
| | Point.x = ( Frame.left + Frame.right ) / 2;
| | Point.y = Frame.top + 3 - MinTextHeight * w;
//    TextStrm.seekg( ios::beg );
| | for( l = 0; l < w; l++ )
| | {
| | #  Strm >> word;
| | #  addLabel( Maxed, Point, word );
| | #  Point.y += MinTextHeight;
| | }
| }
| oldList = MinButton;
| if( !( newList = new ( Button ( *[MinButtons + 1] ) ) ) )
| {
| | cerr << "Panel::addButton can't create newList[MinButtons]"
| | << endl;
| | exit( EXIT_FAILURE );
| }
| for( b = 0; b < MinButtons; b++ )
| #  newList[b] = oldList[b];
| if( !( newList[MinButtons++] = new Button( Frame, Type ) ) )
| {
| | cerr << "Panel::addButton can't create Button" << endl;
| | exit( EXIT_FAILURE );
| }
| MinButton = newList;
}
delete []oldList;
delete []word;
}
```

C-DOC PANEL.CPP

```
// add a push button or indicator to this panel
void Panel::addButton( Boolean Maxed, ThermoStat *newTemp )
{
  ThermoStat **newList, **oldList;
  uint b;
  if( Maxed )
  {
  | oldList = MaxTemp;
  | if( !( newList = new ( ThermoStat ( *[MaxTemps + 1] ) ) ) )
  | {
  | | cerr << "Panel::addButton can't create newList[MaxTemps]"
  | | << endl;
  | | exit( EXIT_FAILURE );
  | }
  | for( b = 0; b < MaxTemps; b++ )
  | #   newList[b] = oldList[b];
  | newList[MaxTemps++] = newTemp;
  | MaxTemp = newList;
  }
  else
  {
  | oldList = MinTemp;
  | if( !( newList = new ( ThermoStat ( *[MinTemps + 1] ) ) ) )
  | {
  | | cerr << "Panel::addButton can't create newList[MinTemps]"
  | | << endl;
  | | exit( EXIT_FAILURE );
  | }
  | for( b = 0; b < MinTemps; b++ )
  | #   newList[b] = oldList[b];
  | newList[MinTemps++] = newTemp;
  | MinTemp = newList;
  }
  delete []oldList;
}

// add a push button or indicator to this panel
void Panel::addButton( GRect& MaxFrame, GRect& MinFrame,
  :  Button::ButtonType Type, char *Text )
{
  Quit = False;
  Button **newList, **oldList;
  GPoint MaxPoint, MinPoint;
  char *word;
  if( !( word = new char[strlen( Text ) + 1] ) )
  {
  | cerr << "Panel::addButton can't create word" << endl;
  | exit( EXIT_FAILURE );
  }
  istrstream TextStrm( Text );
  uint b, l, w = 0;
//   TextStrm << Text;
  while( !Quit )
  {
  #  TextStrm >> word;
  #  if( strlen( word ) == 0 )
  #  |  Quit = True;
  #  else
  #  |  w++;
  }
  if( w )
  {
```

C-DOC PANEL.CPP

```
  | MaxPoint.x = ( MaxFrame.left + MaxFrame.right ) / 2;
  | MaxPoint.y = MaxFrame.top - MaxTextHeight * w;
  | MinPoint.x = ( MinFrame.left + MinFrame.right ) / 2;
  | MinPoint.y = MinFrame.top + 3 - MinTextHeight * w;
  | istrstream Strm( Text );
//    Strm << Text;
  | for( l = 0; l < w; l++ )
  | {
  | #  Strm >> word;
  | #  addLabel( True, MaxPoint, word );
  | #  addLabel( False, MinPoint, word );
  | #  MaxPoint.y += MaxTextHeight;
  | #  MinPoint.y += MinTextHeight;
  | }
  }
  delete []word;
  oldList = MaxButton;
  if( !( newList = new ( Button ( *[MaxButtons + 1] ) ) ) )
  {
  | cerr << "Panel::addButton can't create newList[MaxButtons]"
  | << endl;
  | exit( EXIT_FAILURE );
  }
  for( b = 0; b < MaxButtons; b++ )
  #  newList[b] = oldList[b];
  if( !( newList[MaxButtons++] = new Button( MaxFrame, Type ) ) )
  {
  | cerr << "Panel::addButton can't create Button" << endl;
  | exit( EXIT_FAILURE );
  }
  MaxButton = newList;
  delete []oldList;
  oldList = MinButton;
  if( !( newList = new ( Button ( *[MinButtons + 1] ) ) ) )
  {
  | cerr << "Panel::addButton can't create newList[MinButtons]" << endl;
  | exit( EXIT_FAILURE );
  }
  for( b = 0; b < MinButtons; b++ )
  #  newList[b] = oldList[b];
  if( !( newList[MinButtons++] = new Button( MinFrame, Button::Indicator ) ) )
  {
  | cerr << "Panel::addButton can't create Button" << endl;
  | exit( EXIT_FAILURE );
  }
  MinButton = newList;
  delete []oldList;
}

// add a push button or indicator to this panel
void Panel::addButton( GRect& MaxFrame, GRect& MinFrame,
  : Button::ButtonType Type, char *MaxText, char *MinText )
{
  Quit = False;
  Button **newList, **oldList;
  char *word;
  if( !( word = new char[strlen( MaxText ) + 1] ) )
  {
  | cerr << "Panel::addButton can't create word" << endl;
  | exit( EXIT_FAILURE );
  }
  GPoint aPoint;
```

C-DOC PANEL.CPP

```
STText **newLabels, **oldLabels;
istrstream TextStrm( MaxText );
uint b, l, w = 0;
//  TextStrm << MaxText;
while( !Quit )
{
#  TextStrm >> word;
#  if( strlen( word ) == 0 )
#  |  Quit = True;
#  else
#  |  w++;
}
if( w )
{
|  oldLabels = MaxLabel;
|  if( !( newLabels = new ( SText ( *[MaxLabels + w] ) ) ) )
|  {
|  |  cerr << "Panel::addButton can't create newLabels[MaxLabels]"
|  |  << endl;
|  |  exit( EXIT_FAILURE );
|  }
|  for( l = 0; l < MaxLabels; l++ )
|  #  newLabels[l] = oldLabels[l];
|  aPoint.x = ( MaxFrame.left + MaxFrame.right ) / 2;
|  aPoint.y = MaxFrame.top - MinTextHeight * w;
|  istrstream Strm( MaxText );
//    Strm << MaxText;
|  for( l = 0; l < w; l++ )
|  {
|  #  Strm >> word;
|  #  ;
|  #  if( !( newLabels[MaxLabels++] = new SText( aPoint, MinTextHeight, word ) ) )
|  #  {
|  #  |  cerr << "Panel::addButton can't create SText" << endl;
|  #  |  exit( EXIT_FAILURE );
|  #  }
|  #  aPoint.y += MinTextHeight;
|  }
|  MaxLabel = newLabels;
|  delete []oldLabels;
}
oldLabels = MinLabel;
if( !( newLabels = new ( SText ( *[MinLabels + 1] ) ) ) )
{
|  cerr << "Panel::addButton can't create newLabels[MinLabels + 1]"
|  << endl;
|  exit( EXIT_FAILURE );
}
for( l = 0; l < MinLabels; l++ )
#  newLabels[l] = oldLabels[l];
aPoint.x = ( MinFrame.left + MinFrame.right ) / 2;
aPoint.y = MinFrame.top + 3 - MinTextHeight;
;
if( !( newLabels[MinLabels++] = new SText( aPoint, MinTextHeight, MinText ) ) )
{
|  cerr << "Panel::addButton can't create SText" << endl;
|  exit( EXIT_FAILURE );
}
MinLabel = newLabels;
delete []oldLabels;
oldList = MaxButton;
if( !( newList = new ( Button ( *[MaxButtons + 1] ) ) ) )
```

```
{
| cerr << "Panel::addButton can't create newList[MaxButtons]" << endl;
| exit( EXIT_FAILURE );
}
for( b = 0; b < MaxButtons; b++ )
#  newList[b] = oldList[b];
if( !( newList[MaxButtons++] = new Button( MaxFrame, Type ) ) )
{
| cerr << "Panel::addButton can't create Button" << endl;
| exit( EXIT_FAILURE );
}
MaxButton = newList;
delete []oldList;
oldList = MinButton;
if( !( newList = new ( Button ( *[MinButtons + 1] ) ) ) )
{
| cerr << "Panel::addButton can't create newList[MinButtons]" << endl;
| exit( EXIT_FAILURE );
}
for( b = 0; b < MinButtons; b++ )
#  newList[b] = oldList[b];
if( !( newList[MinButtons++] = new Button( MinFrame, Button::Indicator ) ) )
{
| cerr << "Panel::addButton can't create Button" << endl;
| exit( EXIT_FAILURE );
}
MinButton = newList;
delete []oldList;
}

// add a label to this panel
void Panel::addLabel( Boolean Maxed, const GPoint& Anchor, char *Label )
{
SText **newLabels, **oldLabels;
if( Maxed )
{
| oldLabels = MaxLabel;
| if( !( newLabels = new ( SText ( *[MaxLabels + 1] ) ) ) )
| {
| | cerr << "Panel::addLabel can't create newLabels[MaxLabels]"
| | << endl;
| | exit( EXIT_FAILURE );
| }
| for( uint a = 0; a < MaxLabels; a++ )
| #  newLabels[a] = oldLabels[a];
| if( !( newLabels[MaxLabels++] = new SText( Anchor, MaxTextHeight, Label ) ) )
| {
| | cerr << "Panel::addLabel can't create SText" << endl;
| | exit( EXIT_FAILURE );
| }
| MaxLabel = newLabels;
}
else
{
| oldLabels = MinLabel;
| if( !( newLabels = new ( SText ( *[MinLabels + 1] ) ) ) )
| {
| | cerr << "Panel::addLabel can't create newLabels[MinLabels]"
| | << endl;
| | exit( EXIT_FAILURE );
| }
| for( uint i = 0; i < MinLabels; i++ )
```

C-DOC PANEL.CPP

```
   | #  newLabels[i] = oldLabels[i];
   | if( !( newLabels[MinLabels++] = new SText( Anchor, MinTextHeight, Label ) ) )
   | {
   | |  cerr << "Panel::addLabel can't create SText" << endl;
   | |  exit( EXIT_FAILURE );
   | }
   | MinLabel = newLabels;
   }
   delete []oldLabels;
}

// add a dot matrix display to this panel
void Panel::addMatDisp( Boolean Maxed, MatrixDisplay *newMatDisp )
{
   if( Maxed )
   {
   | delete MaxMatDisp;
   | MaxMatDisp = newMatDisp;
   }
   else
   {
   | delete MinMatDisp;
   | MinMatDisp = newMatDisp;
   }
}

// add a display to this panel
void Panel::addReadOut( Boolean Maxed, ReadOut *newReadOut )
{
   if( Maxed )
   {
   | delete MaxReadOut;
   | MaxReadOut = newReadOut;
   }
   else
   {
   | delete MinReadOut;
   | MinReadOut = newReadOut;
   }
}

// set a new display value
void Panel::Display( char *Text )
{
//   if( Hidden )
//     return;
   if( Shrunk && MinReadOut )
   | MinReadOut->Display( Text );
   if( !Shrunk && MaxReadOut )
   | MaxReadOut->Display( Text );
}

void Panel::Display( ReadOut::OnOff Lit )
{
//   if( Hidden )
//     return;
   if( Shrunk && MinReadOut )
   | MinReadOut->LED( Lit );
   if( !Shrunk && MaxReadOut )
   | MaxReadOut->LED( Lit );
}

```

C-DOC PANEL.CPP

```
// display a message on the dot matrix display
void Panel::Display( uint Row, uint Col, char *msg )
{
//   if( Hidden )
//     return;
   if( Shrunk && MinMatDisp )
   |  MinMatDisp->Display( Row, Col, msg );
   if( !Shrunk && MaxMatDisp )
   |  MaxMatDisp->Display( Row, Col, msg );
}

// get the current display value
int Panel::DispVal( void )
{
   char *temp;
   int value = 0;
   if( Shrunk && MinReadOut )
   {
   |  temp = strdup( MinReadOut->Display() );
   |  istrstream min( temp );
//     min << MinReadOut->Display();
   |  min >> value;
   |  delete []temp;
   }
   if( !Shrunk && MaxReadOut )
   {
   |  temp = strdup( MaxReadOut->Display() );
   |  istrstream max( temp );
//     max << MaxReadOut->Display();
   |  max >> value;
   |  delete []temp;
   }
====return value;
}

// set a new display value
void Panel::DispVal( int value )
{
//   if( Hidden )
//     return;
   if( Shrunk && MinReadOut )
   |  MinReadOut->Display( value );
   if( !Shrunk && MaxReadOut )
   |  MaxReadOut->Display( value );
}

// Draw the Oxy Dry logo
void Panel::DrawLogo( GPoint& Origin, GPoint& Size )
{
   setviewport( Origin.x, Origin.y, Origin.x + Size.x, Origin.y + Size.y,
   :  True );
   setcolor( GREEN );
   setlinestyle( SOLID_LINE, 0xffff, NORM_WIDTH );
   setfillstyle( SOLID_FILL, GREEN );
   GPoint aPoint, corners[] = { { GPoint( 0, 0 ) },
   { GPoint( 0, Size.y ) },
   { GPoint( Size.x / 2, Size.y ) },
   { GPoint( Size.x / 2, 0 ) },
   { GPoint( 0, 0 ) } };
   fillpoly( 5, (int *)corners );
   fillellipse( Size.x / 2, Size.y / 2, Size.x / 2, Size.y / 2 );
   setfillstyle( SOLID_FILL, BLACK );
```

C-DOC PANEL.CPP

```
fillellipse( Size.x / 2, Size.y / 2, Size.x / 2 - 4, Size.y / 2 - 2 );
line( 0, Size.y / 2, Size.x, Size.y / 2 );
if( Size.y > 15 )
{
| setcolor( WHITE );
| settextjustify( CENTER_TEXT, CENTER_TEXT );
| settextstyle( SMALL_FONT, HORIZ_DIR, 0 );
| setusercharsize( 1, 1, 1, 1 );
| int multx = Size.x / 2, divx = textwidth( "OXY" ),
| multy = Size.y / 3, divy = textheight( "DRY" );
| setusercharsize( multx, divx, multy, divy );
| aPoint.x = Size.x / 2;
| aPoint.y = Size.y / 3;
| outtextxy( aPoint.x, aPoint.y - 1, "OXY" );
| aPoint.x = Size.x / 2;
| aPoint.y = Size.y * 2 / 3;
| outtextxy( aPoint.x, aPoint.y - 0, "DRY" );
}
}

// draw the panel in the maximum view
void Panel::drawMax( void )
{
if( MaxSize.x == 0 || MaxSize.y == 0 )
========return;
GPoint aPoint, corners[] = { { GPoint( 0, 0 ) },
{ GPoint( 0, MaxSize.y ) },
{ GPoint( MaxSize.x, MaxSize.y ) },
{ GPoint( MaxSize.x, 0 ) },
{ GPoint( 0, 0 ) } };
setcolor( LIGHTGRAY );
setlinestyle( SOLID_LINE, 0xffff, NORM_WIDTH );
setfillstyle( SOLID_FILL, BLACK );
setviewport( MaxAnchor.x, MaxAnchor.y,
: MaxSize.x + MaxAnchor.x, MaxAnchor.y + MaxSize.y, True );
fillpoly( 5, (int *)corners );
settextjustify( CENTER_TEXT, CENTER_TEXT );
settextstyle( SMALL_FONT, HORIZ_DIR, 0 );
setusercharsize( 1, 1, 1, 1 );
int mul = MaxTextHeight, div = textheight( Title );
setusercharsize( mul, div, mul, div );
setcolor( WHITE );
aPoint.x = ( MaxSize.x + 60 ) / 2;
aPoint.y = MaxSize.y - 41;
outtextxy( aPoint.x, aPoint.y, Title );
aPoint.x = 10;
aPoint.y = MaxSize.y - 55;
aPoint += MaxAnchor;
DrawLogo( aPoint, GPoint( 54, 28 ) );
for( uint l = 0; l < MaxLabels; l++ )
# MaxLabel[l]->reDraw();
if( MaxReadOut )
| MaxReadOut->reDraw();
if( MaxMatDisp )
| MaxMatDisp->reDraw();
for( uint b = 0; b < MaxButtons; b++ )
# MaxButton[b]->reDraw();
for( uint t = 0; t < MaxTemps; t++ )
# MaxTemp[t]->reDraw();
}

// draw the panel in the minimum view
```

C-DOC PANEL.CPP

```
void Panel::drawMin( void )
{
   if( MinSize.x == 0 || MinSize.y == 0 )
      return;
   GPoint aPoint, corners[] = { { GPoint( 0, 0 ) },
   { GPoint( 0, MinSize.y ) },
   { GPoint( MinSize.x, MinSize.y ) },
   { GPoint( MinSize.x, 0 ) },
   { GPoint( 0, 0 ) } };
   setcolor( LIGHTGRAY );
   setlinestyle( SOLID_LINE, 0xffff, NORM_WIDTH );
   setfillstyle( SOLID_FILL, BLACK );
   setviewport( MinAnchor.x, MinAnchor.y,
   :  MinSize.x + MinAnchor.x, MinAnchor.y + MinSize.y, True );
   fillpoly( 5, (int *)corners );
   settextjustify( CENTER_TEXT, CENTER_TEXT );
   settextstyle( SMALL_FONT, HORIZ_DIR, 0 );
   setusercharsize( 1, 1, 1, 1 );
   int mul = MinTextHeight, div = textheight( Title );
   setusercharsize( mul, div, mul, div );
   setcolor( WHITE );
   aPoint.x = MinSize.x / 2;
//   aPoint.x = ( MinSize.x + 30 ) / 2;
   aPoint.y = MinSize.y - 10;
   outtextxy( aPoint.x, aPoint.y, Title );
//   aPoint.x = 5;
//   aPoint.y = MinSize.y - 17;
//   aPoint += MinAnchor;
//   DrawLogo( aPoint, GPoint( 25, 14 ) );
   for( uint l = 0; l < MinLabels; l++ )
   #  MinLabel[l]->reDraw();
   if( MinReadOut )
   |  MinReadOut->reDraw();
   if( MinMatDisp )
   |  MinMatDisp->reDraw();
   for( uint b = 0; b < MinButtons; b++ )
   #  MinButton[b]->reDraw();
   for( uint t = 0; t < MinTemps; t++ )
   #  MinTemp[t]->reDraw();
}

// illuminate a button in a new color
void Panel::Light( uint index, COLORS newColor )
{
//   if( Hidden )
//      return;
   if( Shrunk && index < MinButtons )
   |  MinButton[index]->Light( newColor );
   if( !Shrunk && index < MaxButtons )
   |  MaxButton[index]->Light( newColor );
}

// maximize this panel
void Panel::Max( void )
{
   if( Shrunk && MaxSize.x && MaxSize.y )
   {
   |  setcolor( DARKGRAY );
   |  setfillstyle( SOLID_FILL, DARKGRAY );
   |  GPoint corners[] = { { GPoint( 0, 0 ) },
   |  { GPoint( 0, MinSize.y ) },
   |  { GPoint( MinSize.x, MinSize.y ) },
```

```
  | { GPoint( MinSize.x, 0 ) },
  | { GPoint( 0, 0 ) } };
  | setviewport( MinAnchor.x, MinAnchor.y,
  | :  MinSize.x + MinAnchor.x, MinAnchor.y + MinSize.y, True );
  | fillpoly( 5, (int *)corners );
  | drawMax();
  | if( MaxReadOut && MinReadOut )
  | |  MaxReadOut->Display( MinReadOut->Display() );
  | if( MaxMatDisp && MinMatDisp )
  | |  MaxMatDisp->Display( MinMatDisp->Display() );
  | for( uint b = 0; b < MinButtons; b++ )
  | {
  | #   MaxButton[b]->Light( MinButton[b]->Light() );
  | #   MaxButton[b]->Tag( MinButton[b]->Tag() );
  | }
  | for( uint t = 0; t < MinTemps; t++ )
  | #   MaxTemp[t]->Light( MinTemp[t]->Light() );
  | Shrunk = False;
  }
}

// answer the query is this panel in the maximized view
Boolean Panel::Maxed( void )
{
====return (Boolean)!Shrunk;
}

//  minimize this panel
void Panel::Min( void )
{
  if( !Shrunk && MinSize.x && MinSize.y )
  {
  | Touched( GPoint( -1, -1 ) );//  make sure all buttons are untouched
  | setcolor( DARKGRAY );
  | setfillstyle( SOLID_FILL, DARKGRAY );
  | GPoint corners[] = { { GPoint( 0, 0 ) },
  | { GPoint( 0, MaxSize.y ) },
  | { GPoint( MaxSize.x, MaxSize.y ) },
  | { GPoint( MaxSize.x, 0 ) },
  | { GPoint( 0, 0 ) } };
  | setviewport( MaxAnchor.x, MaxAnchor.y,
  | :  MaxSize.x + MaxAnchor.x, MaxAnchor.y + MaxSize.y, True );
  | fillpoly( 5, (int *)corners );
  | drawMin();
  | if( MinReadOut && MaxReadOut )
  | |  MinReadOut->Display( MaxReadOut->Display() );
  | if( MinMatDisp && MaxMatDisp )
  | |  MinMatDisp->Display( MaxMatDisp->Display() );
  | for( uint b = 0; b < MinButtons; b++ )
  | {
  | #   MinButton[b]->Light( MaxButton[b]->Light() );
  | #   MinButton[b]->Tag( MaxButton[b]->Tag() );
  | }
  | for( uint t = 0; t < MinTemps; t++ )
  | #   MinTemp[t]->Light( MaxTemp[t]->Light() );
  | Shrunk = True;
  }
}

//  test a switch to see if it's just been pushed or released
Boolean Panel::OneShot( uint index )
{
```

C-DOC PANEL.CPP

```
//   if( Shrunk && index < MinButtons && MinButton[index]->Once() )
//     return True;
    if( index < MaxButtons && MaxButton[index]->Once() )
========return True;
====return False;
}

/*
// reDraw this panel in its current size
void Panel::reDraw( void )
{
//   Hidden = False;
:  if( Shrunk )
:     drawMin();
:  else
:     drawMax();
}
*/

// test a switch to see if it's on
Boolean Panel::Switch( uint index )
{
//   if( Shrunk && index < MinButtons && MinButton[index]->On() )
//     return True;
    if( index < MaxButtons && MaxButton[index]->On() )
========return True;
====return False;
}

// restore a switch's state
void Panel::Switch( uint index, Boolean State )
{
    if( index < MaxButtons )
    |  MaxButton[index]->Set( State ) ;
//   if( index < MinButtons )
//     MinButton[index]->Set( State ) ;
}

// change a camelian button's text
void Panel::Tag( uint index, const char *Text, font_names TextFont )
{
//   if( Hidden )
//     return;
    if( Shrunk && index < MinButtons )
    |  MinButton[index]->Tag( Text, TextFont );
    if( !Shrunk && index < MaxButtons )
    |  MaxButton[index]->Tag( Text, TextFont );
}

// change the displayed values on the temperature control
void Panel::TempTag( uint index, uint Which, uint Value0, uint Value1 )
{
    if( Shrunk && index < MinTemps )
    |  MinTemp[index]->Tag2( Which, Value0, Value1 );
    if( !Shrunk && index < MaxTemps )
    |  MaxTemp[index]->Tag2( Which, Value0, Value1 );
}

// change a camelian button's text
void Panel::TempTag( uint index, uint Value )
{
    if( Shrunk && index < MinTemps )
```

```
| MinTemp[index]->Tag1( Value );
if( !Shrunk && index < MaxTemps )
| MaxTemp[index]->Tag1( Value );
}

// illuminate a temp disp in a new color
void Panel::TempLight( uint index, COLORS newColor )
{
//   if( Hidden )
//     return;
   if( Shrunk && index < MinTemps )
   | MinTemp[index]->Light( newColor );
   if( !Shrunk && index < MaxTemps )
   | MaxTemp[index]->Light( newColor );
}

// test a temp disp to see if it's just been pushed
Boolean Panel::TempSwitch( uint index )
{
//   if( Shrunk && index < MinTemps && MinTemp[index]->Once() )
//     return True;
   if( index < MaxTemps && MaxTemp[index]->Once() && MaxTemp[index]->On() )
========return True;
====return False;
}

// has this panel been touched?
Boolean Panel::Touched( const GPoint& Push )
{
   GRect Region( MinAnchor.x, MinAnchor.y, MinSize.x + MinAnchor.x,
      : MinAnchor.y + MinSize.y );
   if( Shrunk && Region.contains( Push ) )
========return True;
   Region.moveTo( MaxAnchor );
   Region.move( 0, MaxSize.y - 65 );
   Region.growTo( 70, 48 );
   if( !Shrunk )
   {
   | for( uint b = 0; b < MaxButtons; b++ )
   | #  MaxButton[b]->Touched( Push );
   | for( uint t = 0; t < MaxTemps; t++ )
   | #  MaxTemp[t]->Touched( Push );
   | if( Region.contains( Push ) )
   | |  Min();
   }
====return False;
}

// force a switch off
void Panel::UnLatch( uint index )
{
//   if( Hidden )
//     return;
   if( Shrunk && index < MinButtons )
   | MinButton[index]->Unlatch();
   if( !Shrunk && index < MaxButtons )
   | MaxButton[index]->Unlatch();
}
```

C-DOC SFCONFIG.CPP

```

/************************************\
*                                  *
*  sfconfig.cpp                    *
*                                  *
*  Sheet Feed Printing Press Installation and Configuration Data  *
*                                  *
*  (C) 1993 OXY-DRY CORPORATION all rights reserved  *
*                                  *
\************************************/

// 1993 september 21  change name of cancel button to exit
// 1993 october 10   change copyright for listing

#include <conio.h>          // getch(), kbhit()
#include <ctype.h>          // is...(), toupper()
#include <dos.h>            // MK_FP()
#include <iomanip.h>        // ostream_withassign
#include <iostream.h>       // ostream_withassign
#include <stdlib.h>         // exit()
#include <string.h>         // str...()
#include <strstrea.h>       // istrstream, ostrstream & strstream
#include <time.h>           // time functions and data types
#include "keys.h"           // keyboard key names
#include "sfconfig.h"
#include "sheetfed.h"

const uint Psize = 18;  // height of prompt text in configuration panel

// a function that returns the ascii code of a keyboard charater or the scan
// code of nonascii keys
uint GetKP( void )
{
  uint Key = 0;
  if( kbhit() )
  {
  |  Key = getch();
  |  if( Key == 0 || Key == 0xe0 )
  |  |  Key = 128 + getch();
  }
====return Key;
}

extern SheetFeed control;

const char *SheetFedConfig::ColorNames[] = { "BLACK", "BLUE", "GREEN", "CYAN",
        "RED", "MAGENTA", "BROWN", "LIGHTGRAY", "DARKGRAY", "LIGHTBLUE",
        "LIGHTGREEN", "LIGHTCYAN", "LIGHTRED", "LIGHTMAGENTA", "YELLOW",
        "WHITE" },
*SheetFedConfig::FontNames[] = { "DEFAULT_FONT", "TRIPLEX_FONT", "SMALL_FONT",
   "SANS_SERIF_FONT", "GOTHIC_FONT", "SCRIPT_FONT", "SIMPLEX_FONT",
   "TRIPLEX_SCR_FONT", "COMPLEX_FONT", "EUROPEAN_FONT", "BOLD_FONT" };

const uint SheetFedConfig::KeyCode[] = { '1', ESCkey, 'Q', 'A', '2', 'Z', 'W',
        'S', '3', 'X', 'E', 'D', '4', 'C', 'R', 'F', '5', 'V', 'T', 'G', '6', 'B',
        'Y', 'H', '7', 'N', 'U', 'J', '8', 'M', 'I', 'K', '9', '<', 'O', 'L', '0',
        '>', 'P', ENTERkey, BSkey, ' ' };

// the default constructor
SheetFedConfig::SheetFedConfig()
{
  index = 0;
```

C-DOC SFCONFIG.CPP

```
  Terminal = 0;
  GetDataBlock();
  FixConfig();
  if( !Valid() )
  | Configure();
}

// the destructor
SheetFedConfig::~SheetFedConfig()
{
  if( InstallerPassword == 666 )
  {
  | index = 0;
  | WatchWord = ~MakeCheckSum();
  | SetDataBlock();
  }
}

// adjust the value of one of the configuration items
uint SheetFedConfig::Adjust( uint Item, Boolean Configured )
{
  char sep, *Yes = "YES", *No = "NO";
  istrstream Response( SetupName, 20 );
  ostrstream Default( SetupName, 20 );
  time_t now;
  time( &now );
  static uint Key;
  struct tm Tm = *localtime( &now );
  uint Mdays[] = { 31, 29, 31, 30, 31, 30, 31, 31, 30, 31, 30, 30 };
  switch( Item )
  {
  case ClockSet:
  | sep = ':';
  | struct time Ti;
  | gettime( &Ti );
  | Default << setfill( '0' ) << setw( 2 ) << (uint)Ti.ti_hour
  | << sep << setw( 2 ) << (uint)Ti.ti_min << ends;
  | Key = GetBuffer( "Set Clock (24 hour format)", sep,
  | : strlen( SetupName ) );
  | Response >> dec >> Tm.tm_hour >> sep >> Tm.tm_min >> sep >> Tm.tm_sec;
  | Ti.ti_hour = (byte) Tm.tm_hour % 24;
  | Ti.ti_min = (byte) Tm.tm_min % 60;
  | Ti.ti_sec = (byte) Tm.tm_sec % 60;
  | Ti.ti_hund = 0;
  | if( Key == ENTERkey )
  | | settime( &Ti );
  |===break;
  case DateSet:
  | sep = '/';
  | struct date Da;
  | getdate( &Da );
  | Default << setfill( '0' ) << setw( 4 ) << (uint)Da.da_year
  | << sep << setw( 2 ) << (uint)Da.da_mon
  | << sep << setw( 2 ) << (uint)Da.da_day
  | << ends;
  | Key = GetBuffer( "Set Date (YYYY/MM/DD)", sep,
  | : strlen( SetupName ) );
  | Response >> dec >> Da.da_year >> sep >> Tm.tm_mon >> sep >> Tm.tm_mday;
  | Tm.tm_mon--;
  | Tm.tm_mon %= 60;
  | Da.da_mon = (byte)( Tm.tm_mon + 1 );
  | Da.da_day = (byte)( ( Tm.tm_mday - 1 ) % Mdays[Tm.tm_mon] + 1 );
```

C-DOC SFCONFIG.CP

```
| if( Key == ENTERkey )
| | setdate( &Da );
|===break;
case Msg1Color:
| Default << ColorNames[control.GetMsgColor( 0 )];
| Default << ends;
| Key = GetBuffer( "Message Line 1 Color", '_',
| : strlen( SetupName ) );
| if( strlen( SetupName ) && Key == ENTERkey )
| | control.ChooseColor( 0, SetupName );
|===break;
case Msg1Font:
| Default << FontNames[control.GetMsgFont( 0 )];
| Default << ends;
| Key = GetBuffer( "Message Line 1 Font", '_',
| : strlen( SetupName ) );
| if( strlen( SetupName ) && Key == ENTERkey )
| | control.ChooseFont( 0, SetupName );
|===break;
case Msg1Text:
| Default << control.GetMsgText( 0 );
| Default << ends;
| Key = GetBuffer( "Message Line 1 Text", ' ',
| : strlen( SetupName ) );
| if( Key == ENTERkey )
| | control.ChangeText( 0, SetupName );
|===break;
case Msg2Color:
| Default << ColorNames[control.GetMsgColor( 1 )];
| Default << ends;
| Key = GetBuffer( "Message Line 2 Color", '_',
| : strlen( SetupName ) );
| if( strlen( SetupName ) && Key == ENTERkey )
| | control.ChooseColor( 1, SetupName );
|===break;
case Msg2Font:
| Default << FontNames[control.GetMsgFont( 1 )];
| Default << ends;
| Key = GetBuffer( "Message Line 2 Font", '_',
| : strlen( SetupName ) );
| if( strlen( SetupName ) && Key == ENTERkey )
| | control.ChooseFont( 1, SetupName );
|===break;
case Msg2Text:
| Default << control.GetMsgText( 1 );
| Default << ends;
| Key = GetBuffer( "Message Line 2 Text", ' ',
| : strlen( SetupName ) );
| if( Key == ENTERkey )
| | control.ChangeText( 1, SetupName );
|===break;
case Msg3Color:
| Default << ColorNames[control.GetMsgColor( 2 )];
| Default << ends;
| Key = GetBuffer( "Message Line 3 Color", '_',
| : strlen( SetupName ) );
| if( strlen( SetupName ) && Key == ENTERkey )
| | control.ChooseColor( 2, SetupName );
|===break;
case Msg3Font:
| Default << FontNames[control.GetMsgFont( 2 )];
| Default << ends;
```

C-DOC SFCONFIG.CI

```
| Key = GetBuffer( "Message Line 3 Font", '_',
| : strlen( SetupName ) );
| if( strlen( SetupName ) && Key == ENTERkey )
| | control.ChooseFont( 2, SetupName );
|===break;
case Msg3Text:
| Default << control.GetMsgText( 2 );
| Default << ends;
| Key = GetBuffer( "Message Line 3 Text", '',
| : strlen( SetupName ) );
| if( Key == ENTERkey )
| | control.ChangeText( 2, SetupName );
|===break;
case Msg4Color:
| Default << ColorNames[control.GetMsgColor( 3 )];
| Default << ends;
| Key = GetBuffer( "Message Line 4 Color", '_',
| : strlen( SetupName ) );
| if( strlen( SetupName ) && Key == ENTERkey )
| | control.ChooseColor( 3, SetupName );
|===break;
case Msg4Font:
| Default << FontNames[control.GetMsgFont( 3 )];
| Default << ends;
| Key = GetBuffer( "Message Line 4 Font", '_',
| : strlen( SetupName ) );
| if( strlen( SetupName ) && Key == ENTERkey )
| | control.ChooseFont( 3, SetupName );
|===break;
case Msg4Text:
| Default << control.GetMsgText( 3 );
| Default << ends;
| Key = GetBuffer( "Message Line 4 Text", '',
| : strlen( SetupName ) );
| if( Key == ENTERkey )
| | control.ChangeText( 3, SetupName );
|===break;
case Msg5Color:
| Default << ColorNames[control.GetMsgColor( 4 )];
| Default << ends;
| Key = GetBuffer( "Message Line 5 Color", '_',
| : strlen( SetupName ) );
| if( strlen( SetupName ) && Key == ENTERkey )
| | control.ChooseColor( 4, SetupName );
|===break;
case Msg5Font:
| Default << FontNames[control.GetMsgFont( 4 )];
| Default << ends;
| Key = GetBuffer( "Message Line 5 Font", '_',
| : strlen( SetupName ) );
| if( strlen( SetupName ) && Key == ENTERkey )
| | control.ChooseFont( 4, SetupName );
|===break;
case Msg5Text:
| Default << control.GetMsgText( 4 );
| Default << ends;
| Key = GetBuffer( "Message Line 5 Text", '',
| : strlen( SetupName ) );
| if( Key == ENTERkey )
| | control.ChangeText( 4, SetupName );
|===break;
case Msg6Color:
```

C-DOC SFCONFIG.CPP

```
| Default << ColorNames[control.GetMsgColor( 5 )];
| Default << ends;
| Key = GetBuffer( "Message Line 6 Color", '_',
| : strlen( SetupName ) );
| if( strlen( SetupName ) && Key == ENTERkey )
| | control.ChooseColor( 5, SetupName );
|===break;
case Msg6Font:
| Default << FontNames[control.GetMsgFont( 5 )];
| Default << ends;
| Key = GetBuffer( "Message Line 6 Font", '_',
| : strlen( SetupName ) );
| if( strlen( SetupName ) && Key == ENTERkey )
| | control.ChooseFont( 5, SetupName );
|===break;
case Msg6Text:
| Default << control.GetMsgText( 5 );
| Default << ends;
| Key = GetBuffer( "Message Line 6 Text", ' ',
| : strlen( SetupName ) );
| if( Key == ENTERkey )
| | control.ChangeText( 5, SetupName );
|===break;
case Msg7Color:
| Default << ColorNames[control.GetMsgColor( 6 )];
| Default << ends;
| Key = GetBuffer( "Message Line 7 Color", '_',
| : strlen( SetupName ) );
| if( strlen( SetupName ) && Key == ENTERkey )
| | control.ChooseColor( 6, SetupName );
|===break;
case Msg7Font:
| Default << FontNames[control.GetMsgFont( 6 )];
| Default << ends;
| Key = GetBuffer( "Message Line 7 Font", '_',
| : strlen( SetupName ) );
| if( strlen( SetupName ) && Key == ENTERkey )
| | control.ChooseFont( 6, SetupName );
|===break;
case Msg7Text:
| Default << control.GetMsgText( 6 );
| Default << ends;
| Key = GetBuffer( "Message Line 7 Text", ' ',
| : strlen( SetupName ) );
| if( Key == ENTERkey )
| | control.ChangeText( 6, SetupName );
|===break;
case Msg8Color:
| Default << ColorNames[control.GetMsgColor( 7 )];
| Default << ends;
| Key = GetBuffer( "Message Line 8 Color", '_',
| : strlen( SetupName ) );
| if( strlen( SetupName ) && Key == ENTERkey )
| | control.ChooseColor( 7, SetupName );
|===break;
case Msg8Font:
| Default << FontNames[control.GetMsgFont( 7 )];
| Default << ends;
| Key = GetBuffer( "Message Line 8 Font", '_',
| : strlen( SetupName ) );
| if( strlen( SetupName ) && Key == ENTERkey )
| | control.ChooseFont( 7, SetupName );
```

```
|===break;
case Msg8Text:
| Default << control.GetMsgText( 7 );
| Default << ends;
| Key = GetBuffer( "Message Line 8 Text", ' ',
| : strlen( SetupName ) );
| if( Key == ENTERkey )
| | control.ChangeText( 7, SetupName );
|===break;
case AF_Panel:
| Default << ( FillerDisplayed ? Yes : No );
| Default << ends;
| Key = GetBuffer( "Auto Filler Panel Displayed (Y or N)", '_',
| : strlen( SetupName ) );
| if( strlen( SetupName ) && Key == ENTERkey )
| | if( strchr( SetupName, 'Y' ) )
| | | FillerDisplayed = True;
| | else
| | | FillerDisplayed = False;
|===break;
case AK_Panel:
| Default << ( KnifeDisplayed ? Yes : No );
| Default << ends;
| Key = GetBuffer( "Air Knife Panel Displayed (Y or N)", '_',
| : strlen( SetupName ) );
| if( strlen( SetupName ) && Key == ENTERkey )
| | if( strchr( SetupName, 'Y' ) )
| | | KnifeDisplayed = True;
| | else
| | | KnifeDisplayed = False;
|===break;
case BW_Coat:
| Default << ( BWcoater ? Yes : No );
| Default << ends;
| if( BWbuttons )
| | Key = GetBuffer( "Last Blanket Washer is a Coater (Y or N)", '_',
| | : strlen( SetupName ) );
| if( strlen( SetupName ) && Key == ENTERkey )
| | if( strchr( SetupName, 'Y' ) )
| | | BWcoater = True;
| | else
| | | BWcoater = False;
|===break;
case EvacIn:
| Default << ( EvacInstalled ? Yes : No );
| Default << ends;
| if( KnifeInstalled )
| | Key = GetBuffer( "Evacuator Installed (Y or N)", '_',
| | : strlen( SetupName ) );
| if( strlen( SetupName ) && Key == ENTERkey )
| | if( strchr( SetupName, 'Y' ) )
| | | EvacInstalled = KnifeInstalled = True;
| | else
| | | EvacInstalled = False;
|===break;
case FillIn:
| Default << ( FillerInstalled ? Yes : No );
| Default << ends;
| Key = GetBuffer( "Auto Filler Installed (Y or N)", '_',
| : strlen( SetupName ) );
| if( strlen( SetupName ) && Key == ENTERkey )
| | if( strchr( SetupName, 'Y' ) )
```

C-DOC SFCONFIG.CPP

```
| | | FillerInstalled = True;
| | else
| | | FillerInstalled = False;
|==break;
case KnifeIn:
| Default << ( KnifeInstalled ? Yes : No );
| Default << ends;
| Key = GetBuffer( "Air Knife Installed (Y or N)", '_',
| : strlen( SetupName ) );
| if( strlen( SetupName ) && Key == ENTERkey )
| | if( strchr( SetupName, 'Y' ) )
| | | KnifeInstalled = True;
| | else
| | | EvacInstalled = KnifeInstalled = False;
|==break;
case SprayIn:
| Default << ( SprayerInstalled ? Yes : No );
| Default << ends;
| Key = GetBuffer( "Sprayer Installed (Y or N)", '_',
| : strlen( SetupName ) );
| if( strlen( SetupName ) && Key == ENTERkey )
| | if( strchr( SetupName, 'Y' ) )
| | | SprayerInstalled = True;
| | else
| | | SprayerInstalled = False;
|==break;
case SP_Panel:
| Default << ( SprayerDisplayed ? Yes : No );
| Default << ends;
| Key = GetBuffer( "Powder Sprayer Panel Displayed (Y or N)", '_',
| : strlen( SetupName ) );
| if( strlen( SetupName ) && Key == ENTERkey )
| | if( strchr( SetupName, 'Y' ) )
| | | SprayerDisplayed = True;
| | else
| | | SprayerDisplayed = False;
|==break;
case ST_Disp:
| Default << ( StackTempDisp ? Yes : No );
| Default << ends;
| Key = GetBuffer( "Stack Temperature Displayed (Y or N)", '_',
| : strlen( SetupName ) );
| if( strlen( SetupName ) && Key == ENTERkey )
| | if( strchr( SetupName, 'Y' ) )
| | | StackTempDisp = True;
| | else
| | | StackTempDisp = False;
|==break;
case WasherBars:
| Default << ( BWairBars ? Yes : No );
| Default << ends;
| if( BWunits )
| | Key = GetBuffer( "Blanket Washer uses Air Bars (Y or N)", '_',
| | : strlen( SetupName ) );
| if( strlen( SetupName ) && Key == ENTERkey )
| | if( strchr( SetupName, 'Y' ) )
| | | BWairBars = True;
| | else
| | | BWairBars = False;
|==break;
case AFinterval:
| if( Configured )
```

```
| | Default << FillInterval;
| Default << ends;
| if( FillerDisplayed || FillerInstalled )
| | Key = GetBuffer( "Fill Interval (20-360 minutes)", '_',
| | : strlen( SetupName ) );
| if( strlen( SetupName ) && Key == ENTERkey )
| | Response >> FillInterval;
|===break;
case AFtime:
| if( Configured )
| | Default << FillTime;
| Default << ends;
| if( FillerDisplayed || FillerInstalled )
| | Key = GetBuffer( "Fill Time (1-30 minutes)", '_',
| | : strlen( SetupName ) );
| if( strlen( SetupName ) && Key == ENTERkey )
| | Response >> FillTime;
|===break;
case AKwarmUp:
| if( Configured )
| | Default << WarmUpTime;
| Default << ends;
| if( KnifeDisplayed || KnifeInstalled )
| | Key = GetBuffer( "Air Knife Warm Up Time (1-30 minutes)", '_',
| | : strlen( SetupName ) );
| if( strlen( SetupName ) && Key == ENTERkey )
| | Response >> WarmUpTime;
|===break;
case BWBrushTime:
| if( Configured )
| | Default << WashProg0Time;
| Default << ends;
| if( BWunits )
| | Key = GetBuffer( "Brush Condition Solvent (2-25 seconds)", '_',
| | : strlen( SetupName ) );
| if( strlen( SetupName ) && Key == ENTERkey )
| | Response >> WashProg0Time;
|===break;
case BWprog1Shots:
| if( Configured )
| | Default << WashProg1Shots;
| Default << ends;
| if( BWunits )
| | Key = GetBuffer( "Program 1 # of Solvent shots", '_',
| | : strlen( SetupName ) );
| if( strlen( SetupName ) && Key == ENTERkey )
| | Response >> WashProg1Shots;
|===break;
case BWprog1Time:
| if( Configured )
| | Default << WashProg1Time;
| Default << ends;
| if( BWunits )
| | Key = GetBuffer( "Program 1 Solvent (2-25 seconds)", '_',
| | : strlen( SetupName ) );
| if( strlen( SetupName ) && Key == ENTERkey )
| | Response >> WashProg1Time;
|===break;
case BWprog2Shots:
| if( Configured )
| | Default << WashProg2Shots;
| Default << ends;
```

```
| if( BWunits )
| | Key = GetBuffer( "Program 2 # of Solvent shots", '_',
| | : strlen( SetupName ) );
| if( strlen( SetupName ) && Key == ENTERkey )
| | Response >> WashProg2Shots;
|===break;
case BWprog2Time:
| if( Configured )
| | Default << WashProg2Time;
| Default << ends;
| if( BWunits )
| | Key = GetBuffer( "Program 2 Solvent (2-25 seconds)", '_',
| | : strlen( SetupName ) );
| if( strlen( SetupName ) && Key == ENTERkey )
| | Response >> WashProg2Time;
|===break;
case BWprog3Shots:
| if( Configured )
| | Default << WashProg3Shots;
| Default << ends;
| if( BWunits )
| | Key = GetBuffer( "Program 3 # of Solvent shots", '_',
| | : strlen( SetupName ) );
| if( strlen( SetupName ) && Key == ENTERkey )
| | Response >> WashProg3Shots;
|===break;
case BWprog3Time:
| if( Configured )
| | Default << WashProg3Time;
| Default << ends;
| if( BWunits )
| | Key = GetBuffer( "Program 3 Solvent (2-25 seconds)", '_',
| | : strlen( SetupName ) );
| if( strlen( SetupName ) && Key == ENTERkey )
| | Response >> WashProg3Time;
|===break;
case BWprog4Shots:
| if( Configured )
| | Default << WashProg4Shots;
| Default << ends;
| if( BWunits )
| | Key = GetBuffer( "Program 4 # of Solvent shots", '_',
| | : strlen( SetupName ) );
| if( strlen( SetupName ) && Key == ENTERkey )
| | Response >> WashProg4Shots;
|===break;
case BWprog4Time:
| if( Configured )
| | Default << WashProg4Time;
| Default << ends;
| if( BWunits )
| | Key = GetBuffer( "Program 4 Solvent (2-25 seconds)", '_',
| | : strlen( SetupName ) );
| if( strlen( SetupName ) && Key == ENTERkey )
| | Response >> WashProg4Time;
|===break;
case BWprog5Shots:
| if( Configured )
| | Default << WashProg5Shots;
| Default << ends;
| if( BWunits )
| | Key = GetBuffer( "Program 5 # of Solvent shots", '_',
```

C-DOC SFCONFIG.CPP

```
| | : strlen( SetupName ) );
| if( strlen( SetupName ) && Key == ENTERkey )
| | Response >> WashProg5Shots;
|===break;
case BWprog5Time:
| if( Configured )
| | Default << WashProg5Time;
| Default << ends;
| if( BWunits )
| | Key = GetBuffer( "Program 5 Solvent (2-25 seconds)", '_',
| | : strlen( SetupName ) );
| if( strlen( SetupName ) && Key == ENTERkey )
| | Response >> WashProg5Time;
|===break;
case BW_Buttons:
| if( Configured )
| | Default << BWbuttons;
| Default << ends;
| Key = GetBuffer( "Blanket Washer Units Displayed (0-10)", '_',
| : strlen( SetupName ) );
| if( strlen( SetupName ) && Key == ENTERkey )
| | Response >> BWbuttons;
|===break;
case DryerPanels:
| if( Configured )
| | Default << DryersDisplayed;
| Default << ends;
| Key = GetBuffer( "Dryers Panels Displayed (0-3)", '_',
| : strlen( SetupName ) );
| if( strlen( SetupName ) && Key == ENTERkey )
| | Response >> DryersDisplayed;
|===break;
case InstallerCode:
| if( Configured )
| | Default << InstallerPassword;
| Default << ends;
| Key = GetBuffer( "New Installer Access Code (0-32767)", '_',
| : strlen( SetupName ) );
| if( strlen( SetupName ) && Key == ENTERkey )
| | Response >> InstallerPassword;
|===break;
case NumDryers:
| if( Configured )
| | Default << DryerUnits;
| Default << ends;
| Key = GetBuffer( "Dryers Installed (0-3)", '_',
| : strlen( SetupName ) );
| if( strlen( SetupName ) && Key == ENTERkey )
| | Response >> DryerUnits;
|===break;
case NumTemps:
| if( Configured )
| | Default << TempUnits;
| Default << ends;
| Key = GetBuffer( "WaterLess Temp Controls Installed (0-8)", '_',
| : strlen( SetupName ) );
| if( strlen( SetupName ) && Key == ENTERkey )
| | Response >> TempUnits;
|===break;
case NumWashers:
| if( Configured )
| | Default << BWunits;
```

C-DOC SFCONFIG.CPP

```
| Default << ends;
| Key = GetBuffer( "Blanket Washers Installed (0-10)", '_',
| : strlen( SetupName ) );
| if( strlen( SetupName ) && Key == ENTERkey )
| | Response >> BWunits;
|===break;
case OperatorCode:
| if( Configured )
| | Default << SetupPassword;
| Default << ends;
| Key = GetBuffer( "Operator Access Code (0-32767)", '_',
| : strlen( SetupName ) );
| if( strlen( SetupName ) && Key == ENTERkey )
| | Response >> SetupPassword;
|===break;
case SPdelay:
| if( Configured )
| | Default << SprayDelay;
| Default << ends;
| if( SprayerInstalled )
| | Key = GetBuffer( "Sprayer Delay Time (0-600 seconds)", '_',
| | : strlen( SetupName ) );
| if( strlen( SetupName ) && Key == ENTERkey )
| | Response >> SprayDelay;
|===break;
case WLheatDelay:
| if( Configured )
| | Default << WLHeatDelayTime;
| Default << ends;
| if( TempUnits )
| | Key = GetBuffer( "Waterless Heater Delay (10-60 seconds)", '_',
| | : strlen( SetupName ) );
| if( strlen( SetupName ) && Key == ENTERkey )
| | Response >> WLHeatDelayTime;
|===break;
case WLpreHeat:
| if( Configured )
| | Default << WLPreHeatTime;
| Default << ends;
| if( TempUnits || WLtempButtons )
| | Key = GetBuffer( "Waterless Pre Heat (1-60 minutes)", '_',
| | : strlen( SetupName ) );
| if( strlen( SetupName ) && Key == ENTERkey )
| | Response >> WLPreHeatTime;
|===break;
case WL_Buttons:
| if( Configured )
| | Default << WLtempButtons;
| Default << ends;
| Key = GetBuffer( "Waterless Units Displayed (0-8)", '_',
| : strlen( SetupName ) );
| if( strlen( SetupName ) && Key == ENTERkey )
| | Response >> WLtempButtons;
|===break;
case WL_D_plate:
| if( Configured )
| | Default << PlateCoefficientD;
| Default << ends;
| if( TempUnits )
| | Key = GetBuffer( "Differential Component 'TD' for IR (0-999)", '_',
| | : strlen( SetupName ) );
| if( strlen( SetupName ) && Key == ENTERkey )
```

C-DOC SFCONFIG.CPP

```
| | Response >> PlateCoefficientD;
|===break;
case WL_D_water:
| if( Configured )
| | Default << WaterCoefficientD;
| Default << ends;
| if( TempUnits )
| | Key = GetBuffer( "Differential Component 'TD' for TC (0-999)", '_',
| | : strlen( SetupName ) );
| if( strlen( SetupName ) && Key == ENTERkey )
| | Response >> WaterCoefficientD;
|===break;
case WL_I_plate:
| if( Configured )
| | Default << PlateCoefficientI;
| Default << ends;
| if( TempUnits )
| | Key = GetBuffer( "Integral Component 'TI' for IR (1-999)", '_',
| | : strlen( SetupName ) );
| if( strlen( SetupName ) && Key == ENTERkey )
| | Response >> PlateCoefficientI;
|===break;
case WL_I_water:
| if( Configured )
| | Default << WaterCoefficientI;
| Default << ends;
| if( TempUnits )
| | Key = GetBuffer( "Integral Component 'TI' for TC (1-999)", '_',
| | : strlen( SetupName ) );
| if( strlen( SetupName ) && Key == ENTERkey )
| | Response >> WaterCoefficientI;
|===break;
case WL_N_plate:
| if( Configured )
| | Default << PlateCoefficientN;
| Default << ends;
| if( TempUnits )
| | Key = GetBuffer( "Number of Samples 'NS' for IR (0-199)", '_',
| | : strlen( SetupName ) );
| if( strlen( SetupName ) && Key == ENTERkey )
| | Response >> PlateCoefficientN;
|===break;
case WL_N_water:
| if( Configured )
| | Default << WaterCoefficientN;
| Default << ends;
| if( TempUnits )
| | Key = GetBuffer( "Number of Samples 'NS' for TC (0-199)", '_',
| | : strlen( SetupName ) );
| if( strlen( SetupName ) && Key == ENTERkey )
| | Response >> WaterCoefficientN;
|===break;
case WL_P_plate:
| if( Configured )
| | Default << PlateCoefficientP;
| Default << ends;
| if( TempUnits )
| | Key = GetBuffer( "Proportional Component 'K' for IR (0-99)", '_',
| | : strlen( SetupName ) );
| if( strlen( SetupName ) && Key == ENTERkey )
| | Response >> PlateCoefficientP;
|===break;
```

C-DOC SFCONFIG.CPI

```
case WL_P_water:
| if( Configured )
| | Default << WaterCoefficientP;
| Default << ends;
| if( TempUnits )
| | Key = GetBuffer( "Proportional Component 'K' for TC (0-99)", '_',
| | : strlen( SetupName ) );
| if( strlen( SetupName ) && Key == ENTERkey )
| | Response >> WaterCoefficientP;
|===break;
case WL_T_plate:
| if( Configured )
| | Default << PlateCoefficientT;
| Default << ends;
| if( TempUnits )
| | Key = GetBuffer( "Sample Interval 'TS' for IR (50-2000 milliseconds)",
| | : '_', strlen( SetupName ) );
| if( strlen( SetupName ) && Key == ENTERkey )
| | Response >> PlateCoefficientT;
|===break;
case WL_T_water:
| if( Configured )
| | Default << WaterCoefficientT;
| Default << ends;
| if( TempUnits )
| | Key = GetBuffer( "Sample Interval 'TS' for TC (50-2000 milliseconds)",
| | : '_', strlen( SetupName ) );
| if( strlen( SetupName ) && Key == ENTERkey )
| | Response >> WaterCoefficientT;
|===break;
}
====return Key;
}

// build the data entry terminal
void SheetFedConfig::BuildTerminal( char *Title )
{
GRect Frame; Frame.moveTo( PanelAnchor ); Frame.growTo( PanelSize );
void *TempPointer;
if( !( Terminal = new Panel( Frame, GRect( 0, 0, 0, 0 ), Title ) ) )
{
| cerr << "SheetFedConfig::BuildTerminal can't create Terminal Panel"
| << endl;
| exit( EXIT_FAILURE );
}
Frame.moveTo( DispAnchor ); Frame.growTo( DispSize );
if( !( TempPointer = new MatrixDisplay( Frame, 20, 1 ) ) )
{
| cerr << "SheetFedConfig::BuildTerminal can't create MatrixDisplay"
| << endl;
| exit( EXIT_FAILURE );
}
Terminal->addMatDisp( True, (MatrixDisplay*)TempPointer );
Frame.growTo( MaxButtonSize );
Frame.moveTo( Key1 );
if( !( TempPointer = new Button( Frame, Button::Momentary, " 1 " ) ) )
{
| cerr << "SheetFedConfig::BuildTerminal can't create Button"
| << endl;
| exit( EXIT_FAILURE );
}
Terminal->addButton( True, (Button*)TempPointer );
```

C-DOC SFCONFIG.CPP

```
Frame.moveTo( KeyCancel );
if( !( TempPointer = new Button( Frame, Button::Momentary, "Exit" ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( KeyQ );
if( !( TempPointer = new Button( Frame, Button::Momentary, " Q " ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( KeyA );
if( !( TempPointer = new Button( Frame, Button::Momentary, " A " ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( Key2 );
if( !( TempPointer = new Button( Frame, Button::Momentary, " 2 " ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( KeyZ );
if( !( TempPointer = new Button( Frame, Button::Momentary, " Z " ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( KeyW );
if( !( TempPointer = new Button( Frame, Button::Momentary, " W " ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( KeyS );
if( !( TempPointer = new Button( Frame, Button::Momentary, " S " ) ) )
{
|  cerr << "SheetFedConfig::BuildTerminal can't create Button"
|  << endl;
|  exit( EXIT_FAILURE );
}
Terminal->addButton( True, (Button*)TempPointer );
Frame.moveTo( Key3 );
if( !( TempPointer = new Button( Frame, Button::Momentary, " 3 " ) ) )
{
|  cerr << "SheetFedConfig::BuildTerminal can't create Button"
|  << endl;
|  exit( EXIT_FAILURE );
```

```
}
Terminal->addButton( True, (Button*)TempPointer );
Frame.moveTo( KeyX );
if( !( TempPointer = new Button( Frame, Button::Momentary, " X " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyE );
if( !( TempPointer = new Button( Frame, Button::Momentary, " E " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyD );
if( !( TempPointer = new Button( Frame, Button::Momentary, " D " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( Key4 );
if( !( TempPointer = new Button( Frame, Button::Momentary, " 4 " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyC );
if( !( TempPointer = new Button( Frame, Button::Momentary, " C " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyR );
if( !( TempPointer = new Button( Frame, Button::Momentary, " R " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyF );
if( !( TempPointer = new Button( Frame, Button::Momentary, " F " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( Key5 );
if( !( TempPointer = new Button( Frame, Button::Momentary, " 5 " ) ) )
{
| cerr << "SheetFedConfig::BuildTerminal can't create Button"
```

```
| << endl;
| exit( EXIT_FAILURE );
}
Terminal->addButton( True, (Button*)TempPointer );
Frame.moveTo( KeyV );
if( !( TempPointer = new Button( Frame, Button::Momentary, " V " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyT );
if( !( TempPointer = new Button( Frame, Button::Momentary, " T " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyG );
if( !( TempPointer = new Button( Frame, Button::Momentary, " G " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( Key6 );
if( !( TempPointer = new Button( Frame, Button::Momentary, " 6 " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyB );
if( !( TempPointer = new Button( Frame, Button::Momentary, " B " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyY );
if( !( TempPointer = new Button( Frame, Button::Momentary, " Y " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyH );
if( !( TempPointer = new Button( Frame, Button::Momentary, " H " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( Key7 );
if( !( TempPointer = new Button( Frame, Button::Momentary, " 7 " ) ) )
```

```
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyN );
if( !( TempPointer = new Button( Frame, Button::Momentary, " N " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyU );
if( !( TempPointer = new Button( Frame, Button::Momentary, " U " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyJ );
if( !( TempPointer = new Button( Frame, Button::Momentary, " J " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( Key8 );
if( !( TempPointer = new Button( Frame, Button::Momentary, " 8 " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyM );
if( !( TempPointer = new Button( Frame, Button::Momentary, " M " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyI );
if( !( TempPointer = new Button( Frame, Button::Momentary, " I " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyK );
if( !( TempPointer = new Button( Frame, Button::Momentary, " K " ) ) )
{
| cerr << "SheetFedConfig::BuildTerminal can't create Button"
| << endl;
| exit( EXIT_FAILURE );
}
Terminal->addButton( True, (Button*)TempPointer );
```

```
Frame.moveTo( Key9 );
if( !( TempPointer = new Button( Frame, Button::Momentary, " 9 " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyPrev );
if( !( TempPointer = new Button( Frame, Button::Momentary, "Prev" ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyO );
if( !( TempPointer = new Button( Frame, Button::Momentary, " O " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyL );
if( !( TempPointer = new Button( Frame, Button::Momentary, " L " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( Key0 );
if( !( TempPointer = new Button( Frame, Button::Momentary, " 0 " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyNext );
if( !( TempPointer = new Button( Frame, Button::Momentary, "Next" ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyP );
if( !( TempPointer = new Button( Frame, Button::Momentary, " P " ) ) )
{
| cerr << "SheetFedConfig::BuildTerminal can't create Button"
| << endl;
| exit( EXIT_FAILURE );
}
Terminal->addButton( True, (Button*)TempPointer );
Frame.moveTo( KeyEnter );
if( !( TempPointer = new Button( Frame, Button::Momentary, "Enter" ) ) )
{
| cerr << "SheetFedConfig::BuildTerminal can't create Button"
| << endl;
| exit( EXIT_FAILURE );
```

```
    }
    Terminal->addButton( True, (Button*)TempPointer );
    Frame.moveTo( KeyBack );
    if( !( TempPointer = new Button( Frame, Button::Momentary, "Back" ) ) )
    {
    | cerr << "SheetFedConfig::BuildTerminal can't create Button"
    | << endl;
    | exit( EXIT_FAILURE );
    }
    Terminal->addButton( True, (Button*)TempPointer );
    Frame.moveTo( KeySpace ); Frame.growTo( SpaceBarSize );
    if( !( TempPointer = new Button( Frame, Button::Momentary ) ) )
    {
    | cerr << "SheetFedConfig::BuildTerminal can't create Button"
    | << endl;
    | exit( EXIT_FAILURE );
    }
    Terminal->addButton( True, (Button*)TempPointer );
}

// configure the system installation
void SheetFedConfig::Configure( void )
{
    BuildTerminal( "" );
    for( uint Item = InstallerCode; Item < InstallerItems; Item++ )
    #  Adjust( Item, False );
    SetupName[0] = '\0';
    uint Key = GetBuffer( "Configure operator items now? (Y or N)" );
    if( strchr( SetupName, 'Y' ) )
    {
    | Item = 0;
    | while( Key != ESCkey )
    | {
    | #  Key = Adjust( Item, False );
    | #  if( Key == '<' || Key == ',' )
    | #  {
    | #  | if( Item == 0 )
    | #  | | Item = InstallerItems;
    | #  | Item--;
    | #  }
    | #  if( Key == '>' || Key == '.' || Key == ENTERkey )
    | #  {
    | #  | ++Item;
    | #  | if( Item >= InstallerItems )
    | #  | | Item = 0;
    | #  }
    | #  FixConfig();
    | }
    }
    FixConfig();
    SetupName[0] = '\0';
    index = 0;
    Update();
    delete Terminal;
    Terminal = 0;
}

// ask the user "are you sure you're sure?"
Boolean SheetFedConfig::Confirm( char *Prompt )
{
    Boolean endless = True, Sure = False;
    GPoint Anchor( PanelAnchor.x + DispAnchor.x + DispSize.x / 2,
```

C-DOC SFCONFIG.CPP

```
    : PanelAnchor.y + DispAnchor.y - 2 * Psize );
SText *Label, *Response;
uint Key;
if( !( Label = new SText( Anchor, Psize, Prompt ) ) )
{
| cerr << "SheetFedConfig::Confirm can't create SText Label" << endl;
| exit( EXIT_FAILURE );
}
Anchor.y += DispSize.y + 4 * Psize;
if( !( Response = new SText( Anchor, Psize, "No" ) ) )
{
| cerr << "SheetFedConfig::Confirm can't create SText Response" << endl;
| exit( EXIT_FAILURE );
}
Terminal->Display( 0, 0, SetupName );
while( endless )
{
#  Key = 0;
#  if( kbhit() )
#  | Key = toupper( GetKP() );
#  else
#  {
#  | Terminal->Touched( control.TP_Where() );
#  | for( uint b = 0; b < ( sizeof( KeyCode ) / sizeof( KeyCode[0] ) );
#  | #  : b++ )
#  | #  if( Terminal->OneShot(b) && Terminal->Switch( b ) )
#  | #  {
#  | #  | Key = KeyCode[b];
#  | #=======break;
#  | #  }
#  }
#  control.runIO();
#  if( Key == 'Y' )
#  {
#  | delete Response;
#  | Sure = True;
#  | if( !( Response = new SText( Anchor, Psize, "Yes" ) ) )
#  | {
#  | | cerr << "SheetFedConfig::Confirm can't create SText Response" << endl;
#  | | exit( EXIT_FAILURE );
#  | }
#  }
#  if( Key == 'N' )
#  {
#  | delete Response;
#  | Sure = False;
#  | if( !( Response = new SText( Anchor, Psize, "No" ) ) )
#  | {
#  | | cerr << "SheetFedConfig::Confirm can't create SText Response" << endl;
#  | | exit( EXIT_FAILURE );
#  | }
#  }
#  if( Key == ESCkey | Key == ENTERkey )
#=======break;
}
delete Label;
delete Response;
if( Key == ESCkey )
========return False;
else
========return Sure;
}
```

C-DOC SFCONFIG.CPP

```

// force configuration parameters to legitimate values
void SheetFedConfig::FixConfig( void )
{
   BWbuttons %= 11;
//   if( BW16IOs )
   BW16IOs = True;
   BWcycles %= 1000;
   for( uint p = 0; p < 10; p++ )
   #  BWprog[p] %= 6;
   BWunits %= 11;
   Dryer1Speed %= 101;
   Dryer2Speed %= 101;
   Dryer3Speed %= 101;
   DryersDisplayed %= 4;
   DryerUnits %= 4;
   if( 20 > FillInterval |
   | :  FillInterval > 360 )
   | FillInterval = 100;         // minutes
   if( 1 > FillTime || FillTime > 30 )
   | FillTime = 8;               // minutes
   InstallerPassword &= 32767;
   for( uint u = 0; u < 8; u++ )
   {
   #  if( 40 > PlateSetPoint[u] || PlateSetPoint[u] > 125 )
   #  |  PlateSetPoint[u] = 75;
   #  if( 40 > WaterSetPoint[u] || WaterSetPoint[u] > 125 )
   #  |  WaterSetPoint[u] = 75;
   #  TempMode[u] %= WaterLessTemperature::Modes;
   }
   if( PlateCoefficientD > 999 )
   | PlateCoefficientD = 0;
   if( 1 > PlateCoefficientI || PlateCoefficientI > 999 )
   | PlateCoefficientI = 500;
   if( PlateCoefficientN > 199 )
   | PlateCoefficientN = 10;
   if( PlateCoefficientP > 99 )
   | PlateCoefficientP = 3;
   if( 50 > PlateCoefficientT || PlateCoefficientT > 2000 )
   | PlateCoefficientT = 50;
   for( uint c = 0; c < 20; c++ )
   #  if( ispunct( SetupName[c] ) || isspace( SetupName[c] ) )
   #  |  SetupName[c] = '_';
   SetupName[20] = '\0';
   SetupPassword &= 32767;
   if( SprayDelay > 600 )
   | SprayDelay = 10;            // seconds
   SpraySpeed %= 101;
   TempUnits %= 9;
   if( 1 > WarmUpTime || WarmUpTime > 30 )
   | WarmUpTime = 5;             // minutes
   if( 2 > WashProg0Time || WashProg0Time > 25 )// seconds
   | WashProg0Time = 5;
   if( 2 > WashProg1Time || WashProg1Time > 25 )
   | WashProg1Time = 13;
   if( 2 > WashProg2Time || WashProg2Time > 25 )
   | WashProg2Time = 9;
   if( 2 > WashProg3Time || WashProg3Time > 25 )
   | WashProg3Time = 7;
   if( 2 > WashProg4Time || WashProg4Time > 25 )
   | WashProg4Time = 5;
   if( 2 > WashProg5Time || WashProg5Time > 25 )
```

C-DOC SFCONFIG.CPP

```
| WashProg5Time = 4;
if( ( 2 * WashProg1Shots - 1 ) * WashProg1Time > 70 )
| WashProg1Shots = ( 70 + WashProg1Time ) / ( 2 * WashProg1Time );
if( ( 2 * WashProg2Shots - 1 ) * WashProg2Time > 70 )
| WashProg2Shots = ( 70 + WashProg2Time ) / ( 2 * WashProg2Time );
if( ( 2 * WashProg3Shots - 1 ) * WashProg3Time > 70 )
| WashProg3Shots = ( 70 + WashProg3Time ) / ( 2 * WashProg3Time );
if( ( 2 * WashProg4Shots - 1 ) * WashProg4Time > 70 )
| WashProg4Shots = ( 70 + WashProg4Time ) / ( 2 * WashProg4Time );
if( ( 2 * WashProg5Shots - 1 ) * WashProg5Time > 70 )
| WashProg5Shots = ( 70 + WashProg5Time ) / ( 2 * WashProg5Time );
if( WaterCoefficientD > 999 )
| WaterCoefficientD = 0;
if( 1 > WaterCoefficientI || WaterCoefficientI > 999 )
| WaterCoefficientI = 500;
if( WaterCoefficientN > 199 )
| WaterCoefficientN = 10;
if( WaterCoefficientP > 99 )
| WaterCoefficientP = 3;
if( 50 > WaterCoefficientT || WaterCoefficientT > 2000 )
| WaterCoefficientT = 50;
if( 10 > WLHeatDelayTime || WLHeatDelayTime > 60 )
| WLHeatDelayTime = 10;
if( 1 > WLPreHeatTime || WLPreHeatTime > 60 )
| WLPreHeatTime = 15;
WLtempButtons %= 9;
}

// get a line of text in the setupname buffer
uint SheetFedConfig::GetBuffer( char *Prompt, char BlankChar, uint right,
: uint left )
{
Terminal->Display( 0, 0, "" );
Boolean endless = True;
GPoint Anchor( PanelAnchor.x + DispAnchor.x + DispSize.x / 2,
    : PanelAnchor.y + DispAnchor.y - Psize );
SText *Label;
if( !( Label = new SText( Anchor, Psize, Prompt ) ) )
{
| cerr << "SheetFedConfig::GetBuffer can't create SText Label" << endl;
| exit( EXIT_FAILURE );
}
byte *Cursor;
Terminal->Display( 0, 0, SetupName );
uint End = strlen( SetupName ), Key, Scale = 10;
while( Scale )
{
# settextstyle( DEFAULT_FONT, HORIZ_DIR, Scale );
# if( textwidth( "W" ) * 20 < DispSize.x &&
# | : textheight( "W" ) * 1 < DispSize.y )
#=======break;
# Scale--;
}
const GPoint ChrSz( textheight( "W" ), textwidth( "W" ) ),
ChrHm( PanelAnchor.x + DispAnchor.x + ( DispSize.x - 20 * ChrSz.x ) / 2,
: PanelAnchor.y + DispAnchor.y + ( DispSize.y - 1 * ChrSz.y ) / 2 );
GRect Curse;
Curse.growTo( ChrSz );
Curse.grow( GPoint( -1, -1 ) );
Curse.moveTo( ChrHm );
Curse.move( End * ChrSz.x, 0 );
if( !( Cursor = new byte[imagesize( Curse.left, Curse.top,
```

```
| : : : Curse.right, Curse.bottom )] ) )
{
| cerr << "SheetFedConfig::GetBuffer can't create Cursor" << endl;
| exit( EXIT_FAILURE );
}
setfillstyle( SOLID_FILL, YELLOW );
setviewport( 0, 0, getmaxx(), getmaxy(), False );
bar( Curse.left, Curse.top, Curse.right, Curse.bottom );
getimage( Curse.left, Curse.top, Curse.right, Curse.bottom, Cursor );
Curse.moveTo( ChrHm );
Curse.move( left * ChrSz.x, 0 );
for( uint c = left; c < right; c++ )
{
#  putimage( Curse.left, Curse.top, Cursor, XOR_PUT );
#  Curse.move( ChrSz.x, 0 );
}
Timer Blink( 4 );
while( endless )
{
#  control.runIO();
#  End = strlen( SetupName );
#  Key = 0;
#  if( Blink.Expired() )
#  {
#  |  Blink.Set( 4 );
#  |  Curse.moveTo( ChrHm );
#  |  Curse.move( End * ChrSz.x, 0 );
#  |  setviewport( 0, 0, getmaxx(), getmaxy(), False );
#  |  putimage( Curse.left, Curse.top, Cursor, XOR_PUT );
#  }
#  if( kbhit() )
#  |  Key = toupper( GetKP() );
#  else
#  {
#  |  Terminal->Touched( control.TP_Where() );
#  |  for( uint b = 0; b < ( sizeof( KeyCode ) / sizeof( KeyCode[0] ) );
#  |  #  :  b++ )
#  |  #  if( Terminal->OneShot( b ) && Terminal->Switch( b ) )
#  |  #  {
#  |  #  |  Key = KeyCode[b];
#  |  #=======break;
#  |  #  }
#  }
#  if( Key )
#  {
#  |  Blink.Set( 0 );
#  |  setviewport( 0, 0, getmaxx(), getmaxy(), False );
#  |  putimage( Curse.left, Curse.top, Cursor, OR_PUT );
#  |  putimage( Curse.left, Curse.top, Cursor, XOR_PUT );
#  }
#  if( Key == ESCkey || Key == ENTERkey || Key == '<'
#  |  :  || Key == ',' || Key == '>' || Key == '.' )
#========break;
#  if( Key == BSkey && End > 0 )
#  {
#  |  if( left != right )
#  |  {
#  |  |  Curse.moveTo( ChrHm );
#  |  |  Curse.move( left * ChrSz.x, 0 );
#  |  |  for( uint e = left; e < right; e++ )
#  |  |  {
#  |  |  #  setviewport( 0, 0, getmaxx(), getmaxy(), False );
```

C-DOC SFCONFIG.CPP

```
    # | | #  putimage( Curse.left, Curse.top, Cursor, XOR_PUT );
    # | | #  Curse.move( ChrSz.x, 0 );
    # | | }
    # | | left = right = 0;
    # | }
    # | SetupName[--End] = '\0';
    # | Terminal->Display( 0, 0, SetupName );
    # }
    # if( Key && left != right )
    # {
    # | for( uint d = 0; d < strlen( SetupName ); d++ )
    # | #  SetupName[left + d] = SetupName[right + d];
    # | left = right = 0;
    # }
    # End = strlen( SetupName );
    # if( ( isalnum( Key ) | Key == ' ' ) && End < 20 )
    # {
    # | SetupName[++End] = '\0';
    # | SetupName[--End] = isspace( Key ) ? BlankChar : Key;
    # | Terminal->Display( 0, 0, SetupName );
    # }
    }
    delete Cursor;
    delete Label;
====return Key;
}

// fetch configuration data from ram "disk"
void SheetFedConfig::GetDataBlock( void )
{
    byte Bank, *Block = (byte *)MK_FP( 0xda00, 0 ),
    *Buffer , *Frame = (byte *)MK_FP( 0xd800, 0 );
    uint Offset = 0,
        size = sizeof( WatchWord ) + (byte*)&WatchWord - (byte*)&BWcycles;
    if( index == 0 )
    | Buffer = (byte*)&BWcycles;
    else
    {
    | Buffer = (byte*)&index;
    | Offset = index * size + (byte*)&index - (byte*)&BWcycles;
    }
    Bank = 0x60 + Offset / 0x2000;
    Block = (byte *)MK_FP( 0xda00, Offset % 0x2000 );
    Frame = (byte *)MK_FP( 0xd800, 0 );
    if( Bank < 0x80 )
    {
    | *Frame = Bank;
    | while( sizeof( WatchWord ) + (byte*)&WatchWord - Buffer > 0 )
    | {
    | #  if( Block >= (byte*)MK_FP( 0xda00, 0x2000 ) )
    | #  {
    | #  | Block = (byte *)MK_FP( 0xda00, 0 );
    | #  | if( ++Bank >= 0x80 )
    | #============break;
    | #  | *Frame = Bank;
    | #  }
    | #  *Buffer++ = *Block++;
    | }
    }
    FixConfig();
}
```

```
// get user's ID for this setup
Boolean SheetFedConfig::GetID( char *Prompt )
{
  Boolean endless = True;
  uint Key, newIndex = 0;
  Terminal->Display( 0, 0, SetupName );
  while( endless )
  {
  #  Key = GetBuffer( Prompt );
  #  if( ( Key == '<' || Key == ',' ) && newIndex > 0 )
  #  {
  #  |  index = --newIndex;
  #  |  GetDataBlock();
  #  |  Terminal->Display( 0, 0, SetupName );
  #  }
  #  if( Key == '>' || Key == '.' )
  #  {
  #  |  index = ++newIndex;
  #  |  GetDataBlock();
  #  |  if( !Valid() )
  #  |  {
  #  |  |  index = --newIndex;
  #  |  |  GetDataBlock();
  #  |  }
  #  |  Terminal->Display( 0, 0, SetupName );
  #  }
  #  if( Key == ESCkey || Key == ENTERkey )
  #========break;
  }
  if( Key == ESCkey )
========return False;
  else
========return True;
}

// Calculate a checksum for a block of data
uint SheetFedConfig::MakeCheckSum( void )
{
  byte *Buffer;
  if( index == 0 )
  |  Buffer = (byte*)&BWcycles;
  else
  |  Buffer = (byte*)&index;
  uint CheckSum = 0;
  while( &WatchWord - (uint*)Buffer > 0 )
  #  CheckSum += *Buffer++;
=====return CheckSum;
}

// recall a saved setup
void SheetFedConfig::RecallSetup( void )
{
  char newName[21];
  uint newIndex;
  BuildTerminal( "" );
  while( GetID( "Enter Job Name to Recall" ) != False )
  {
  #  strncpy( newName, SetupName, 20 );
  #  newName[20] = '\0';
  #  newIndex = 0;
  #  do {
  #  #  index = ++newIndex;
```

```
    # #  GetDataBlock();
    # } while( Valid() && strcmp( newName, SetupName ) != 0 );
    # if( Valid() )
    # {
    # |  index = newIndex;        // ?
    # |  GetDataBlock();
    #=======break;
    # }
    # if( !Confirm( "No such setup name, re-enter?" ) )
    #=======break;
    }
    delete Terminal;
    Terminal = 0;
}

// save the current setup
void SheetFedConfig::SaveSetup( void )
{
    char newName[21];
    uint newIndex;
    Update();
    BuildTerminal( "" );
    index = 0;
    while( GetID( "Enter Job Name to Save" ) != False )
    {
    # if( index != 0 && strlen( SetupName ) == 0 )
    # {
    # |  GetDataBlock();
    # |  if( Confirm( "Delete this Setup?" ) )
    # | |  do {
    # | | #  index++;
    # | | #  GetDataBlock();
    # | | #  index--;
    # | | #  SetDataBlock();
    # | | #  index++;
    # | |  } while( Valid() );
    #=======break;
    # }
    # strncpy( newName, SetupName, 20 );
    # newName[20] = '\0';
    # newIndex = 0;
    # do {
    # #  index = ++newIndex;
    # #  GetDataBlock();
    # } while( Valid() && strcmp( newName, SetupName ) != 0 );
    # if( !Valid() || Confirm( "Overwrite existing setup?" ) )
    # {
    # |  index = 0;
    # |  GetDataBlock();
    # |  index = newIndex;
    # |  strncpy( SetupName, newName, 20 );
    # |  SetupName[20] = '\0';
    # |  WatchWord = MakeCheckSum();
    # |  SetDataBlock();
    # |  Update();
    #=======break;
    # }
    }
    delete Terminal;
    Terminal = 0;
    index = 0;
    GetDataBlock();
```

```
}

// store configuration data to ram "disk"
void SheetFedConfig::SetDataBlock( void )
{
  byte Bank, *Block = (byte *)MK_FP( 0xda00, 0 ),
  *Buffer , *Frame = (byte *)MK_FP( 0xd800, 0 );
  uint Offset = 0,
     size = sizeof( WatchWord ) + (byte*)&WatchWord - (byte*)&BWcycles;
  if( index == 0 )
  | Buffer = (byte*)&BWcycles;
  else
  {
  | Buffer = (byte*)&index;
  | Offset = index * size + (byte*)&index - (byte*)&BWcycles;
  }
  Bank = 0x60 + Offset / 0x2000;
  Block = (byte *)MK_FP( 0xda00, Offset % 0x2000 );
  Frame = (byte *)MK_FP( 0xd800, 0 );
  if( Bank < 0x80 )
  {
  | *Frame = Bank;
  | while( sizeof( WatchWord ) + (byte*)&WatchWord - Buffer > 0 )
  | {
  | #  if( Block >= (byte*)MK_FP( 0xda00, 0x2000 ) )
  | #  {
  | #  |  Block = (byte *)MK_FP( 0xda00, 0 );
  | #  |  if( ++Bank >= 0x80 )
  | #==========break;
  | #  |  *Frame = Bank;
  | #  }
  | #  *Block++ = *Buffer++;
  | }
  }
}

// change the setup parameters
void SheetFedConfig::Setup( void )
{
  Update();
  BuildTerminal( "" );
  istrstream Response( SetupName, 20 );
  ostrstream Default( SetupName, 20 );
  Default << ends;
  uint Code, Item = 0, Key = GetBuffer( "Enter your access code" );
  Response >> Code;
  if( Key != ESCkey && (
  | : : Code == InstallerPassword || Code == SetupPassword ) )
  {
  | Boolean InstallerAccess = Code == InstallerPassword ? True : False;
  | if( InstallerAccess )
  | | Item = InstallerCode;
  | while( Key != ESCkey )
  | {
  | #  Key = Adjust( Item, True );
  | #  if( Key == '<' || Key == ',' )
  | #  {
  | #  |  if( Item == 0 )
  | #  |  | Item = InstallerAccess ? InstallerItems : OperatorItems;
  | #  |  Item--;
  | #  }
  | #  if( Key == '>' | Key == '.' )
```

C-DOC SFCONFIG.CP

```
   {
   |  index = OldIndex;
========return False;
   }
   Ok = False;
   FixConfig();
   if( MakeCheckSum() == WatchWord )
   |  Ok = True;
   index = OldIndex;
   if( MakeCheckSum() == WatchWord )
   |  Ok = True;
====return Ok;
}
```

C-DOC SHEETFED.CP

```
/****************************\
*                           *
*  sheetfed.cpp             *
*                           *
*  Sheet Feed Printing Press Control Panel  *
*                           *
*  (C) 1993 OXY-DRY CORPORATION  *
*  all rights reserved      *
*                           *
\****************************/

// 1993 october 10    change copyright for listing

#include <alloc.h>
#include <conio.h>              // getch(), kbhit()
#include <ctype.h>              // is...(), toupper()
#include <dir.h>                // disk directory functions
#include <dos.h> // getvect(), inportb(), MK_FP(), outportb(), setvect()
#include <fstream.h>            // file stream classes
#include <iomanip.h>            // stream i/o manipulators
#include <stdlib.h>             // random(), randomize()
#include <string.h>             // str...()
#include <strstrea.h>           // istrstream, ostrstream, strstream
#include <time.h>               // randomize() needs to know time()
#include "keys.h"               // keyboard key names
#include "sheetfed.h"

SheetFeed::SheetFeed()          // the constructor
{
  Clock = 0;
  ConfigData = 0;
  Dryer = 0;
  IOup = False;
  KnifeSprayFill = 0;
  LastMinute = 60;
  for( uint I = 0; I < 8; I++ )
  {
  #  Msg[I].Font = GOTHIC_FONT;
  #  Msg[I].Color = DARKGRAY;
  #  Msg[I].Text = 0;
  }
  RecallButton = 0;
  SafetyNet = 0;
  SaveButton = 0;
  SetupButton = 0;
  StackTemp = 0;
  TP = 0;
  Washer = 0;
  Water = 0;
  tzset();
  GetMsg();
  int errorcode, GraphicsDriver = DETECT, GraphMode;
  errorcode = registerfarbgidriver( EGAVGA_driver_far );
  if( errorcode < 0 )
  {
  | cerr << "Graphics error: " << grapherrormsg( errorcode ) << endl;
  | exit( EXIT_FAILURE );        // terminate with an error code
  }
  errorcode = registerfarbgifont( bold_font_far );
  if( errorcode < 0 )
  {
```

```
| cerr << "Graphics error: " << grapherrormsg( errorcode ) << endl;
| exit( EXIT_FAILURE );        // terminate with an error code
}
errorcode = registerfarbgifont( complex_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( euro_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( gothic_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( sansserif_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( script_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( simplex_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( small_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( triplex_font_far );
if( errorcode < 0 )
{
| cerr << "Graphics error: " << grapherrormsg( errorcode ) << endl;
| exit( EXIT_FAILURE );        // terminate with an error code
}
errorcode = registerfarbgifont( triplex_scr_font_far );
if( errorcode < 0 )
{
| cerr << "Graphics error: " << grapherrormsg( errorcode ) << endl;
| exit( EXIT_FAILURE );        // terminate with an error code
}
if( !( TP = new TouchPanel( COM1, IRQ4, 9600 ) ) )
{
| cerr << "SheetFeed can't create TouchPanel" << endl;
| exit( EXIT_FAILURE );
}
```

C-DOC SHEETFED.CPP

```
initgraph( &GraphicsDriver, &GraphMode, "" );
errorcode = graphresult();
if( errorcode != grOk )
{
| cerr << "Graphics error: " << grapherrormsg( errorcode ) << endl;
| exit( EXIT_FAILURE );        // terminate with an error code
}
TP->SetScaling( GPoint( getmaxx() + 1, getmaxy() + 1 ), GPoint( 0, 0 ) );
if( !( ConfigData = new SheetFedConfig ) )
{
| cerr << "SheetFeed can't create SheetFedConfig" << endl;
| exit( EXIT_FAILURE );
}
TP->SetScaling( GPoint( 643, 489 ), GPoint( 1, -1 ) );
GPoint corners[] = { { GPoint( 0, 0 ) },
{ GPoint( 0, getmaxy() ) },
{ GPoint( getmaxx(), getmaxy() ) },
{ GPoint( getmaxx(), 0 ) },
{ GPoint( 0, 0 ) } };
setcolor( LIGHTGRAY );
setfillstyle( SOLID_FILL, DARKGRAY );
setviewport( 0, 0, getmaxx(), getmaxy(), False );
fillpoly( 5, (int *)corners );
if( !( Washer = new BlanketWasher( ConfigData ) ) )
{
| cerr << "SheetFeed can't create BlanketWasher" << endl;
| exit( EXIT_FAILURE );
}
if( !( Water = new WaterLessTemperature( ConfigData ) ) )
{
| cerr << "SheetFeed can't create WaterLessTemperature" << endl;
| exit( EXIT_FAILURE );
}
if( !( KnifeSprayFill = new KnifeSprayerFiller( ConfigData ) ) )
{
| cerr << "SheetFeed can't create KnifeSprayerFiller" << endl;
| exit( EXIT_FAILURE );
}
if( !( Dryer = new Dryers( ConfigData ) ) )
{
| cerr << "SheetFeed can't create Dryers" << endl;
| exit( EXIT_FAILURE );
}
GRect MaxFrame, MinFrame;
MaxFrame.growTo( MaxButtonSize );
MaxFrame.moveTo( ClockPoint );
if( !( Clock = new ThermoStat( MaxFrame ) ) )
{
| cerr << "SheetFeed can't create Clock ThermoStat" << endl;
| exit( EXIT_FAILURE );
}
MaxFrame.moveTo( StackPoint );
if( ConfigData->StackTempDisp &&
| :  !( StackTemp = new ThermoStat( MaxFrame ) ) )
{
| cerr << "SheetFeed can't create StackTemp ThermoStat" << endl;
| exit( EXIT_FAILURE );
}
MaxFrame.moveTo( RecallPoint );
if( !( RecallButton = new Button( MaxFrame, Button::Momentary,
| : : :  "Recall" ) ) )
{
```

C-DOC SHEETFED.CP

```
    |  cerr << "SheetFeed can't create RecallButton" << endl;
    |  exit( EXIT_FAILURE );
    }
    MaxFrame.moveTo( SavePoint );
    if( !( SaveButton = new Button( MaxFrame, Button::Momentary, "Save" ) ) )
    {
    |  cerr << "SheetFeed can't create SaveButton" << endl;
    |  exit( EXIT_FAILURE );
    }
    MaxFrame.moveTo( SetupPoint );
    if( !( SetupButton = new Button( MaxFrame, Button::Momentary, "Setup" ) ) )
    {
    |  cerr << "SheetFeed can't create SetupButton" << endl;
    |  exit( EXIT_FAILURE );
    }
    if( !( SafetyNet = new Timer( 65535u ) ) )
    {
    |  cerr << "SheetFeed can't create SafetyNet Timer" << endl;
    |  exit( EXIT_FAILURE );
    }
}

SheetFeed::~SheetFeed()          // the destructor
{
    delete Clock;
    delete ConfigData;
    delete Dryer;
    delete KnifeSprayFill;
    for( uint l = 0; l < 8; l++ )
    #  delete []Msg[l].Text;
    delete RecallButton;
    delete SafetyNet;
    delete SaveButton;
    delete SetupButton;
    delete StackTemp;
    delete TP;
    delete Washer;
    delete Water;
    closegraph();
    cout << "Thank-you for choosing Oxy-Dry." << endl;
}

// change the text of a message line
void SheetFeed::ChangeText( uint line, char *phrase )
{
    uint len = strlen( phrase );
    delete []Msg[line].Text;
    Msg[line].Text = 0;
    if( len > 0 )
    {
    |  if( !( Msg[line].Text = new char[len + 1] ) )
    |  {
    |  |  cerr << "SheetFeed::ChangeText can't create Msg.Text" << endl;
    |  |  exit( EXIT_FAILURE );
    |  }
    |  strcpy( Msg[line].Text, phrase );
    }
}

// choose a color for a line of text
void SheetFeed::ChooseColor( uint line, char *phrase )
{
```

C-DOC SHEETFED.CP

```
  strupr( phrase );
  if( strstr( phrase, "BLACK" ) )
  |  Msg[line].Color = BLACK;
  if( strstr( phrase, "BLUE" ) )
  |  Msg[line].Color = BLUE;
  if( strstr( phrase, "GREEN" ) )
  |  Msg[line].Color = GREEN;
  if( strstr( phrase, "CYAN" ) )
  |  Msg[line].Color = CYAN;
  if( strstr( phrase, "RED" ) )
  |  Msg[line].Color = RED;
  if( strstr( phrase, "MAGENTA" ) )
  |  Msg[line].Color = MAGENTA;
  if( strstr( phrase, "BROWN" ) )
  |  Msg[line].Color = BROWN;
  if( strstr( phrase, "LIGHTGRAY" ) )
  |  Msg[line].Color = LIGHTGRAY;
  if( strstr( phrase, "DARKGRAY" ) )
  |  Msg[line].Color = DARKGRAY;
  if( strstr( phrase, "LIGHTBLUE" ) )
  |  Msg[line].Color = LIGHTBLUE;
  if( strstr( phrase, "LIGHTGREEN" ) )
  |  Msg[line].Color = LIGHTGREEN;
  if( strstr( phrase, "LIGHTCYAN" ) )
  |  Msg[line].Color = LIGHTCYAN;
  if( strstr( phrase, "LIGHTRED" ) )
  |  Msg[line].Color = LIGHTRED;
  if( strstr( phrase, "LIGHTMAGENTA" ) )
  |  Msg[line].Color = LIGHTMAGENTA;
  if( strstr( phrase, "YELLOW" ) )
  |  Msg[line].Color = YELLOW;
  if( strstr( phrase, "WHITE" ) )
  |  Msg[line].Color = WHITE;
}

// choose a font for a line of text
void SheetFeed::ChooseFont( uint line, char *phrase )
{
  strupr( phrase );
  if( strstr( phrase, "TRIP" ) )
  |  Msg[line].Font = TRIPLEX_FONT;
  if( strstr( phrase, "LITT" ) || strstr( phrase, "SMALL" ) )
  |  Msg[line].Font = SMALL_FONT;
  if( strstr( phrase, "SANS" ) )
  |  Msg[line].Font = SANS_SERIF_FONT;
  if( strstr( phrase, "GOTH" ) )
  |  Msg[line].Font = GOTHIC_FONT;
  if( strstr( phrase, "SCRI" ) )
  |  Msg[line].Font = SCRIPT_FONT;
  if( strstr( phrase, "SIMP" ) )
  |  Msg[line].Font = SIMPLEX_FONT;
  if( strstr( phrase, "TSCR" ) || strstr( phrase, "XSCR" ) ||
  |  :  strstr( phrase, "X_SCR" ) )
  |  Msg[line].Font = TRIPLEX_SCR_FONT;
  if( strstr( phrase, "LCOM" ) || strstr( phrase, "COMPLEX" ) )
  |  Msg[line].Font = COMPLEX_FONT;
  if( strstr( phrase, "EURO" ) )
  |  Msg[line].Font = EUROPEAN_FONT;
  if( strstr( phrase, "BOLD" ) )
  |  Msg[line].Font = BOLD_FONT;
}
```

C-DOC SHEETFED.CPP

```
// find a file with .msg extension and read its contents
void SheetFeed::GetMsg( void )
{
   struct ffblk ff;
   if( findfirst( "*.msg", &ff, 0 ) != 0 )
========return;
   char phrase[80];
   ifstream is( ff.ff_name );
   for( uint line = 0; line < 8; line++ )
   {
   #  is >> phrase;
   #  ChooseFont( line, phrase );
   #  is >> phrase;
   #  ChooseColor( line, phrase );
   #  is.getline( phrase, sizeof phrase );
   #  ChangeText( line, phrase );
   }
}

// display the user defined message
void SheetFeed::HideMsg( void )
{
   const LeftEdge = 250, newHeight = getmaxy() / 9, RightEdge = 590;
   setviewport( 0, 0, getmaxx(), getmaxy(), False );
   settextjustify( CENTER_TEXT, CENTER_TEXT );
   for( uint l = 0; l < 8; l++ )
   {
   #  settextstyle( Msg[l].Font, HORIZ_DIR, 0 );
//    setcolor( Msg[l].Color );
   #  setcolor( DARKGRAY );
   #  setusercharsize( 1, 1, 1, 1 );
   #  int newWidth = RightEdge - LeftEdge,
   #     oldWidth = textwidth( Msg[l].Text );
   #  setusercharsize( newWidth, oldWidth,
   #  :  newHeight, textheight( Msg[l].Text ) );
   #  outtextxy( ( LeftEdge + RightEdge ) / 2, ( l + 1 ) * newHeight,
   #  :  Msg[l].Text );
   }
//   MsgUp = True;
   MsgUp = False;
}

// reset the computer
void Reset( char *Msg )
{
   closegraph();
   cout << Msg;
   *( (int*)MK_FP( 0x0040, 0x0072 ) ) = 0x7f7f;
   void (far*boot)( void ) = (void(*)())MK_FP( 0xffff, 0 );
   boot();
}

void SheetFeed::run( void )
{
   IOup = True;
   MsgUp = False;
   Quit = False;
   GPoint corners[] = { { GPoint( 0, 0 ) },
   { GPoint( 0, getmaxy() ) },
   { GPoint( getmaxx(), getmaxy() ) },
   { GPoint( getmaxx(), 0 ) },
   { GPoint( 0, 0 ) } };
```

C-DOC SHEETFED.CPF

```
Timer AqTime;
while( !Quit )
{
#  GPoint Push;
#  if( kbhit() )
#  {
#  |  uint Key = GetKP();
#  |  if( Key == ESCkey )
#  |  |  Quit = True;
#  |  if( Dryer->CanUse( Key ) )
#  |  |  Push = Dryer->MakePush( Key );
#  |  if( KnifeSprayFill->CanUse( Key ) )
#  |  |  Push = KnifeSprayFill->MakePush( Key );
#  |  if( Washer->CanUse( Key ) )
#  |  |  Push = Washer->MakePush( Key );
#  |  if( Water->CanUse( Key ) )
#  |  |  Push = Water->MakePush( Key );
#  |  if( Key == ' ' )
#  |  {
#  |  |  Push.x = 10;
#  |  |  Push.y = MaxPanelSize.y - 55;
#  |  |  Push += MaxPanelAnchor;
#  |  }
#  |  if( Key == '=' )
#  |  {
#  |  |  Push = StackPoint;
#  |  |  Push.x += MaxButtonSize.x / 2;
#  |  |  Push.y += MaxButtonSize.y / 2;
#  |  }
#  |  if( Key == '0' )
#  |  {
#  |  |  Push = SetupPoint ;
#  |  |  Push.x += MaxButtonSize.x / 2;
#  |  |  Push.y += MaxButtonSize.y / 2;
#  |  }
#  |  if( Key == ';' )
#  |  {
#  |  |  Push = SavePoint ;
#  |  |  Push.x += MaxButtonSize.x / 2;
#  |  |  Push.y += MaxButtonSize.y / 2;
#  |  }
#  |  if( Key == '/' )
#  |  {
#  |  |  Push = RecallPoint ;
#  |  |  Push.x += MaxButtonSize.x / 2;
#  |  |  Push.y += MaxButtonSize.y / 2;
#  |  }
#  }
#  else
#  |  Push = TP->Where();
#  if( Dryer->Touched( Push ) )
#  {
#  |  Dryer->Min();
#  |  KnifeSprayFill->Min();
#  |  Washer->Min();
#  |  Water->Min();
#  |  HideMsg();
#  |  Dryer->Max();
#  }
#  if( KnifeSprayFill->Touched( Push ) )
#  {
#  |  Dryer->Min();
```

```
# | KnifeSprayFill->Min();
# | Washer->Min();
# | Water->Min();
# | HideMsg();
# | KnifeSprayFill->Max();
# }
# if( Washer->Touched( Push ) )
# {
# | Dryer->Min();
# | KnifeSprayFill->Min();
# | Washer->Min();
# | Water->Min();
# | HideMsg();
# | Washer->Max();
# }
# if( Water->Touched( Push ) )
# {
# | Dryer->Min();
# | KnifeSprayFill->Min();
# | Washer->Min();
# | Water->Min();
# | HideMsg();
# | Water->Max();
# }
# char chronic[6];
# struct tm *t;
# time_t now;
# time(&now);
# t = localtime(&now);
# if( LastMinute != t->tm_min )
# {
# | char DateText[6];
# | LastMinute = t->tm_min;
# | Clock->Light( LIGHTCYAN );
# | strftime( chronic, 6, "%H:%M", t );
# | strftime( DateText, 6, "%m/%d", t );
# | Clock->Tag2( 0, chronic, DateText );
# }
# if( ConfigData->StackTempDisp )
# {
# | const double Seconds = 65536.0 / 3600.0;
# | if( AqTime.Expired() && StackTemp->Touched( Push ) &&
# | | : StackTemp->Once() )
# | | AqTime.Set( (uint)( 60 * Seconds ) );
# | StackTemp->Once();
# | if( !AqTime.Expired() )
# | | if( (uint)( AqTime.TimeRemaining() / Seconds ) % 2 )
# | | | StackTemp->Light( LIGHTRED );
# | | else
# | | | StackTemp->Light( LIGHTGRAY );
# | else
# | | if( StackTemp->Light() == LIGHTGRAY )
# | | {
# | | | char StackText[6];
# | | | ostrstream Temperature( StackText, sizeof StackText );
# | | | Temperature << ( random( 120 - 70 ) + 70 ) << "°F" << ends;
# | | | StackTemp->Light( LIGHTRED );
# | | | StackTemp->Tag2( 0, StackText, chronic );
# | | }
# }
# SetupButton->Light( LIGHTMAGENTA );
# SaveButton->Light( LIGHTMAGENTA );
```

C-DOC SHEETFED.CPP

```
# RecallButton->Light( LIGHTMAGENTA );
# GRect MaxFrame;
# MaxFrame.growTo( MaxButtonSize );
# MaxFrame.moveTo( StackPoint );
# if( SetupButton->Touched( Push ) )
# {
# | Dryer->Hide();
# | KnifeSprayFill->Hide();
# | Washer->Hide();
# | Water->Hide();
# | HideMsg();
# | ConfigData->Setup();
# | setcolor( LIGHTGRAY );
# | setfillstyle( SOLID_FILL, DARKGRAY );
# | setviewport( 0, 0, getmaxx(), getmaxy(), False );
# | fillpoly( 5, (int *)corners );
# | Washer->DispInit( ConfigData );
# | Water->DispInit( ConfigData );
# | KnifeSprayFill->DispInit( ConfigData );
# | Dryer->DispInit( ConfigData );
# | Clock->reDraw();
# | if( ConfigData->StackTempDisp )
# | {
# | | if( !StackTemp )
# | | | if( !( StackTemp = new ThermoStat( MaxFrame ) ) )
# | | | {
# | | | | cerr << "SheetFeed can't create StackTemp ThermoStat"
# | | | | << endl;
# | | | | exit( EXIT_FAILURE );
# | | | }
# | | StackTemp->reDraw();
# | }
# | else
# | {
# | | delete StackTemp;
# | | StackTemp = 0;
# | }
# | SetupButton->reDraw();
# | SaveButton->reDraw();
# | RecallButton->reDraw();
# }
# if( SaveButton->Touched( Push ) )
# {
# | Washer->Hide();
# | Water->Hide();
# | KnifeSprayFill->Hide();
# | Dryer->Hide();
# | HideMsg();
# | ConfigData->SaveSetup();
# | setcolor( LIGHTGRAY );
# | setfillstyle( SOLID_FILL, DARKGRAY );
# | setviewport( 0, 0, getmaxx(), getmaxy(), False );
# | fillpoly( 5, (int *)corners );
# | Washer->DispInit( ConfigData );
# | Water->DispInit( ConfigData );
# | KnifeSprayFill->DispInit( ConfigData );
# | Dryer->DispInit( ConfigData );
# | Clock->reDraw();
# | if( ConfigData->StackTempDisp )
# | {
# | | if( !StackTemp )
# | | | if( !( StackTemp = new ThermoStat( MaxFrame ) ) )
```

C-DOC SHEETFED.CPP

```
# | | | {
# | | | | cerr << "SheetFeed can't create StackTemp ThermoStat"
# | | | | << endl;
# | | | | exit( EXIT_FAILURE );
# | | | }
# | | StackTemp->reDraw();
# | }
# | else
# | {
# | | delete StackTemp;
# | | StackTemp = 0;
# | }
# | SetupButton->reDraw();
# | SaveButton->reDraw();
# | RecallButton->reDraw();
# }
# if( RecallButton->Touched( Push ) )
# {
# | Washer->Hide();
# | Water->Hide();
# | KnifeSprayFill->Hide();
# | Dryer->Hide();
# | HideMsg();
# | ConfigData->RecallSetup();
# | setcolor( LIGHTGRAY );
# | setfillstyle( SOLID_FILL, DARKGRAY );
# | setviewport( 0, 0, getmaxx(), getmaxy(), False );
# | fillpoly( 5, (int *)corners );
# | Washer->DispInit( ConfigData );
# | Water->DispInit( ConfigData );
# | KnifeSprayFill->DispInit( ConfigData );
# | Dryer->DispInit( ConfigData );
# | Clock->reDraw();
# | if( ConfigData->StackTempDisp )
# | {
# | | if( !StackTemp )
# | | | if( !( StackTemp = new ThermoStat( MaxFrame ) ) )
# | | | {
# | | | | cerr << "SheetFeed can't create StackTemp ThermoStat"
# | | | | << endl;
# | | | | exit( EXIT_FAILURE );
# | | | }
# | | StackTemp->reDraw();
# | }
# | else
# | {
# | | delete StackTemp;
# | | StackTemp = 0;
# | }
# | SetupButton->reDraw();
# | SaveButton->reDraw();
# | RecallButton->reDraw();
# }
# if( !Dryer->Maxed() && !KnifeSprayFill->Maxed() && !Washer->Maxed() &&
# | : !Water->Maxed() && !MsgUp )
# | ShowMsg();
# runIO();
# Dryer->UpdateSetup( ConfigData );
# KnifeSprayFill->UpdateSetup( ConfigData );
# Washer->UpdateSetup( ConfigData );
# Water->UpdateSetup( ConfigData );
# ConfigData->Update();
```

C-DOC SHEETFED.CP

```
   }
}

// update all remote IO
void SheetFeed::runIO()
{
  if( IOup )
  {
//     included for trouble shooting only
  | unsigned long total = farcoreleft();
  | struct farheapinfo heap;
  | ostrstream totalStr( heapStr, sizeof heapStr );
  | switch( farheapcheck() )
  | {
  | case _HEAPEMPTY:
  | | strcpy( heapStr, "    No heap" );
  | | total = -1;
  | |===break;
  | case _HEAPCORRUPT:
  | | strcpy( heapStr, "Heap corrupt" );
  | | total = -2;
  | |===break;
  | case _HEAPOK:
  | | heap.ptr = NULL;
  | | while( farheapwalk( &heap ) != _HEAPEND )
  | | #  if( !heap.in_use )
  | | #  |  total += heap.size;
  | | totalStr << "Heap " << setw(7) << total << ends;
  | |===break;
  | }
  | if( ConfigData->InstallerPassword == 666 && HeapSize != total )
  | {
//       display available heap size on screen
  | | setviewport( 0, 0, getmaxx(), getmaxy(), False );
  | | settextstyle( DEFAULT_FONT, HORIZ_DIR, 1 );
  | | settextjustify( LEFT_TEXT, TOP_TEXT );
  | | setfillstyle( SOLID_FILL, DARKGRAY );
  | | bar( 1, 1, textwidth( heapStr ) - 2, textheight( heapStr ) - 2 );
  | | setcolor( BLACK );
  | | outtextxy( 1, 1, heapStr );
  | }
  | HeapSize = total;
  | Active = (Boolean)( Water->TestActivity() | Washer->TestActivity()
  | :  | KnifeSprayFill->TestActivity() | Dryer->TestActivity() );
  | if( Active || HeapSize > 10000 )
  | | SafetyNet->Set( 65535u );
  | if( SafetyNet->Expired() | HeapSize <= 1640 )// creep size
  | | Reset( heapStr );
  | Dryer->setInterLock( KnifeSprayFill->getInterLock() );
  | Dryer->runIO();
  | KnifeSprayFill->runIO();
  | Washer->runIO();
  | Water->runIO();
  }
}

// display the user defined message
void SheetFeed::ShowMsg( void )
{
  const LeftEdge = 250, newHeight = getmaxy() / 9, RightEdge = 590;
  setviewport( 0, 0, getmaxx(), getmaxy(), False );
  settextjustify( CENTER_TEXT, CENTER_TEXT );
```

C-DOC SHEETFED.CPP

```
    for( uint l = 0; l < 8; l++ )
    {
    #  settextstyle( Msg[l].Font, HORIZ_DIR, 0 );
    #  setcolor( Msg[l].Color );
    #  setusercharsize( 1, 1, 1, 1 );
    #  int newWidth = RightEdge - LeftEdge,
    #     oldWidth = textwidth( Msg[l].Text );
    #  setusercharsize( newWidth, oldWidth,
    #  :  newHeight, textheight( Msg[l].Text ) );
    #  outtextxy( ( LeftEdge + RightEdge ) / 2, ( l + 1 ) * newHeight,
    #  :  Msg[l].Text );
    }
    MsgUp = True;
}

SheetFeed control;

void main( void )
{
    randomize();
    control.run();
====return;
}
```

C-DOC TIMER.CPP

```

/*****************************\
*                            *
*  timer.cpp                  *
*                            *
*  55 mS Timers                *
*                            *
*  (C) 1993 OXY-DRY CORPORATION  *
*  all rights reserved           *
*                            *
\*****************************/

// 1993 july 12      improve ability to efficiently delete and re-use timers
// 1993 october 10    change copyright for listing

#include <constrea.h>           // cerr
#include <dos.h>               // getvect, setvect
#include <iostream.h>           // ostream_withassign
#include <stdlib.h>             // exit(), EXIT_xxxx, size_t
#include "timer.h"

byte far*Timer::ActiveTimers = 0;
uint Timer::MaxTimers = 0;
uint far*Timer::Timers = 0;
void interrupt (far *Timer::oldTimer )(...);

Timer::Timer( uint Ticks )
{
  // first timer sets interrupt vector
  if( MaxTimers == 0 )
  {
  | oldTimer = getvect( 8 );
  | setvect( 8, Timer::TimerInt );
  }
  // locate first available timer
  size_t BlockSize = sizeof( byte ) * 8;
  for( index = 0; index < MaxTimers; index++ )
  #  if( ActiveTimers[index / BlockSize] & ( 1 << ( index % BlockSize ) ) )
  #=======continue;
  #  else
  #  {
  #  |  Timers[index] = Ticks;
  #  |  ActiveTimers[index / BlockSize] |= 1 << ( index % BlockSize );
===========return;
  #  }
  // allocate 8 more timers
  uint *newTimers;
  if( !( newTimers = new ( uint ( [MaxTimers + BlockSize] ) ) ) )
  {
  | cerr << "Unable to initialize Timer #" << MaxTimers << endl;
  | exit( EXIT_FAILURE );
  }
  byte *newBlock;
  if( !( newBlock = new ( byte ( [MaxTimers / BlockSize + 1] ) ) ) )
  {
  | cerr << "Unable to initialize Timer #" << MaxTimers << endl;
  | exit( EXIT_FAILURE );
  }
  // flag all prior timers as in use
  for( uint b = 0; b < MaxTimers / BlockSize; b++ )
  #  newBlock[b] = 0xffffffffl;
  newBlock[MaxTimers / BlockSize] = 1;
```

C-DOC TIMER.CPP

```
disable();
delete []ActiveTimers;
ActiveTimers = newBlock;
// copy timer values
for( uint x = 0; x < MaxTimers; x++ )
#  newTimers[x] = Timers[x];
delete []Timers;
Timers = newTimers;
MaxTimers += BlockSize;
Timers[index] = Ticks;
enable();
}

Timer::~Timer()
{
  size_t BlockSize = sizeof( byte ) * 8;
  // mark this timer as available
  ActiveTimers[index / BlockSize] &= ~( 1 << ( index % BlockSize ) );
  for( index = 0; index < MaxTimers; index++ )
  #  if( ActiveTimers[index / BlockSize] & ( 1 << ( index % BlockSize ) ) )
============return;
  // last one out turn off the lights
  setvect( 8, oldTimer );
  MaxTimers = 0;
  delete []ActiveTimers;
  ActiveTimers = 0;
  delete []Timers;
  Timers = 0;
}

Boolean Timer::Expired( void )
{
  if( index >= MaxTimers || Timers[index] == 0 )
========return True;
  else
========return False;
}

void Timer::Set( uint Ticks )
{
  if( index < MaxTimers )
  |  Timers[index] = Ticks;
}

// a grain of sand falls through the hourglass
void interrupt far Timer::TimerInt(...)
{
  register uint index;
  for( index = 0; index < MaxTimers; index++ )
  #  if( Timers[index] )
  #  |  Timers[index]--;
  oldTimer();
}
```

C-DOC TP.CPP

```

/*****************************\
*                            *
*  tp.cpp                     *
*                            *
*  Touch Panel Interface              *
*                            *
*  (C) 1993 OXY-DRY CORPORATION   *
*  all rights reserved              *
*                            *
\*****************************/

//  1993 may 24 create TouchPanel class
//  1993 march 11 disable polled receive function
//  1993 march 15 add support for auto initialize of panel
//  1993 august 14     find touch panel on any port
//  1993 october 10    change copyright for listing

#include <bios.h>              // biosequip()
#include <constrea.h>            // cerr
#include <dos.h>              // inportb(), outportb(), setvect()
#include <graphics.h>            // getmaxx(), getmaxy()
#include <iostream.h>            // ostream_withassign
#include <stdio.h>              // EXIT_FAILURE
#include <stdlib.h>             // exit()
#include "tp.h"               // TouchPanel

// interrupt service routines can only access variables with global scope
Boolean TouchPanel::RXBaudFlag = False;
Boolean TouchPanel::Touched = False;
TouchPanel::TPstate TouchPanel::RXState = GET_REPORT;
COMports TouchPanel::BasePort = COM3;
Interrupts TouchPanel::interruptNumber = IRQ4;
uint TouchPanel::ScanCol = 255;
uint TouchPanel::ScanRow = 255;
Timer *TouchPanel::WatchDog = 0;
void interrupt (far *TouchPanel::oldVector)(...) = 0;

// The constructor for this class needs to know the base port of the UART
// and the interrupt vector number for communications. We will assume
// 8 data bits, no parity and 1 stop bit. The baud rate can be set
// optionally, the default is 9600.
TouchPanel::TouchPanel( COMports UARTbasePort, Interrupts VectorNumber,
:  long Baud )
{
   cmd = 0;
   oldDLL = 0;
   oldDLM = 0;
   oldIER = 0;
   oldLCR = 0;
   oldMCR = 0;
   Panel_Size = GPoint( 83, 63 );
   Scaled = False;
   if( !( WatchDog = new Timer ) )
   {
   |  cerr << "TouchPanel can't create WatchDog Timer" << endl;
   |  exit( EXIT_FAILURE );
   }
   union {
   :  int word;
   :  struct { uint
   :  :     DiskBoot:1,
```

```
: :     FloatCoProc:1,
: :     MotherRAMsize:2,
: :     VideoMode:2,
: :     DiskDrives:2,
: :     SoftDMA:1,
: :     SerialPorts:3,
: :     GameIO:1,
: :     SerialPrinter:1,
: :     ParallelPorts:2;
:  } bits;
 } EquipList;
 EquipList.word = biosequip();
 if( EquipList.bits.SerialPorts >= 1 && FindTP( COM1, IRQ4, Baud ) )
========return;
 if( EquipList.bits.SerialPorts >= 2 && FindTP( COM2, IRQ3, Baud ) )
========return;
 if( EquipList.bits.SerialPorts >= 3 && FindTP( COM3, IRQ4, Baud ) )
========return;
 if( EquipList.bits.SerialPorts >= 4 && FindTP( COM4, IRQ3, Baud ) )
========return;
//  if( FindTP( COMA, IRQ4, Baud ) )
//    return;
//  if( FindTP( COMB, IRQ3, Baud ) )
//    return;
 if( FindTP( UARTbasePort, VectorNumber, Baud, False ) )
========return;
 cerr << "Unable to initialize Touch Panel." << endl;
}

// The destructor returns interrupt vectors
TouchPanel::~TouchPanel()
{
 disable();
 outportb( BasePort + uartLCR, uartLCR_DLAB );// talk to baud rate generator
 FlushPipe();
 outportb( BasePort + uartDLL, oldDLL );// restore baud rate low byte
 FlushPipe();
 outportb( BasePort + uartDLM, oldDLM );// restore baud rate high byte
 FlushPipe();
 outportb( BasePort + uartIER, oldIER );// restore interrupt enable register
 FlushPipe();
 outportb( BasePort + uartLCR, oldLCR );// restore line control register
 FlushPipe();
 outportb( BasePort + uartMCR, oldMCR );// restore modem control register
 FlushPipe();
 setvect( interruptNumber, oldVector );// **
 enable();
 delete WatchDog;
}

// try to establish communication with touch panel
Boolean TouchPanel::FindTP( COMports UARTbasePort, Interrupts VectorNumber,
    : long Baud, Boolean ShouldRestore )
{
 BasePort = UARTbasePort;
 interruptNumber = VectorNumber;
 disable();
 uint IntMask = 1 << ( interruptNumber - 8 );
 uint BaudDivider = (uint)( 115200L / Baud );
//  for( BaudDivider = 3; Baud < 38400L; BaudDivider *= 2, Baud *= 2 );
//  if( Baud == 38400L && BaudDivider <= 384 )
 _AL = inportb( BasePort + uartLCR );
```

C-DOC TP.CPP

```
FlushPipe();
oldLCR = _AL;
outportb( BasePort + uartLCR, uartLCR_DLAB );// talk to baud rate generator
FlushPipe();
_AL = inportb( BasePort + uartDLL );
FlushPipe();
oldDLL = _AL;
outportb( BasePort + uartDLL, BaudDivider % 0x100 );// set baud rate low byte
FlushPipe();
_AL = inportb( BasePort + uartDLM );
FlushPipe();
oldDLM = _AL;
outportb( BasePort + uartDLM, BaudDivider / 0x100 );// set baud rate high byte
FlushPipe();
outportb( BasePort + uartLCR, uartLCR_8Bit );// set 8 data, no parity, one stop
FlushPipe();
_AL = inportb( BasePort + uartMCR );
FlushPipe();
oldMCR = _AL;
outportb( BasePort + uartMCR, uartMCR_RTS );// set RTS line always high
FlushPipe();
_AL = inportb( BasePort + uartIER );
FlushPipe();
oldIER = _AL;
outportb( BasePort + uartIER, uartIER_RDA );// enable receive interrupt
FlushPipe();
_AL = inportb( BasePort + uartRBR );// read any character
FlushPipe();
_AL = inportb( BasePort + uartLSR );// clear register with a read
FlushPipe();
_AL = inportb( BASE8259 + 1 );
FlushPipe();
register byte temp = _AL;
outportb( BASE8259 + 1, temp & ~IntMask );
FlushPipe();
outportb( BASE8259, interruptNumber - 8 + 0x60 );// EOI
FlushPipe();
outportb( BasePort + uartMCR, uartMCR_RTS + uartMCR_Out2 );
FlushPipe();
oldVector = getvect( VectorNumber );// **
setvect( VectorNumber, TouchPanel::TouchInt );// **
enable();
uint Retry = 3;
RXBaudFlag = False;

do
{
#  SendCommand( RESET );
#  Timer InitDelay( InitDelayTime );
#  while( !InitDelay.Expired() );
#  SendCommand( AUTOBAUD );
#  InitDelay.Set( InitDelayTime );
#  do
#  {
#  #  InitTP();
#  #  if( RXBaudFlag )
===============return True;
#  }
#  while( !InitDelay.Expired() );
}
while( --Retry > 0 );
if( ShouldRestore )
```

```
    {
    | disable();
    | outportb( BasePort + uartLCR, uartLCR_DLAB );// talk to baud rate generator
    | FlushPipe();
    | outportb( BasePort + uartDLL, oldDLL );// restore baud rate low byte
    | FlushPipe();
    | outportb( BasePort + uartDLM, oldDLM );// restore baud rate high byte
    | FlushPipe();
    | outportb( BasePort + uartIER, oldIER );// restore interrupt enable register
    | FlushPipe();
    | outportb( BasePort + uartLCR, oldLCR );// restore line control register
    | FlushPipe();
    | outportb( BasePort + uartMCR, oldMCR );// restore modem control register
    | FlushPipe();
    | setvect( interruptNumber, oldVector );// **
    | enable();
    }
====return False;
}

// Test for a received character from the touch panel
void TouchPanel::InitTP( void )
{
   if( RXBaudFlag )
   | switch( cmd++ )
   | {
   | case 0: RXState = GET_REPORT; Touched = False; break;
   | case 1: SendCommand( ENENTER ); break;// enable enter point mode
   | case 2: SendCommand( ENEXIT ); break;// enable exit point mode
   | case 3: SendCommand( ENXFER ); break;// enable report transfer
   | case 4:
   | | if( !Scaled )          // for allignment
   | |===SendCommand( ENCOORD ); break;// enable continuous coordinate report
   | default: cmd = 0; RXBaudFlag = False; break;
   | }
}

// Send initialization commands to touch panel
void TouchPanel::SendCommand( char command )
{
   register byte temp;
   RXState = GET_REPORT;
   do {
   #  _AL = inportb( BasePort + uartLSR );
   #  FlushPipe();
   #  temp = _AL;
   } while( ( temp & uartLSR_THRE ) == 0 );
   outportb( BasePort + uartTHR, command );
   FlushPipe();
}

// set the screen size and compensation for scaling
void TouchPanel::SetScaling( GPoint ScreenSize, GPoint ScreenComp )
{
   this->ScreenSize = ScreenSize;
   this->ScreenComp = ScreenComp;
   Scaled = True;
}

// Handle an incoming character from the touch panel
void interrupt far TouchPanel::TouchInt(...)
{
```

C-DOC TP.CPP

```
register byte temp;
register int RxChr;
_AL = inportb( BasePort + uartLSR );
FlushPipe();
temp = _AL;
if( temp & ( uartLSR_OE | uartLSR_PE | uartLSR_FE ) );
_AL = inportb( BasePort + uartRBR );
FlushPipe();
RxChr = _AL;
if( WatchDog->Expired() )
{
| RXState = GET_REPORT;
| Touched = False;
}
WatchDog->Set( WatchDogTime );
switch( RXState )
{
case GET_REPORT:
| switch( RxChr )
| {
| case COORDREPORT:
| case ENTERPOINT:
| | Touched = True;
| | RXState = GET_X_COORD;
| |===break;
| case EXITPOINT:
| | Touched = False;
| | RXState = GET_X_COORD;
| |===break;
| case BADBEAM:
| | RXState = GET_BADBEAM;
| |===break;
| case GOODBAUD:
| | RXBaudFlag = True;
| default:
| | RXState = GET_REPORT;
| }
|===break;
case GET_X_COORD:
| ScanCol = RxChr;
| RXState = GET_Y_COORD;
|===break;
case GET_Y_COORD:
| ScanRow = RxChr;
| RXState = GET_REPORT;
|===break;
case GET_BADBEAM:
| if (RxChr == 0xFF)
| | RXState = GET_REPORT;
|===break;
default:
| RXState = GET_REPORT;
}
outportb( BASE8259, interruptNumber + 88 );// EOI
FlushPipe();
oldVector();                // allow shared interrupts
}

// Return a point in the current screen coordinates
const GPoint& TouchPanel::Where( void )
{
if( WatchDog->Expired() )
```

C-DOC TP.CPP

```
{
| SendCommand( RESET );
| Timer InitDelay( InitDelayTime );
| Touched = False;
| while( !InitDelay.Expired() );
| SendCommand( AUTOBAUD );
| WatchDog->Set( WatchDogTime );
}
InitTP();
if( RXState == GET_REPORT )    // to be sure we're not in the middle
{
| disable();
| if( Scaled )
| {
| | Poke.x = (int)( (long)ScanCol * ScreenSize.x / Panel_Size.x )
| | + ScreenComp.x;
| | Poke.y = (int)( (long)ScanRow * ScreenSize.y / Panel_Size.y )
| | + ScreenComp.y;
| }
| else
| {
| | Poke.x = ScanCol;
| | Poke.y = ScanRow;
| }
| enable();
}
if( !Touched )
{
| Poke.x = -1;
| Poke.y = -1;
}
====return Poke;
}
```

C-DOC WASHER.CPP

```

/*********************************\
*                                *
*  washer.cpp                    *
*                                *
*  Blanket Washer controls for the Sheet Fed printing press  *
*                                *
*  (C) 1993 OXY-DRY CORPORATION         *
*  all rights reserved                 *
*                                *
\*********************************/

// life in this world began on february 21
// 1993 july 14      disable wiper and ignore interlock during condition
// 1993 august 8     add air bar option
// 1993 august 11    allow panel to work with io disabled
// 1993 october 10   change copyright for listing

#include <ctype.h>          // is...(), toupper()
#include <graphics.h>       // graphics primitives
#include <iostream.h>       // ostream_withassign
#include <stdlib.h>         // exit()
#include <string.h>         // str...()
#include <strstrea.h>       // string stream functions
#include "washer.h"         // the BlanketWasher class

const char *Prog[] = { " Off ", "Prog 1", "Prog 2", "Prog 3", "Prog 4", "Prog 5" };

// the constructor
BlanketWasher::BlanketWasher( SheetFedConfig *ConfigData )
{
   Active = False;
   AirBars = ConfigData->BWairBars;
   BrushMotorTime = AirBars ? 164 : 134;
   BWbuttons = ConfigData->BWbuttons;
   BWcoater = ConfigData->BWcoater;
   Control = 0;
   CycleTimer = 0;
   Generator[0] = ConfigData->WashProg0Time;
   Generator[1] = ConfigData->WashProg1Time;
   Generator[2] = ConfigData->WashProg2Time;
   Generator[3] = ConfigData->WashProg3Time;
   Generator[4] = ConfigData->WashProg4Time;
   Generator[5] = ConfigData->WashProg5Time;
   OK2Max = False;
   ScrubDelay = 4;
   ScrubTime = AirBars ? 120 : 94;
   SolventShots[0] = 3;         // ConfigData->WashProg0Shots;
   SolventShots[1] = ConfigData->WashProg1Shots;
   SolventShots[2] = ConfigData->WashProg2Shots;
   SolventShots[3] = ConfigData->WashProg3Shots;
   SolventShots[4] = ConfigData->WashProg4Shots;
   SolventShots[5] = ConfigData->WashProg5Shots;
   State = Idle;
   Use16IOs = ConfigData->BW16IOs;
   Washer[First] = 0;
   Washer[Second] = 0;
   Washer[Third] = 0;
   Washers = ConfigData->BWunits;
   Washes = ConfigData->BWcycles;
   for( uint p = 0; p < 10; p++ )
   #  WashProg[p] = ConfigData->BWprog[p];
```

```
  WiperDelay = AirBars ? 30 : 94;
  WiperRollerTime = 210;
  Build();
  if( !( CycleTimer= new Timer ) )
  {
  | cerr << "BlanketWasher can't create CycleTimer" << endl;
  | exit( EXIT_FAILURE );
  }
}

BlanketWasher::~BlanketWasher()      // the destructor
{
  delete Control;
  delete CycleTimer;
  delete Washer[First];
  delete Washer[Second];
  delete Washer[Third];
}

// reconstruct the control panel and reconfigure the io
void BlanketWasher::Build( void )
{
  if( !Washers )
  {
  | delete Washer[First];
  | delete Washer[Second];
  | delete Washer[Third];
  | Washer[First] = 0;
  | Washer[Second] = 0;
  | Washer[Third] = 0;
  }
  if( Washers >= 1 )
  {
  | if( !Washer[First] )
  | | if( !( Washer[First] = new WasherStation( 2 ) ) )
  | | {
  | | | cerr << "BlanketWasher can't create First WasherStation"
  | | | << endl;
  | | | exit( EXIT_FAILURE );
  | | }
  | Washer[First]->ConfigIO( OilFault, RemoteStation::DigitalInput );
  | Washer[First]->ConfigIO( SolventRecovery, RemoteStation::DigitalInput );
  | Washer[First]->ConfigIO( HydrolicMotor, RemoteStation::DigitalOutput );
  | Washer[First]->ConfigIO( BWInterLock, RemoteStation::DigitalInput );
  | Washer[First]->ConfigIO( BrushMotorB, RemoteStation::DigitalOutput );
  | Washer[First]->ConfigIO( SolventPumpB, RemoteStation::DigitalOutput );
  | Washer[First]->ConfigIO( ScrubB, RemoteStation::DigitalOutput );
  | Washer[First]->ConfigIO( WipeB, RemoteStation::DigitalOutput );
  }
  if( Washers >= 2 )
  {
  | Washer[First]->ConfigIO( BrushMotorC, RemoteStation::DigitalOutput );
  | Washer[First]->ConfigIO( SolventPumpC, RemoteStation::DigitalOutput );
  | Washer[First]->ConfigIO( ScrubC, RemoteStation::DigitalOutput );
  | if( AirBars )
  | | Washer[First]->ConfigIO( WipeC, RemoteStation::DigitalInput );
  | else
  | | Washer[First]->ConfigIO( WipeC, RemoteStation::DigitalOutput );
  }
  if( Washers >= 3 )
  {
  | Washer[First]->ConfigIO( BrushMotorD, RemoteStation::DigitalOutput );
```

C-DOC WASHER.CPP

```
| Washer[First]->ConfigIO( SolventPumpD, RemoteStation::DigitalOutput );
| Washer[First]->ConfigIO( ScrubD, RemoteStation::DigitalOutput );
| if( AirBars )
| | Washer[First]->ConfigIO( WipeD, RemoteStation::DigitalInput );
| else
| | Washer[First]->ConfigIO( WipeD, RemoteStation::DigitalOutput );
}
if( Washers >= 4 )
{
| if( Use16IOs )
| {
| | if( !Washer[Second] )
| | | if( !( Washer[Second] = new WasherStation( 3 ) ) )
| | | {
| | | | cerr << "BlanketWasher can't create Second WasherStation"
| | | | << endl;
| | | | exit( EXIT_FAILURE );
| | | }
| | Washer[Second]->ConfigIO( BrushMotorA, RemoteStation::DigitalOutput );
| | Washer[Second]->ConfigIO( SolventPumpA, RemoteStation::DigitalOutput );
| | Washer[Second]->ConfigIO( ScrubA, RemoteStation::DigitalOutput );
| | if( AirBars )
| | | Washer[Second]->ConfigIO( WipeA, RemoteStation::DigitalInput );
| | else
| | | Washer[Second]->ConfigIO( WipeA, RemoteStation::DigitalOutput );
| }
| else
| {
| | Washer[First]->ConfigIO( BrushMotorE, RemoteStation::DigitalOutput );
| | Washer[First]->ConfigIO( SolventPumpE, RemoteStation::DigitalOutput );
| | Washer[First]->ConfigIO( ScrubE, RemoteStation::DigitalOutput );
| | if( AirBars )
| | | Washer[First]->ConfigIO( WipeE, RemoteStation::DigitalInput );
| | else
| | | Washer[First]->ConfigIO( WipeE, RemoteStation::DigitalOutput );
| }
}
if( Washers >= 5 )
{
| if( Use16IOs )
| {
| | Washer[Second]->ConfigIO( BrushMotorB, RemoteStation::DigitalOutput );
| | Washer[Second]->ConfigIO( SolventPumpB, RemoteStation::DigitalOutput );
| | Washer[Second]->ConfigIO( ScrubB, RemoteStation::DigitalOutput );
| | if( AirBars )
| | | Washer[Second]->ConfigIO( WipeB, RemoteStation::DigitalInput );
| | else
| | | Washer[Second]->ConfigIO( WipeB, RemoteStation::DigitalOutput );
| }
| else
| {
| | Washer[First]->ConfigIO( BrushMotorF, RemoteStation::DigitalOutput );
| | Washer[First]->ConfigIO( SolventPumpF, RemoteStation::DigitalOutput );
| | Washer[First]->ConfigIO( ScrubF, RemoteStation::DigitalOutput );
| | if( AirBars )
| | | Washer[First]->ConfigIO( WipeF, RemoteStation::DigitalInput );
| | else
| | | Washer[First]->ConfigIO( WipeF, RemoteStation::DigitalOutput );
| }
}
if( Washers >= 6 )
{
```

C-DOC WASHER.CPP

```
| if( Use16IOs )
| {
| | Washer[Second]->ConfigIO( BrushMotorC, RemoteStation::DigitalOutput );
| | Washer[Second]->ConfigIO( SolventPumpC, RemoteStation::DigitalOutput );
| | Washer[Second]->ConfigIO( ScrubC, RemoteStation::DigitalOutput );
| | if( AirBars )
| | | Washer[Second]->ConfigIO( WipeC, RemoteStation::DigitalInput );
| | else
| | | Washer[Second]->ConfigIO( WipeC, RemoteStation::DigitalOutput );
| }
| else
| {
| | if( !Washer[Second] )
| | | if( !( Washer[Second] = new WasherStation( 3 ) ) )
| | | {
| | | | cerr << "BlanketWasher can't create Second WasherStation"
| | | | << endl;
| | | | exit( EXIT_FAILURE );
| | | }
| | Washer[Second]->ConfigIO( BrushMotorA, RemoteStation::DigitalOutput );
| | Washer[Second]->ConfigIO( SolventPumpA, RemoteStation::DigitalOutput );
| | Washer[Second]->ConfigIO( ScrubA, RemoteStation::DigitalOutput );
| | if( AirBars )
| | | Washer[Second]->ConfigIO( WipeA, RemoteStation::DigitalInput );
| | else
| | | Washer[Second]->ConfigIO( WipeA, RemoteStation::DigitalOutput );
| }
}
if( Washers >= 7 )
{
| if( Use16IOs )
| {
| | Washer[Second]->ConfigIO( BrushMotorD, RemoteStation::DigitalOutput );
| | Washer[Second]->ConfigIO( SolventPumpD, RemoteStation::DigitalOutput );
| | Washer[Second]->ConfigIO( ScrubD, RemoteStation::DigitalOutput );
| | if( AirBars )
| | | Washer[Second]->ConfigIO( WipeD, RemoteStation::DigitalInput );
| | else
| | | Washer[Second]->ConfigIO( WipeD, RemoteStation::DigitalOutput );
| }
| else
| {
| | Washer[Second]->ConfigIO( BrushMotorB, RemoteStation::DigitalOutput );
| | Washer[Second]->ConfigIO( SolventPumpB, RemoteStation::DigitalOutput );
| | Washer[Second]->ConfigIO( ScrubB, RemoteStation::DigitalOutput );
| | if( AirBars )
| | | Washer[Second]->ConfigIO( WipeB, RemoteStation::DigitalInput );
| | else
| | | Washer[Second]->ConfigIO( WipeB, RemoteStation::DigitalOutput );
| }
}
if( Washers >= 8 )
{
| if( Use16IOs )
| {
| | if( !Washer[Third] )
| | | if( !( Washer[Third] = new WasherStation( 10 ) ) )
| | | {
| | | | cerr << "BlanketWasher can't create Third WasherStation"
| | | | << endl;
| | | | exit( EXIT_FAILURE );
| | | }
```

C-DOC WASHER.CPP

```
| | Washer[Third]->ConfigIO( BrushMotorA, RemoteStation::DigitalOutput );
| | Washer[Third]->ConfigIO( SolventPumpA, RemoteStation::DigitalOutput );
| | Washer[Third]->ConfigIO( ScrubA, RemoteStation::DigitalOutput );
| | if( AirBars )
| | | Washer[Third]->ConfigIO( WipeA, RemoteStation::DigitalInput );
| | else
| | | Washer[Third]->ConfigIO( WipeA, RemoteStation::DigitalOutput );
| }
| else
| {
| | Washer[Second]->ConfigIO( BrushMotorC, RemoteStation::DigitalOutput );
| | Washer[Second]->ConfigIO( SolventPumpC, RemoteStation::DigitalOutput );
| | Washer[Second]->ConfigIO( ScrubC, RemoteStation::DigitalOutput );
| | if( AirBars )
| | | Washer[Second]->ConfigIO( WipeC, RemoteStation::DigitalInput );
| | else
| | | Washer[Second]->ConfigIO( WipeC, RemoteStation::DigitalOutput );
| }
}
if( Washers >= 9 )
{
| if( Use16IOs )
| {
| | Washer[Third]->ConfigIO( BrushMotorB, RemoteStation::DigitalOutput );
| | Washer[Third]->ConfigIO( SolventPumpB, RemoteStation::DigitalOutput );
| | Washer[Third]->ConfigIO( ScrubB, RemoteStation::DigitalOutput );
| | if( AirBars )
| | | Washer[Third]->ConfigIO( WipeB, RemoteStation::DigitalInput );
| | else
| | | Washer[Third]->ConfigIO( WipeB, RemoteStation::DigitalOutput );
| }
| else
| {
| | Washer[Second]->ConfigIO( BrushMotorD, RemoteStation::DigitalOutput );
| | Washer[Second]->ConfigIO( SolventPumpD, RemoteStation::DigitalOutput );
| | Washer[Second]->ConfigIO( ScrubD, RemoteStation::DigitalOutput );
| | if( AirBars )
| | | Washer[Second]->ConfigIO( WipeD, RemoteStation::DigitalInput );
| | else
| | | Washer[Second]->ConfigIO( WipeD, RemoteStation::DigitalOutput );
| }
}
if( Washers >= 10 )
{
| if( Use16IOs )
| {
| | Washer[Third]->ConfigIO( BrushMotorC, RemoteStation::DigitalOutput );
| | Washer[Third]->ConfigIO( SolventPumpC, RemoteStation::DigitalOutput );
| | Washer[Third]->ConfigIO( ScrubC, RemoteStation::DigitalOutput );
| | if( AirBars )
| | | Washer[Third]->ConfigIO( WipeC, RemoteStation::DigitalInput );
| | else
| | | Washer[Third]->ConfigIO( WipeC, RemoteStation::DigitalOutput );
| }
| else
| {
| | Washer[Second]->ConfigIO( BrushMotorE, RemoteStation::DigitalOutput );
| | Washer[Second]->ConfigIO( SolventPumpE, RemoteStation::DigitalOutput );
| | Washer[Second]->ConfigIO( ScrubE, RemoteStation::DigitalOutput );
| | if( AirBars )
| | | Washer[Second]->ConfigIO( WipeE, RemoteStation::DigitalInput );
| | else
```

C-DOC WASHER.CPP

```
| | | Washer[Second]->ConfigIO( WipeE, RemoteStation::DigitalOutput );
| }
}
delete Control;
GPoint MaxPoint, MinPoint;
GRect MaxFrame, MinFrame;
void *TempPointer;
// construct both views of the blanket washer panel
MaxFrame.moveTo( MaxPanelAnchor ); MaxFrame.growTo( MaxPanelSize );
MinFrame.moveTo( BWminAnchor ); MinFrame.growTo( LargePanelSize );
if( !( Control = new Panel( MaxFrame, MinFrame, "BLANKET WASHER" ) ) )
{
| cerr << "BlanketWasher::Build can't create Control Panel" << endl;
| exit( EXIT_FAILURE );
}
if( BWbuttons >= 1 )
{
| MaxFrame.moveTo( MaxPanelAnchor ); MaxFrame.growTo( MaxMatDispSize );
| MaxFrame.move( MaxMatDispAnchor );
| if( !( TempPointer = new MatrixDisplay( MaxFrame, 10, 2 ) ) )
| {
| | cerr << "BlanketWasher::Build can't create MatrixDisplay" << endl;
| | exit( EXIT_FAILURE );
| }
| Control->addMatDisp( True, (MatrixDisplay*)TempPointer );
| MinFrame.moveTo( BWminAnchor ); MinFrame.growTo( MinMatDispSize );
| MinFrame.move( MinMatDispAnchor );
| if( !( TempPointer = new MatrixDisplay( MinFrame, 10, 2 ) ) )
| {
| | cerr << "BlanketWasher::Build can't create MatrixDisplay" << endl;
| | exit( EXIT_FAILURE );
| }
| Control->addMatDisp( False, (MatrixDisplay*)TempPointer );
| char QtyTxt[6];
| ostrstream Qty( QtyTxt, 6 );
| Qty << Washes << "  ";
| Control->Display( 0, 0, "Total    " );
| Control->Display( 1, 0, "Washes " );
| Control->Display( 1, 7, QtyTxt );
| OldMessage = WashCount;
| MaxFrame.moveTo( MaxPanelAnchor ); MaxFrame.growTo( MaxButtonSize );
| MaxFrame.move( MaxSwitchCol1of3 ); MaxFrame.move( MaxSwitchRow );
| MinFrame.moveTo( BWminAnchor ); MinFrame.growTo( MinButtonSize );
| MinFrame.move( MinSwitchCol1of3 ); MinFrame.move( MinSwitchRow );
| Control->addButton( MaxFrame, MinFrame, Button::Momentary,
| :  "BRUSH CONDITION", "BRUSH" );
| MaxFrame.moveTo( MaxPanelAnchor ); MaxFrame.growTo( MaxButtonSize );
| MaxFrame.move( MaxSwitchCol2of3 ); MaxFrame.move( MaxSwitchRow );
| MinFrame.moveTo( BWminAnchor ); MinFrame.growTo( MinButtonSize );
| MinFrame.move( MinSwitchCol2of3 ); MinFrame.move( MinSwitchRow );
| Control->addButton( MaxFrame, MinFrame, Button::Momentary,
| :  "START", "START" );
| MaxFrame.moveTo( MaxPanelAnchor ); MaxFrame.growTo( MaxButtonSize );
| MaxFrame.move( MaxSwitchCol3of3 ); MaxFrame.move( MaxSwitchRow );
| MinFrame.moveTo( BWminAnchor ); MinFrame.growTo( MinButtonSize );
| MinFrame.move( MinSwitchCol3of3 ); MinFrame.move( MinSwitchRow );
| Control->addButton( MaxFrame, MinFrame, Button::Momentary,
| :  "STOP", "STOP" );
| Control->Light( Stop, RED );
| MaxPoint = MaxPanelAnchor; MaxPoint += MaxUnitLabel;
| Control->addLabel( True, MaxPoint, "UNIT" );
| MinPoint = BWminAnchor; MinPoint += MinUnitLabel;
```

C-DOC WASHER.CPP

```
| Control->addLabel( False, MinPoint, "UNIT" );
| MaxFrame.moveTo( MaxPanelAnchor ); MaxFrame.growTo( MaxSwitchSize );
| MaxFrame.move( MaxUnit1Anchor );
| if( !( TempPointer = new Button( MaxFrame, Button::Momentary,
| | : : : "Unit 1" ) ) )
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit1Anchor );
| if( !( TempPointer = new Button( MinFrame, Button::Momentary,
| | : : : "Unit 1" ) ) )
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit1Label;
| MinPoint = BWminAnchor; MinPoint += MinUnit1Label;
| if( BWbuttons == 1 && BWcoater )
| {
| | Control->addLabel( True, MaxPoint, "C" );
| | Control->addLabel( False, MinPoint, "C" );
| }
| else
| {
| | Control->addLabel( True, MaxPoint, "1" );
| | Control->addLabel( False, MinPoint, "1" );
| }
}
if( BWbuttons >= 2 )
{
| MaxFrame.moveTo( MaxPanelAnchor ); MaxFrame.growTo( MaxSwitchSize );
| MaxFrame.move( MaxUnit2Anchor );
| if( !( TempPointer = new Button( MaxFrame, Button::Momentary,
| | : : : "Unit 2" ) ) )
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit2Anchor );
| if( !( TempPointer = new Button( MinFrame, Button::Momentary,
| | : : : "Unit 2" ) ) )
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit2Label;
| MinPoint = BWminAnchor; MinPoint += MinUnit2Label;
| if( BWbuttons == 2 && BWcoater )
| {
| | Control->addLabel( True, MaxPoint, "C" );
| | Control->addLabel( False, MinPoint, "C" );
| }
| else
| {
| | Control->addLabel( True, MaxPoint, "2" );
```

C-DOC WASHER.CPP

```
| | Control->addLabel( False, MinPoint, "2" );
| }
}
if( BWbuttons >= 3 )
{
| MaxFrame.moveTo( MaxPanelAnchor ); MaxFrame.growTo( MaxSwitchSize );
| MaxFrame.move( MaxUnit3Anchor );
| if( !( TempPointer = new Button( MaxFrame, Button::Momentary,
| | : : : "Unit 3" ) ) )
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit3Anchor );
| if( !( TempPointer = new Button( MinFrame, Button::Momentary,
| | : : : "Unit 3" ) ) )
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit3Label;
| MinPoint = BWminAnchor; MinPoint += MinUnit3Label;
| if( BWbuttons == 3 && BWcoater )
| {
| | Control->addLabel( True, MaxPoint, "C" );
| | Control->addLabel( False, MinPoint, "C" );
| }
| else
| {
| | Control->addLabel( True, MaxPoint, "3" );
| | Control->addLabel( False, MinPoint, "3" );
| }
}
if( BWbuttons >= 4 )
{
| MaxFrame.moveTo( MaxPanelAnchor ); MaxFrame.growTo( MaxSwitchSize );
| MaxFrame.move( MaxUnit4Anchor );
| if( !( TempPointer = new Button( MaxFrame, Button::Momentary,
| | : : : "Unit 4" ) ) )
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit4Anchor );
| if( !( TempPointer = new Button( MinFrame, Button::Momentary,
| | : : : "Unit 4" ) ) )
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit4Label;
| MinPoint = BWminAnchor; MinPoint += MinUnit4Label;
| if( BWbuttons == 4 && BWcoater )
| {
| | Control->addLabel( True, MaxPoint, "C" );
| | Control->addLabel( False, MinPoint, "C" );
```

C-DOC WASHER.CPP

```
| }
| else
| {
| | Control->addLabel( True, MaxPoint, "4" );
| | Control->addLabel( False, MinPoint, "4" );
| }
}
if( BWbuttons >= 5 )
{
| MaxFrame.moveTo( MaxPanelAnchor ); MaxFrame.growTo( MaxSwitchSize );
| MaxFrame.move( MaxUnit5Anchor );
| if( !( TempPointer = new Button( MaxFrame, Button::Momentary,
| | : : : "Unit 5" )))
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit5Anchor );
| if( !( TempPointer = new Button( MinFrame, Button::Momentary,
| | : : : "Unit 5" )))
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit5Label;
| MinPoint = BWminAnchor; MinPoint += MinUnit5Label;
| if( BWbuttons == 5 && BWcoater )
| {
| | Control->addLabel( True, MaxPoint, "C" );
| | Control->addLabel( False, MinPoint, "C" );
| }
| else
| {
| | Control->addLabel( True, MaxPoint, "5" );
| | Control->addLabel( False, MinPoint, "5" );
| }
}
if( BWbuttons >= 6 )
{
| MaxFrame.moveTo( MaxPanelAnchor ); MaxFrame.growTo( MaxSwitchSize );
| MaxFrame.move( MaxUnit6Anchor );
| if( !( TempPointer = new Button( MaxFrame, Button::Momentary,
| | : : : "Unit 6" )))
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit6Anchor );
| if( !( TempPointer = new Button( MinFrame, Button::Momentary,
| | : : : "Unit 6" )))
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit6Label;
| MinPoint = BWminAnchor; MinPoint += MinUnit6Label;
```

```
| if( BWbuttons == 6 && BWcoater )
| {
| | Control->addLabel( True, MaxPoint, "C" );
| | Control->addLabel( False, MinPoint, "C" );
| }
| else
| {
| | Control->addLabel( True, MaxPoint, "6" );
| | Control->addLabel( False, MinPoint, "6" );
| }
}
if( BWbuttons >= 7 )
{
| MaxFrame.moveTo( MaxPanelAnchor ); MaxFrame.growTo( MaxSwitchSize );
| MaxFrame.move( MaxUnit7Anchor );
| if( !( TempPointer = new Button( MaxFrame, Button::Momentary,
| | : : : "Unit 7" )))
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit7Anchor );
| if( !( TempPointer = new Button( MinFrame, Button::Momentary,
| | : : : "Unit 7" )))
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit7Label;
| MinPoint = BWminAnchor; MinPoint += MinUnit7Label;
| if( BWbuttons == 7 && BWcoater )
| {
| | Control->addLabel( True, MaxPoint, "C" );
| | Control->addLabel( False, MinPoint, "C" );
| }
| else
| {
| | Control->addLabel( True, MaxPoint, "7" );
| | Control->addLabel( False, MinPoint, "7" );
| }
}
if( BWbuttons >= 8 )
{
| MaxFrame.moveTo( MaxPanelAnchor ); MaxFrame.growTo( MaxSwitchSize );
| MaxFrame.move( MaxUnit8Anchor );
| if( !( TempPointer = new Button( MaxFrame, Button::Momentary,
| | : : : "Unit 8" )))
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit8Anchor );
| if( !( TempPointer = new Button( MinFrame, Button::Momentary,
| | : : : "Unit 8" )))
| {
| | cerr << "BlanketWasher::Build can't create Button" << endl;
| | exit( EXIT_FAILURE );
```

C-DOC WASHER.CPP

```
| }
| Control->addButton( False, (Button*)TempPointer );
| MaxPoint = MaxPanelAnchor; MaxPoint += MaxUnit8Label;
| MinPoint = BWminAnchor; MinPoint += MinUnit8Label;
| if( BWbuttons == 8 && BWcoater )
| {
| | Control->addLabel( True, MaxPoint, "C" );
| | Control->addLabel( False, MinPoint, "C" );
| }
| else
| {
| | Control->addLabel( True, MaxPoint, "8" );
| | Control->addLabel( False, MinPoint, "8" );
| }
}
if( BWbuttons >= 9 )
{
| MaxFrame.moveTo( MaxPanelAnchor ); MaxFrame.growTo( MaxSwitchSize );
| MaxFrame.move( MaxUnit9Anchor );
| if( !( TempPointer = new Button( MaxFrame, Button::Momentary,
| | : : : "Unit 9" )))
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit9Anchor );
| if( !( TempPointer = new Button( MinFrame, Button::Momentary,
| | : : : "Unit 9" )))
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit9Label;
| MinPoint = BWminAnchor; MinPoint += MinUnit9Label;
| if( BWbuttons == 9 && BWcoater )
| {
| | Control->addLabel( True, MaxPoint, "C" );
| | Control->addLabel( False, MinPoint, "C" );
| }
| else
| {
| | Control->addLabel( True, MaxPoint, "9" );
| | Control->addLabel( False, MinPoint, "9" );
| }
}
if( BWbuttons >= 10 )
{
| MaxFrame.moveTo( MaxPanelAnchor ); MaxFrame.growTo( MaxSwitchSize );
| MaxFrame.move( MaxUnit10Anchor );
| if( !( TempPointer = new Button( MaxFrame, Button::Momentary,
| | : : : "Unit 10" )))
| {
| | cerr << "BlanketWasher::Build can't create Button" << endl;
| | exit( EXIT_FAILURE );
| }
| Control->addButton( True, (Button*)TempPointer );
| MinFrame.moveTo( BWminAnchor ); MinFrame.growTo( MinSwitchSize );
| MinFrame.move( MinUnit10Anchor );
| if( !( TempPointer = new Button( MinFrame, Button::Momentary,
```

```
| | : : : "Unit 10" ) ) )
| {
| | cerr << "BlanketWasher::Build can't create Button" << endl;
| | exit( EXIT_FAILURE );
| }
| Control->addButton( False, (Button*)TempPointer );
| MaxPoint = MaxPanelAnchor; MaxPoint += MaxUnit10Label;
| MinPoint = BWminAnchor; MinPoint += MinUnit10Label;
| if( BWbuttons == 10 && BWcoater )
| {
| | Control->addLabel( True, MaxPoint, "C" );
| | Control->addLabel( False, MinPoint, "C" );
| }
| else
| {
| | Control->addLabel( True, MaxPoint, "10" );
| | Control->addLabel( False, MinPoint, "10" );
| }
}
Control->Max(); Control->Min();
for( uint w = 0; w < BWbuttons; w++ )// MaxWashers
{
#  Control->Tag( Unit1 + w, Prog[WashProg[w]] );
#  if( WashProg[w] == 0 )
#  | Control->Light( Unit1 + w, DARKGRAY );
#  else
#  | Control->Light( Unit1 + w, GREEN );
}
}

// is this key press appropriate for this panel
Boolean BlanketWasher::CanUse( uint Key )
{
  if( Control == 0 )
========return False;
  if( BWbuttons && !Control->Maxed() && Key == '1' )
========return True;
  if( Control->Maxed() && strchr( "ABCEIOPQRSTUWY", toupper( Key ) ) )
========return True;
====return False;
}

// start a brush condition cycle
void BlanketWasher::ConditionBrushes( void )
{
  uint Mask = 0;
  if( Washers >= 1 && BWbuttons >= 1 && WashProg[0] != 0 )
  | Mask |= 0x02;
  if( Washers >= 2 && BWbuttons >= 2 && WashProg[1] != 0 )
  | Mask |= 0x04;
  if( Washers >= 3 && BWbuttons >= 3 && WashProg[2] != 0 )
  | Mask |= 0x08;
  if( Use16IOs )
  {
  | if( Washer[First] )
  | | Washer[First]->BlanketWasher( Mask, Generator[0], Generator[0],
  | | : Generator[WashProg[0]], Generator[WashProg[0]],
  | | : Generator[WashProg[1]], Generator[WashProg[1]],
  | | : Generator[WashProg[2]], Generator[WashProg[2]],
  | | : Generator[0], Generator[0], Generator[0], Generator[0],
  | | : Generator[0], Generator[0], SolventShots[0], SolventShots[0],
  | | : SolventShots[0],SolventShots[0],SolventShots[0],SolventShots[0],
```

C-DOC WASHER.CPP

```
| | : 0, 5 * Generator[0], 40, 0, 0, 0, AirBars );
| Mask = 0;
| if( Washers >= 4 && BWbuttons >= 4 && WashProg[3] != 0 )
| | Mask |= 0x01;
| if( Washers >= 5 && BWbuttons >= 5 && WashProg[4] != 0 )
| | Mask |= 0x02;
| if( Washers >= 6 && BWbuttons >= 6 && WashProg[5] != 0 )
| | Mask |= 0x04;
| if( Washers >= 7 && BWbuttons >= 7 && WashProg[6] != 0 )
| | Mask |= 0x08;
| if( Washer[Second] )
| | Washer[Second]->BlanketWasher( Mask,
| | : Generator[WashProg[3]], Generator[WashProg[3]],
| | : Generator[WashProg[4]], Generator[WashProg[4]],
| | : Generator[WashProg[5]], Generator[WashProg[5]],
| | : Generator[WashProg[6]], Generator[WashProg[6]],
| | : Generator[0], Generator[0], Generator[0], Generator[0],
| | : Generator[0], Generator[0], SolventShots[0], SolventShots[0],
| | : SolventShots[0],SolventShots[0],SolventShots[0],SolventShots[0],
| | : 0, 5 * Generator[0], 40, 0, 0, 0, AirBars );
| Mask = 0;
| if( Washers >= 8 && BWbuttons >= 8 && WashProg[7] != 0 )
| | Mask |= 0x01;
| if( Washers >= 9 && BWbuttons >= 9 && WashProg[8] != 0 )
| | Mask |= 0x02;
| if( Washers >= 10 && BWbuttons >= 10 && WashProg[9] != 0 )
| | Mask |= 0x04;
| if( Washer[Third] )
| | Washer[Third]->BlanketWasher( Mask,
| | : Generator[WashProg[7]], Generator[WashProg[7]],
| | : Generator[WashProg[8]], Generator[WashProg[8]],
| | : Generator[WashProg[9]], Generator[WashProg[9]],
| | : Generator[0], Generator[0],
| | : Generator[0], Generator[0], Generator[0], Generator[0],
| | : Generator[0], Generator[0], SolventShots[0], SolventShots[0],
| | : SolventShots[0],SolventShots[0],SolventShots[0],SolventShots[0],
| | : 0, 5 * Generator[0], 40, 0, 0, 0, AirBars );
}
else
{
| if( Washers >= 4 && BWbuttons >= 4 && WashProg[3] != 0 )
| | Mask |= 0x10;
| if( Washers >= 5 && BWbuttons >= 5 && WashProg[4] != 0 )
| | Mask |= 0x20;
| if( Washer[First] )
| | Washer[First]->BlanketWasher( Mask, Generator[0], Generator[0],
| | : Generator[WashProg[0]], Generator[WashProg[0]],
| | : Generator[WashProg[1]], Generator[WashProg[1]],
| | : Generator[WashProg[2]], Generator[WashProg[2]],
| | : Generator[WashProg[3]], Generator[WashProg[3]],
| | : Generator[WashProg[4]], Generator[WashProg[4]],
| | : Generator[0], Generator[0], SolventShots[0], SolventShots[0],
| | : SolventShots[0],SolventShots[0],SolventShots[0],SolventShots[0],
| | : 0, 5 * Generator[0], 40, 0, 0, 0, AirBars );
| Mask = 0;
| if( Washers >= 6 && BWbuttons >= 6 && WashProg[5] != 0 )
| | Mask |= 0x01;
| if( Washers >= 7 && BWbuttons >= 7 && WashProg[6] != 0 )
| | Mask |= 0x02;
| if( Washers >= 8 && BWbuttons >= 8 && WashProg[7] != 0 )
| | Mask |= 0x04;
| if( Washers >= 9 && BWbuttons >= 9 && WashProg[8] != 0 )
```

```
  | | Mask |= 0x08;
  | if( Washers >= 10 && BWbuttons >= 10 && WashProg[9] != 0 )
  | | Mask |= 0x10;
  | if( Washer[Second] )
  | | Washer[Second]->BlanketWasher( Mask,
  | | :  Generator[WashProg[5]], Generator[WashProg[5]],
  | | :  Generator[WashProg[6]], Generator[WashProg[6]],
  | | :  Generator[WashProg[7]], Generator[WashProg[7]],
  | | :  Generator[WashProg[8]], Generator[WashProg[8]],
  | | :  Generator[WashProg[9]], Generator[WashProg[9]],
  | | :  Generator[0], Generator[0],
  | | :  Generator[0], Generator[0], SolventShots[0], SolventShots[0],
  | | :  SolventShots[0],SolventShots[0],SolventShots[0],SolventShots[0],
  | | :  0, 5 * Generator[0], 40, 0, 0, 0, AirBars );
  }
  WasherStation::BroadcastStart();
}

// initialize the buttons and indicators
void BlanketWasher::DispInit( SheetFedConfig *ConfigData )
{
  AirBars = ConfigData->BWairBars;
  BrushMotorTime = AirBars ? 164 : 134;
  BWbuttons = ConfigData->BWbuttons;
  BWcoater = ConfigData->BWcoater;
  Generator[0] = ConfigData->WashProg0Time;
  Generator[1] = ConfigData->WashProg1Time;
  Generator[2] = ConfigData->WashProg2Time;
  Generator[3] = ConfigData->WashProg3Time;
  Generator[4] = ConfigData->WashProg4Time;
  Generator[5] = ConfigData->WashProg5Time;
  ScrubTime = AirBars ? 120 : 94;
  SolventShots[0] = 3;          // ConfigData->WashProg0Shots;
  SolventShots[1] = ConfigData->WashProg1Shots;
  SolventShots[2] = ConfigData->WashProg2Shots;
  SolventShots[3] = ConfigData->WashProg3Shots;
  SolventShots[4] = ConfigData->WashProg4Shots;
  SolventShots[5] = ConfigData->WashProg5Shots;
  Use16IOs = ConfigData->BW16IOs;
  Washers = ConfigData->BWunits;
  Washes = ConfigData->BWcycles;
  for( uint p = 0; p < 10; p++ )
  #  WashProg[p] = ConfigData->BWprog[p];
  WiperDelay = AirBars ? 30 : 94;
  Build();
}

// hide the blanket washer control panel
void BlanketWasher::Hide( void )
{
  delete Control;
  Control = 0;
}

// translate the key press into a push point
GPoint& BlanketWasher::MakePush( uint Key )
{
  static GPoint Push( -1, -1 );
  if( Control == 0 )
========return Push;
  if( !Control->Maxed() && ( Key == '1' ) )
  {
```

C-DOC WASHER.CPP

```
| Push.x = LargePanelSize.x / 2;
| Push.y = LargePanelSize.y / 2;
| Push += BWminAnchor;
}
if( Control->Maxed() && strchr( "ABCEIOPQRSTUWY", toupper( Key ) ) )
{
| Push.x = MaxButtonSize.x / 2;
| Push.y = MaxButtonSize.y / 2;
| Push += MaxPanelAnchor;
| switch( toupper( Key ) )
| {
| case 'A':            // stArt
| | Push += MaxSwitchRow;
| | Push += MaxSwitchCol2of3;
| |===break;
| case 'B':            // Brush condition
| | Push += MaxSwitchRow;
| | Push += MaxSwitchCol1of3;
| |===break;
| case 'C':            // Clear wash Counter
| | Push += MaxMatDispAnchor;
| |===break;
| case 'E':            // unit 3
| | Push += MaxUnit3Anchor;
| |===break;
| case 'I':            // unit 8
| | Push += MaxUnit8Anchor;
| |===break;
| case 'O':            // unit 9
| | Push += MaxUnit9Anchor;
| |===break;
| case 'P':            // unit 10
| | Push += MaxUnit10Anchor;
| |===break;
| case 'Q':            // unit 1
| | Push += MaxUnit1Anchor;
| |===break;
| case 'R':            // unit 4
| | Push += MaxUnit4Anchor;
| |===break;
| case 'S':            // Stop
| | Push += MaxSwitchRow;
| | Push += MaxSwitchCol3of3;
| |===break;
| case 'T':            // unit 5
| | Push += MaxUnit5Anchor;
| |===break;
| case 'U':            // unit 7
| | Push += MaxUnit7Anchor;
| |===break;
| case 'W':            // unit 2
| | Push += MaxUnit2Anchor;
| |===break;
| case 'Y':            // unit 6
| | Push += MaxUnit6Anchor;
| |===break;
| }
}
=====return Push;
}

// see if we should maximize
```

```
|  :  !Washer[First]->GetDigital( BWInterLock ) )
{
|  Fault = True;
|  NewMessage = InterLockFault;
}
if( Washer[First] && Washer[First]->GetDigital( OilFault ) )
{
|  Fault = True;
|  NewMessage = HydrolicFault;
}
if( Washer[First] && !Washer[First]->Responding() )
|  Fault = True;
if( Washer[Second] && !Washer[Second]->Responding() )
|  Fault = True;
if( Washer[Third] && !Washer[Third]->Responding() )
|  Fault = True;
if( ( Control && Control->OneShot( Stop ) && Control->Switch( Stop ) )
|  :  || ( Fault && State != Idle ) )
{
|  WasherStation::BroadcastStop();
//    Timer Delay( 3 );
//    while( !Delay.Expired() );
|  CycleTimer->Set( 0 );
|  State = Idle;
|  if( Washer[First] )
|  {
|  |  Washer[First]->SetDigital( HydrolicMotor, False );
|  |  Washer[First]->StopProgram();
|  }
|  if( Washer[Second] )
|  |  Washer[Second]->StopProgram();
|  if( Washer[Third] )
|  |  Washer[Third]->StopProgram();
|  if( Control )
|  {
|  |  Control->Light( Brush, DARKGRAY );
|  |  Control->Light( Start, DARKGRAY );
|  |  Control->Light( Stop, RED );
|  }
}
if( Washer[Second] && ( ( Use16IOs && Washers >= 4 ) || Washers >= 6 ) )
|  Washer[Second]->GetDigital( PLCrunning );
if( Washer[Third] && Use16IOs && Washers >= 8 )
|  Washer[Third]->GetDigital( PLCrunning );
if( Control && NewMessage != OldMessage )
{
|  switch( NewMessage )
|  {
|  case WashCount:
|  |  char QtyTxt[6];
|  |  ostrstream Qty( QtyTxt, 6 );
|  |  Qty << Washes << "  ";
|  |  Control->Display( 0, 0, "Total    " );
|  |  Control->Display( 1, 0, "Washes " );
|  |  Control->Display( 1, 7, QtyTxt );
|  |==break;
|  case Conditioning:
|  |  Control->Display( 0, 0, "Condition " );
|  |  Control->Display( 1, 0, " Brushes  " );
|  |==break;
|  case Washing:
|  |  Control->Display( 0, 0, " Washing  " );
```

C-DOC WASHER.CPP

```
|  |  Control->Display( 1, 0, " Blankets " );
|  |===break;
|  case SolventWarning:
|  |  Control->Display( 0, 0, " Solvent  " );
|  |  Control->Display( 1, 0, " Recovery " );
|  |===break;
|  case HydrolicFault:
|  |  Control->Display( 0, 0, "Hydraulic " );
|  |  Control->Display( 1, 0, "Oil Fault " );
|  |===break;
|  case InterLockFault:
|  |  Control->Display( 0, 0, " Inter   " );
|  |  Control->Display( 1, 0, "  Lock   " );
|  |===break;
|  }
|  OldMessage = NewMessage;
}
}

// do the finger poking thing
Boolean BlanketWasher::Touched( GPoint& Push )
{
  if( BWbuttons && Control )
  {
  |  GRect Reset;
  |  Reset.moveTo( MaxMatDispAnchor ); Reset.growTo( MaxMatDispSize );
  |  Reset.move( MaxPanelAnchor );
  |  if( Washes > 0 && Control->Maxed() && Reset.contains( Push ) )
  |  {
  |  |  if( State == Idle )
  |  |  {
  |  |  |  Control->Display( 0, 0, "Total" );
  |  |  |  Control->Display( 1, 0, "Washes " );
  |  |  |  Control->Display( 1, 7, "0  " );
  |  |  |  OldMessage = WashCount;
  |  |  }
  |  |  Washes = 0;
  |  }
  |  OK2Max = Control->Touched( Push );
  }
  else
  |  OK2Max = False;
====return OK2Max;
}

// change the configuration parameters
void BlanketWasher::UpdateSetup( SheetFedConfig *ConfigData )
{
  ConfigData->BWcycles = Washes;
  for( uint p = 0; p < BWbuttons; p++ )
  #  ConfigData->BWprog[p] = WashProg[p];
}

// start a blanket wash cycle
void BlanketWasher::WashBlankets( void )
{
  uint Mask = 0;
  if( Washers >= 1 && BWbuttons >= 1 && WashProg[0] != 0 )
  |  Mask |= 0x02;
  if( Washers >= 2 && BWbuttons >= 2 && WashProg[1] != 0 )
  |  Mask |= 0x04;
  if( Washers >= 3 && BWbuttons >= 3 && WashProg[2] != 0 )
```

C-DOC WASHER.CPP

```
| Mask |= 0x08;
if( Use16IOs )
{
| if( Washer[First] )
| | Washer[First]->BlanketWasher( Mask, Generator[0], Generator[0],
| | : Generator[WashProg[0]], Generator[WashProg[0]],
| | : Generator[WashProg[1]], Generator[WashProg[1]],
| | : Generator[WashProg[2]], Generator[WashProg[2]],
| | : Generator[0], Generator[0], Generator[0], Generator[0],
| | : Generator[0], Generator[0], SolventShots[0],
| | : SolventShots[WashProg[0]], SolventShots[WashProg[1]],
| | : SolventShots[WashProg[2]], SolventShots[0], SolventShots[0],
| | : ScrubTime, ScrubTime + 5 * Generator[0],
| | : BrushMotorTime, WiperRollerTime, ScrubDelay,
| | : WiperDelay, AirBars );
| Mask = 0;
| if( Washers >= 4 && BWbuttons >= 4 && WashProg[3] != 0 )
| | Mask |= 0x01;
| if( Washers >= 5 && BWbuttons >= 5 && WashProg[4] != 0 )
| | Mask |= 0x02;
| if( Washers >= 6 && BWbuttons >= 6 && WashProg[5] != 0 )
| | Mask |= 0x04;
| if( Washers >= 7 && BWbuttons >= 7 && WashProg[6] != 0 )
| | Mask |= 0x08;
| if( Washer[Second] )
| | Washer[Second]->BlanketWasher( Mask,
| | : Generator[WashProg[3]], Generator[WashProg[3]],
| | : Generator[WashProg[4]], Generator[WashProg[4]],
| | : Generator[WashProg[5]], Generator[WashProg[5]],
| | : Generator[WashProg[6]], Generator[WashProg[6]],
| | : Generator[0], Generator[0], Generator[0], Generator[0],
| | : Generator[0], Generator[0], SolventShots[WashProg[3]],
| | : SolventShots[WashProg[4]], SolventShots[WashProg[5]],
| | : SolventShots[WashProg[6]], SolventShots[0], SolventShots[0],
| | : ScrubTime, ScrubTime + 5 * Generator[0],
| | : BrushMotorTime, WiperRollerTime, ScrubDelay,
| | : WiperDelay, AirBars );
| Mask = 0;
| if( Washers >= 8 && BWbuttons >= 8 && WashProg[7] != 0 )
| | Mask |= 0x01;
| if( Washers >= 9 && BWbuttons >= 9 && WashProg[8] != 0 )
| | Mask |= 0x02;
| if( Washers >= 10 && BWbuttons >= 10 && WashProg[9] != 0 )
| | Mask |= 0x04;
| if( Washer[Third] )
| | Washer[Third]->BlanketWasher( Mask,
| | : Generator[WashProg[7]], Generator[WashProg[7]],
| | : Generator[WashProg[8]], Generator[WashProg[8]],
| | : Generator[WashProg[9]], Generator[WashProg[9]],
| | : Generator[0], Generator[0],
| | : Generator[0], Generator[0], Generator[0], Generator[0],
| | : Generator[0], Generator[0], SolventShots[WashProg[7]],
| | : SolventShots[WashProg[8]], SolventShots[WashProg[9]],
| | : SolventShots[0], SolventShots[0], SolventShots[0],
| | : ScrubTime, ScrubTime + 5 * Generator[0],
| | : BrushMotorTime, WiperRollerTime, ScrubDelay,
| | : WiperDelay, AirBars );
}
else
{
| if( Washers >= 4 && BWbuttons >= 4 && WashProg[3] != 0 )
| | Mask |= 0x10;
```

C-DOC WASHER.CPP

```
| if( Washers >= 5 && BWbuttons >= 5 && WashProg[4] != 0 )
| | Mask |= 0x20;
| if( Washer[First] )
| | Washer[First]->BlanketWasher( Mask, Generator[0], Generator[0],
| | : Generator[WashProg[0]], Generator[WashProg[0]],
| | : Generator[WashProg[1]], Generator[WashProg[1]],
| | : Generator[WashProg[2]], Generator[WashProg[2]],
| | : Generator[WashProg[3]], Generator[WashProg[3]],
| | : Generator[WashProg[4]], Generator[WashProg[4]],
| | : Generator[0], Generator[0], SolventShots[0],
| | : SolventShots[WashProg[0]], SolventShots[WashProg[1]],
| | : SolventShots[WashProg[2]], SolventShots[WashProg[3]],
| | : SolventShots[WashProg[4]],
| | : ScrubTime, ScrubTime + 5 * Generator[0],
| | : BrushMotorTime, WiperRollerTime, ScrubDelay,
| | : WiperDelay, AirBars );
| Mask = 0;
| if( Washers >= 6 && BWbuttons >= 6 && WashProg[5] != 0 )
| | Mask |= 0x01;
| if( Washers >= 7 && BWbuttons >= 7 && WashProg[6] != 0 )
| | Mask |= 0x02;
| if( Washers >= 8 && BWbuttons >= 8 && WashProg[7] != 0 )
| | Mask |= 0x04;
| if( Washers >= 9 && BWbuttons >= 9 && WashProg[8] != 0 )
| | Mask |= 0x08;
| if( Washers >= 10 && BWbuttons >= 10 && WashProg[9] != 0 )
| | Mask |= 0x10;
| if( Washer[Second] )
| | Washer[Second]->BlanketWasher( Mask,
| | : Generator[WashProg[5]], Generator[WashProg[5]],
| | : Generator[WashProg[6]], Generator[WashProg[6]],
| | : Generator[WashProg[7]], Generator[WashProg[7]],
| | : Generator[WashProg[8]], Generator[WashProg[8]],
| | : Generator[WashProg[9]], Generator[WashProg[9]],
| | : Generator[0], Generator[0], Generator[0], Generator[0],
| | : SolventShots[WashProg[5]], SolventShots[WashProg[6]],
| | : SolventShots[WashProg[7]], SolventShots[WashProg[8]],
| | : SolventShots[WashProg[9]], SolventShots[0],
| | : ScrubTime, ScrubTime + 5 * Generator[0],
| | : BrushMotorTime, WiperRollerTime, ScrubDelay,
| | : WiperDelay, AirBars );
}
WasherStation::BroadcastStart();
}
```

C-DOC WATERLES.CI

```

/*************************************\
*                                     *
*  waterles.cpp                       *
*                                     *
*  Waterless temperature controls for the Sheet Fed printing press  *
*                                     *
*  (C) 1993 OXY-DRY CORPORATION all rights reserved  *
*                                     *
\*************************************/

// life in this world began on may 6
// 1993 june 15     fix blinking plate set point
// 1993 july 5      add pre-heat mode
// 1993 july 7      fix strstream bug
// 1993 july 29     assign keyboard debugging keys
// 1993 august 11   allow panel to work with io disabled
// 1993 october 10  change copyright for listing

#include <ctype.h>          // is...(), toupper()
#include <graphics.h>       // graphics primitives
#include <iostream.h>       // ostream_withassign
#include <stdlib.h>         // exit(), random(), randomize()
#include <string.h>         // str...()
#include <strstrea.h>       // string stream functions
#include <time.h>           // randomize() needs to know time()
#include "waterles.h"       // temperature control

const GPoint WaterLessTemperature::DecButton[] =
      { MaxTemp1Dec, MaxTemp2Dec, MaxTemp3Dec, MaxTemp4Dec, MaxTemp5Dec,
        MaxTemp6Dec, MaxTemp7Dec, MaxTemp8Dec },
WaterLessTemperature::IncButton[] =
{ MaxTemp1Inc, MaxTemp2Inc, MaxTemp3Inc, MaxTemp4Inc, MaxTemp5Inc,
  MaxTemp6Inc, MaxTemp7Inc, MaxTemp8Inc },
WaterLessTemperature::TempButton[] =
{ MaxTemp1Anchor, MaxTemp2Anchor, MaxTemp3Anchor, MaxTemp4Anchor,
  MaxTemp5Anchor, MaxTemp6Anchor, MaxTemp7Anchor, MaxTemp8Anchor };
const uint WaterLessTemperature::DecSw[] =
      { Unit1Dec, Unit2Dec, Unit3Dec, Unit4Dec, Unit5Dec, Unit6Dec, Unit7Dec,
        Unit8Dec },
WaterLessTemperature::Heater[] =
{ Heater1, Heater2, Heater3, Heater4, Heater5, Heater6, Heater7,
  Heater8 },
WaterLessTemperature::IncSw[] =
{ Unit1Inc, Unit2Inc, Unit3Inc, Unit4Inc, Unit5Inc, Unit6Inc, Unit7Inc,
  Unit8Inc };

// the constructor
WaterLessTemperature::WaterLessTemperature( SheetFedConfig *ConfigData )// the constructor
{
  Active = False;
  ActiveTemp = 0;
  Control = 0;
  HeaterDelay = 0;      // pointer to an array of pointers to timers
  HeaterDelayTime = 10;       // seconds
  NewSetPoint = False;
  OK2Max = False;
  OnSw = ConfigData->WLOnSw;
  OpMode = Off;
  PlateCoefficientD = ConfigData->PlateCoefficientD;
  PlateCoefficientI = ConfigData->PlateCoefficientI;
  PlateCoefficientN = ConfigData->PlateCoefficientN;
```

C-DOC WATERLES.CP

```
PlateCoefficientP = ConfigData->PlateCoefficientP;
PlateCoefficientT = ConfigData->PlateCoefficientT;
PHSw = ConfigData->WLPHSw;
PreHeatTime = ConfigData->WLPreHeatTime;
RunSw = ConfigData->WLRunSw;
SPSw = ConfigData->WLSPSw;
TempUnits = ConfigData->TempUnits;
typeOmatic = 0;
WarmUp = 0;
WaterCoefficientD = ConfigData->WaterCoefficientD;
WaterCoefficientI = ConfigData->WaterCoefficientI;
WaterCoefficientN = ConfigData->WaterCoefficientN;
WaterCoefficientP = ConfigData->WaterCoefficientP;
WaterCoefficientT = ConfigData->WaterCoefficientT;
WaterIO = 0;
WaterWiz = 0;
WLtempButtons = ConfigData->WLtempButtons;
if( !( HeaterDelay = new Timer *[8] ) )
{
| cerr << "WaterLessTemperature can't create HeaterDelay Timers" << endl;
| exit( EXIT_FAILURE );
}
for( uint u = 0; u < 8; u++ )
{
#  FakePlateTemp[u] = 1045;     // 20.7°C
#  FakeWaterTemp[u] = 1045;     // 20.7°C
#  PlateSetPoint[u] = ConfigData->PlateSetPoint[u];
#  PlateTemp[u] = 55;
#  WaterSetPoint[u] = ConfigData->WaterSetPoint[u];
#  WaterTemp[u] = 55;
#  TempMode[u] = ConfigData->TempMode[u];
#  if( !( HeaterDelay[u] = new Timer ) )
#  {
#  | cerr << "WaterLessTemperature can't create HeaterDelay Timer"
#  | << endl;
#  | exit( EXIT_FAILURE );
#  }
 }
 if( !( typeOmatic = new Timer ) )
 {
 | cerr << "WaterLessTemperature can't create typeOmatic Timer" << endl;
 | exit( EXIT_FAILURE );
 }
 if( !( WarmUp = new Timer ) )
 {
 | cerr << "WaterLessTemperature can't create WarmUp Timer" << endl;
 | exit( EXIT_FAILURE );
 }
 Build();
}

WaterLessTemperature::~WaterLessTemperature()// the destructor
{
 delete Control;
 for( uint u = 0; u < 8; u++ )
 #  delete HeaterDelay[u];
 delete []HeaterDelay;
 delete typeOmatic;
 delete WarmUp;
 delete WaterIO;
 delete WaterWiz;
}
```

C-DOC WATERLES.CI

```
// reconstruct the control panel and reconfigure the io
void WaterLessTemperature::Build( void )
{
   if( !TempUnits )
   {
   | delete WaterIO;
   | WaterIO = 0;
   | delete WaterWiz;
   | WaterWiz = 0;
   }
   if( TempUnits )
   {
   | if( !WaterIO )
   | | if( !( WaterIO = new RemoteStation( 8 ) ) )
   | | {
   | | | cerr << "WaterLessTemperature can't create WaterIO RemoteStation"
   | | | << endl;
   | | | exit( EXIT_FAILURE );
   | | }
   | if( !WaterWiz )
   | | if( !( WaterWiz = new WaterStation( 73 ) ) )
   | | {
   | | | cerr << "WaterLessTemperature can't create WaterWiz WaterStation"
   | | | << endl;
   | | | exit( EXIT_FAILURE );
   | | }
   | WaterIO->ConfigIO( Heater1, RemoteStation::DigitalOutput );
   | WaterIO->ConfigIO( Heater2, RemoteStation::DigitalOutput );
   | WaterIO->ConfigIO( Heater3, RemoteStation::DigitalOutput );
   | WaterIO->ConfigIO( Heater4, RemoteStation::DigitalOutput );
   | WaterIO->ConfigIO( Heater5, RemoteStation::DigitalOutput );
   | WaterIO->ConfigIO( Heater6, RemoteStation::DigitalOutput );
   | WaterIO->ConfigIO( Heater7, RemoteStation::DigitalOutput );
   | WaterIO->ConfigIO( Heater8, RemoteStation::DigitalOutput );
   | WaterIO->ConfigIO( Impression, RemoteStation::DigitalInput );
   | WaterIO->ConfigIO( Valves, RemoteStation::DigitalOutput );
   | WaterIO->ConfigIO( ZonePump, RemoteStation::DigitalOutput );
   }
   delete Control;
   GPoint MaxPoint, MinPoint;
   GRect MaxFrame, MinFrame;
   void *TempPointer;
   // construct both views of the waterless (?) panel
   MaxFrame.moveTo( MaxWLanchor ); MaxFrame.growTo( MaxWLsize );
   MinFrame.moveTo( WLminAnchor ); MinFrame.growTo( LargePanelSize );
   if( !( Control = new Panel( MaxFrame, MinFrame, "WATERLESS" ) ) )
   {
   | cerr << "WaterLessTemperature::Build can't create Control Panel"
   | << endl;
   | exit( EXIT_FAILURE );
   }
   MaxPoint = MaxWLanchor; MaxPoint += MaxTStext;
   Control->addLabel( True, MaxPoint, "TRI SERVICE" );
   MinPoint = WLminAnchor; MinPoint += MinTStext;
   Control->addLabel( False, MinPoint, "TRI SERVICE" );
   if( WLtempButtons >= 1 )
   {
   | MaxFrame.moveTo( MaxWLanchor ); MaxFrame.growTo( MaxButtonSize );
   | MaxFrame.move( GPoint( MaxSwitchCol1of4.x, MaxSwitchRow.y ) );
   | MinFrame.moveTo( WLminAnchor ); MinFrame.growTo( MinButtonSize );
   | MinFrame.move( GPoint( MinSwitchCol1of4.x, MinSwitchRow.y ) );
```

C-DOC WATERLES.CP

```
| Control->addButton( MaxFrame, MinFrame, Button::Latching,
| :  "ON", "ON" );
| Control->Switch( On, OnSw );
| MaxFrame.moveTo( MaxWLanchor ); MaxFrame.growTo( MaxButtonSize );
| MaxFrame.move( MaxSwitchCol2of4 ); MaxFrame.move( MaxSwitchRow );
| MinFrame.moveTo( WLminAnchor ); MinFrame.growTo( MinButtonSize );
| MinFrame.move( MinSwitchCol2of4 ); MinFrame.move( MinSwitchRow );
| Control->addButton( MaxFrame, MinFrame, Button::Momentary,
| :  "PRE HEAT", "PH" );
| Control->Switch( PreHeat, PHSw );
| MaxFrame.moveTo( MaxWLanchor ); MaxFrame.growTo( MaxButtonSize );
| MaxFrame.move( MaxSwitchCol3of4 ); MaxFrame.move( MaxSwitchRow );
| MinFrame.moveTo( WLminAnchor ); MinFrame.growTo( MinButtonSize );
| MinFrame.move( MinSwitchCol3of4 ); MinFrame.move( MinSwitchRow );
| Control->addButton( MaxFrame, MinFrame, Button::Latching,
| :  "RUN", "RUN" );
| Control->Switch( Run, RunSw );
| MaxFrame.moveTo( MaxWLanchor ); MaxFrame.growTo( MaxButtonSize );
| MaxFrame.move( MaxSwitchCol4of4 ); MaxFrame.move( MaxSwitchRow );
| MinFrame.moveTo( WLminAnchor ); MinFrame.growTo( MinButtonSize );
| MinFrame.move( MinSwitchCol4of4 ); MinFrame.move( MinSwitchRow );
| Control->addButton( MaxFrame, MinFrame, Button::Latching,
| :  "SET POINT", "SP" );
| Control->Switch( SetPoint, SPSw );
| MaxPoint = MaxWLanchor; MaxPoint += MaxTempLabel;
| Control->addLabel( True, MaxPoint, "UNIT" );
| MinPoint = WLminAnchor; MinPoint += MinTempLabel;
| Control->addLabel( False, MinPoint, "UNIT" );
| MaxFrame.moveTo( MaxWLanchor ); MaxFrame.growTo( MaxTempSize );
| MaxFrame.move( MaxTemp1Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp1Label;
| Control->addLabel( True, MaxPoint, "1" );
| MinFrame.moveTo( WLminAnchor ); MinFrame.growTo( MinTempSize );
| MinFrame.move( MinTemp1Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp1Label;
| Control->addLabel( False, MinPoint, "1" );
| MaxFrame.moveTo( MaxWLanchor ); MaxFrame.growTo( MaxIncDecSize );
| MaxFrame.move( MaxTemp1Inc );
| if( !( TempPointer = new Button( MaxFrame, Button::Momentary,
| | : : : "H" )))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp1Dec );
```

C-DOC WATERLES.CPI

```
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
| }
| Control->addButton( True, (Button*)TempPointer );
}
if( WLtempButtons >= 2 )
{
| MaxFrame.moveTo( MaxWLanchor ); MaxFrame.growTo( MaxTempSize );
| MaxFrame.move( MaxTemp2Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp2Label;
| Control->addLabel( True, MaxPoint, "2" );
| MinFrame.moveTo( WLminAnchor ); MinFrame.growTo( MinTempSize );
| MinFrame.move( MinTemp2Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp2Label;
| Control->addLabel( False, MinPoint, "2" );
| MaxFrame.moveTo( MaxWLanchor ); MaxFrame.growTo( MaxIncDecSize );
| MaxFrame.move( MaxTemp2Inc );
| if( !( TempPointer = new Button( MaxFrame, Button::Momentary,
| | : : : "H")))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp2Dec );
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
| }
| Control->addButton( True, (Button*)TempPointer );
}
if( WLtempButtons >= 3 )
{
| MaxFrame.moveTo( MaxWLanchor ); MaxFrame.growTo( MaxTempSize );
| MaxFrame.move( MaxTemp3Anchor );
| if( !( TempPointer = new ThermoStat( MaxFrame ) ) )
| {
| | cerr << "WaterLessTemperature::Build can't create ThermoStat"
| | << endl;
```

C-DOC WATERLES.CPI

```
| | exit( EXIT_FAILURE );
| }
| Control->addButton( True, (ThermoStat*)TempPointer );
| MaxPoint = MaxWLanchor; MaxPoint += MaxTemp3Label;
| Control->addLabel( True, MaxPoint, "3" );
| MinFrame.moveTo( WLminAnchor ); MinFrame.growTo( MinTempSize );
| MinFrame.move( MinTemp3Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp3Label;
| Control->addLabel( False, MinPoint, "3" );
| MaxFrame.moveTo( MaxWLanchor ); MaxFrame.growTo( MaxIncDecSize );
| MaxFrame.move( MaxTemp3Inc );
| if( !( TempPointer = new Button( MaxFrame, Button::Momentary,
| | : : : "H")))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp3Dec );
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
| }
| Control->addButton( True, (Button*)TempPointer );
}
if( WLtempButtons >= 4 )
{
| MaxFrame.moveTo( MaxWLanchor ); MaxFrame.growTo( MaxTempSize );
| MaxFrame.move( MaxTemp4Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp4Label;
| Control->addLabel( True, MaxPoint, "4" );
| MinFrame.moveTo( WLminAnchor ); MinFrame.growTo( MinTempSize );
| MinFrame.move( MinTemp4Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp4Label;
| Control->addLabel( False, MinPoint, "4" );
| MaxFrame.moveTo( MaxWLanchor ); MaxFrame.growTo( MaxIncDecSize );
```

```
| MaxFrame.move( MaxTemp4Inc );
| if( !( TempPointer = new Button( MaxFrame, Button::Momentary,
| | : : : "H")))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp4Dec );
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
| }
| Control->addButton( True, (Button*)TempPointer );
}
if( WLtempButtons >= 5 )
{
| MaxFrame.moveTo( MaxWLanchor ); MaxFrame.growTo( MaxTempSize );
| MaxFrame.move( MaxTemp5Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp5Label;
| Control->addLabel( True, MaxPoint, "5" );
| MinFrame.moveTo( WLminAnchor ); MinFrame.growTo( MinTempSize );
| MinFrame.move( MinTemp5Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp5Label;
| Control->addLabel( False, MinPoint, "5" );
| MaxFrame.moveTo( MaxWLanchor ); MaxFrame.growTo( MaxIncDecSize );
| MaxFrame.move( MaxTemp5Inc );
| if( !( TempPointer = new Button( MaxFrame, Button::Momentary,
| | : : : "H")))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp5Dec );
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
```

C-DOC WATERLES.CPI

```
| }
| Control->addButton( True, (Button*)TempPointer );
}
if( WLtempButtons >= 6 )
{
| MaxFrame.moveTo( MaxWLanchor ); MaxFrame.growTo( MaxTempSize );
| MaxFrame.move( MaxTemp6Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp6Label;
| Control->addLabel( True, MaxPoint, "6" );
| MinFrame.moveTo( WLminAnchor ); MinFrame.growTo( MinTempSize );
| MinFrame.move( MinTemp6Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp6Label;
| Control->addLabel( False, MinPoint, "6" );
| MaxFrame.moveTo( MaxWLanchor ); MaxFrame.growTo( MaxIncDecSize );
| MaxFrame.move( MaxTemp6Inc );
| if( !( TempPointer = new Button( MaxFrame, Button::Momentary,
| | : : : "H" )))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp6Dec );
| if( !( TempPointer = new Button( MaxFrame, Button::Momentary,
| | : : : "C" )))
| {
| | cerr << "WaterLessTemperature::Build can't create Button"
| | << endl;
| | exit( EXIT_FAILURE );
| }
| Control->addButton( True, (Button*)TempPointer );
}
if( WLtempButtons >= 7 )
{
| MaxFrame.moveTo( MaxWLanchor ); MaxFrame.growTo( MaxTempSize );
| MaxFrame.move( MaxTemp7Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp7Label;
| Control->addLabel( True, MaxPoint, "7" );
| MinFrame.moveTo( WLminAnchor ); MinFrame.growTo( MinTempSize );
```

C-DOC WATERLES.CPP

```
| MinFrame.move( MinTemp7Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp7Label;
| Control->addLabel( False, MinPoint, "7" );
| MaxFrame.moveTo( MaxWLanchor ); MaxFrame.growTo( MaxIncDecSize );
| MaxFrame.move( MaxTemp7Inc );
| if( !( TempPointer = new Button( MaxFrame, Button::Momentary,
| | : : : "H")))
| {
| | cerr << "WaterLessTemperature::Build can't create Button"
| | << endl;
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp7Dec );
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
| }
| Control->addButton( True, (Button*)TempPointer );
}
if( WLtempButtons >= 8 )
{
| MaxFrame.moveTo( MaxWLanchor ); MaxFrame.growTo( MaxTempSize );
| MaxFrame.move( MaxTemp8Anchor );
| if( !( TempPointer = new ThermoStat( MaxFrame ) ) )
| {
| | cerr << "WaterLessTemperature::Build can't create ThermoStat"
| | << endl;
| | exit( EXIT_FAILURE );
| }
| Control->addButton( True, (ThermoStat*)TempPointer );
| MaxPoint = MaxWLanchor; MaxPoint += MaxTemp8Label;
| Control->addLabel( True, MaxPoint, "8" );
| MinFrame.moveTo( WLminAnchor ); MinFrame.growTo( MinTempSize );
| MinFrame.move( MinTemp8Anchor );
| if( !( TempPointer = new ThermoStat( MinFrame ) ) )
| {
| | cerr << "WaterLessTemperature::Build can't create ThermoStat"
| | << endl;
| | exit( EXIT_FAILURE );
| }
| Control->addButton( False, (ThermoStat*)TempPointer );
| MinPoint = WLminAnchor; MinPoint += MinTemp8Label;
| Control->addLabel( False, MinPoint, "8" );
| MaxFrame.moveTo( MaxWLanchor ); MaxFrame.growTo( MaxIncDecSize );
| MaxFrame.move( MaxTemp8Inc );
| if( !( TempPointer = new Button( MaxFrame, Button::Momentary,
| | : : : "H")))
| {
| | cerr << "WaterLessTemperature::Build can't create Button"
| | << endl;
```

C-DOC WATERLES.C

```
| | exit( EXIT_FAILURE );
| }
| Control->addButton( True, (Button*)TempPointer );
| MaxFrame.moveTo( MaxWLanchor ); MaxFrame.growTo( MaxIncDecSize );
| MaxFrame.move( MaxTemp8Dec );
| if( !( TempPointer = new Button( MaxFrame, Button::Momentary,
| | : : : "C")))
| {
| | cerr << "WaterLessTemperature::Build can't create Button"
| | << endl;
| | exit( EXIT_FAILURE );
| }
| Control->addButton( True, (Button*)TempPointer );
}
Control->Max(); Control->Min();
for( uint u = 0; u < WLtempButtons; u++ )// MaxTempUnits
{
# Control->TempTag( u, TempMode[u], PlateTemp[u], WaterTemp[u] );
# DisplayMode[u] %= Modes;
# Control->TempLight( u, DARKGRAY );
}
}

// is this key press appropriate for this panel
Boolean WaterLessTemperature::CanUse( uint Key )
{
if( Control == 0 )
========return False;
if( WLtempButtons && !Control->Maxed() && Key == '2' )
========return True;
if( Control->Maxed() && strchr( "+-ABCDEFGHORPS", toupper( Key ) ) )
========return True;
====return False;
}

// initialize the buttons and indicators
void WaterLessTemperature::DispInit( SheetFedConfig *ConfigData )
{
HeaterDelayTime = ConfigData->WLHeatDelayTime;
OK2Max = False;
OnSw = ConfigData->WLOnSw;
PHSw = ConfigData->WLPHSw;
PlateCoefficientD = ConfigData->PlateCoefficientD;
PlateCoefficientI = ConfigData->PlateCoefficientI;
PlateCoefficientN = ConfigData->PlateCoefficientN;
PlateCoefficientP = ConfigData->PlateCoefficientP;
PlateCoefficientT = ConfigData->PlateCoefficientT;
PreHeatTime = ConfigData->WLPreHeatTime;
RunSw = ConfigData->WLRunSw;
SPSw = ConfigData->WLSPSw;
TempUnits = ConfigData->TempUnits;
WaterCoefficientD = ConfigData->WaterCoefficientD;
WaterCoefficientI = ConfigData->WaterCoefficientI;
WaterCoefficientN = ConfigData->WaterCoefficientN;
WaterCoefficientP = ConfigData->WaterCoefficientP;
WaterCoefficientT = ConfigData->WaterCoefficientT;
WLtempButtons = ConfigData->WLtempButtons;
for( uint u = 0; u < 8; u++ )
{
# PlateSetPoint[u] = ConfigData->PlateSetPoint[u];
# PlateTemp[u] = 55;
# WaterSetPoint[u] = ConfigData->WaterSetPoint[u];
```

C-DOC WATERLES.CPI

```
  #  WaterTemp[u] = 55;
  #  TempMode[u] = ConfigData->TempMode[u];
  }
  Build();
}

// hide the blanket washer control panel
void WaterLessTemperature::Hide( void )
{
  delete Control;
  Control = 0;
}

// translate the key press into a push point
GPoint& WaterLessTemperature::MakePush( uint Key )
{
  static GPoint Push( -1, -1 );
  if( Control == 0 )
=========return Push;
  if( !Control->Maxed() && ( Key == '2' ) )
  {
  |  Push.x = LargePanelSize.x / 2;
  |  Push.y = LargePanelSize.y / 2;
  |  Push += WLminAnchor;
=========return Push;
  }
  Key = toupper( Key );
  if( Control->Maxed() && strchr( "+-ABCDEFGHORPS", Key ) )
  {
  |  Push.x = MaxButtonSize.x / 2;
  |  Push.y = MaxButtonSize.y / 2;
  |  switch( Key )
  |  {
  |  case '+':
  |  |  Push.x = MaxIncDecSize.x / 2;
  |  |  Push.y = MaxIncDecSize.y / 2;
  |  |  Push += IncButton[ActiveTemp];
  |  |===break;
  |  case '-':
  |  |  Push.x = MaxIncDecSize.x / 2;
  |  |  Push.y = MaxIncDecSize.y / 2;
  |  |  Push += DecButton[ActiveTemp];
  |  |===break;
  |  case 'A':
  |  case 'B':
  |  case 'C':
  |  case 'D':
  |  case 'E':
  |  case 'F':
  |  case 'G':
  |  case 'H':
  |  |  Push.x = MaxTempSize.x / 2;
  |  |  Push.y = MaxTempSize.y / 2;
  |  |  ActiveTemp = Key - 'A';
  |  |  Push += TempButton[ActiveTemp];
  |  |===break;
  |  case 'O':                // On
  |  |  Push += MaxSwitchRow;
  |  |  Push += MaxSwitchCol1of4;
  |  |===break;
  |  case 'P':                // Pre-heat
  |  |  Push += MaxSwitchRow;
```

```
  | | Push += MaxSwitchCol2of4;
  | |===break;
  | case 'R':            // Run
  | | Push += MaxSwitchRow;
  | | Push += MaxSwitchCol3of4;
  | |===break;
  | case 'S':            // Set-point
  | | Push += MaxSwitchRow;
  | | Push += MaxSwitchCol4of4;
  | |===break;
  | }
  | Push += MaxWLanchor;
  }
=====return Push;
}

// see if we should maximize
void WaterLessTemperature::Max( void )
{
  if( Control && OK2Max )
  | Control->Max();
}

// see if we should maximize
Boolean WaterLessTemperature::Maxed( void )
{
  if( Control )
========return Control->Maxed();
  else
========return False;
}

// minimize this panel
void WaterLessTemperature::Min( void )
{
  if( Control )
  {
  | Control->UnLatch( SetPoint );
  | Control->Min();
  }
}

// do the io functions
void WaterLessTemperature::runIO( void )
{
  const double Minutes = 65536L / 60,// ticks @ 18.2 Hz
         Seconds = Minutes / 60;
  if( WLtempButtons == 0 )
  | OpMode = Off;
  if( InterLockOn || OpMode == Off )
  | WarmUp->Set( 0 );
  if( Control && WLtempButtons )   // panel displayed
  {
  | if( Control->OneShot( PreHeat ) && OpMode == Off )
  | {
  | | PHSw = True;
  | | WarmUp->Set( (uint)( PreHeatTime * Minutes ) );
  | | OpMode = Heating;
  | }
  | if( Control->Switch( Run ) && OnSw )
  | {
  | | RunSw = True;
```

C-DOC WATERLES.CPP

```
| | if( InterLockOn )
| | | OpMode = Running;
| | else
| | | OpMode = Ready;
| | WarmUp->Set( 0 );
| | Control->Light( Run, YELLOW );
| }
| else
| {
| | RunSw = False;
| | if( OpMode == Running )
| | | OpMode = Ready;
| | Control->Light( Run, DARKGRAY );
| }
| if( Control->Switch( On ) )
| {
| | OnSw = True;
| | Control->Light( On, YELLOW );
| }
| else
| {
| | OnSw = False;
| | OpMode = Off;
| | WarmUp->Set( 0 );
| | Control->UnLatch( Run );
| | Control->UnLatch( SetPoint );
| | Control->Light( On, DARKGRAY );
| | Control->Light( Run, DARKGRAY );
| }
| if( WarmUp->Expired() )
| {
| | PHSw = False;
| | Control->Light( PreHeat, DARKGRAY );
| }
| else
| | Control->Light( PreHeat, YELLOW );
| SPSw = Control->Switch( SetPoint );
}
if( WarmUp->Expired() && OpMode == Heating )
| OpMode = Ready;
if( WaterIO )
{
| if( OpMode == Off )
| | WaterIO->SetDigital( ZonePump, False );
| else
| | WaterIO->SetDigital( ZonePump, True );
| Active = WaterIO->GetDigital( Impression );
}
else
| Active = False;
if( InterLockOn != Active )
{
| if( Active && OpMode != Off )
| {
| | OpMode = Ready;
| | WarmUp->Set( 0 );
| }
| InterLockOn = Active;
}
if( WaterWiz )
{
| WaterWiz->HeaterDelay( HeaterDelayTime );
```

C-DOC WATERLES.CPP

```
|  WaterWiz->PreHeat( PreHeatTime );
}
for( uint u = 0; u < WLtempButtons; u++ )// MaxTempUnits
{
#  if( WaterIO && WaterWiz && u < TempUnits )
#  {
#  |  PlateTemp[u] = WaterWiz->GetTemp( u, WaterStation::InfraRed );
#  |  WaterTemp[u] = WaterWiz->GetTemp( u, WaterStation::ThermoCouple );
#  |  WaterWiz->Dcoefficients( u, PlateCoefficientD, WaterCoefficientD );
#  |  WaterWiz->Icoefficients( u, PlateCoefficientI, WaterCoefficientI );
#  |  WaterWiz->Ncoefficients( u, PlateCoefficientN, WaterCoefficientN );
#  |  WaterWiz->NewSetPoints( u, PlateSetPoint[u], WaterSetPoint[u] );
#  |  WaterWiz->Pcoefficients( u, PlateCoefficientP, WaterCoefficientP );
#  |  WaterWiz->Tcoefficients( u, PlateCoefficientT, WaterCoefficientT );
#  |  if( OpMode == Off )
#  |  {
#  |  |  WaterIO->SetDigital( Heater[u], False );
#  |  |  WaterIO->SetDigital( Valves, False );
#  |  |  WaterWiz->SelectSensor( u, WaterStation::Off );
#  |  }
#  |  if( OpMode == Heating )
#  |  {
#  |  |  WaterIO->SetDigital( Heater[u], True );
#  |  |  WaterIO->SetDigital( Valves, False );
#  |  |  WaterWiz->SelectSensor( u, WaterStation::WarmUp );
#  |  }
#  |  if( OpMode == Ready || OpMode == Running )
#  |  {
#  |  |  if( TempMode[u] == PlateSense && OpMode == Running )
#  |  |  {
#  |  |  |  if( PlateTemp[u] >= PlateSetPoint[u] )
#  |  |  |  |  HeaterDelay[u]->Set( (uint)( HeaterDelayTime * Seconds ) );
#  |  |  |  WaterWiz->SelectSensor( u, WaterStation::InfraRed );
#  |  |  }
#  |  |  if( TempMode[u] == WaterSense || OpMode == Ready )
#  |  |  {
#  |  |  |  if( WaterTemp[u] >= WaterSetPoint[u] )
#  |  |  |  |  HeaterDelay[u]->Set( (uint)( HeaterDelayTime * Seconds ) );
#  |  |  |  WaterWiz->SelectSensor( u, WaterStation::ThermoCouple );
#  |  |  }
#  |  |  if( HeaterDelay[u]->Expired() )
#  |  |  |  WaterIO->SetDigital( Heater[u], True );
#  |  |  else
#  |  |  |  WaterIO->SetDigital( Heater[u], False );
#  |  |  WaterIO->SetDigital( Valves, True );
#  |  }
#  }
#  else
#  {
#  |  if( HeaterDelay[u]->Expired() && OpMode != Off )
#  |  {
#  |  |  FakePlateTemp[u] += random( 5 ) - 2;
#  |  |  FakeWaterTemp[u] += random( 5 ) - 2;
#  |  |  if( PlateTemp[u] < PlateSetPoint[u] )
#  |  |  |  FakePlateTemp[u]++;
#  |  |  if( PlateTemp[u] > PlateSetPoint[u] )
#  |  |  |  FakePlateTemp[u]--;
#  |  |  if( WaterTemp[u] < WaterSetPoint[u] )
#  |  |  |  FakeWaterTemp[u]++;
#  |  |  if( WaterTemp[u] > WaterSetPoint[u] )
#  |  |  |  FakeWaterTemp[u]--;
#  |  |  HeaterDelay[u]->Set( 1 );
```

C-DOC WATERLES.CPP

```
# | }
# | if( FakePlateTemp[u] > 32768u )
# | | FakePlateTemp[u] = 0;
# | if( FakePlateTemp[u] >= 4096 )
# | | FakePlateTemp[u] = 4095;
# | if( FakeWaterTemp[u] > 32768u )
# | | FakeWaterTemp[u] = 0;
# | if( FakeWaterTemp[u] >= 4096 )
# | | FakeWaterTemp[u] = 4095;
# | if( PlateTemp[u] != FakePlateTemp[u] * 9 / 251 + 32 )
# | {
# | | HeaterDelay[u]->Set( 10 );
# | | PlateTemp[u] = FakePlateTemp[u] * 9 / 251 + 32;
# | }
# | if( WaterTemp[u] != FakeWaterTemp[u] * 9 / 251 + 32 )
# | {
# | | HeaterDelay[u]->Set( 10 );
# | | WaterTemp[u] = FakeWaterTemp[u] * 9 / 251 + 32;
# | }
# }
# if( Control == 0 )
#=======continue;
# if( ( OpMode == Running || SPSw ) && Control->TempSwitch( u ) )
# | if( SPSw )
# | {
# | | DisplayMode[u]++;
# | | DisplayMode[u] %= Modes;
# | }
# | else
# | {
# | | TempMode[u]++;
# | | TempMode[u] %= Modes;
# | }
# if( SPSw )
# {
# | if( DisplayMode[u] == PlateDisp )
# | {
# | | if( typeOmatic->Expired() && (
# | | | : : Control->Switch( IncSw[u] ) ||
# | | | : : Control->Switch( DecSw[u] ) ) )
# | | {
# | | | if( Control->Switch( IncSw[u] ) &&
# | | | | : PlateSetPoint[u] < 125 )
# | | | | PlateSetPoint[u]++;
# | | | if( Control->Switch( DecSw[u] ) &&
# | | | | : PlateSetPoint[u] > 40 )
# | | | | PlateSetPoint[u]--;
# | | | typeOmatic->Set( 4 );
# | | }
# | | Control->TempLight( u, RED );
# | | Control->TempTag( u, PlateSetPoint[u] );
# | }
# | if( DisplayMode[u] == WaterDisp )
# | {
# | | if( typeOmatic->Expired() && (
# | | | : : Control->Switch( IncSw[u] ) ||
# | | | : : Control->Switch( DecSw[u] ) ) )
# | | {
# | | | if( Control->Switch( IncSw[u] ) &&
# | | | | : WaterSetPoint[u] < 125 )
# | | | | WaterSetPoint[u]++;
# | | | if( Control->Switch( DecSw[u] ) &&
```

C-DOC WATERLES.CPP

```
#  | | | | : WaterSetPoint[u] > 40 )
#  | | | | WaterSetPoint[u]--;
#  | | | typeOmatic->Set( 4 );
#  | | }
#  | | Control->TempLight( u, BLUE );
#  | | Control->TempTag( u, WaterSetPoint[u] );
#  | }
#  | Control->Light( SetPoint, YELLOW );
#  }
#  else
#  {
#  | if( OpMode == Off || OpMode == Heating )
#  | | Control->TempLight( u, DARKGRAY );
#  | if( OpMode == Ready || ( OpMode == Running &&
#  | | : : TempMode[u] == WaterSense ) )
#  | | Control->TempLight( u, BLUE );
#  | if( OpMode == Running && TempMode[u] == PlateSense )
#  | {
#  | | Control->TempLight( u, RED );
#  | | Control->TempTag( u, PlateSense,
#  | | : PlateTemp[u], WaterTemp[u] );
#  | }
#  | else
#  | | Control->TempTag( u, WaterSense,
#  | | : PlateTemp[u], WaterTemp[u] );
#  | Control->Light( SetPoint, DARKGRAY );
#  }
#  if( OpMode == Ready || OpMode == Running )
#  {
#  | if( ( ( OpMode == Ready || TempMode[u] == WaterSense ) &&
#  | | : : WaterTemp[u] > WaterSetPoint[u] ) ||
#  | | : ( OpMode == Running && TempMode[u] == PlateSense &&
#  | | : : PlateTemp[u] > PlateSetPoint[u] ) )
#  | | Control->Light( DecSw[u], YELLOW );
#  | else
#  | | Control->Light( DecSw[u], DARKGRAY );
#  | if( ( ( OpMode == Ready || TempMode[u] == WaterSense ) &&
#  | | : : WaterTemp[u] < WaterSetPoint[u] ) ||
#  | | : ( OpMode == Running && TempMode[u] == PlateSense &&
#  | | : : PlateTemp[u] < PlateSetPoint[u] ) )
#  | | Control->Light( IncSw[u], YELLOW );
#  | else
#  | | Control->Light( IncSw[u], DARKGRAY );
#  }
#  else
#  {
#  | Control->Light( DecSw[u], DARKGRAY );
#  | Control->Light( IncSw[u], DARKGRAY );
#  }
   }
}

// do the finger poking thing
Boolean WaterLessTemperature::Touched( GPoint& Push )
{
   if( WLtempButtons && Control )
   | OK2Max = Control->Touched( Push );
   else
   | OK2Max = False;
=====return OK2Max;
}
```

C-DOC WATERLES.CPP

```
// change the configuration parameters
void WaterLessTemperature::UpdateSetup( SheetFedConfig *ConfigData )
{
   for( uint u = 0; u < WLtempButtons; u++ )// MaxTempUnits
   {
   #  ConfigData->PlateSetPoint[u] = PlateSetPoint[u];
   #  ConfigData->TempMode[u] = TempMode[u];
   #  ConfigData->WaterSetPoint[u] = WaterSetPoint[u];
   #  ConfigData->WLOnSw = OnSw;
   #  ConfigData->WLPHSw = PHSw;
   #  ConfigData->WLRunSw = RunSw;
   #  ConfigData->WLSPSw = SPSw;
   }
}
```

What is claimed is:

1. A system for controlling auxiliary devices associated with a printing press from a common location, the system comprising, a plurality of auxiliary devices connected to the printing press, each auxiliary device having individual operating parameters, a controller including a processor and a memory for storing values of the operating parameters, an input device for obtaining commands and connected to provide electrical signals to the processor corresponding to the commands, an interface for connecting the auxiliary devices to the processor such that signals from the processor control the operating parameters of the auxiliary devices, and a display connected to receive electrical image signals from the processor, the display including a first area for displaying images thereon representing control panels of the auxiliary devices and a second area for displaying an image thereon representing a selected one of the control panels, the processor operating the display to provide real-time status information in the control panel images of non-selected auxiliary devices concurrent with the display of the control panel image of the selected auxiliary device, at least some of the images of the non-selected control panels being displayed independent of the display of the selected control panel, and the processor providing signals to the interface to control the auxiliary device corresponding to the selected control panel image in accordance with commands from the input device.

2. The system of claim 1 wherein the input device comprises a touch screen controller coordinated with the display for obtaining commands from an operator by detecting physical proximity to one of the areas of the display screen displaying an image representing one of the control panels.

3. The system of claim 1 wherein the processor controls the display to enlarge the image of the selected one of the control panels and to display the enlarged image in the second area upon receiving a selection command from the input device.

4. The system of claim 1 further comprising a storage device, wherein the input device includes means for entering an identifying label to the controller and for commanding the storage of the operating parameters of the auxiliaries from the memory of the controller to the storage device in conjunction with the identifying label.

5. The system of claim 4 wherein the means for entering an identifying label and for commanding the storage of values comprises a touch screen controller coordinated with the display for obtaining commands by detecting physical proximity to an area of the display screen, the means further including a first image on the display screen corresponding to alphanumeric characters and a second image on the display screen corresponding to a store command, such that at least one alphanumeric character is entered upon detection of physical proximity thereto for storing as an identifying label upon subsequent detection of the store command.

6. The system of claim 4 wherein the input device includes means for entering an identifying label and for commanding retrieval of the operating parameters of the auxiliaries from the storage device to the memory of the controller in conjunction with the identifying label.

7. The system of claim 6 wherein the means for entering an identifying label and for retrieving the storage of values comprises a touch screen controller coordinated with the display for obtaining commands by detecting physical proximity to an area of the display screen, the means further including a first image on the display screen corresponding to alphanumeric characters, and a second image on the display screen corresponding to a recall command, such that at least one alphanumeric character is entered upon detection of physical proximity thereto for referencing as an identifying label upon detection of the recall command to access the set of data values for recalling to the memory of the controller.

8. The system of claim 2 wherein one of the auxiliaries comprises a sprayer, and wherein the input device includes means for increasing and decreasing the output level of the sprayer.

9. A system for controlling auxiliary devices associated with a printing press from a common location, the system comprising, in combination, a plurality of auxiliary devices connected to the printing press, each auxiliary device having individual operating parameters, a controller including a processor and a memory for storing values of the operating parameters, a display connected to receive electrical image signals from the processor, the display including a first area for displaying images thereon representing control panels for the auxiliary devices and a second area for displaying an image thereon representing a selected one of the control panels, a touch screen controller adjacent the display for detecting physical proximity to the displayed control panels and providing electrical signals to the processor corresponding thereto, and an interface for connecting the auxiliary devices to the processor, the processor including a translator for translating signals from the touch screen controller to commands for 1) selecting one of control panel images from the first area for display in the second area, 2) updating the contents of the memory and 3) providing signals to the interface to control the operating parameters of the auxiliary device corresponding to the selected control panel in accordance with the commands, the processor operating the display to provide real-time status information in the control panel images of non-selected auxiliary devices concurrent with the display of the control panel image of the selected auxiliary device, at least some of the images of the non-selected control panels being displayed independent of the display of the selected control panel.

10. The system of claim 9 wherein the translator controls the display to enlarge the image of the selected one of the control panels and to display the enlarged image in the second area upon translating the signal received from the touch screen controller indicative of the selection of one of the control panels.

11. The system of claim 9 further comprising memory maps each having commands stored therein corresponding to coordinates on the display screen, wherein the translator receives signals from the touch screen controller representing coordinates on the display screen, and the translator references one of the memory maps to translate the received coordinates into a command.

12. The system of claim 11 further comprising a storage device, wherein the images on the display screen include an icon for selecting a request to save a set of values for the operating parameters and the touch screen controller provides coordinates to the translator indicative thereof, the translator modifying the images on the display screen and accessing one of the memory maps associated with the modified images to translate coordinates received from the touch screen controller into an identifying label after receipt of the save request, the translator commanding the storage of the set of values for the operating parameters from the memory to the storage device in correlation with the identifying label such that the label can be used to later recall the set of values.

13. The system of claim 12 wherein the display screen includes an icon for selecting a request to recall the set of values of the operating parameters and the touch screen controller provides coordinates to the translator indicative thereof, the translator modifying the images on the display and accessing one of the memory maps associated therewith to translate coordinates received from the touch screen controller into the identifying label upon receiving the recall request, the translator commanding the retrieval of the set of values of the operating parameters of the auxiliaries from the storage device to the memory in correlation with the identifying label in response to recognition of the label.

14. A method of controlling operating parameters of auxiliary devices connected to a printing press, comprising the steps of:

displaying an image representing the control panels corresponding to each auxiliary device connected to the printing press on a first area of a display screen at a common location;

receiving real-time status information from the auxiliary devices;

updating the display of the control panel images of the auxiliary devices in the first area;

selecting from the image one of the control panels;

displaying an image representing the selected control panel on a second area of the display screen while concurrently displaying the images of the non-selected control panels, at least some of the images of the non-selected control panels being displayed independent of the display of the selected control panel;

actuating the selected control panel on the display screen for inputting values of the operating parameters;

selecting values for the operating parameters of the selected control panel of the auxiliary device; and outputting a signal corresponding to the selected operating parameter to control the operating parameter of the selected auxiliary device.

15. The method of claim 14 wherein the step of displaying an image representing the selected control panel includes enlarging the image of the selected control panel.

16. The method of claim 14 wherein the step of selecting one of the control panels includes resolving an X–Y coordinate of a touch to the display.

17. The method of claim 14 further comprising the steps of entering an identifying label corresponding to the values of the operating parameters for the auxiliary device, and storing the values in correlation with the identifying label for later recall.

18. The method of claim 17 further comprising the steps of entering the identifying label corresponding to the values of the operating parameters stored for the auxiliary device, retrieving the values correlated with the identifying label, and outputting signals corresponding to the values of the operating parameters for controlling the auxiliary device.

19. The method of claim 18 wherein the display provides visual prompts for commanding the storage and retrieval of the values of the operating parameters, and the step of storing the values includes the steps of a) sensing a request to store the values, altering the image on the display to provide a prompt for entering the identifying label, and c) sensing the entry of the label; and the step of retrieving the values of the operating parameters includes the steps of a) sensing the request to retrieve the values, b) altering the image on the display to provide a prompt for entering the identifying label, and c) sensing the entry of the label.

20. A method of controlling an operating parameter of an auxiliary device connected to a printing press, comprising the steps of:

displaying at one area of a display screen an image of the control panels for each auxiliary device connected to the printing press;

receiving real-time status information from the auxiliary devices;

updating the display of the control panel images of the auxiliary devices in the first area;

selecting one of the control panels;

displaying an image representing the selected control panel on a second area of the display screen while concurrently displaying the images of the non-selected control panels, at least some of the images of the non-selected control panels being displayed independent of the display of the selected control panel;

actuating a user input icon on the selected one of the control panels and providing a visual confirmation indicative of the actuation;

entering by way of the user input icon a value for the operating parameter of the selected auxiliary device; and outputting a signal corresponding to the entered value of the operating parameter for controlling the selected auxiliary device.

21. The method of claim 20 wherein the steps of selecting, actuating, and entering include resolving a value of an X–Y coordinate on a touch screen of the display.

22. The method of claim 21 further comprising the steps of correlating an identifying label with the values of the parameter for the auxiliary device, and storing the value and identifying label in a memory.

23. The method of claim 22 further comprising the steps of retrieving the stored value by first presenting the identifying label corresponding to the value stored in the memory, presenting a retrieve command, and displaying the value in the memory on the display.

24. The method of claim 23 wherein the display provides icons for prompting the storing and retrieving of the values of the operating parameter, and the step of storing the values includes the steps of a) requesting storage of the value by touching one of the icons, b) altering the image of the display to provide a prompt for entering the identifying label, and c) storing the identifying label in correlation with the value; and the step of retrieving the value includes the steps of a) requesting retrieval of the stored value, b) altering the image of the display to provide a prompt for entering the identifying label; and c) retrieving the stored value by accessing a location of the memory correlated with the identifying label.

25. The method of claim 23 further comprising the step of inputting a plurality of values for a plurality of operating parameters and outputting a plurality of signals corresponding to the values to control the operating parameters of a plurality of auxiliary devices.

* * * * *